(12) United States Patent
Nhan et al.

(10) Patent No.: US 12,505,128 B2
(45) Date of Patent: Dec. 23, 2025

(54) CREATION AND CONSUMPTION OF DATA MODELS THAT SPAN MULTIPLE SETS OF FACTS

(71) Applicant: Salesforce, Inc., San Francisco, CA (US)

(72) Inventors: Thomas Nhan, Seattle, WA (US); Zeki Melek, San Jose, CA (US); Gideon Goldin, Shorewood, WI (US); Alvin Leung, Sunnyvale, CA (US); Haya Gur, San Jose, CA (US); Ryan Neil Travitz, Seattle, WA (US); Rakhi Harkawat, Cedar Park, TX (US); Yuwen Li, Seattle, WA (US); Randall Moss, Seattle, WA (US); Mallika Manoj Malkani, Seattle, WA (US); Allan Folting, Woodinville, WA (US); Lena Protasov, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/424,505

(22) Filed: Jan. 26, 2024

(65) Prior Publication Data
US 2024/0378243 A1 Nov. 14, 2024

Related U.S. Application Data

(60) Provisional application No. 63/464,911, filed on May 8, 2023.

(51) Int. Cl.
*G06F 16/28* (2019.01)
*G06F 3/04812* (2022.01)
(Continued)

(52) U.S. Cl.
CPC ........ *G06F 16/287* (2019.01); *G06F 3/04812* (2013.01); *G06F 3/04817* (2013.01);
(Continued)

(58) Field of Classification Search
CPC ............... G06F 16/287; G06F 3/04812; G06F 3/04817; G06F 16/2246; G06F 16/2453;
(Continued)

(56) References Cited

U.S. PATENT DOCUMENTS 9,779,150 B1 * 10/2017 Sherman ................. G06F 16/26
10,402,061 B2    9/2019 Kohlmeier et al.
(Continued)

OTHER PUBLICATIONS

SS-BI Tutorials, (Feb. 2013), 'Erwin Data modeler relationships', https://www.youtube.com/watch?v=UfwyD13jr8Q&t=45s (Year: 2013).*

(Continued)

*Primary Examiner* — Apu M Mofiz
*Assistant Examiner* — Oscar Wehovz
(74) *Attorney, Agent, or Firm* — Morgan, Lewis & Bockius LLP

(57) ABSTRACT

A computing device displays a first object icon representing a first object of a first data source and a second object icon, representing a second object of the first data source. The first object icon is connected to the second object icon via a first connector representing a relationship between the first object and the second object. In response to receiving a first user input to add a third object, the computing device displays a third object icon representing the third object. In response to receiving a second user input on the third object icon, in accordance with a determination that the second object and the third object include at least one common data field, the computing device displays a second connector, connecting the third object icon to the second object icon.

20 Claims, 91 Drawing Sheets

(51) Int. Cl.
    *G06F 3/04817*     (2022.01)
    *G06F 16/22*     (2019.01)
    *G06F 16/2453*     (2019.01)
    *G06F 16/2455*     (2019.01)
    *G06F 16/901*     (2019.01)

(52) U.S. Cl.
    CPC ...... *G06F 16/2246* (2019.01); *G06F 16/2453* (2019.01); *G06F 16/24535* (2019.01); *G06F 16/2456* (2019.01); *G06F 16/9027* (2019.01)

(58) Field of Classification Search
    CPC ........... G06F 16/24535; G06F 16/2456; G06F 16/9027; G06F 16/248
    See application file for complete search history.

(56) References Cited

U.S. PATENT DOCUMENTS

| | | | |
|---|---|---|---|
| 10,795,902 | B1 | 10/2020 | Setlur et al. |
| 10,997,217 | B1 | 5/2021 | Nielsen et al. |
| 11,216,450 | B1 * | 1/2022 | Nhan .................. G06F 3/04812 |
| 11,580,127 | B1 | 2/2023 | Newman |
| 2002/0069193 | A1 | 6/2002 | Beavin et al. |
| 2012/0054226 | A1 | 3/2012 | Cao et al. |
| 2015/0120698 | A1 | 4/2015 | Plattner et al. |
| 2015/0134598 | A1 | 5/2015 | Banerjee et al. |
| 2015/0134599 | A1 | 5/2015 | Banerjee et al. |
| 2016/0225271 | A1 | 8/2016 | Robichaud et al. |
| 2018/0089286 | A1 | 3/2018 | Marquardt et al. |
| 2018/0129374 | A1 | 5/2018 | Kim et al. |
| 2019/0065565 | A1 | 2/2019 | Stolte et al. |
| 2019/0155803 | A1 | 5/2019 | Miller et al. |
| 2020/0026532 | A1 | 1/2020 | Bill et al. |
| 2020/0125239 | A1 * | 4/2020 | Talbot .................. G06F 16/904 |
| 2020/0401581 | A1 * | 12/2020 | Eubank ............... G06F 16/2282 |
| 2021/0149935 | A1 | 5/2021 | De Boer |
| 2021/0256039 | A1 * | 8/2021 | Weir ..................... G06F 16/287 |
| 2022/0318262 | A1 | 10/2022 | Whilden et al. |
| 2023/0394053 | A1 | 12/2023 | Mahdy et al. |
| 2024/0265024 | A1 | 8/2024 | Newman |

OTHER PUBLICATIONS

Nhan, Office Action, U.S. Appl. No. 18/751,126, filed Jun. 2, 2025, 22 pgs.

Nhan, Office Action, U.S. Appl. No. 18/751,131, filed Jun. 20, 2025, 12 pgs.

Nhan, Notice of Allowance, U.S. Appl. No. 18/424,592, filed May 14, 2025, 13 pgs.

Nhan, Notice of Allowance, U.S. Appl. No. 18/424,619, filed Apr. 1, 2025, 12 pgs.

Andreas Grünwald et al., "The semantic model editor," Semantic Systems, Sep. 4, 2014, Copyright 2014, ACM 978-1-4503-2927, pp. 116-123, 8 pgs.

Nhan, Office Action, U.S. Appl. No. 18/424,592, filed Dec. 4, 2024, 13 pgs.

Nhan, Office Action, U.S. Appl. No. 18/424,619, filed Dec. 4, 2024, 7 pgs.

Salesforce, Inc., International Search Report and Written Opinion, PCT/US2024/028206, Jan. 16, 2025, 16 pgs.

* cited by examiner

Tree 1:

Tree 2:

Tree 3:

Object Field Subgraph — Minimum Subgraph

Object Field Subgraph — Minimum Subgraph

Object Field Subgraph

Minimum Subgraph

| Month | Category | SUM(Sold) | SUM(Spent) |
|---|---|---|---|
| Jan | Transportation | 1 | 9310 |
| Feb | Transportation | | 2828 |
| Mar | Device | 13 | 3819 |
| Apr | Device | 32 | |
| | Transportation | 19 | |
| May | Transportation | | 8182 |

Figure 24A

| SUM(Sold) | SUM(Spent) |
|---|---|
| 68 | 24139 |

Figure 24B

| Month | Category |
|---|---|
| Jan | Device |
| | Transportation |
| Feb | Device |
| | Transportation |
| Mar | Device |
| | Transportation |
| Apr | Device |
| | Transportation |
| May | Device |
| | Transportation |

Figure 24C

| Month | Category | SUM(Sales) |
|---|---|---|
| Jan | Transportation | 1 |
| Mar | Device | 13 |
| Apr | Device | 32 |
|  | Transportation | 22 |

Figure 24D

| Month | SUM(Sales) | SUM(Spend) |
|---|---|---|
| Jan | 1 | 2828 |
| Feb |  | 9310 |
| Mar | 13 | 3819 |
| Apr | 54 |  |
| May |  | 8182 |

Figure 24E

| Month | Category | SUM(Sales) | SUM(Spend) |
|---|---|---|---|
| Mar | Device | 13 | 3819 |
| Apr | Device | 32 |  |

Figure 24F

| Month | Category | SUM(Sales) | SUM(Spend) |
|---|---|---|---|
| Jan | Transportation | 1 | 2828 |
| Feb | Transportation |  | 9310 |
| Mar | Device | 13 |  |
| Apr | Device | 32 |  |
|  | Transportation | 22 |  |
| May | Transportation |  | 8182 |

Figure 24G

|   | A | B | C | D | E |
|---|---|---|---|---|---|
| 1 | Month | Category | SUM(Sales) | SUM(Spend) | norm Sales |
| 2 | Jan | Transportation | 1 | 2828 | 0.00035 |
| 3 | Feb | Transportation |  | 9310 | 0 |
| 4 | Mar | Device | 13 |  |  |
| 5 | Apr | Device | 32 |  |  |
| 6 |  | Transportation | 22 |  |  |
| 7 | May | Transportation |  | 8182 | 0 |

2602 A method is performed at a computing device having a display, one or more processors, and memory.

2604 The memory stores one or more programs configured for execution by the one or more processors.

2606 Display, in a user interface, a first object icon and a second object icon positioned to the right of the first object icon. The first object icon represents a first object of a first data source. The second object icon represents a second object of the first data source. The first object icon is connected to the second object icon via a first connector representing a relationship between the first object and the second object. The relationship between the first object and the second object has a first cardinality.

2608 The first cardinality is one of: a many-to-many relationship, a many-to-one relationship, or a one-to-many relationship.

2610 In response to receiving user selection of the first object icon: display, in the user interface, a plurality of data rows and data columns representing information corresponding to one or more data fields in the first object.

2612 The first object comprises a first fact table.

2614 In response to receiving a first user input to add a third object, display, in the user interface, a third object icon representing the third object.

2616 The third object comprises a second fact table that is unrelated to the first fact table.

2618 The third object is an object of the first data source.

2620 The third object is an object of a second data source, distinct from the first data source.

2638 After connecting the third object icon to the second object icon, in response to receiving a user interaction with the second connector, display an identification of the at least one common data field.

2640 After connecting the third object icon to the second object icon, vertically align the first object icon and the third object icon for display in the user interface.

2642 After connecting the third object icon to the second object icon, arranging the first object icon and the third object icon in an alphabetical order for display in the user interface.

Figure 28C 2600 (cont'd)

2644 Display, in the user interface, a fourth object icon representing a fourth object. The fourth object icon is connected to the second object icon via a third connector representing a relationship between the fourth object and the second object. The relationship between the fourth object and the second object has a third cardinality. The fourth object icon is connected to a fifth object icon, representing a fifth object, via a fourth connector representing a relationship between the fourth object and the fifth object. The relationship between the fourth object and the fifth object has a fourth cardinality. The third connector and the fourth connector include an overlapping portion.

2646 The third cardinality is one of: a many-to-many relationship, a many-to-one relationship, or a one-to-many relationship.

2648 The fourth cardinality is one of: a many-to-many relationship, a many-to-one relationship, or a one-to-many relationship.

2650 In response to receiving a user interaction with the overlapping portion of the third connector and the fourth connector, concurrently display (i) an identification of a first related data field relating the fourth object and the second object and (ii) an identification of a second related data field relating the fourth object and the fifth object.

2652 The first object icon, the second object icon, the third object icon, the fourth object icon, and the fifth object icon are distinct icons.

2654 The first related data field and the second related data field are distinct data fields.

2656 In response to user selection of the identification of the first related data field relating the fourth object and the second object, simultaneously visually emphasize the fourth object icon, the second object icon, and the third connector.

Figure 28D 2600 (cont'd)

2658 Display, in the user interface, (i) a fourth object icon representing a fourth object; (ii) a fifth object icon representing a fifth object; and (iii) a third connector connecting the fourth object icon and the fifth object icon. The third connector represents a many-to-many relationship between the fourth object and the fifth object.

2660 The fourth object icon, the fifth object icon, and the third connector are not connected to any of the first object icon, the second object icon, or the third object icon.

2662 In response to receiving a third user input on the fifth object icon, generate and display, in the user interface, a freeform line. A first end of the freeform line is connected to the fifth object icon and a second end of the freeform line corresponds to the position of a mouse cursor in the user interface.

2664 In response to receiving an interaction between the second end of the line and the second object icon, convert the freeform line into a third connector connecting the fifth object icon and the second object icon. The third connector represents a many-to-many relationship between the fifth object and the second object.

2666 The first object icon, the second object icon, and the third object icon are displayed in a first portion of the user interface. The fourth object icon and the fifth object icon are displayed in a second portion of the user interface. Converting the freeform line into a third connector connecting the fifth object icon and the second object icon includes redisplaying the fourth object icon and the fifth object icon in the first portion of the user interface.

2744 Concurrently while displaying the third data visualization, update a visual characteristic of the subset of data fields from the second visual characteristic to the first visual characteristic.

(E)

2746 After displaying the third data visualization: in response to receiving (i) user selection of a fourth data field icon from the subset of data field icons, corresponding to a fourth data field, and (ii) placement of the fourth data field icon in the shelf region: execute a third query that specifies an aggregation of data values of the fourth data field according to the third data field to generate a fourth data visualization.

2748 Display, in the user interface, the fourth data visualization.

2750 The fourth data visualization is concurrently displayed with the third data visualization in the user interface.

2752 The third data visualization and the fourth data visualization share a common data axis.

Figure 29D 2800 (cont'd)

2814 Construct a dimension subquery according to characteristics of the first dimension data field, the second dimension data field, the first object, and/or the second object.

2816 Determine a join type for combining (i) first data rows that include data values of the first dimension data field and (ii) second data rows that include data values of the second dimension data field.

2818 Construct the dimension subquery according to the determined join type. The dimension subquery references the first object and the second object.

2820 Execute the dimension subquery against one or more data sources corresponding to the first dimension data field and the second dimension data field to retrieve first tuples that comprise unique ordered combinations of data values for the first dimension data field and the second dimension data field.

2822 The one or more data sources comprise a plurality of data sources.

2824 Construct one or more measure subqueries, each of the measure subqueries referencing one or more measure data fields in the object model.

2826 Execute the one or more measure subqueries to retrieve second tuples.

2828 Form extended tuples by combining the retrieved first tuples and the retrieved second tuples.

2830 Generate and display the first data visualization according to the extended tuples.

Figure 30B 2800 (cont'd)

2842 When (i) the first object is shared by a first set of root objects and (ii) the second object is shared by a second set of root objects, combine data columns of the first dimension data field and the second dimension data field using a cross join.

2844 When (i) the first object is a first root object, (ii) the second object can be traced to the first root object, and the (iii) the second dimension data field is not shared by another root object, combine data columns of the first dimension data field and the second dimension data field using an inner join.

Figure 30D

CREATION AND CONSUMPTION OF DATA MODELS THAT SPAN MULTIPLE SETS OF FACTS

RELATED APPLICATIONS

This application claims priority to U.S. Provisional Patent Application No. 63/464,911, filed May 8, 2023, titled "Creation and Consumption of Data Models that Span Multiple Sets of Facts," which is incorporated by reference herein in its entirety.

This application is related to U.S. Patent Application No. 18/424,592, filed on Jan. 26, 2024, titled "Infoscenting Fields for Multi-Fact Data Model Analysis Using Shared Dimensions," which is incorporated by reference herein in its entirety.

This application is related to U.S. Patent Application No. 18/424,619, filed on Jan. 26, 2024, titled "Query Semantics for Multi-Fact Data Model Analysis Using Shared Dimensions," which is incorporated by reference herein in its entirety.

This application is related to the following applications, each of which is incorporated by reference herein in its entirety:
(i) U.S. patent application Ser. No. 15/911,026, filed on Mar. 2, 2018, titled "Using an Object Model of Heterogeneous Data to Facilitate Building Data Visualizations," now U.S. Pat. No. 11,620,315, issued on Apr. 4, 2023;
(ii) U.S. patent application Ser. No. 16/236,612, filed on Dec. 30, 2018, titled "Generating Data Visualizations According to an Object Model of Selected Data Sources," now U.S. Pat. No. 11,537,276, issued on Dec. 27, 2022;
(iii) U.S. patent application Ser. No. 16/944,047, filed on Jul. 30, 2020, titled "Analyzing Data Using Data Fields from Multiple Objects in an Object Model," now U.S. Pat. No. 11,216,450, issued on Jan. 4, 2022;
(iv) U.S. patent application Ser. No. 17/397,913, filed on Aug. 9, 2021, titled "Validating Relationships Between Classes in Object Models," now U.S. Pat. No. 11,520,463, issued on Dec. 6, 2022; and
(v) U.S. patent application Ser. No. 17/307,427, filed on May 4, 2021, titled "Systems and Methods for Visualizing Object Models of Database Tables."

TECHNICAL FIELD

The disclosed implementations relate generally to data visualization and more specifically to systems and methods that facilitate building object models and validating relationships between objects in object models of a data source.

BACKGROUND

Data visualization applications enable a user to understand a data set visually, including distribution, trends, outliers, and other factors that are important to making business decisions. Some data visualization applications provide a user interface that enables users to build visualizations from a data source by selecting data fields and placing them into specific user interface regions to indirectly define a data visualization. However, when there are complex data sources and/or multiple data sources, it may be unclear what type of data visualization to generate (if any) based on a user's selections or how data fields are related.

SUMMARY

Enterprises need a holistic understanding of their data to effectively manage their businesses. Oftentimes, their data exists as "silos," in the form of separate but related fact tables, with common dimensions (e.g., dimension data fields or dimension fields) such as time and geography. These tables can be combined together using row-level joins. However, there are "sets of facts" (e.g., groups of related tables) that do not have row-level correspondence. For example, an organization may have a marketing department that controls a marketing campaign for products, and a sales department that owns the sales of these products. In this situation, having the ability to combine data from a marketing fact table and a sales fact table can provide a complete and accurate picture about the effectiveness of the marketing campaign and its impact on sales.

Currently, some data analytics applications restrict analysis to a single set of facts, limiting the questions analysts can ask and imposing a maintenance burden on data stewards who must support workarounds.

Accordingly, there is a need for improved methods, devices, systems, and user interfaces that enable the creation of data models (also known as "object models") that span multiple fact tables. There is also a need for improved methods, devices, systems, and user interfaces that enable a user to analyze a multi-fact data model.

Some implementations of the present disclosure are directed to a computing device having an improved user interface that facilitates authoring of a multi-fact data model. The data models disclosed herein are displayed in the user interface in a more compact manner compared to existing data models (see, e.g., FIG. 1C). The user interface facilitates selection and disambiguation of relationships in the object model.

In some implementations, in response to user interaction with (e.g., hover over) an object in the object model, the computing device highlights that object and traces other objects in the object model that are shared with that object, thus providing improved visual feedback to the user.

Some implementations of the present disclosure are directed to a computing device having an improved user interface that facilitates analysis of a multi-fact data model.

In some instances, in a complex multi-fact data model, analysts cannot easily identify the relevant fields to be used together. Once they start their analysis, the analysts can easily lose sight of fields that are relevant and those that are not relevant. There are multiple perspectives on how to utilize a complex data model and these perspectives need to adapt to the analyst's analytic workflow.

Some implementations of the present disclosure provide a simple yet informative way of guiding the analyst in fully utilizing the multi-fact data model. In some implementations, the user interface grays out fields that are not relevant to the current analysis (e.g., not relevant to the fields that are currently in use in the analysis). In some implementations, the user interface infoscents grayed out fields and provides an explanation as to why they are not related and the consequence of using them. An analyst obtains sufficient information from the tooltips that are displayed in the user interface, to decide whether to proceed. As the analyst continues to explore the data model, the relatability of fields also adapts to user input. In some implementations, the user interface preserves relevant reminders in the fields that have been used, and whether they are related or unrelated fields, so that the analyst can always go back and refine the analysis.

Some implementations of the present disclosure are directed to improved query semantics that support multi-fact data model analysis. The disclosed query semantics are fully compatible with Tableau's VizQL, which provides flexible interactivity, and answers sophisticated analytic questions in an iterative approach.

The systems, methods, and devices of this disclosure each has several innovative aspects, no single one of which is solely responsible for the desirable attributes.

(A1) In accordance with some implementations, a method for generating object models that span multiple fact tables is performed at computing device having a display, one or more processors and memory storing one or more programs configured for execution by the one or more processors. The method includes displaying, in a user interface, a first object icon and a second object icon positioned to the right of the first object icon. The first object icon represents a first object of a first data source. The second object icon represents a second object of the first data source. The first object icon is connected to the second object icon via a first connector representing a relationship between the first object and the second object. The relationship between the first object and the second object has a first cardinality. The method includes, in response to receiving a first user input to add a third object, displaying, in the user interface, a third object icon representing the third object. The method includes, in response to receiving a second user input on the third object icon, when the second object and the third object include at least one common data field, generating and displaying, in the user interface, a second connector connecting the third object icon to the second object icon. The second connector represents a relationship between the third object and the second object. The relationship between the third object and the second object has a second cardinality.

(A2) In some implementations of A1, the first cardinality is one of: a many-to-many relationship, a many-to-one relationship, or a one-to-many relationship.

(A3) In some implementations of A1 or A2, the second cardinality is one of: a many-to-many relationship, a many-to-one relationship, or a one-to-many relationship.

(A4) In some implementations of any of A1-A3, the second user input comprises user selection of at least a portion of the third object icon. The method further includes, in response to the user selection: generating and displaying, in the user interface, a freeform line. A first end of the freeform line is connected to the third object icon and a second end of the freeform line corresponds to a position of a mouse cursor in the user interface.

(A5) In some implementations of any of A1-A4, the method further includes, in response to receiving a user interaction with the second connector, displaying an identification of the at least one common data field.

(A6) In some implementations of any of A1-A5, the method further includes, after connecting the third object icon to the second object icon via the second connector, in response to receiving user selection of the first object icon, displaying, in the user interface, a plurality of data rows and data columns representing information corresponding to one or more data fields in the first object.

(A7) In some implementations of any of A1-A6, the method further includes, after connecting the third object icon to the second object icon via the second connector, vertically aligning the first object icon and the third object icon for display in the user interface.

(A8) In some implementations of any of A1-A7, the method further includes, after connecting the third object icon to the second object icon via the second connector, arranging the first object icon and the third object icon in an alphabetical order for display in the user interface.

(A9) In some implementations of any of A1-A8, displaying the second connector connecting the third object icon to the second object icon comprises converting the second object from a subtree of the first object to a shared object.

(A10) In some implementations of A9, the shared object is a dimension logical table consisting of one or more dimension data fields.

(A11) In some implementations of any of A1-A10, the first object comprises a first fact table and the third object comprises a second fact table that is unrelated to the first fact table.

(A12) In some implementations of any of A1-A11, the at least one common data field comprises a geographic data field.

(A13) In some implementations of any of A1-A11, the at least one common data field comprises a date/time data field.

(A14) In some implementations of any of A1-A13, the third object is an object of the first data source.

(A15) In some implementations of any of A1-A13, the third object is an object of a second data source, distinct from the first data source.

(A16) In some implementations of any of A1-A15, the method further includes, displaying, in the user interface, a fourth object icon representing a fourth object. The fourth object icon is connected to the second object icon via a third connector representing a relationship between the fourth object and the second object. The relationship between the fourth object and the second object has a third cardinality. The fourth object icon is connected to a fifth object icon, representing a fifth object, via a fourth connector. The fourth connector represents a relationship between the fourth object and the fifth object. The relationship between the fourth object and the fifth object has a fourth cardinality. The third connector and the fourth connector include an overlapping portion. The method includes, in response to receiving a user interaction with the overlapping portion of the third connector and the fourth connector, concurrently displaying (i) an identification of a first related data field relating the fourth object and the second object and (ii) an identification of a second related data field relating the fourth object and the fifth object. The first object icon, the second object icon, the third object icon, the fourth object icon, and the fifth object icon are distinct icons. The first related data field and the second related data field are distinct data fields.

(A17) In some implementations of A16, the method further includes, in response to user selection of the identification of the first related data field relating the fourth object and the second object, simultaneously visually emphasizing the fourth object, the second object, and the third connector.

(A18) In some implementations of A16 or A17, the third cardinality is one of: a many-to-many relationship, a many-to-one relationship, or a one-to-many relationship.

(A19) In some implementations of any of A16-A18, the fourth cardinality is one of: a many-to-many relationship, a many-to-one relationship, or a one-to-many relationship.

(A20) In some implementations of any of A1-A19, the method further comprises displaying, in the user interface, (i) a fourth object icon representing a fourth object; (ii) a fifth object icon representing a fifth object; and (iii) a third connector connecting the fourth object icon and the fifth object icon. The third connector represents a many-to-many relationship between the fourth object and the fifth object. The fourth object icon, the fifth object icon, and the third connector are not connected to any of the first object icon, the second object icon, or the third object icon. The method includes, in response to receiving a third user input on the fifth object icon, generating and displaying, in the user interface, a freeform line. A first end of the freeform line is connected to the fifth object icon and a second end of the freeform line corresponds to the position of a mouse cursor in the user interface. The method includes, in response to receiving an interaction between the second end of the freeform line and the second object icon: converting the freeform line into a third connector connecting the fifth object icon and the second object icon, the third connector representing a many-to-many relationship between the fifth object and the second object.

(A21) In some implementations of A20, the first object icon, the second object icon, and the third object icon are displayed in a first portion of the user interface. The fourth object icon and the fifth object icon are displayed in a second portion of the user interface. Converting the freeform line into a third connector connecting the fifth object icon and the second object icon includes redisplaying the fourth object icon and the fifth object icon in the first portion of the user interface.

(B1) In accordance with some implementations, a method for performing guided analysis using multi-fact object model is performed at computing device having a display, one or more processors and memory storing one or more programs configured for execution by the one or more processors. The method includes displaying, in a user interface, a plurality of data field icons corresponding to a plurality of data fields. Each of the data fields is associated with a respective object of a plurality of objects in an object model. The method includes, in response to (i) user selection of a first data field icon, from the plurality of data field icons, corresponding to a first data field, and (ii) placement of the first data field icon in a shelf region of the user interface, where the first data field is associated with a first object of the plurality of objects: (1) generating and displaying a first data visualization in the user interface and (2) updating a visual characteristic, of a subset of the plurality of data field icons that are displayed in the user interface, from a first visual characteristic to a second visual characteristic. Each data field icon in the subset of data field icons is associated with a second object of the plurality of objects, distinct from the first object. The data field icons in the subset are user-selectable independently of the first or second visual characteristic.

(B2) In some implementations of B1, updating the visual characteristic, of the subset of data field icons, from the first visual characteristic to the second visual characteristic includes visually de-emphasizing the subset of data field icons relative to other data field icons in the plurality of data field icons while maintaining user-selectability of the subset of data field icons.

(B3) In some implementations of B1 or B2, the method further comprises, while the visual characteristic of the first subset of data fields is the second visual characteristic: in response to a user interaction with a second data field icon from the subset of data field icons, corresponding to a second data field of the plurality of data fields: displaying information that the second data field is unrelated to the first data field.

(B4) In some implementations of any of B1-B3, the method further comprises, while the visual characteristic of the first subset of data fields is the second visual characteristic: in response to receiving (i) user selection of a second data field icon from the subset of data field icons, corresponding to a second data field of the plurality of data fields, and (ii) user placement of the second data field icon in the shelf region: generating and displaying a second data visualization in the user interface.

(B5) In some implementations of B4, generating the first data visualization includes executing a first query that specifies an aggregation of data values of the first data field. In some implementations, generating the second data visualization includes executing a second query that duplicates, for each data value of the third data field, the aggregated data values of the first data field.

(B6) In some implementations of B4 or B5, the method comprises, concurrently while displaying the second data visualization: displaying, in the shelf region, a warning visual indicator adjacent to the first data field icon. In response to a user interaction with the warning visual indicator, the method displays information that the second data field is unrelated to the first data field.

(B7) In some implementations of any of B1-B6, the method comprises, after updating the visual characteristic of the subset of data field icons to the second visual characteristic: in response to receiving (i) user selection of a third data field icon from the plurality of data field icons, where the third data field icon corresponds to a third data field and is not a data field icon from the subset of data field icons and (ii) placement of the third data field icon in the shelf region, executing a second query that specifies an aggregation of data values of the first data field according to the third data field to generate a third data visualization, then displaying, in the user interface, the third data visualization.

(B8) In some implementations of B7, the method further comprises concurrently while displaying the third data visualization, updating a visual characteristic of the subset of data fields from the second visual characteristic to the first visual characteristic.

(B9) In some implementations of B7 or B8, the third data field is a shared data field that is shared between the first object and the second object.

(B10) In some implementations of any of B7-B9, the third data field is associated with a dimension logical table.

(B11) In some implementations of any of B7-B10, the third data field is a dimension data field.

(B12) In some implementations of any of B7-B11, the third data field is a geographic data field.

(B13) In some implementations of any of B7-B11, the third data field is a date/time data field.

(B14) In some implementations of any of B7-B13, the method further comprises, after displaying the third data visualization: in response to receiving (i) user selection of a fourth data field icon from the subset of data field icons, corresponding to a fourth data field, and (ii) placement of the fourth data field icon in the shelf region: executing a third query that specifies an aggregation of data values of the fourth data field according to the third data field to generate a fourth data visualization, and displaying, in the user interface, the fourth data visualization.

(B15) In some implementations of B14, the fourth data visualization is concurrently displayed with the third data visualization in the user interface.

(B16) In some implementations of B15, the third data visualization and the fourth data visualization share a common data axis.

(C1) In accordance with some implementations, a method for generating data visualizations using multi-fact object models is performed at computing device having a display, one or more processors and memory storing one or more programs configured for execution by the one or more processors. The method includes receiving a first user input specifying a first dimension data field and a second dimension data field for generating a first data visualization. The method includes determining that the first dimension data field belongs to a first object of an object model and the second dimension data field belongs to a second object of the object model, distinct from the first object. The method includes constructing a dimension subquery according to characteristics of the first dimension data field, the second dimension data field, the first object, and/or the second object. The constructing includes determining a join type for combining (i) first data rows that include data values of the first dimension data field and (ii) second data rows that include data values of the second dimension data field; and constructing the dimension subquery according to the determined join type, the dimension subquery referencing the first object and the second object. The method includes executing the dimension subquery against one or more data sources corresponding to the first dimension data field and the second dimension data field to retrieve first tuples that comprise unique ordered combinations of data values for the first dimension data field and the second dimension data field. The method includes constructing one or more measure subqueries, each of the measure subqueries referencing one or more measure data fields in the object model. The method includes executing the one or more measure subqueries to retrieve second tuples. The method includes forming extended tuples by combining the retrieved first tuples and the retrieved second tuples. The method also includes generating and displaying the first data visualization according to the extended tuples.

(C2) In some implementations of C1, constructing the dimension subquery according to the characteristics of the first dimension data field, the second dimension data field, the first object, and/or the object determining includes: when (i) the first dimension data field can be traced to one root object and (ii) the second dimension data field can be traced to the same root object, combining data columns of the first dimension data field and the second dimension data field using an inner join.

(C3) In some implementations of C1, constructing the dimension subquery according to the characteristics of the first dimension data field, the second dimension data field, the first object, and/or the second object includes: when (i) the first dimension data field can be traced to a first root object and (ii) the second dimension data field can be traced to a second root object that is distinct from the first root object: (a) forming a first object tree that includes the first object and the first root object, and combining data columns from objects of the first object tree according to data values of the first dimension data field using an inner join to form a first table; (b) forming a second object tree that includes the second object and the second root object, and combining data columns from objects of the second object tree according to data values of the second dimension data field using an inner join to form a second table; and (c) combining data columns of the first table and the second table via a cross join.

(C4) In some implementations of C1, constructing the dimension subquery according to the characteristics of the first dimension data field, the second dimension data field, the first object, and/or the second object includes: when the first dimension data field and the second dimension data field belong to the same object that is shared by two or more root objects, combining data columns of the first dimension data field and the second dimension data field using an inner join.

(C5) In some implementations of C1, constructing the dimension subquery according to the characteristics of the first dimension data field, the second dimension data field, the first object, and/or the second object includes: when (i) the first object is shared by a first set of root objects and (ii) the second object is shared by a second set of root objects, combining data columns of the first dimension data field and the second dimension data field using a cross join.

(C6) In some implementations of C1, constructing the dimension subquery according to the characteristics of the first dimension data field, the second dimension data field, the first object, and/or the second object includes: when (i) the first object is a first root object, (ii) the second object can be traced to the first root object, and the (iii) the second dimension data field is not shared by another root object, combining data columns of the first dimension data field and the second dimension data field using an inner join.

(C7) In some implementations of any of C1-C6, a first dimension data field and/or the second dimension data field is a geographic data field.

(C8) In some implementations of any of C1-C7, a first dimension data field and/or the second dimension data field is a date/time data field.

(C9) In some implementations of any of C1-C8, the one or more data sources comprise a plurality of data sources.

In some implementations, a computing device includes one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus, methods, systems, and graphical user interfaces are provided for creating object models that span multiple fact tables, and analyzing and presenting data based on multi-fact data models.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 24A-24H illustrate exemplary data tables or data visualizations that are generated from multi-fact object model analysis.

FIGS. 28A-28E provide a flowchart of a method for generating object models (e.g., data models) that span multiple fact tables, in accordance with some implementations.

FIGS. 29A-29D provide a flowchart of a method for performing guided analysis using multi-fact object models (e.g., data models), in accordance with some implementations.

FIGS. 30A-30D provide a flowchart of a method for generating data visualizations using multi-fact object models (e.g., data models), in accordance with some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Enterprises need a holistic understanding of their data to effectively manage their businesses. Oftentimes, their data exists as "silos," in the form of separate fact tables, with common dimensions (e.g., dimension data fields or dimension fields) such as time and geography. For example, an organization may have a marketing department that controls a marketing campaign for products and a sales department that owns the sales of these products. Having the ability to combine data from a marketing fact table and a sales fact table can provide a complete picture about the effectiveness of the marketing campaign and its impact on sales. Currently, some data analytics applications restrict analysis to a single set of facts, limiting the questions analysts can ask and imposing a maintenance burden on data stewards who must support workarounds. The disclosed implementations address deficiencies in current systems by providing improved methods, devices, systems, and user interfaces that enable the creation of and consumption of data models that span multiple fact tables.

Figure 1A:
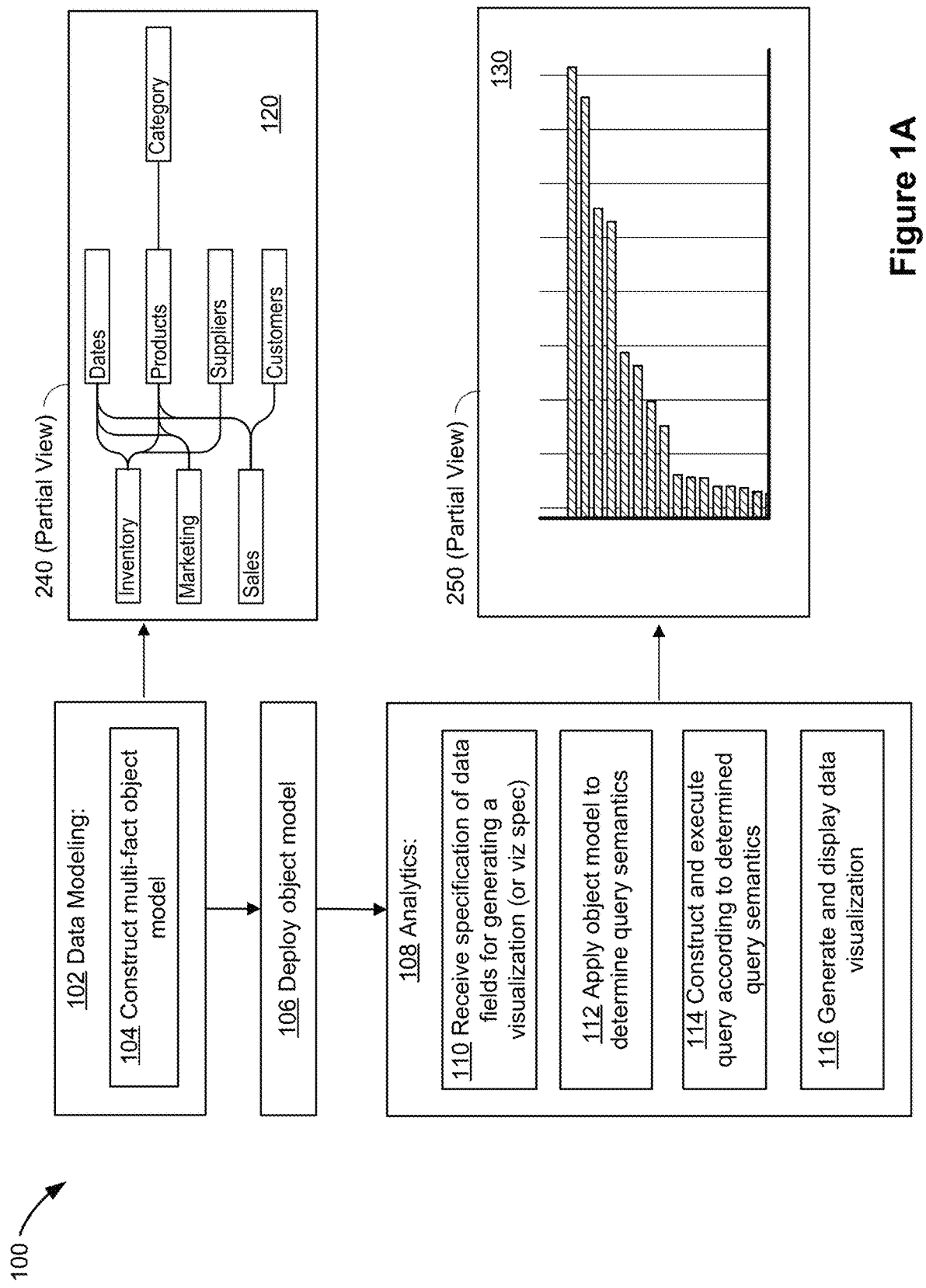
FIG. 1A illustrates a workflow for creating and consuming a data model that spans multiple sets of facts, in accordance with some implementation.

FIG. 1A illustrates a workflow 100 for creating and consuming a data model that spans multiple sets of facts, in accordance with some implementations. In this disclosure, the terms "data model" and "object model" are used interchangeably and refer to the same model. The workflow 100 can be thought of as including three phases, namely a data modeling phase (step 102), a deployment phase (step 106), and an analytics phase (step 108). The data modeling phase comprises constructing (104) (e.g., generating) (e.g., by a data modeler) a multi-fact object model. A multi-fact object model refers to an object model that includes multiple (e.g., at least two) fact tables. In this disclosure, a computing device executes a data visualization application 230 that includes a data modeling user interface 240 for generating multi-fact object models. FIG. 1A illustrates a data model 120 that is generated and displayed by the data modeling user interface 240, in accordance with some implementations.

In some implementations, the workflow 100 includes an analytics phase 108. In this disclosure, a computing device executes a data visualization application 230 that includes a data analytics user interface 250 for performing the analytics phase. FIG. 1A shows that in some implementations, the computing device receives (110) (e.g., via the user interface 250), user specification of one or more data fields for generating a data visualization (or a visual specification 252). In some implementations, the computing device is configured to apply (112) an object model (e.g., a multi-fact object model that is generated in the data modeling phase 102) to determine query semantics. The computing device constructs (114) and executes one or more queries according to the determined query semantics. The computing device then generates (116) and displays a data visualization. FIG. 1A illustrates an example data visualization 130 that is generated and displayed on the data analytics user interface 250, in accordance with some implementations.

Figure 1B:
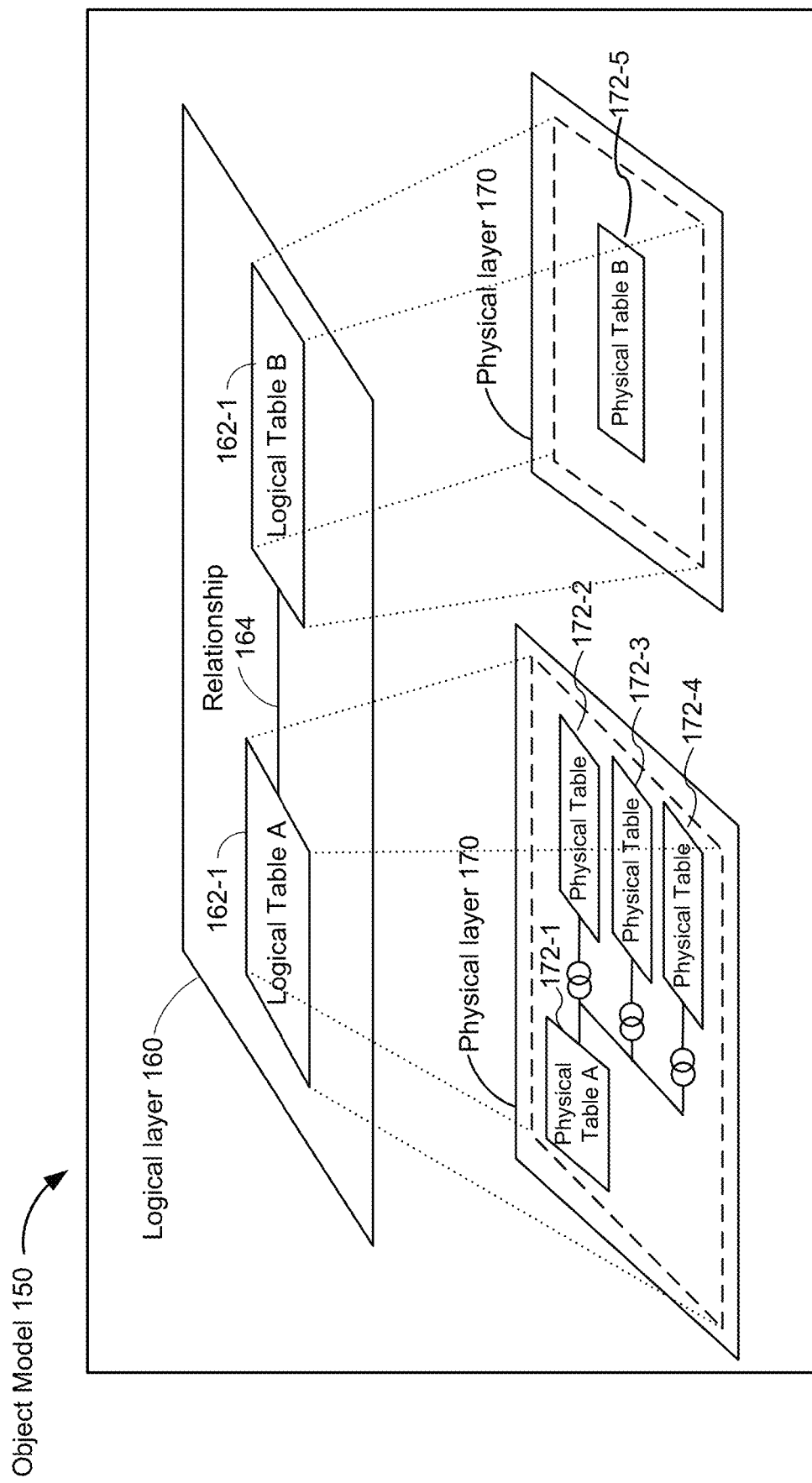
FIG. 1B illustrates a data model, in accordance with some implementations.

FIG. 1B illustrates an object model 150 in accordance with some implementations. An object model can be thought of as a diagram that informs a data visualization application how it should query data in the connected database tables. In some instances, an object model is a simple model with a single table. In other instances, an object model is a complex model with multiple tables that use different combinations of relationships, joins, and unions. The object model 150 has two layers, namely a logical layer 160 and a physical layer 170. In some contexts, the physical layer 170 is referred to as the "Data Model" and the logical layer 160 is referred to as the "Object Model." In most cases here the focus is on the logical layer 160.

In some implementations, the default view that a user (e.g., a data modeler) sees in a data modeling user interface 240 of the data visualization application 230 is the logical layer 160. In FIG. 1B, the logical layer 160 includes a logical table A 162-1 (e.g., an object) and a logical table B 162-2 (e.g., another object). Data in the logical layer 160 is combined using relationships 164 (also referred to as "noodles" in the present disclosure). In the physical layer 170, data is combined between tables using joins and unions. Each logical table 162 in the logical layer 160 contains data from at least one physical table in the physical layer 170. In FIG. 1B, the logical table A 162-1 is made of four tables 172-1, 172-2, 172-3, and 172-4 whereas the logical table B 162-2 is made of one table 172-5. Tables at the logical layer are not merged in the data source; they remain distinct (e.g., normalized) and maintain their native level of detail.

In this disclosure, the terms "object model" and "data model" are generally used interchangeably. In some implementations, the logical layer 160 is also referred to as a semantic layer.

The data modeling capabilities disclosed herein create flexible data sources built around relationships. Relationships combine data from different tables by looking at what columns (fields) those tables have in common and using that information to bring information from each table together in the analysis. Unlike joins or unions, relationships form a data source without flattening multiple tables into a single table. Because of this, related data sources know which table each field is from. That means each field keeps its context, or level of detail. Related data sources can therefore handle tables with different granularity without issues of duplication or data loss. In a related data source, the joins are not fixed up front. Instead of merging all the data (and having to work with all the data regardless of what each visualization requires), only the relevant data is combined as necessary (e.g., per data visualization). As a user drags and drops fields, the data visualization application evaluates the relationships of the relevant fields and tables. Those relationships are used to write queries with the correct join types, aggregations, and null handling. Users can think about how the data fits together and what questions they want to answer, rather than how to combine the data or compensate for artifacts from the data source. Relationships do not replace the previous ways of combining data, such as via joins, unions, and blends. Rather, relationships are a novel, flexible way to bring data together from multiple sources.

Figure 1C:
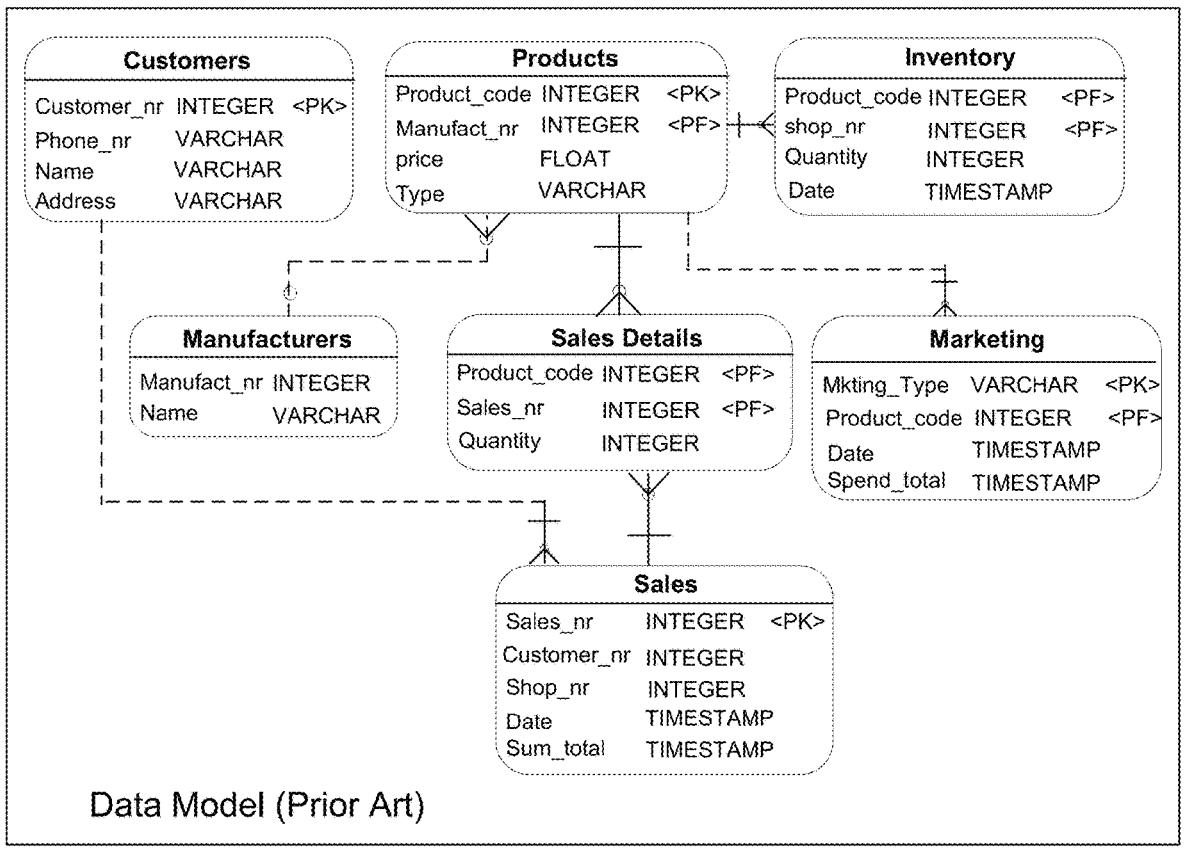
FIG. 1C illustrates visual differences between existing data models and data models of the present disclosure, in accordance with some implementations.
Figure 1C:
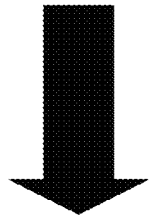
Figure 1C:
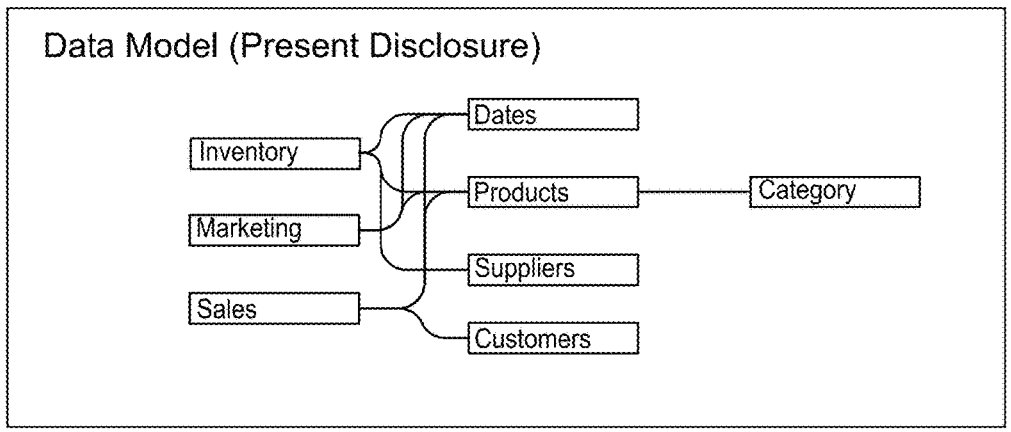

FIG. 1C illustrates conceptually differences between existing data models (top diagram) and data models (bottom diagram) of the present disclosure, in accordance with some implementations. Compared to existing data models, the layout of the multi-fact data models disclosed herein is simpler and easier to understand.

Figure 2:
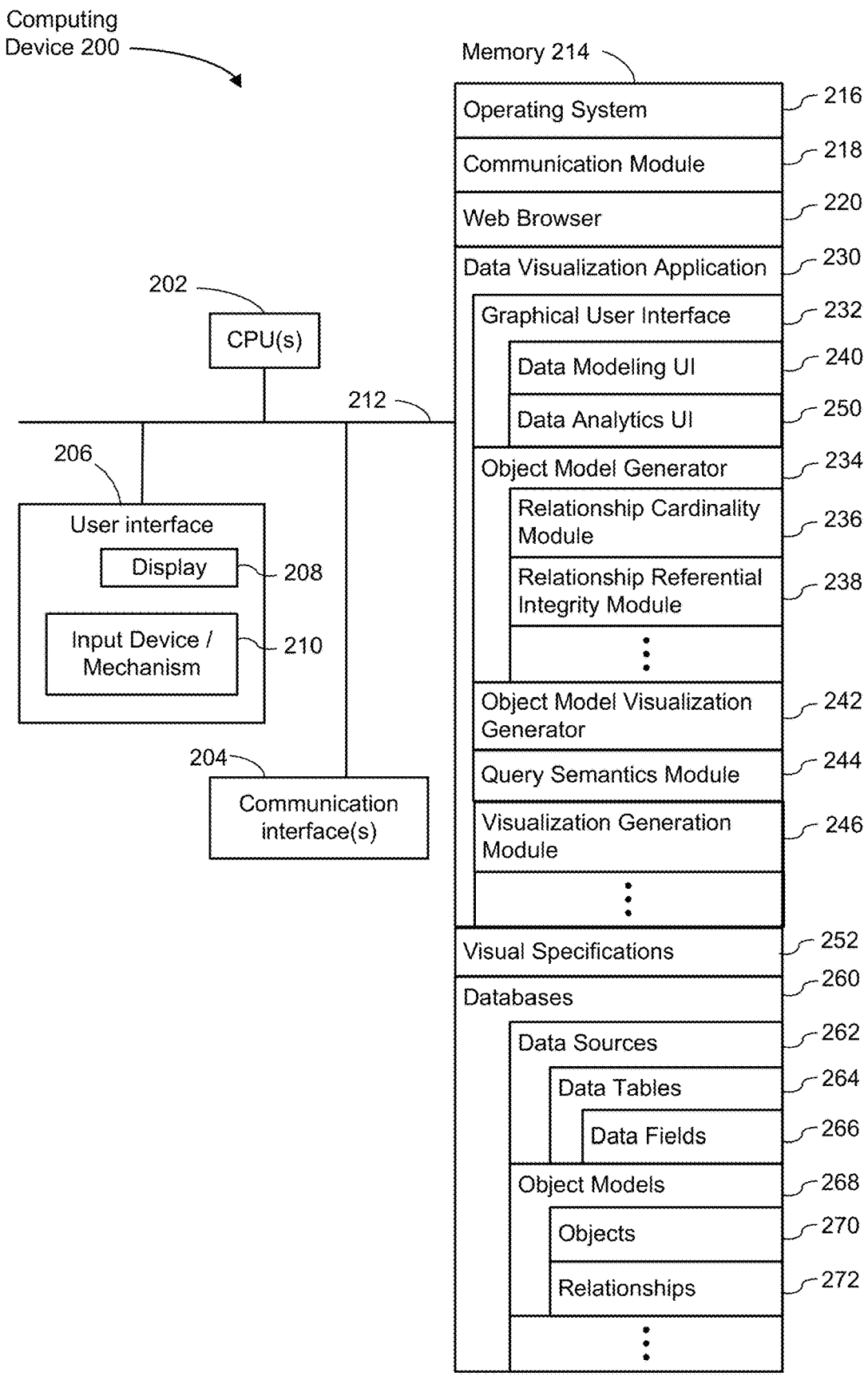
FIG. 2 is a block diagram of a computing device according to some implementations.

FIG. 2 is a block diagram of a computing device 200 (e.g., a client device) that can execute a data visualization application 230 or a data visualization web application to display a data visualization. In some implementations, the computing device displays a graphical user interface 232 for the data visualization application 230. In some implementations, the graphical user interface 232 includes a data modeling user interface 240. In some implementations, the graphical user interface 232 includes a data analytics user interface 250. The computing device 200 may be a desktop computer, a laptop computer, a tablet computer, or other computing device with a display and a processor capable of running a data visualization application 230. The data visualization application 230 may include a data source generator for database organization (e.g., generating object models for databases) as well as generating new data sources using existing databases. A computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard. In some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

an operating system 216, which includes procedures for handling various basic system services and for performing hardware dependent tasks;

a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;

a web browser 220 (or other client application), which enables a user to communicate over a network with remote computers or devices;

a data visualization application 230, which provides a graphical user interface 232 for a user to perform data analysis, including constructing databases, constructing object models, and constructing visual graphics (e.g., an individual data visualization or a dashboard with a plurality of related data visualizations). In some implementations, the data visualization application 230 executes as a standalone application (e.g., a desktop application). In some implementations, the data visualization application 230 executes within the web browser 220 (e.g., as a web application). The data visualization application 230 includes:

- a graphical user interface 232, which enables a user to access or build object models and data sources, and also provides a graphical view to build data visualizations by specifying elements visually. In some implementations, the graphical user interface 232 includes a data modeling user interface 240 for accessing or building object models and data sources. In some implementations, the graphical user interface 232 includes a data analytics user interface 250 for building data visualizations by specifying elements (e.g., data fields) visually;
- an object model generator 234, which generates object models that include a plurality of objects (e.g., object classes). The object model can be generated from one or more databases, and each object in the object model can be generated from one or more data tables (e.g., physical tables) or one or more data fields. An object icon represents a logical combination of one or more data tables. For example, an object that is represented by an object icon may include one or more data fields from a data table. In another example, an object that is represented by an object icon may be constructed by combining (e.g., a left join, a right join, an inner join, a union, or an intersection) two data tables to one another. The object model generator 234 includes a relationship cardinality module 236, which determines the cardinality of a relationship between two object classes. For example, the relationship cardinality module 236 may determine that a many-to-many relationship has been detected or that a many-to-one relationship has been detected. The object model generator 234 also includes a relationship referential integrity module 238, which analyzes and compares data values in linking fields (e.g., linking data fields) from two object classes that are joined in a relationship to identify matched data values and unmatched data values;
- an object model visualization generator 242, which generates (e.g., constructs) a visualization of an object model 268 for display in the object model visualization region 120. The object model visualization generator 242 generates object icons 1322 (e.g., FIG. 13) corresponding to objects in the object models 268, and generates visual representations of relationships between two objects in the object models 268;
- a query semantics module 244, which uses object models to determine query semantics in response to receiving user specification of one or more data fields for generating a data visualization or a visual specification 252. Query semantics specify the database queries to retrieve data from the physical layer 170;
- a visualization generation module 246, which generates data visualizations and/or data dashboards; and
- visual specifications 252, which are used to define characteristics of a desired data visualization. In some implementations, a visual specification 252 is built using the user interface 250. A visual specification includes identified data sources 262 (i.e., specifies what the data sources are), which provide enough information to find the data sources 262 (e.g., a data source name or network full path name). A visual specification 252 also includes visual variables and the assigned data fields for each of the visual variables. In some implementations, a visual specification 252 has visual variables corresponding to each of the shelf regions 1612 (e.g., the columns shelf 1612-1 and the rows shelf 1612-2 in FIG. 16A). In some implementations, the visual variables include other information such as context information about the computing device 200, user preference information, or other data visualization features that are not implemented as shelf regions (e.g., analytic features);
- one or more databases 260, which may store one or more data sources 262 and/or one or more object models 268. Each data source 262 includes one or more data tables 264, and each of the data tables includes one or more data fields 266. Each object model 268 includes a plurality of objects 270 (e.g., logical tables) that are connected to one another by relationship(s) 272 (e.g., noodles).

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
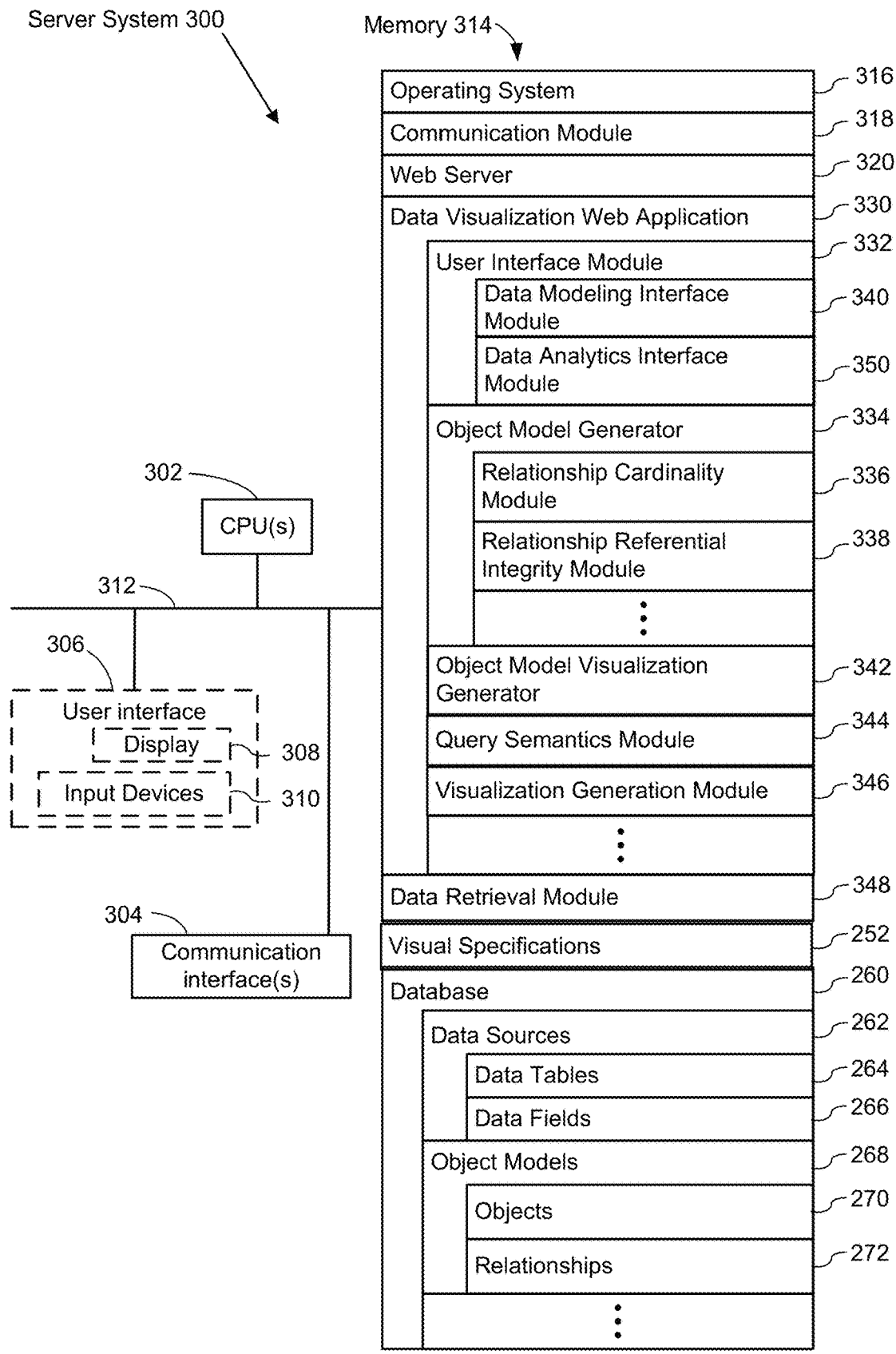
FIG. 3 is a block diagram of a server system according to some implementations.

FIG. 3 is a block diagram of a server system 300 in accordance with some implementations. A server system 300 may host one or more databases 260 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 include circuitry (sometimes called a chipset) that interconnects and controls communications between system components.

In some implementations, the memory 314 includes high-speed random-access memory, such as DRAM, SRAM, DDR RAM, or other random-access solid-state memory devices. In some implementations, the memory includes non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer readable storage medium.

In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 330, which may be downloaded and executed by a web browser 220 on a user's computing device 200. In general, a data visualization web application 330 has the same functionality as a desktop data visualization application 230, but provides the flexibility of access from any device at any location with network connectivity, and does not require installation and maintenance. In some implementations, the data visualization web application 330 includes various software modules to perform certain tasks. In some implementations, the data visualization web application 330 includes a user interface module 332, which provides the user interface for all aspects of the data visualization web application 330. In some implementations, the user interface module 332 includes a data modeling interface module 340. In some implementations, the user interface module 332 includes a data analytics interface module 350. In some implementations, the data visualization web application 330 includes an object model generator 334 and an object model visualization generator 342, as described above with respect to the object model generator 234 and the object model visualization generator 242 in FIG. 2. In some implementations, the object model generator 334 includes a relationship cardinality module 336 and a relationship referential integrity module 338, both of which are described above with respect to the relationship cardinality module 236 and the relationship referential integrity module 238 in FIG. 2. In some implementations, the data visualization web application 330 includes a query semantics module 344 and a visualization generation module 346, as described above with respect to the query semantics module 244 and the visualization generation module 246 in FIG. 2;
- a data retrieval module 348, which builds and executes queries to retrieve data from one or more databases 260. The databases 260 may be stored locally on the server 300 or stored at an external database system. For example, the data retrieval module 348 may retrieve data from a database 260 that stores one or more data sources 262 such that the data tables 264 and the data fields 266 from the data source 262 can be used to build an object model;
- visual specifications 252, as described above in FIG. 2; and
- one or more databases 260, which store data used or created by the data visualization web application 330 or data visualization application 230. The databases 260 may store data sources 262, which provide the data used in the generated data visualizations. For example, a database 260 may store an object model 268 that includes a plurality of objects 270 that are linked to one another via one or more relationships 272, and the objects 270 may be formed from data fields 266 from the one or more data sources 260.

The databases 260 may store data in many different formats, and commonly include many distinct tables 264, each with a plurality of data fields 266. Some databases 240 comprise a single table.

The data fields 266 in the database 260 include both raw fields from the database 260 (e.g., a column from a database table or a column from a spreadsheet) as well as derived data fields, which may be computed or constructed from one or more other data fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 266 are stored separately from the data source 262. In some implementations, the database 260 stores a set of user preferences for each user. The user preferences may be used when the data visualization web application 330 (or desktop data visualization application 230) makes recommendations about how to view a set of data fields 266. In some implementations, the database 260 stores a data visualization history log, which stores information about each data visualization generated.

In some implementations, the database 260 stores other information, including other information used by the data visualization application 230 or data visualization web application 330. The databases 260 may be separate from the server system 300 or may be included with the server system (or both).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

I. Nomenclature

A data model contains an object graph. The nodes in the graph are called objects and the links are called relationships. In some implementations, the graph is also referred to as a "tree." In this disclosure, the terms "object model" and "data model" are generally used interchangeably.

An object is a logical table in an object model. Objects are built through physical modeling. For example, an object may contain a join of two Oracle tables. When considering semantics, objects are treated as opaque, meaning that it is only necessary to be able to query an object and get its schema. In this disclosure, the terms "object" and "logical table" are used interchangeably.

The schemas of the various objects identify object fields.

A relationship is a link for combining objects. Relationships link the objects on one or more pairs of object fields. In some implementations of the present disclosure, a data model with shared objects can block filter flow across shared objects. This is in contrast to existing data models, in which there exists one type of relationship and a filter that is applied to one object flows across all relationships between objects. Relationships will eventually get compiled into joins of various types.

In some implementations, information about the relationship cardinality (e.g., many-to-one, many-to-many, one-to-many, or one-to-one) is known to the data visualization application 230 and/or the data visualization web application 330. In some implementations, the data visualization application 230 assumes all relationships are many-to-many if their cardinality is not known.

In some implementations, the referential integrity of relationships is known. For example, the data visualization application may know that inner joining one logical table to another will not cause the first to lose rows due to unmatched keys. Without this information, a data visualization application does not assume any guarantees about matches.

In some implementations, a query includes calculations and/or filters, which are defined in terms of object fields or other calculations. A calculation includes a field name and a formula. "Layering on a calculation" means applying the formula on top of a query to output a column with the given field name defined by the formula. If a field with that name already exists, the calculation will overwrite it. A filter consists of some predicate (e.g. [State]="Alaska"). "Layering on a filter" means applying the predicate on top of a query and only keeping the rows where the predicate is true.

Every tree has a root table. The root table always starts from the left-most side of the object model.

A shared tree is a tree that can be traced back to two or more root tables. A shared tree does not include the root table.

A shared object is an object that is in common with two or more related trees. For example, in FIG. 4A, the data fields "date" (represented as "DimDate" in FIG. 4A, or dimension field "Date") and "sites" (represented as "DimSites" in FIG. 4A, or dimension field "Sites") are shared objects.

Tree traversal is directional. When we trace an object back to its root, we trace only in the leftward direction A shared object exists in context. For example, if there are two or more fact-trees that are used to generate a data visualization, but a shared object is used with only one fact tree, that shared object would use the same semantics as if it is unshared. This is discussed in greater detail in Section IV.

Shared objects can be connected together into their own subtree. Only one shared object in a shared subtree (see below) can be connected to one unshared object in a fact-tree.

Figure 4A:
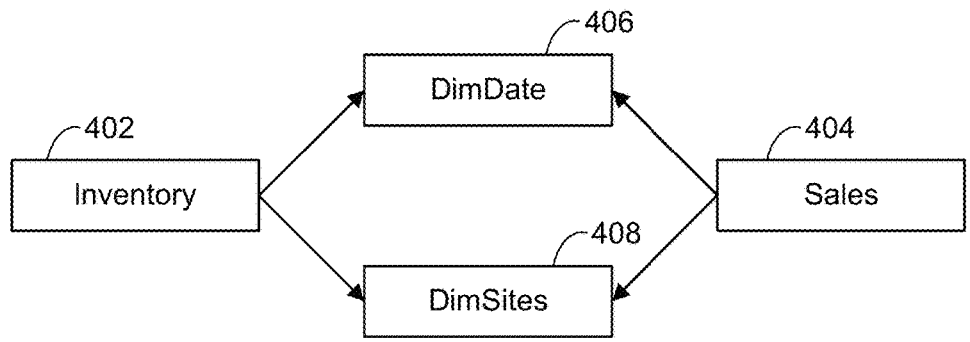
FIGS. 4A and 4B illustrate separate fact tables that share dimension logical tables, in accordance with some implementations.

Fact (sub) tree: Some implementations of the present disclosure enable a data model to support multiple fact trees. Fact trees are combined at the shared objects. In the example of FIG. 4A, there are two fact trees: (1) Inventory, DimDate, DimSites, and (2) Sales, DimDate, DimSites Unshared subtree: An unshared subtree is composed of all related (e.g., connected) objects in a fact tree that are not shared between fact trees. In the example of FIG. 4A, the unshared subtrees are (1) Inventory and (2) Sales.

Shared subtree: A shared subtree is composed of all related (e.g., connected) objects in a fact tree that are shared between fact trees. In the example of FIG. 4A, there are two shared substrees: (1) DimDate and (2) DimSites. There can be two potential shared subtrees if there are more shared objects connected to DimDate and DimSites (e.g., FiscalDate related to DimDate, DimRegion related to DimSites, and DimCountry related to DimRegions).

A dimension (or a dimension data field) is a field that can be considered an independent variable. A dimension data field contains qualitative or categorical information. A dimension data field cannot be aggregated except for counting. Some examples of dimensions are "date," "region," "customer name," "sales type," "order ID," "age," and "longitude."

A measure (or a measure data field) is a field that is a dependent variable. That is, its value is a function of one or more dimensions (e.g., dimension data field). A measure field is one that contains numerical (e.g., quantitative) information. Examples of measure fields are "sales," "revenue," "price," and "spend."

II. Multi-Fact Data Model Using Shared Objects

The present disclosure improves existing data modeling experience by enabling analysts to (i) create a data model (also referred to as an object model) that has multiple related trees; (ii) create relationships independently of adding an object in order to share an object between trees; (iii) identify objects (e.g., logical table(s)) and relationships within a tree; and (iv) identify connected trees and objects related to a shared object.

Figure 4B:
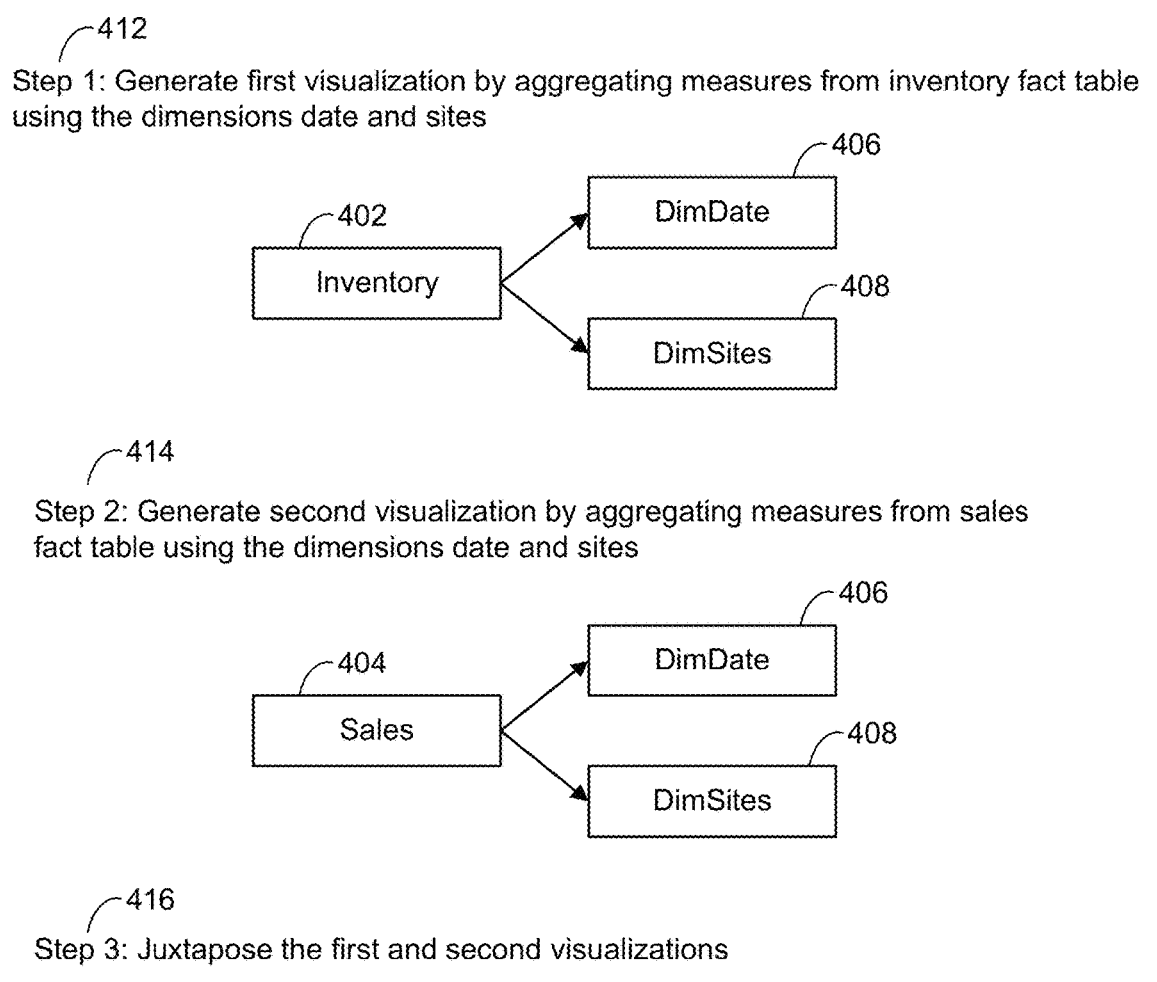

One of the pain points in existing data modeling tools is that analysts cannot aggregate measures from different fact tables (e.g., multi-fact tables) to common dimensions that are in tables shared by the fact tables. FIG. 4A shows an inventory logical table 402 (a fact table) and a Sales logical table 404 (another fact table). The inventory table 402 and the Sales table 404 have separate facts that do not directly relate to each other. However, they both share a dimensional date (DimDate) object 406 (a logical table) and a dimensional sites (DimSites) object 408 (another logical table). FIG. 4B illustrates that, in existing data modeling tools, in order to aggregate measures from the inventory fact table and the sales fact table using common dimensions, an analyst has to (i) generate (412) a first visualization by aggregating measures from the inventory table 402 using the dimensions date and sites, (ii) generate (414) a second visualization by aggregating measures from the sales table 404 using the dimensions date and sites; and (iii) juxtapose (416) the first and second data visualizations onto a data dashboard.

II.A. Feature Goals

According to some aspects of the present disclosure, the same object can be connected to multiple fact trees as a "shared object."

Some aspects of the present disclosure support the current flexibility of tables and fields, which can be either dimensions or measures.

Some aspects of the present disclosure support existing relationship semantics within the same fact tree (i.e., relationships between logical tables, join/union between physical tables)

Some aspects of the present disclosure support shared objects between some (and not all) fact trees.

Some aspects of the present disclosure support shared objects that can have their own subtrees.

II.B. Multi-Tree Approach

According to some aspects of the present disclosure, characteristics/properties of the multi-tree approach include:

Continue current left-to-right layout of the data model.

The left-most object is the root (e.g., root table or root object). There can be one and only one root per tree at the far-left side of the data model, which will be used to describe the fact (sub) tree.

Objects belonging to the same snowflake data model are related together into a (sub) tree.

Objects within the same subtree fan out from the root (to the right).

Each tree is derived by starting from the root and then traversing all relationships going away from the root to the end of every branch, but never going backwards.

Each object must belong to at least one tree. A single object can be a tree by itself.

Each object can have zero or one relationship path back to every root object.

Each shared object is defined as relating back to two or more root objects.

For any tree with one or more shared objects, there is only one set of specific subtrees that can be derived from it unambiguously.

Root objects cannot be directly related to each other.

Shared objects can exist when there are at least two different subtrees/roots.

Shared objects are related to two or more fact-trees and they can be analyzed using new semantics (see the "Query Semantics" section).

II.C. Use Case Scenarios

This section describes four exemplary workflows that lead to and away from using multi-fact with shared objects:

Scenario 1: Create a new data model knowing that it is multi-fact using shared objects;

Scenario 2: Modify a data model (not using shared objects) to have multi-fact and using shared objects;

Scenario 3: Convert multiple single-fact data sources into one data source that is multi-fact and has shared tables; and Scenario 4: Remove multi-fact and shared objects to from a single-fact data model.

Scenario 1: Two (or more) fact subtrees with two (or more) shared objects. In some existing data modeling tools, adding an object would also add a relationship. To support shared objects, some implementations of the present disclosure enable adding relationships independently of objects. For example, in some implementations, relationships can be added across (sub) trees, thereby changing (e.g., converting) an object into a shared object. In some implementations, a relationship can be added to link another tree to an existing shared object.

Unlike existing data modeling tools, which assume that there is only one root table, some implementations of the present disclosure support the construction of data models with multiple root tables. FIGS. 5A, 5B, 5C, and 5D illustrate adding a new root to an object model 510, in accordance with some embodiments. In some implementations, the object model 510 is displayed in data modeling user interface 240 or data modeling user interface 340.

Figure 5A:
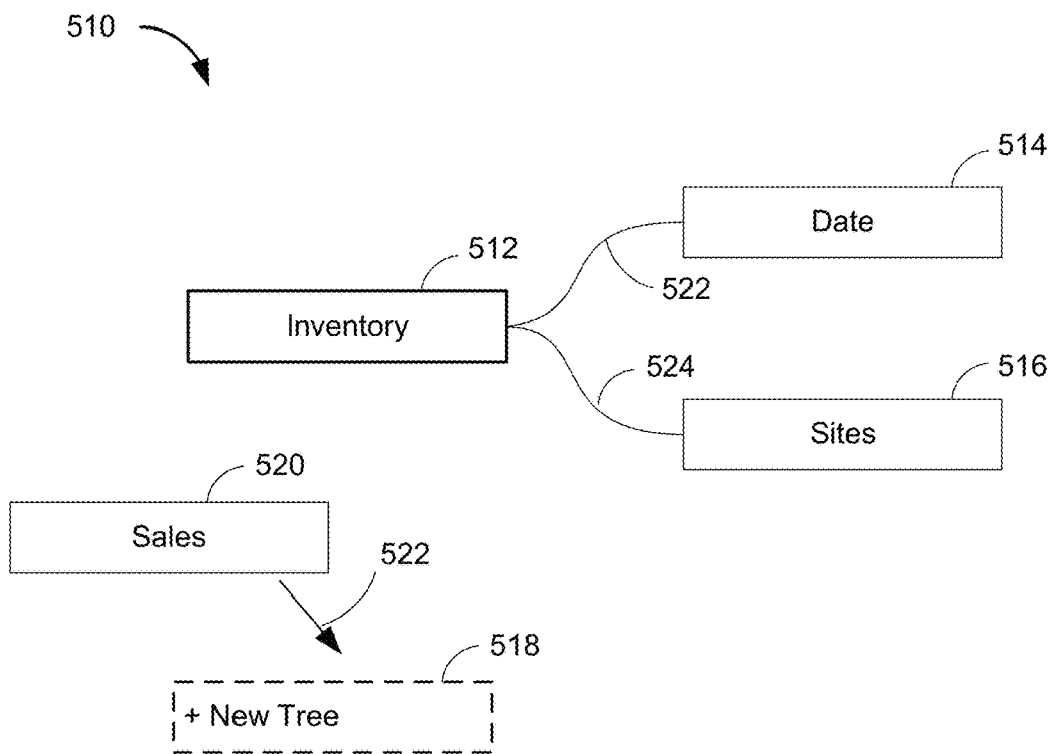
FIGS. 5A-5D illustrate adding a new tree to an existing object model and adding a new relationship, in accordance with some implementations.
Figure 5B:
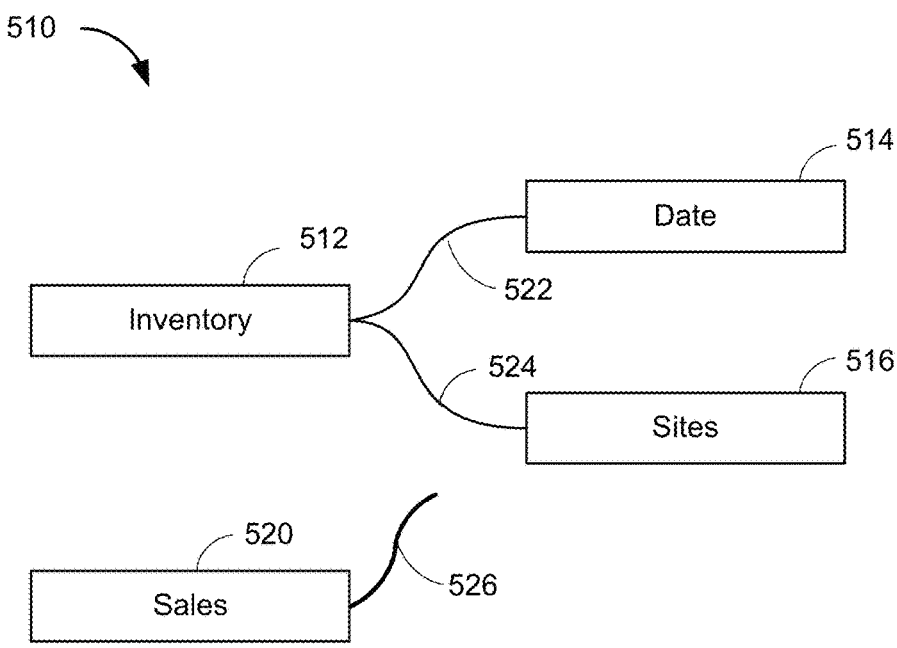

FIG. 5A shows an inventory object 512, a date object 514, and a sites object 516. Data in the inventory object 512 can be combined with data in the date object 514 via a first relationship 522. Data in the inventory object 512 can be combined with data in the sites object 516 via a second relationship 524. The inventory object 512, the date object 514, and the sites object 516 form an "Inventory" tree. The user interface 510 displays an icon 518 (e.g., a drop zone "+New Tree") for creating a new tree. FIG. 5A illustrates placement (522) of a sales object 520 over the icon 518 to add a new tree (e.g., "Sales") to the object model. FIG. 5B shows that a new "Sales" tree has been added. Sales can become its own separate tree or it can be related to the Inventory tree via shared objects.

According to some implementations of the present disclosure, roots and fact subtrees do not have to be related to each other immediately. For example, FIG. 5B illustrates that the Sales tree, which consists of the sales object 520, is independent of the Inventory tree. FIG. 5B also shows that in some implementations, in response to user interaction with the sales object 520 (e.g., at its right), a freeform line 526 is generated and displayed.

Figure 5C:
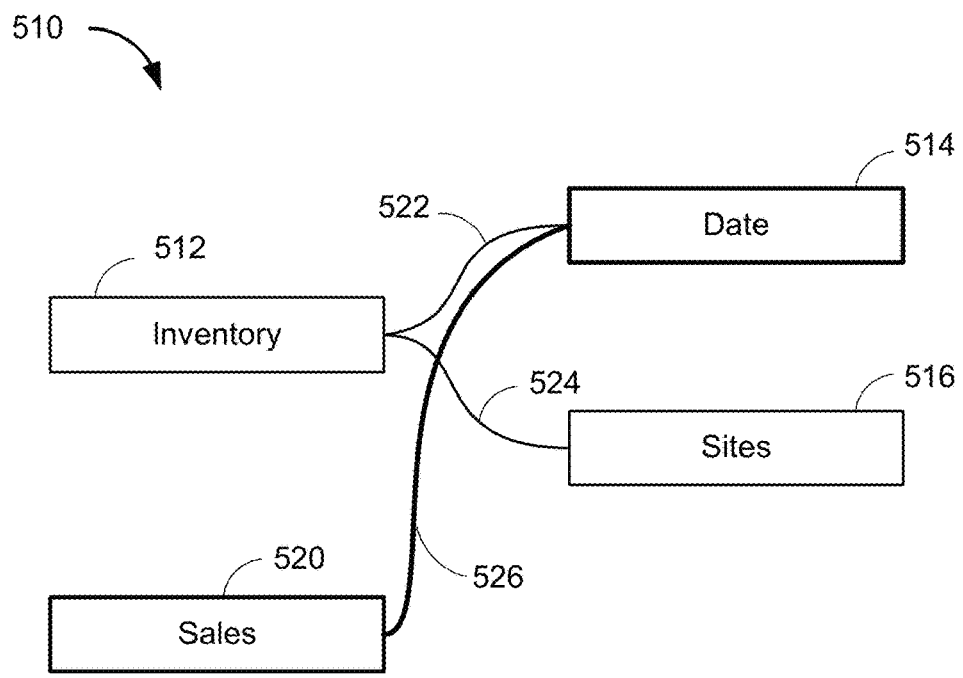
Figure 5D:
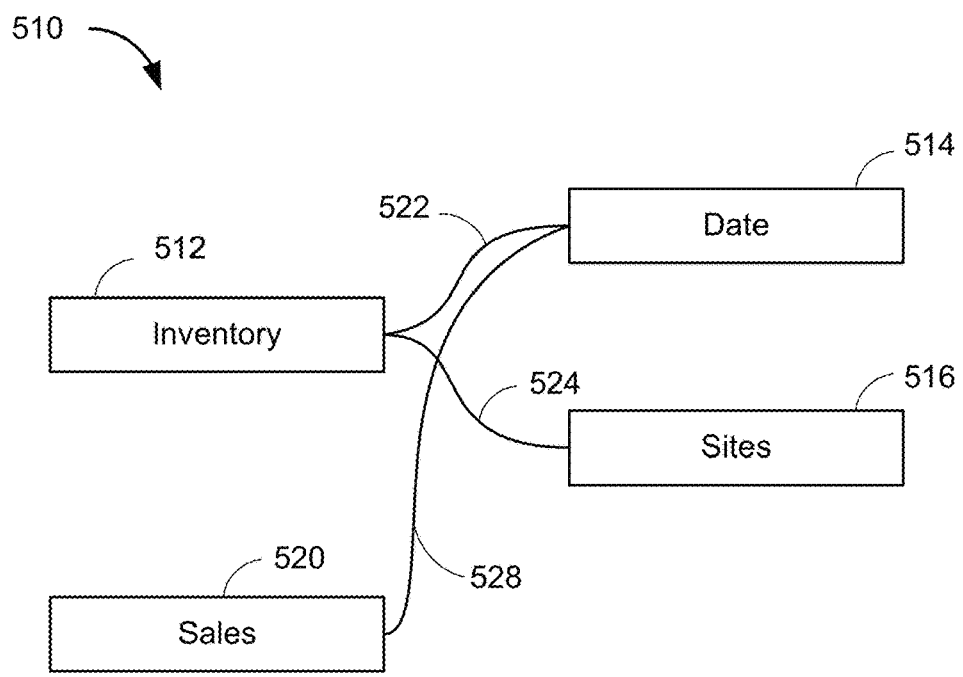

FIG. 5C illustrates the capability to add relationships independently of objects from the sales tree to another tree (e.g., the inventory tree). In this example, in response to the user bringing the freeform line 526 to the date object 514, the data model creates a relationship 528 between the sales object 520 and the date object 514. The newly added relationship 528, as illustrated in FIG. 5D, makes the date object 514 a shared object between the Inventory fact tree (or fact subtree) and the Sales fact tree (or fact subtree).

Figure 6A:
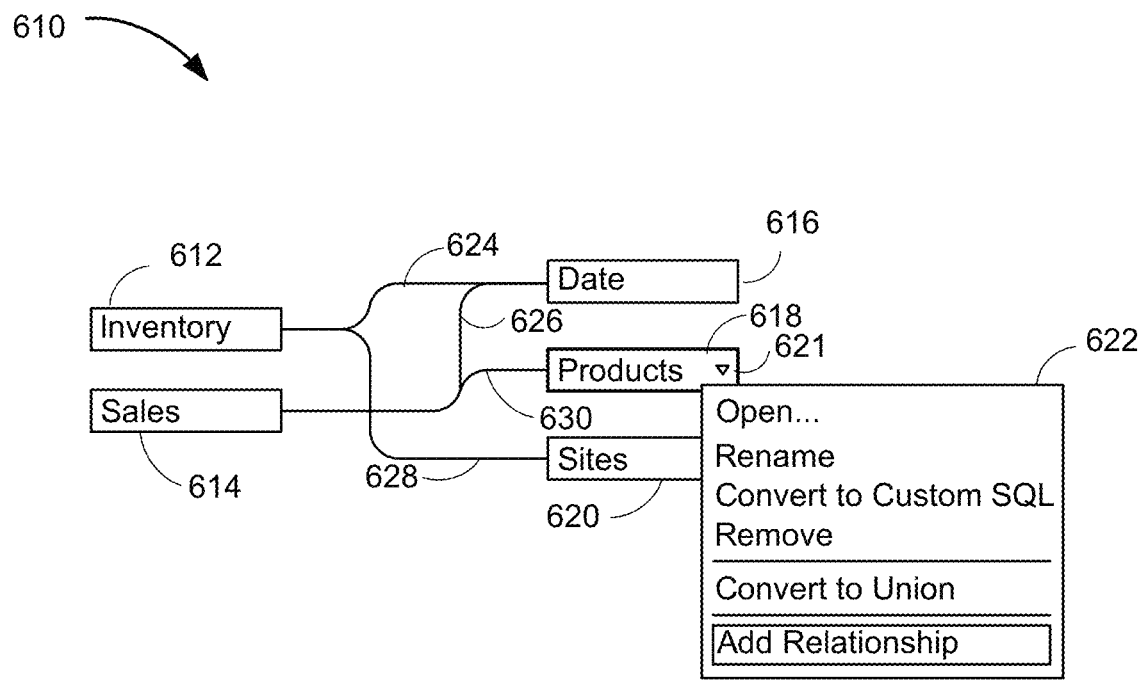
FIGS. 6A and 6B illustrate adding a new relationship between objects in an existing object model, in accordance with some implementations.

Some implementations of the present disclosure enable a data modeler to create a relationship independently of adding a new object. FIG. 6A illustrates an object model 610, which includes an inventory root object 612 and a sales root object 614. The date object 616 is shared with the Inventory object 612 and the Sales object 614 via relationships 624 and 626, respectively. The products object 618 is related to the Sales 614 via another relationship 630. The sites object 620 is related to the Inventory 612 via the relationship 628. In some implementations, a context menu on an object can be utilized to add a new relationship. FIG. 6A illustrates that a context menu 622, corresponding to the Products 618, can be accessed in response to user selection of an icon 621 on the Products object 618.

Figure 6B:
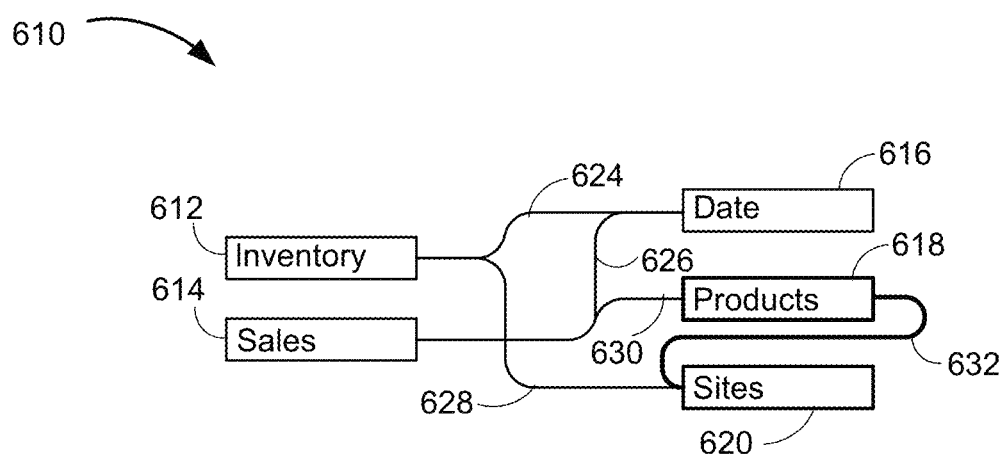

In FIG. 6B, the Inventory object 612 and the Sites object 620 are highlighted because either object can accept a relationship from the Products object 618. Other objects cannot relate to the Products object 618 because the Sales object 614 is already related to the Products object 618 and the Date object 616 is already related to Sales (cross branch within the same subtree). In response to user interaction with the Products object 618, a freeform line 632 can extend from the right of the Products object 618 to connect to the Sites object 620 to create a relationship between these two objects.

Figure 7:
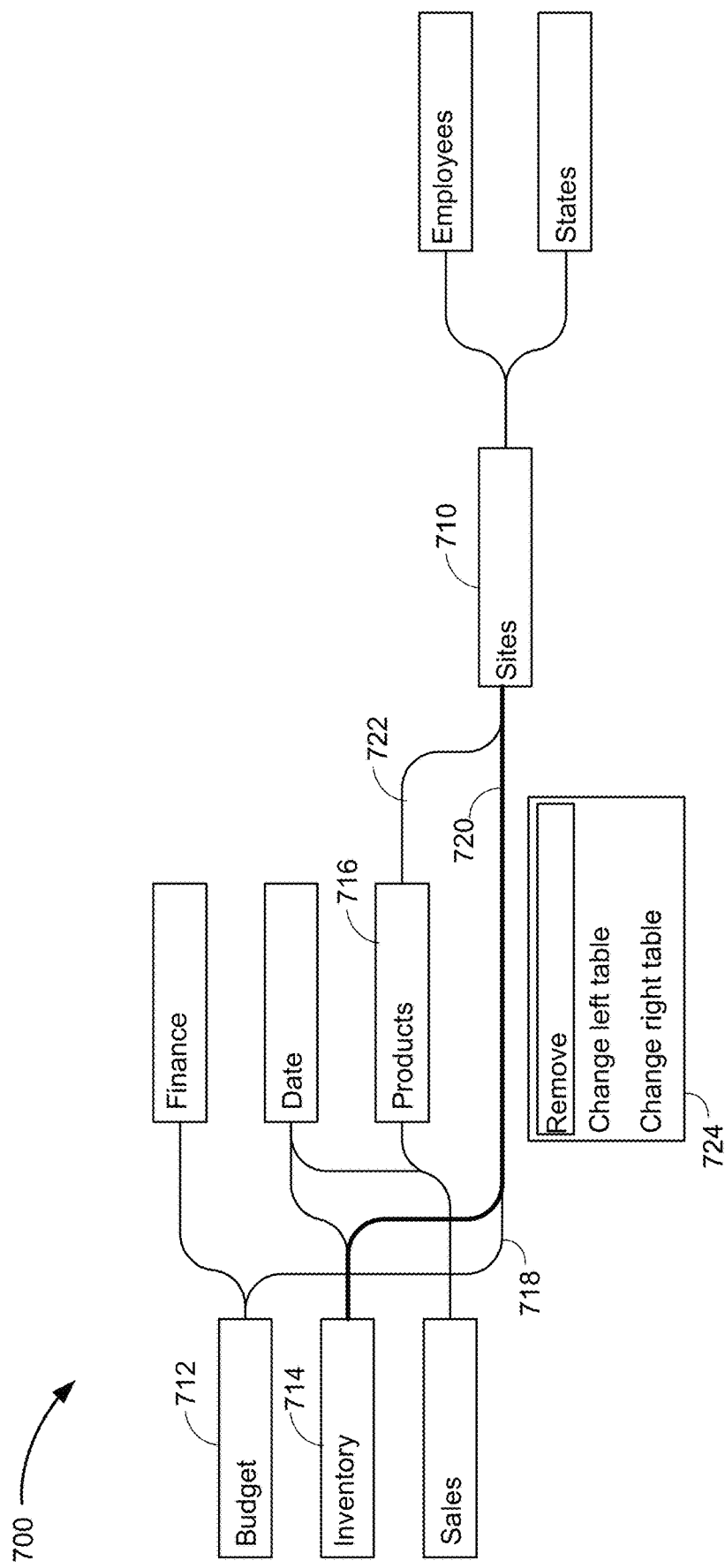
FIG. 7 illustrates removing a relationship between objects in an existing object model, in accordance with some implementations.

Existing data models automatically delete a relationship from an object if objects to its right side (i.e., downstream) are deleted. To support adding/removing relationships between shared and unshared objects, some implementations of the present disclosure enable deletion of relationships between shared and unshared objects. FIG. 7 illustrates that a relationship in an object model 700 can be removed if there are two or more relationships to the left of a current object. In the object model 700, the Sites object 710 has, to its left, (i) a first relationship 718 with the budget object 712, (ii) a second relationship 720 with the inventory object 714, and (iii) a third relationship 722 with the products object 716. FIG. 7 illustrates that, in response to user selection of the relationship 720 (e.g., via a mouse click), a menu 724 is displayed that enables the user to remove the relationship.

In some implementations, when there are two or more relationships to the left of a current object, any of the relationships can be deleted. In some implementations, the option to remove a relationship is not available when there is only one subtree.

In some implementations, a shared object becomes "unshared" when its last remaining relationship is related to one tree. In some implementations, the last remaining relationship to the left of a current object cannot be deleted.

In some implementations, objects that are downstream of a current object become unshared if they are related to only one (sub) tree.

Figure 8A:
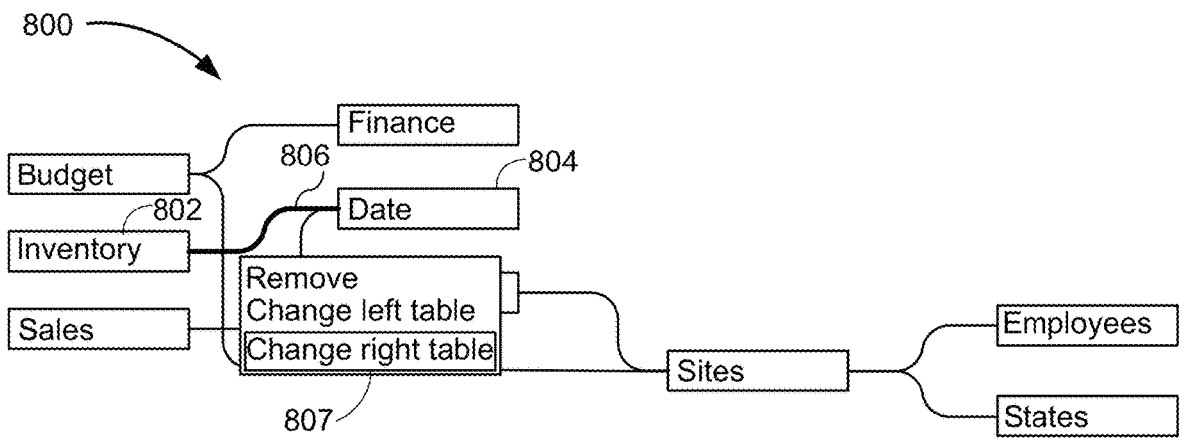
FIGS. 8A-8C illustrate changing a relationship between objects in an existing object model, in accordance with some implementations.

As noted above, a relationship is a link for combining objects. In some implementations, a relationship can be changed by modifying either end of the link. FIG. 8A shows a data model 800 that includes an inventory object 802 and a date object 804 connected by a relationship 806. In response to user selection of the relationship 806, the data modeling user interface 240 (or the data modeling interface module 340) displays a menu 807 that includes options for removing the relationship, changing the left table, or changing the right table.

Figure 8B:
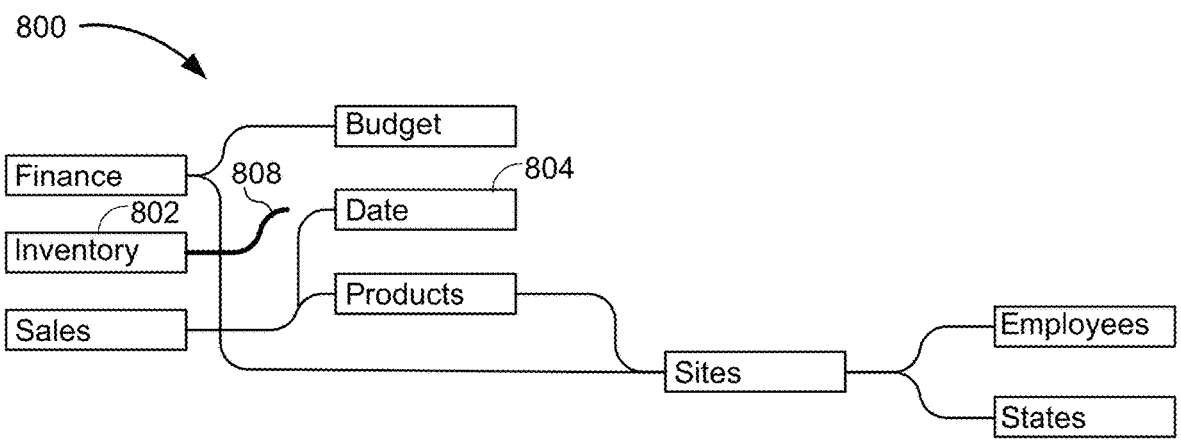
Figure 8C:
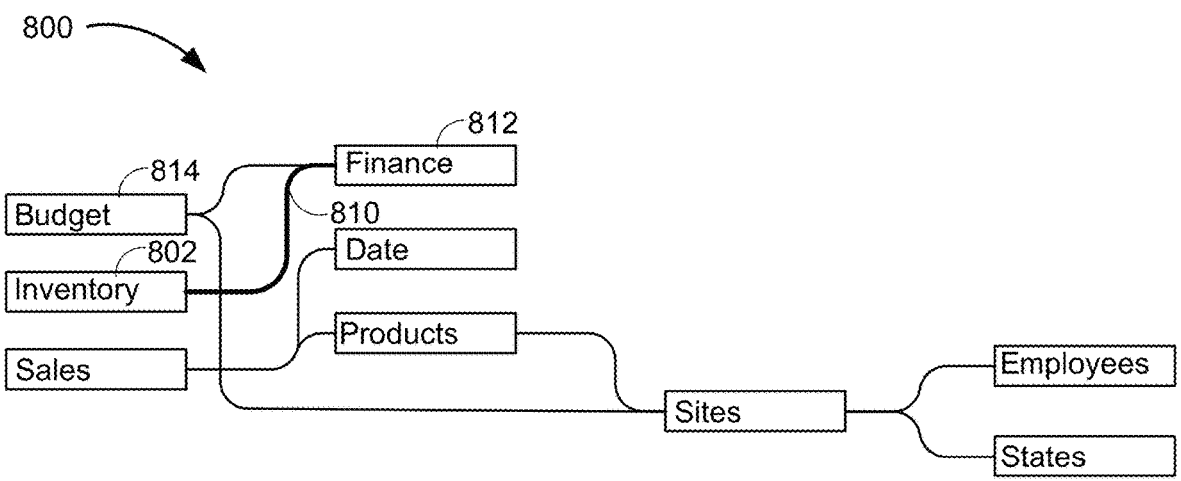

In some implementations, user selection of one end of the relationship 806 frees it to connect to another object. FIG. 8B shows that in response to user selection at the right end of the relationship 806, the connection between Inventory 802 and Date 804 is removed and a freeform line 808 is created. FIG. 8C illustrates a connection 810 (e.g., relationship) is created between the Inventory object 802 and the Finance object 812 via manipulation of the freeform line 808. The finance object 812 becomes a shared object between the Budget object 814 subtree and the Inventory object 802 subtree.

Core scenario 2: Enable rearrangement of a fact subtree so a data modeler can share an object that is currently set as root.

Under existing data model tools, if a user did not add objects in the correct order, the user will have to restart the data modeling process, which may require removing all objects in the data model that have already been created. According to some implementations of the present disclosure, a user (e.g., data modeler) can assign any unshared object of a tree to be the root (e.g., root object or root table).

Figure 9A:
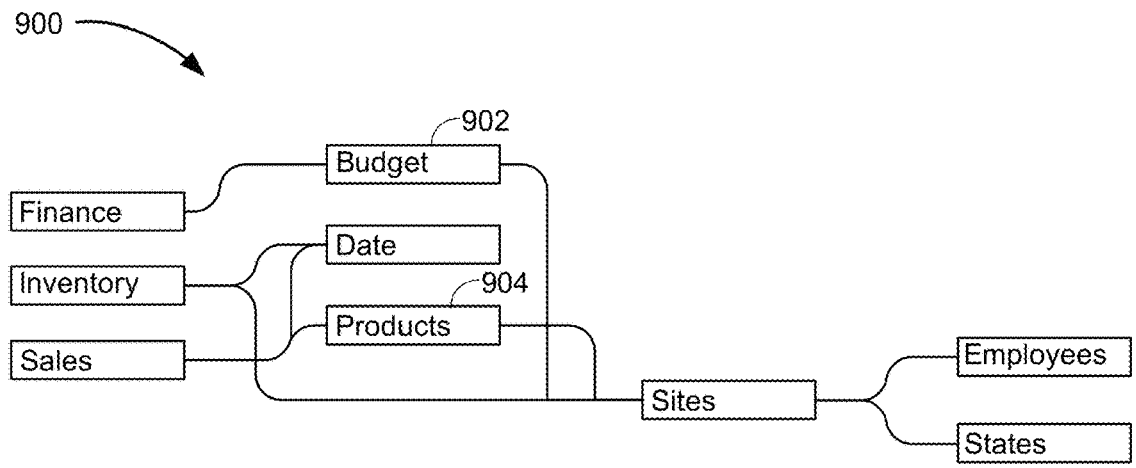
FIGS. 9A-9C illustrate rearrangement of a fact subtree, in accordance with some implementations.
Figure 9B:
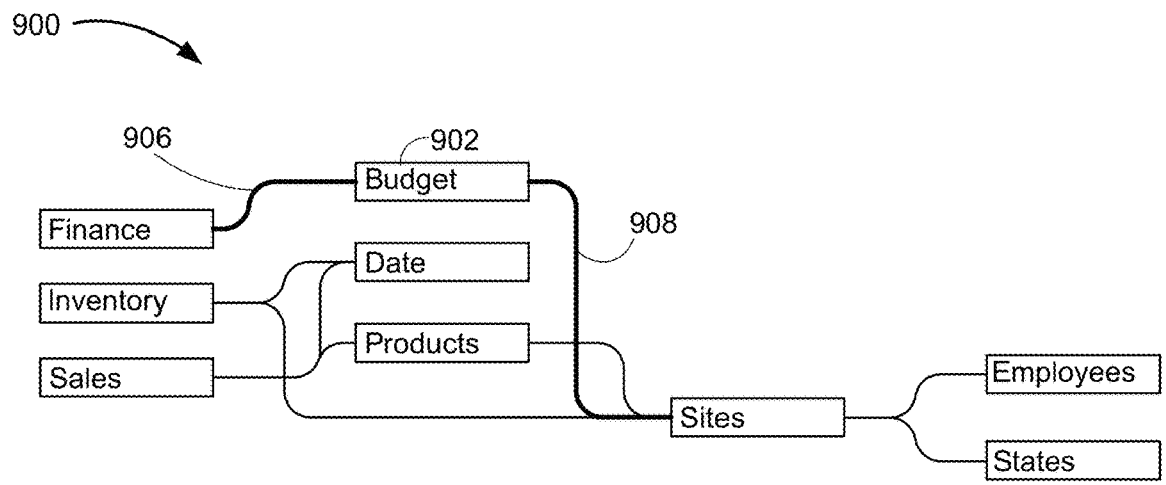
Figure 9C:
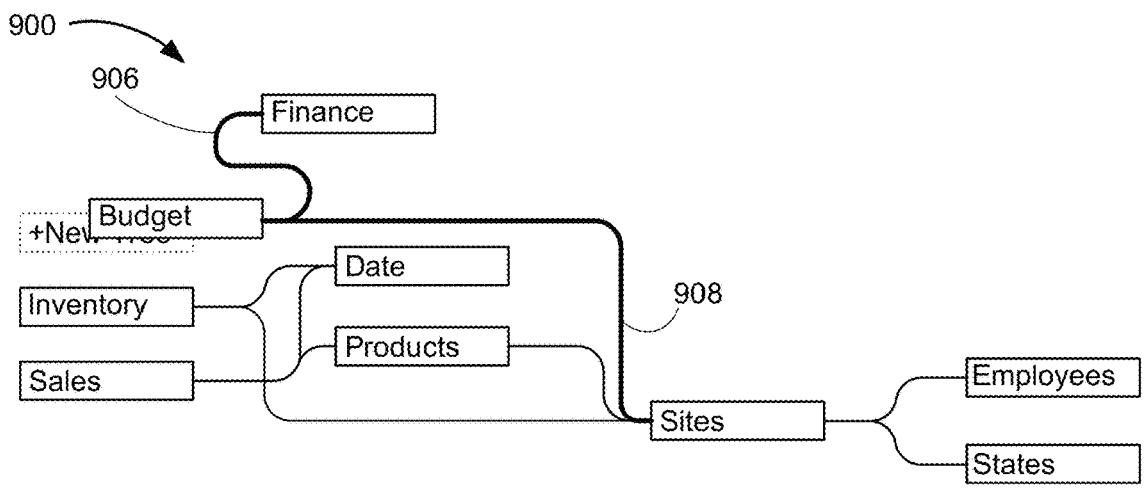

FIG. 9A illustrates an exemplary complex data model 900. According to some implementations of the present disclosure, because the budget object 902 and the products object 904 are not shared in the data model 900, they can become a root in their respective subtrees. FIG. 9B shows that the Budget object 902 has a Finance branch 906 and a Sites branch 908. FIG. 9C shows that making Budget 902 a new root causes Finance to be a new branch as well as Sites and its shared subtree with Employees and States.

Core scenario 3: Data models can become complex and users would need to be able to take different perspectives to see the extent of a fact subtree or to see what facts are already related to the current shared objects.

Figure 10:
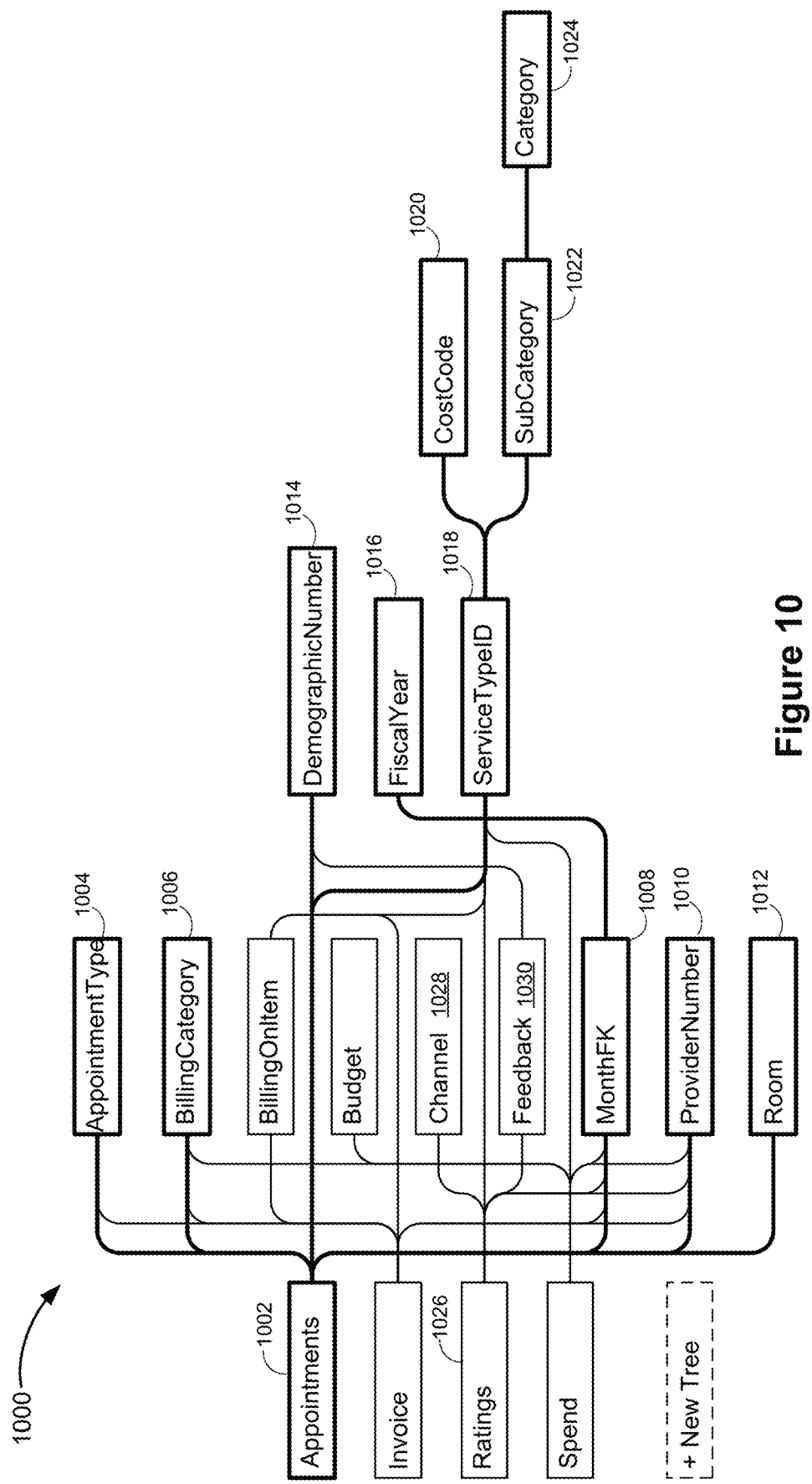
FIG. 10 illustrates visualizing objects that are connected to a root object, in accordance with some implementations.

FIG. 10 illustrates an object model 1000 according to some implementations. FIG. 10 shows that in some implementations, when a user selects the Appointments object 1002, all objects that are connected to the Appointments object (e.g., AppointmentType 1004, Billing Category 1006, MonthFK1008, ProviderNumber 1010, Room 1212, DemographicNumber 1014, FiscalYear 1016, ServiceTypeID 1018, CostCode 1020, SubCategory 1022, and Category 1024), as well as the respective relationship connectors, are visually emphasized.

In some implementations, when an unshared object of an object model 1000 is selected (e.g., Ratings 1026, Channel 1028, and/or Feedback 1030), then connected unshared objects are highlighted, along with all the shared objects that are connected to the unshared object. FIG. 10 shows that the Ratings fact tree is composed of two types of objects: Unshared (Ratings 1026, Channel 1028, and/or Feedback 1030), and Shared (DemographicNumber 1024, ServiceTypeID 1018, CostCode 1020, SubCategory 1022, Category 1024, MonthFK 1008, and FiscalYear 1016).

Figure 11:
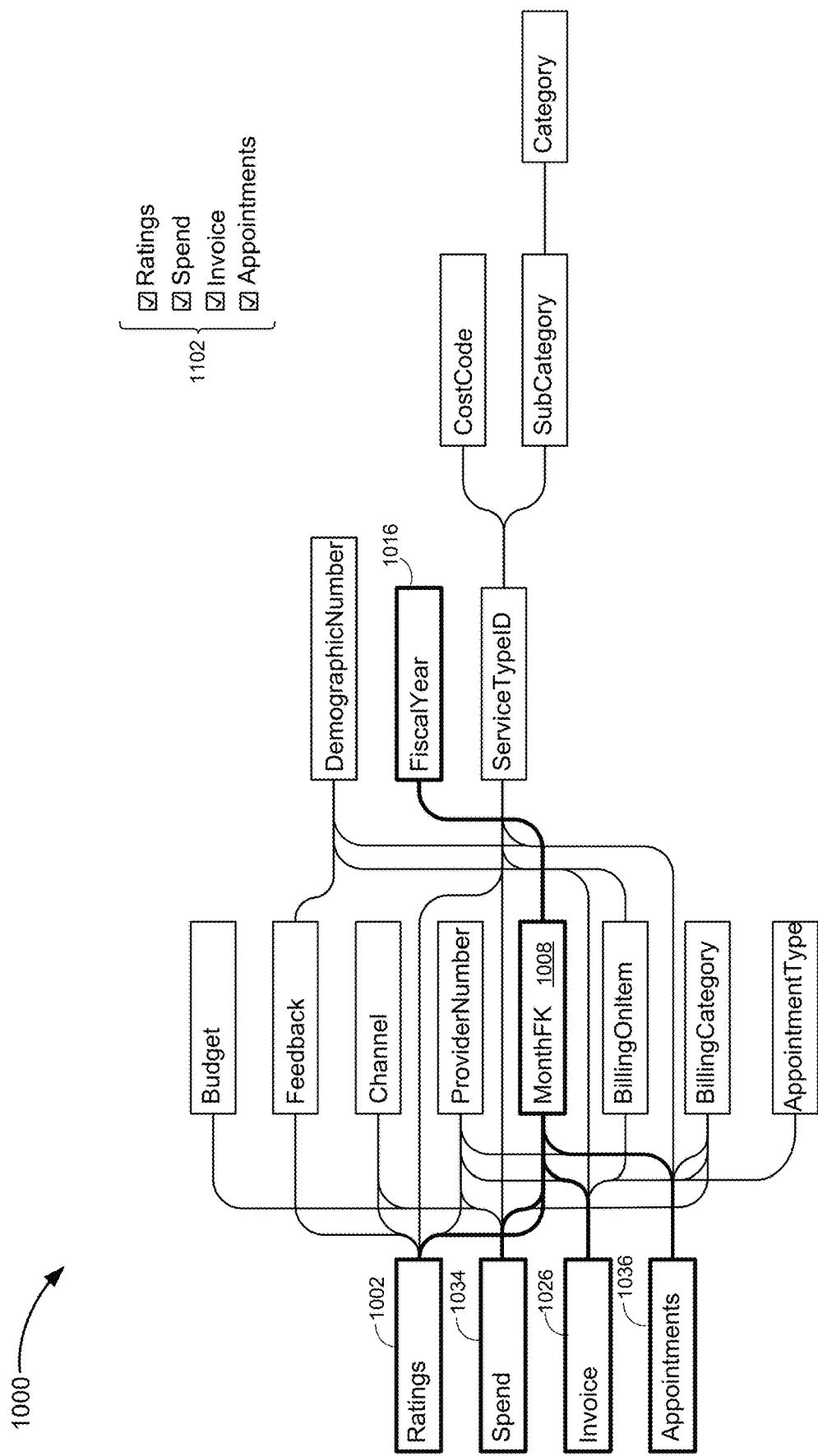
FIG. 11 illustrates visualizing unshared objects that are connected to a selected object, in accordance with some implementations.

Some implementations of the present disclosure enable a data modeler to view a data model from the perspective of shared objects so the data modeler can identify what subtrees are already shared with it. FIG. 11 illustrates the data model 1000 that is shown in FIG. 10, from the perspective of MonthFK 1018. In this perspective, a user can identify that root objects Ratings 1022, Spend 1024, Invoice 1026, and Appointments 1028, and the Fiscal Year object 1020 are shared with MonthFK 1018 whereas the other objects in the object model 1000 are unshared. The data modeler can bring in additional unshared object(s), or to remove relationship(s) with existing object(s). FIG. 11 illustrates that in some implementations, the data modeling user interface 240 includes an affordance 1102 that enables a user to select which root objects (e.g., Ratings 1002, Spend 1034, Invoice 1026, and Appointments 1036) the user would like to view on the user interface.

Figure 12:
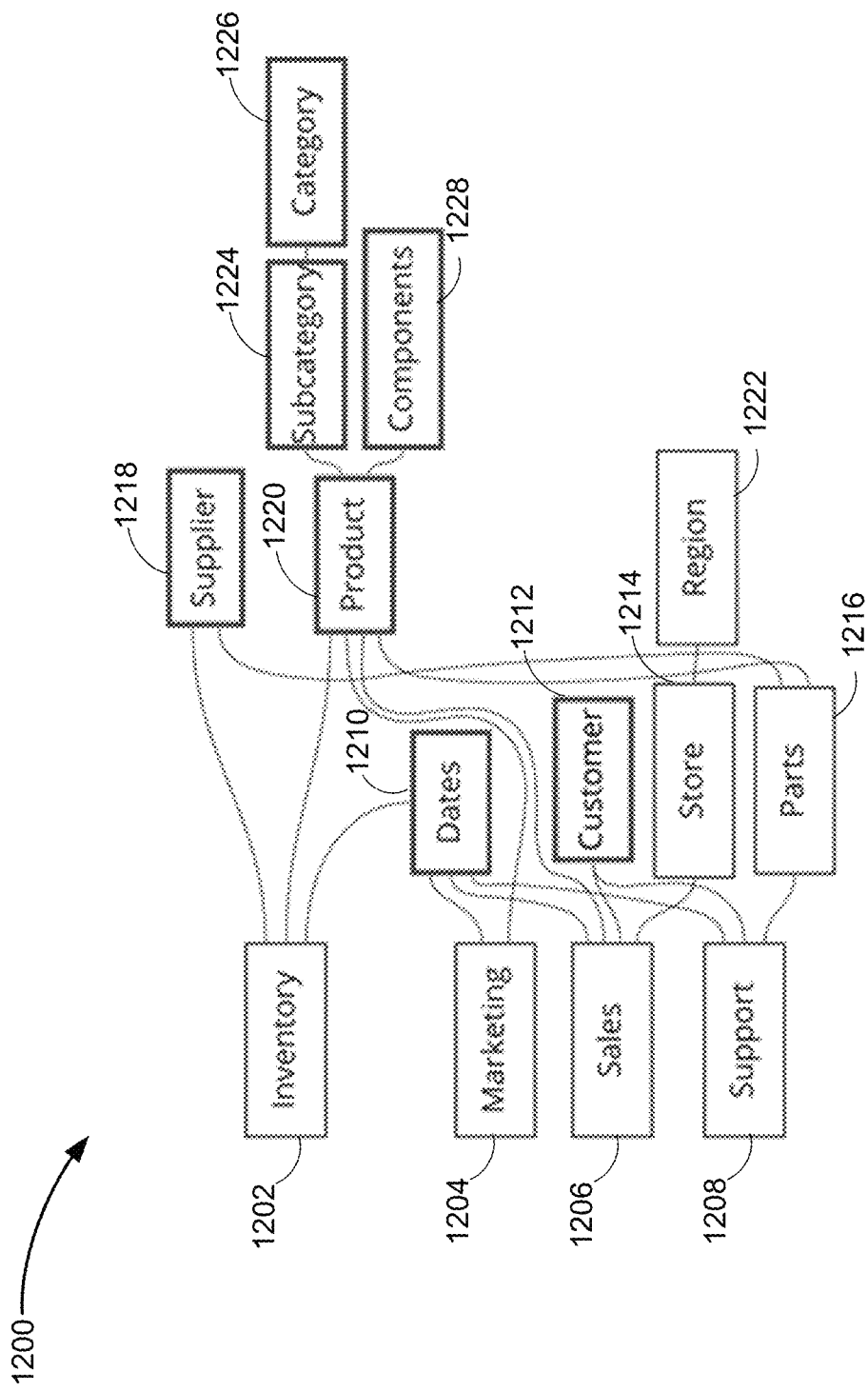
FIG. 12 illustrates swapping unshared tables with a base table, in accordance with some implementations.

In some implementations, a user can swap an unshared table of an object model with a base table of the object model. FIG. 12 illustrates a data model 1200 where there are enough tables that swap with base tables and reparent have the freedom to work. In FIG. 12, the base tables are the leftmost tables: Inventory 1202, Marketing 1204, Sales 1206, and Support 1208. The unshared tables are those that can be traced back to only one base table: Inventory 1202, Marketing 1204, Sales 1206, Store 1214, Region 1222, Support 1208, and Parts 1216. The shared trees of tables are those that group together within their own trees starting with one table that is shared with multiple base tables. In FIG. 12, the single shared trees (single table trees) are Supplier 1218, Dates 1210, and Customer 1212. The multiple shared trees (multiple table trees) are Product 1220, Subcategory 1224, Category 1226, and Components 1228.

In some implementations, any unshared table can swap with its base table. For example, in FIG. 12, Store 1214 and Region 1222 can swap with Sales 1206; Parts 1216 can swap with Support 1208.

In some implementations, a user can reparent a table within its own tree. In some implementations, an unshared table that can swap with its base table can reparent itself to any other unshared table that stems from the same base table. For example, in FIG. 12, Region 1222 can be reparented to Sales 1206. In some implementations, a shared table can be reparented within its own shared tree. For example, in FIG. 12, Category 1226 can be reparented to Components 1228; Components 1228 can be reparented to Subcategory 1224 or Category 1226.

II.D. Exemplary User Interface for Constructing Multi-Fact Data Model

Figure 13A:
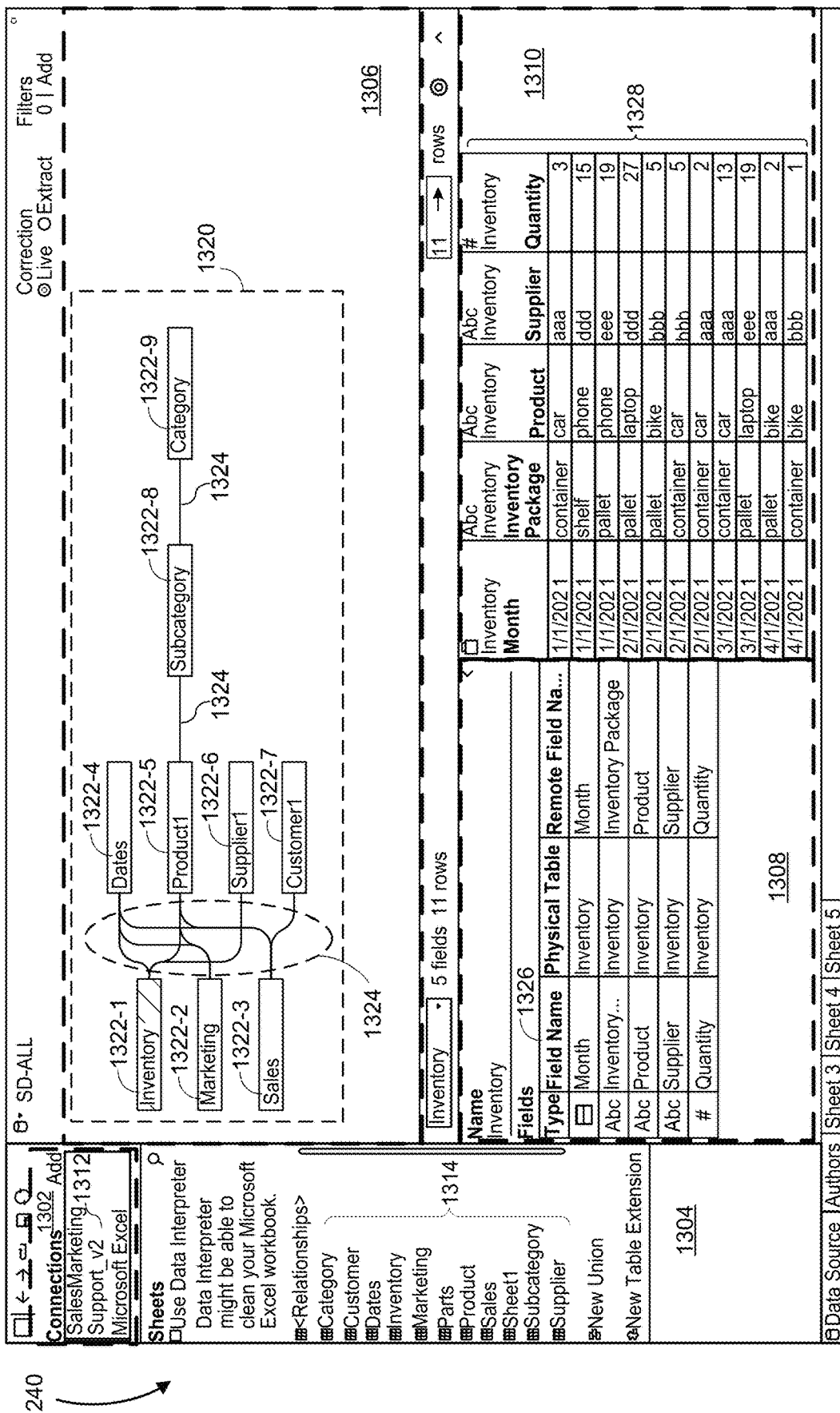
FIGS. 13A-13U provide a series of screenshots that illustrate user interactions with a data modeling graphical user interface for building (e.g., constructing) multi-fact data models, in accordance with some implementations.
Figure 13B:
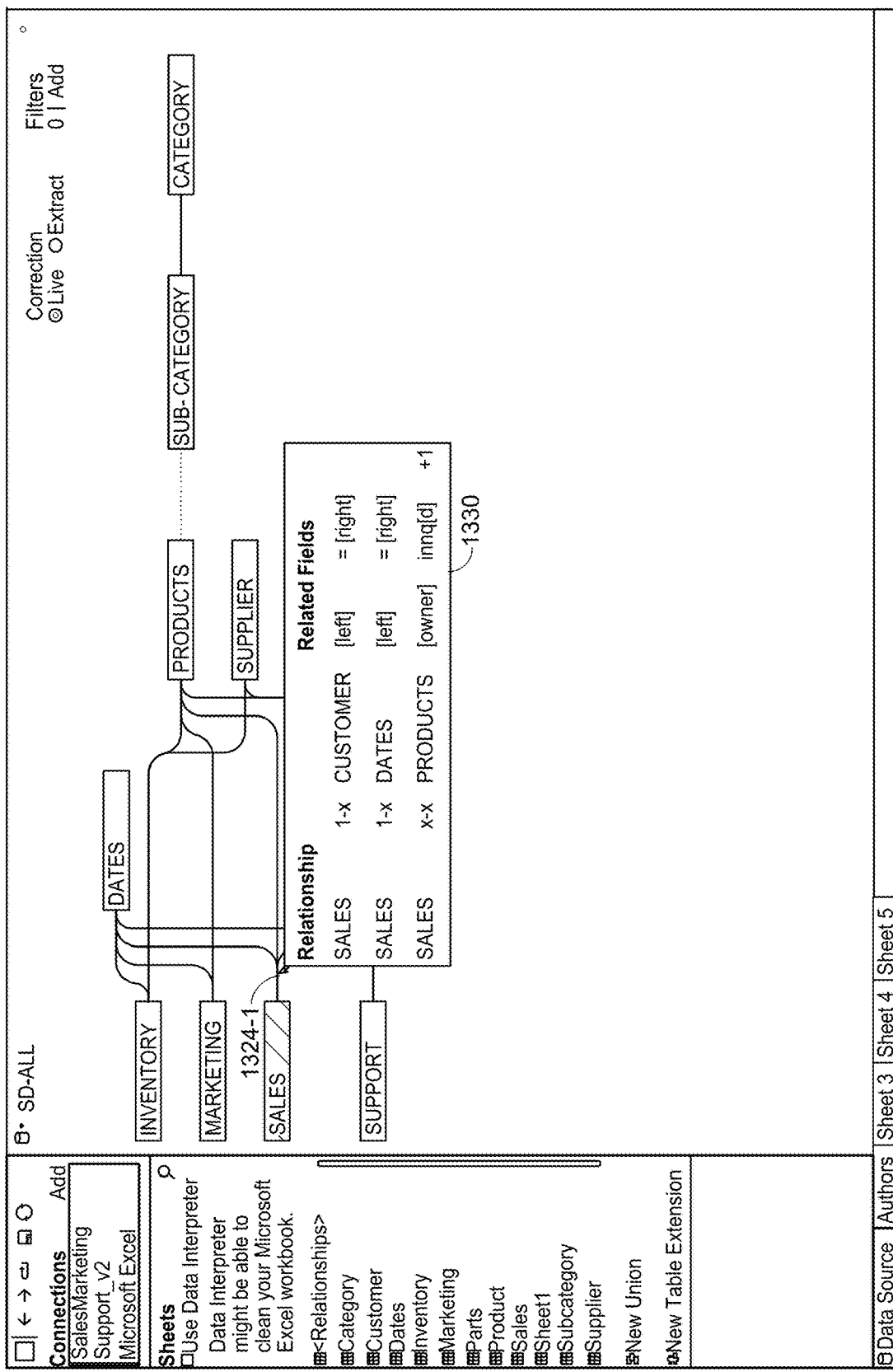
Figure 13C:
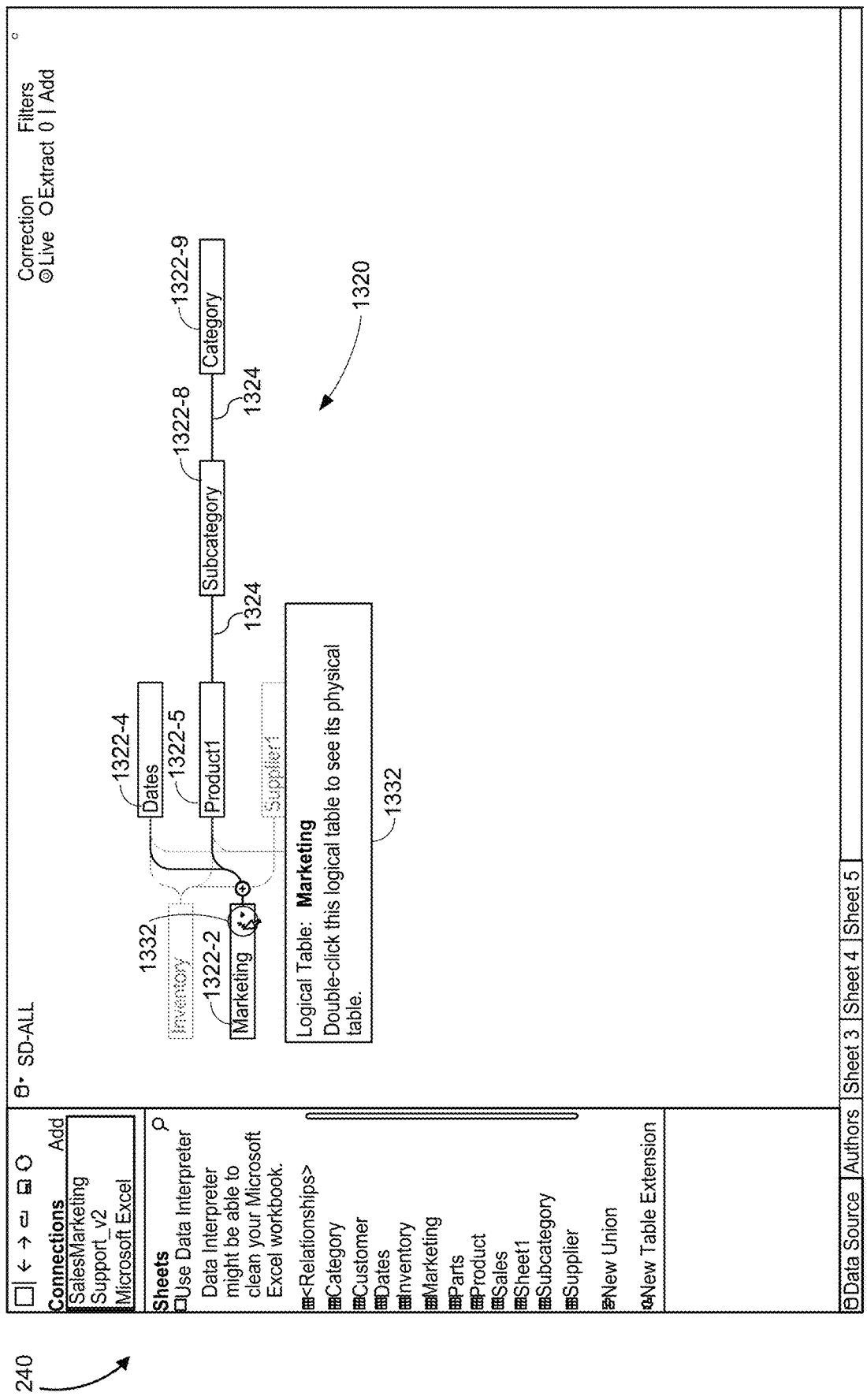
Figure 13D:
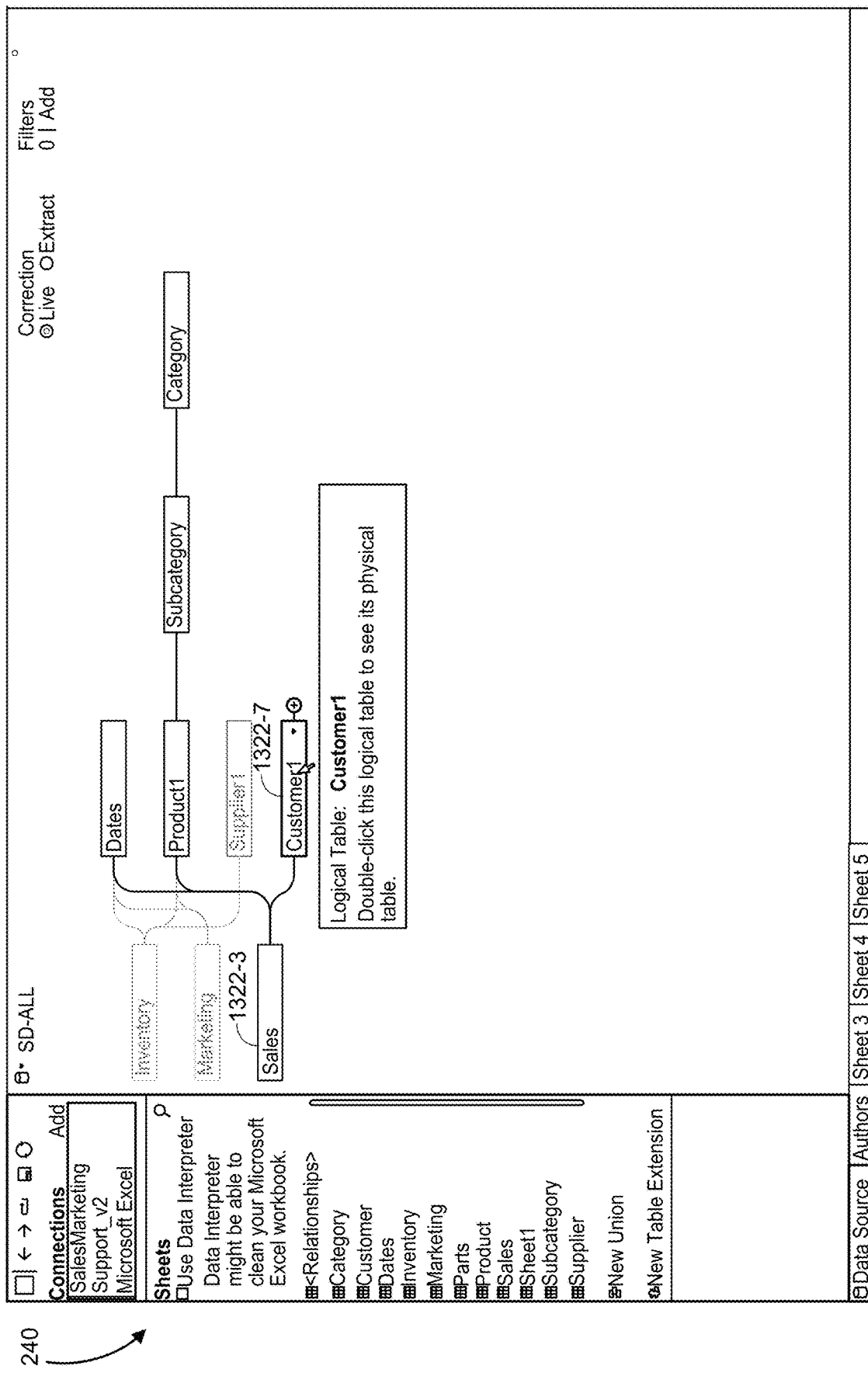
Figure 13E:
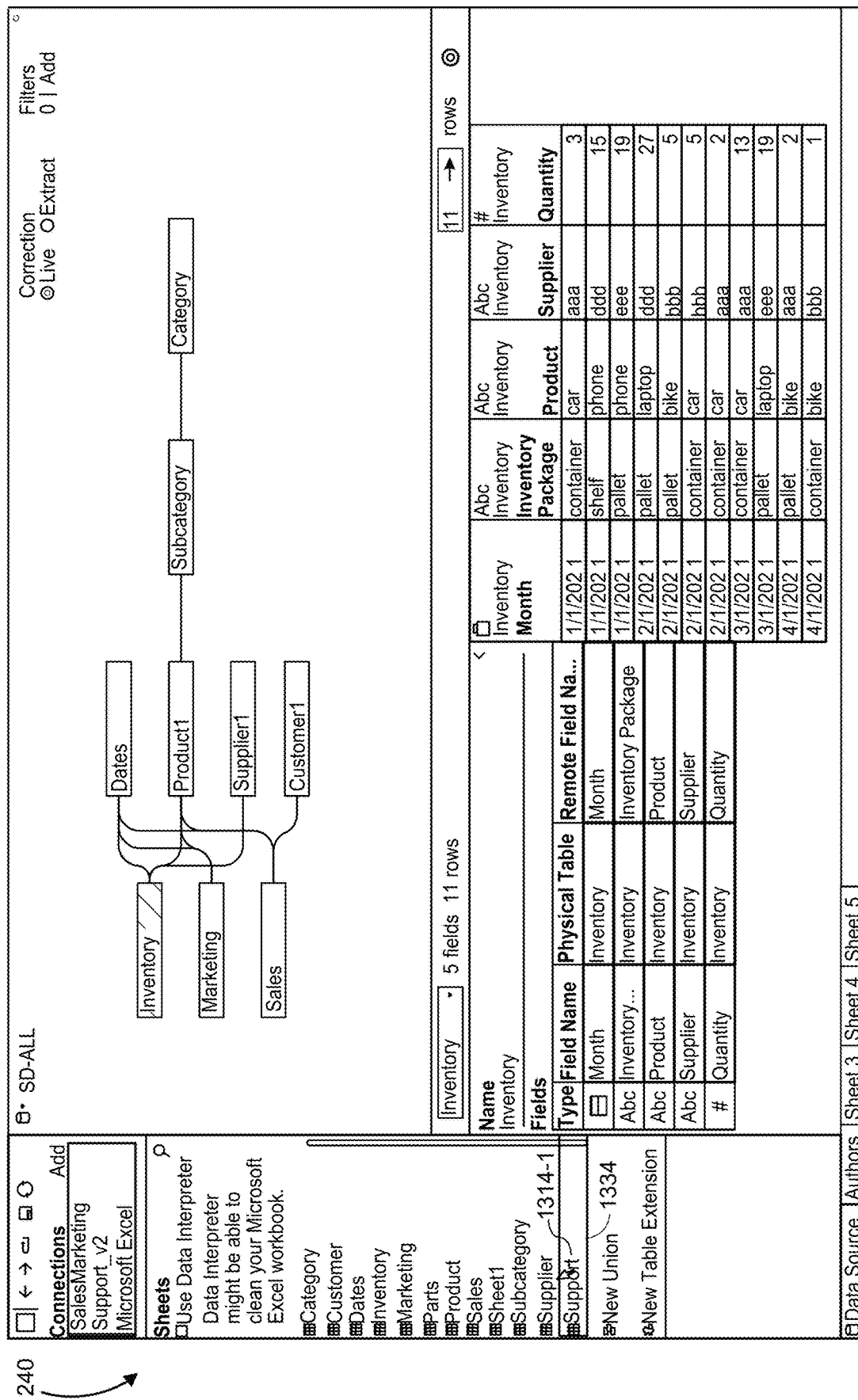
Figure 13F:
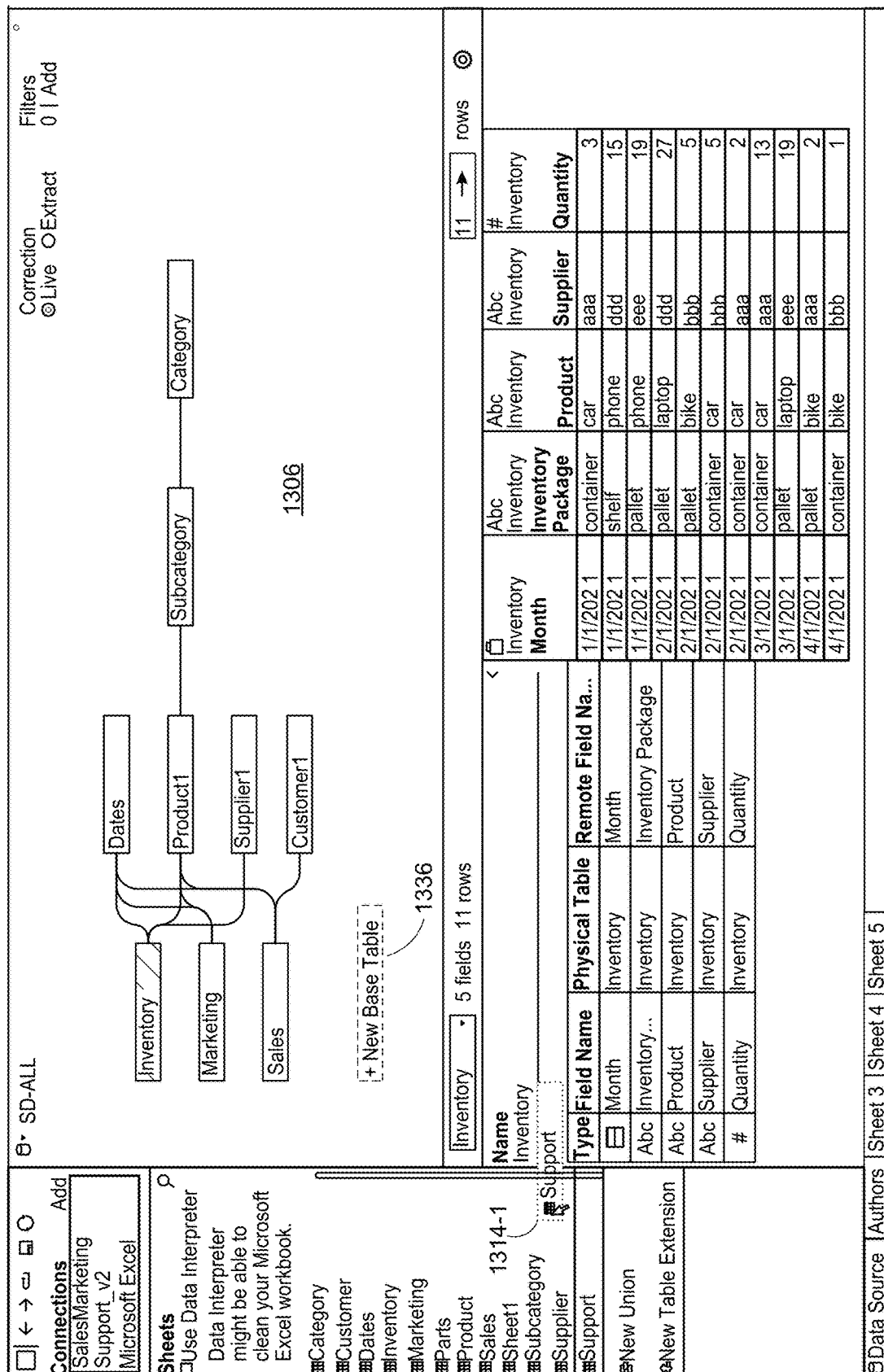
Figure 13G:
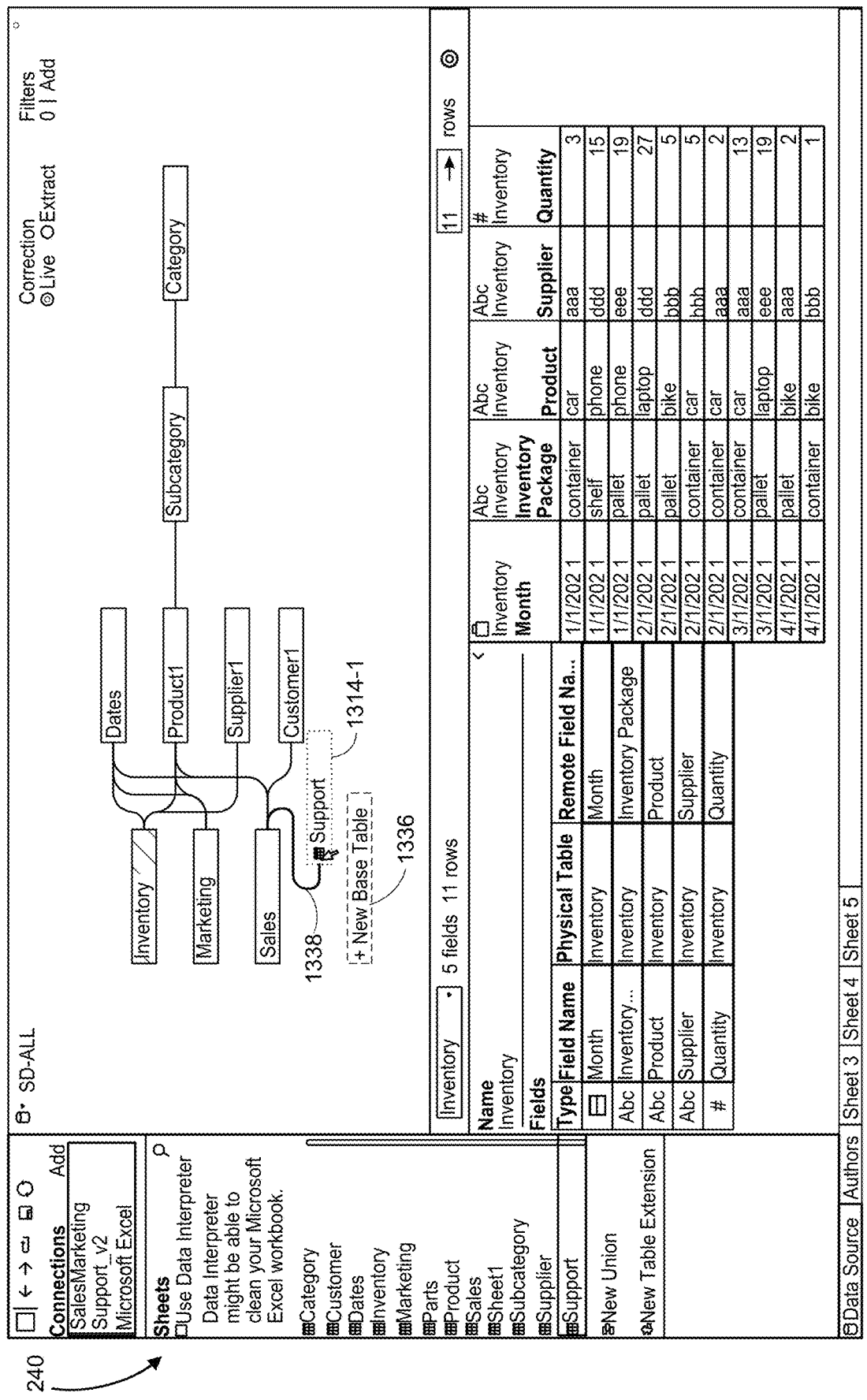
Figure 13H:
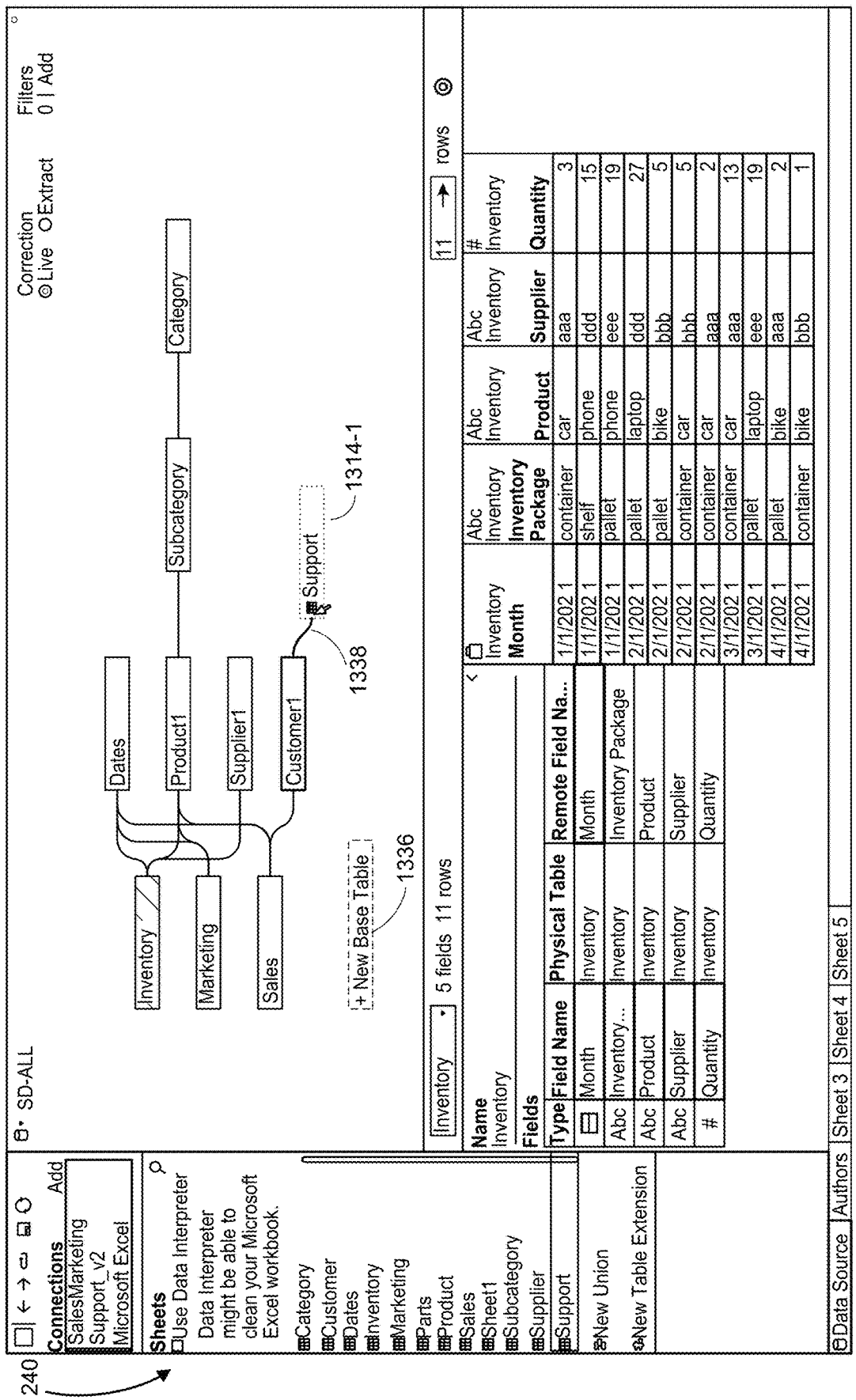
Figure 13I:
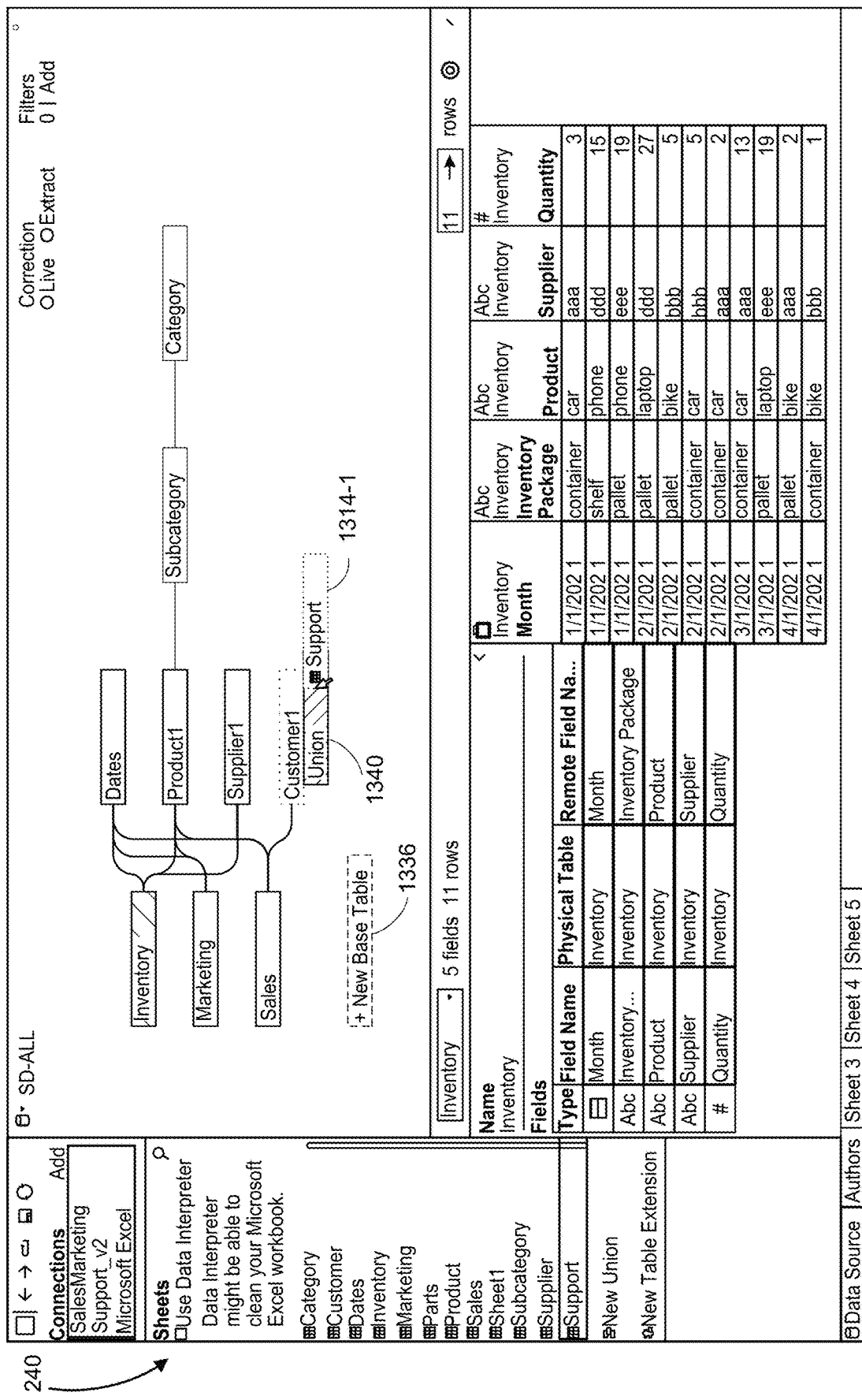
Figure 13J:
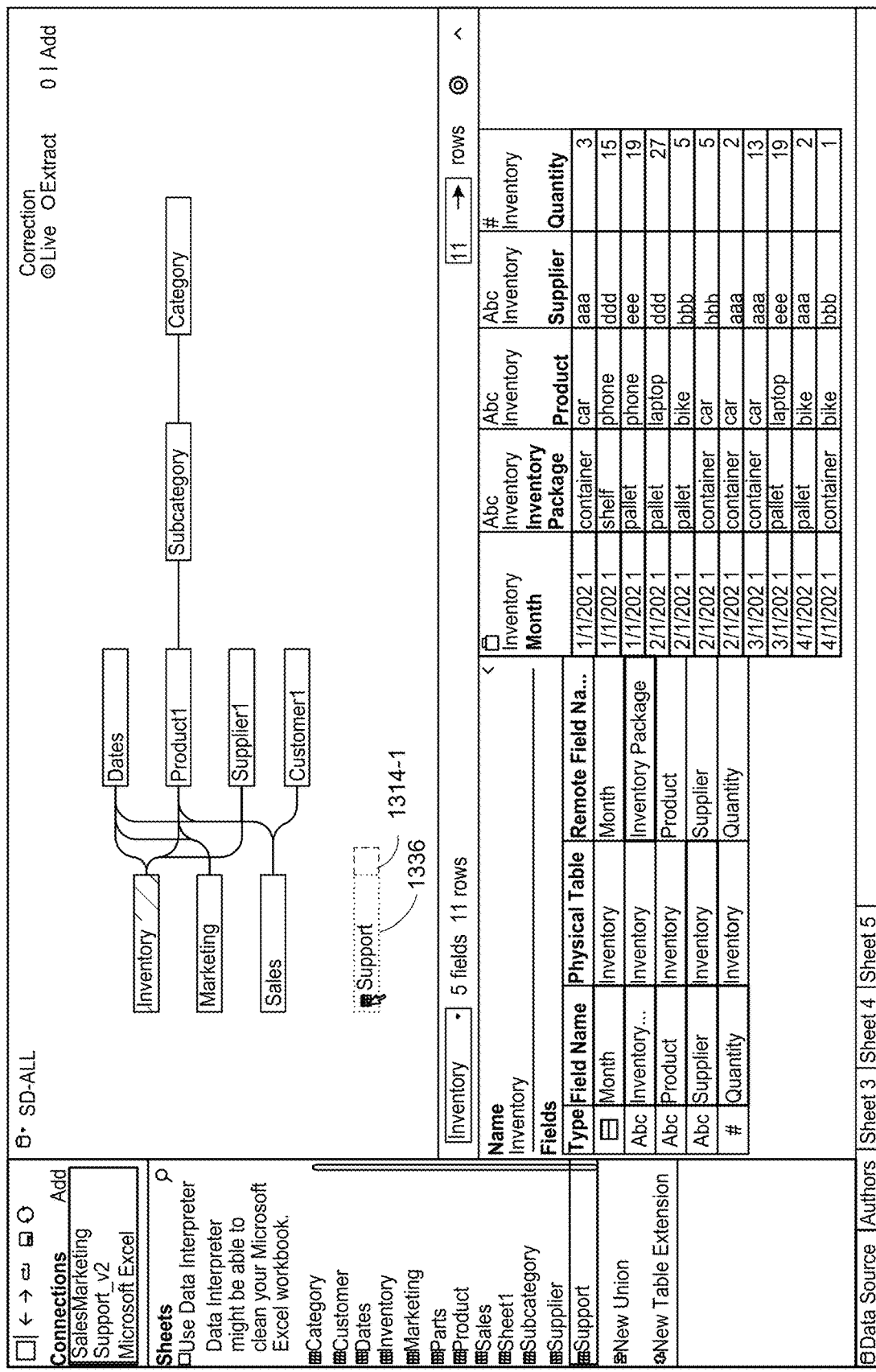
Figure 13K:
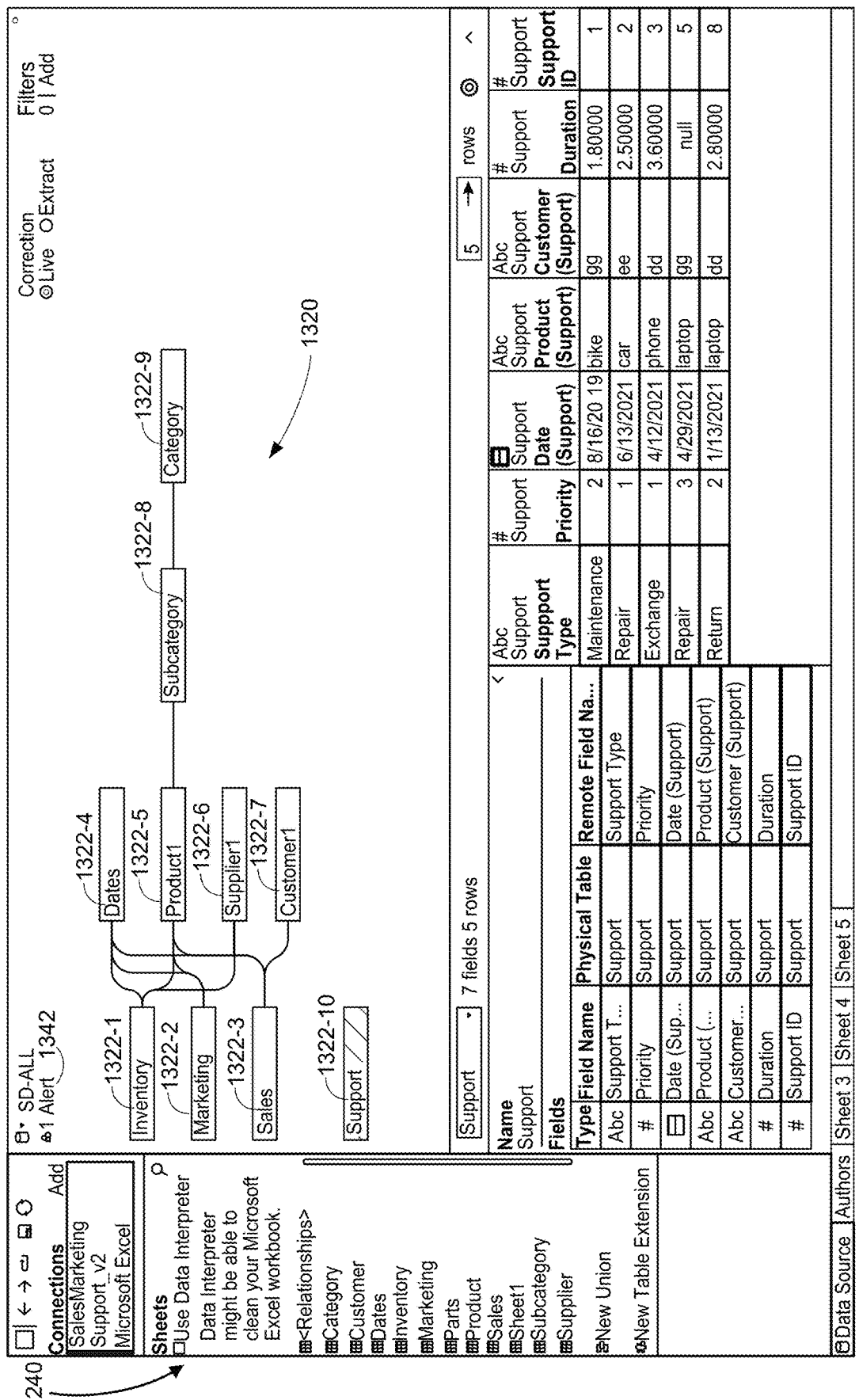
Figure 13L:
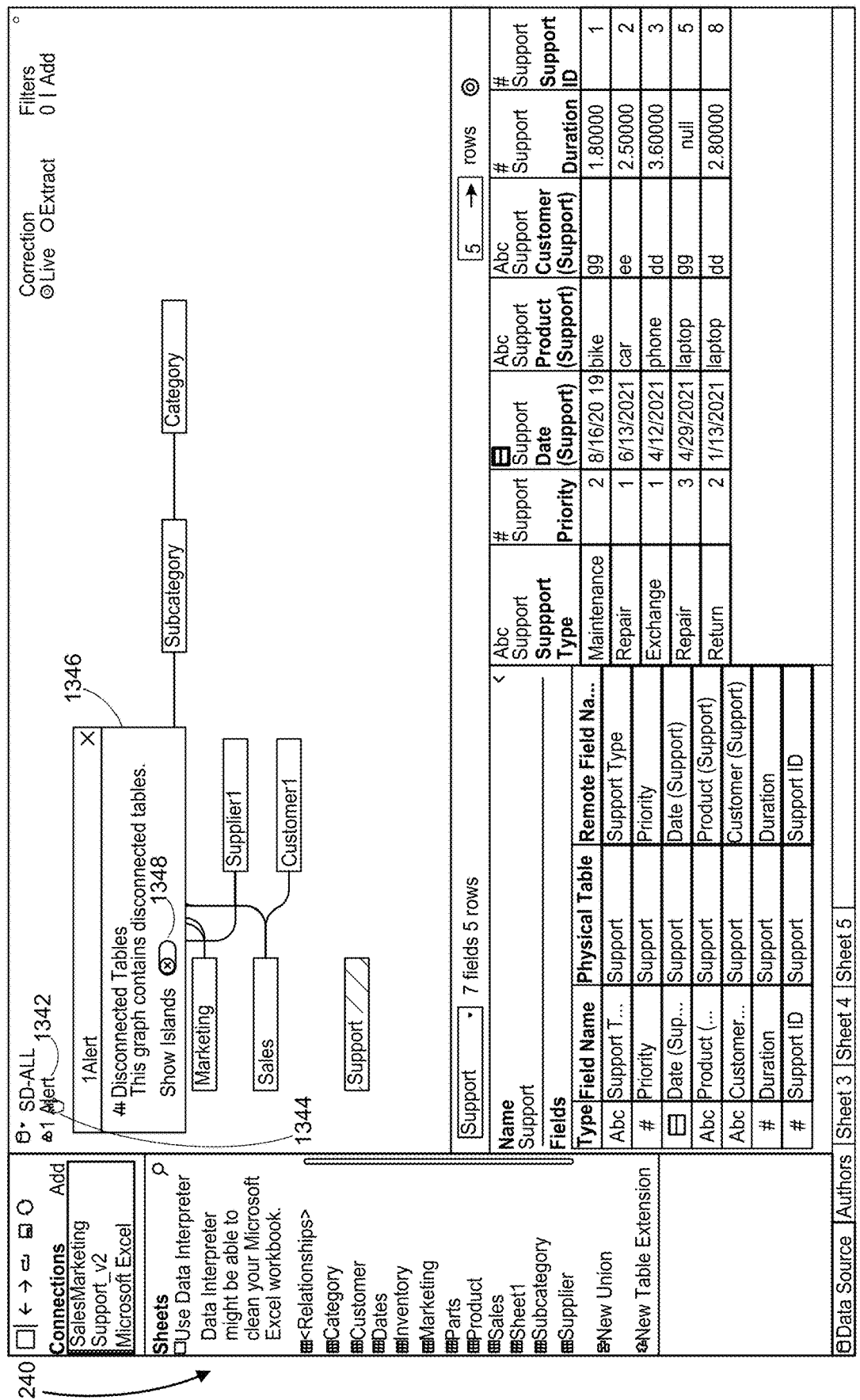
Figure 13M:
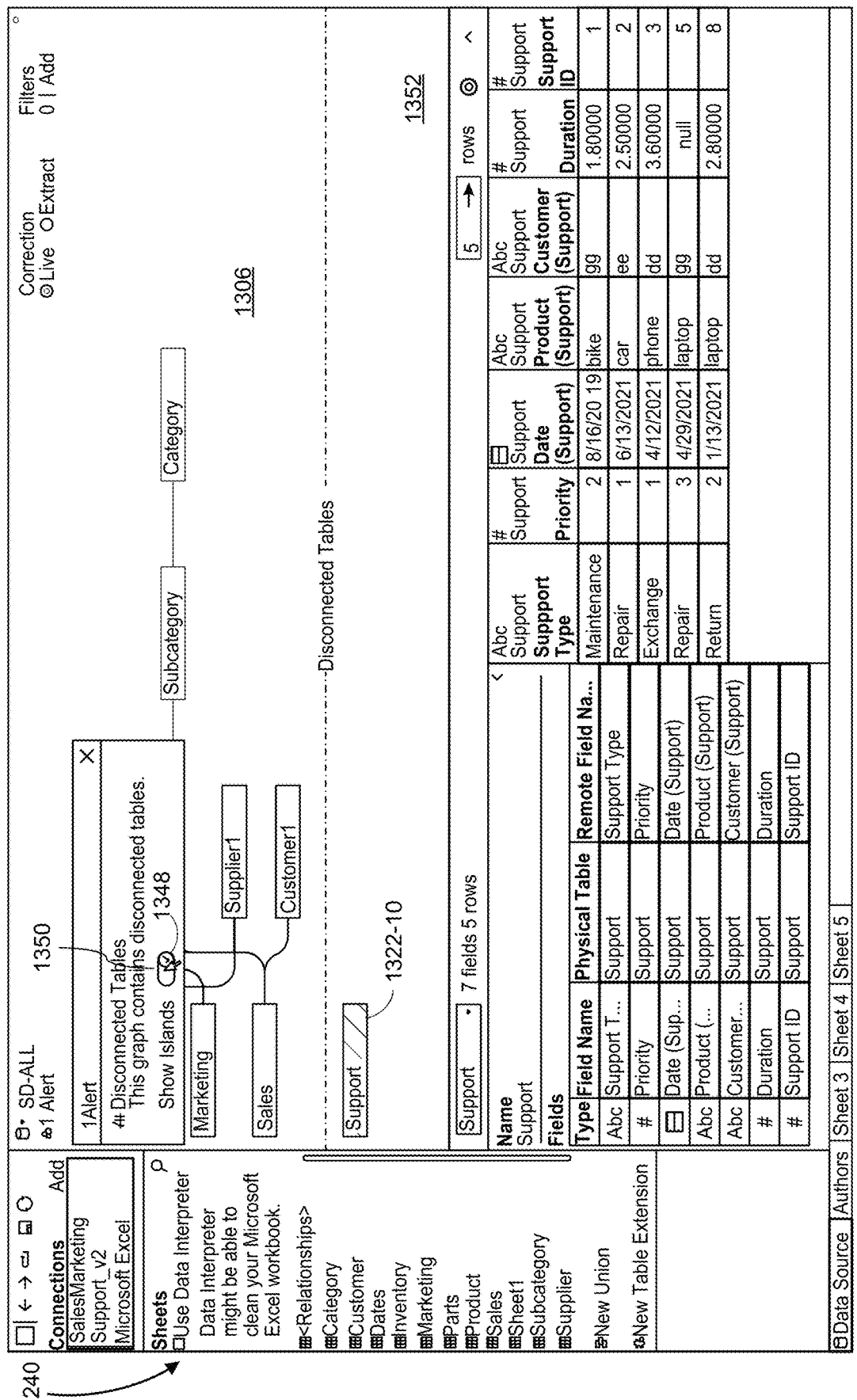
Figure 13N:
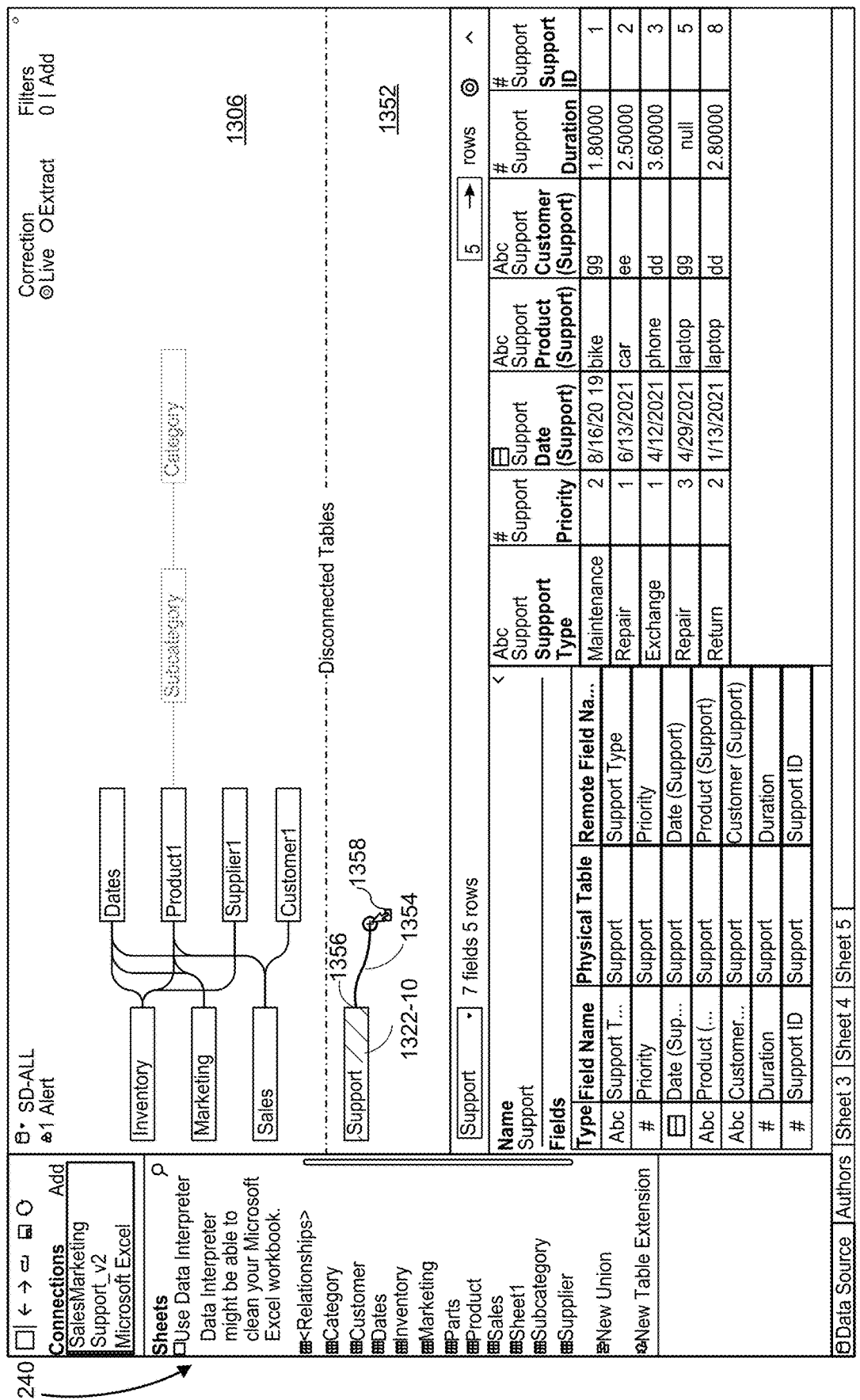
Figure 13O:
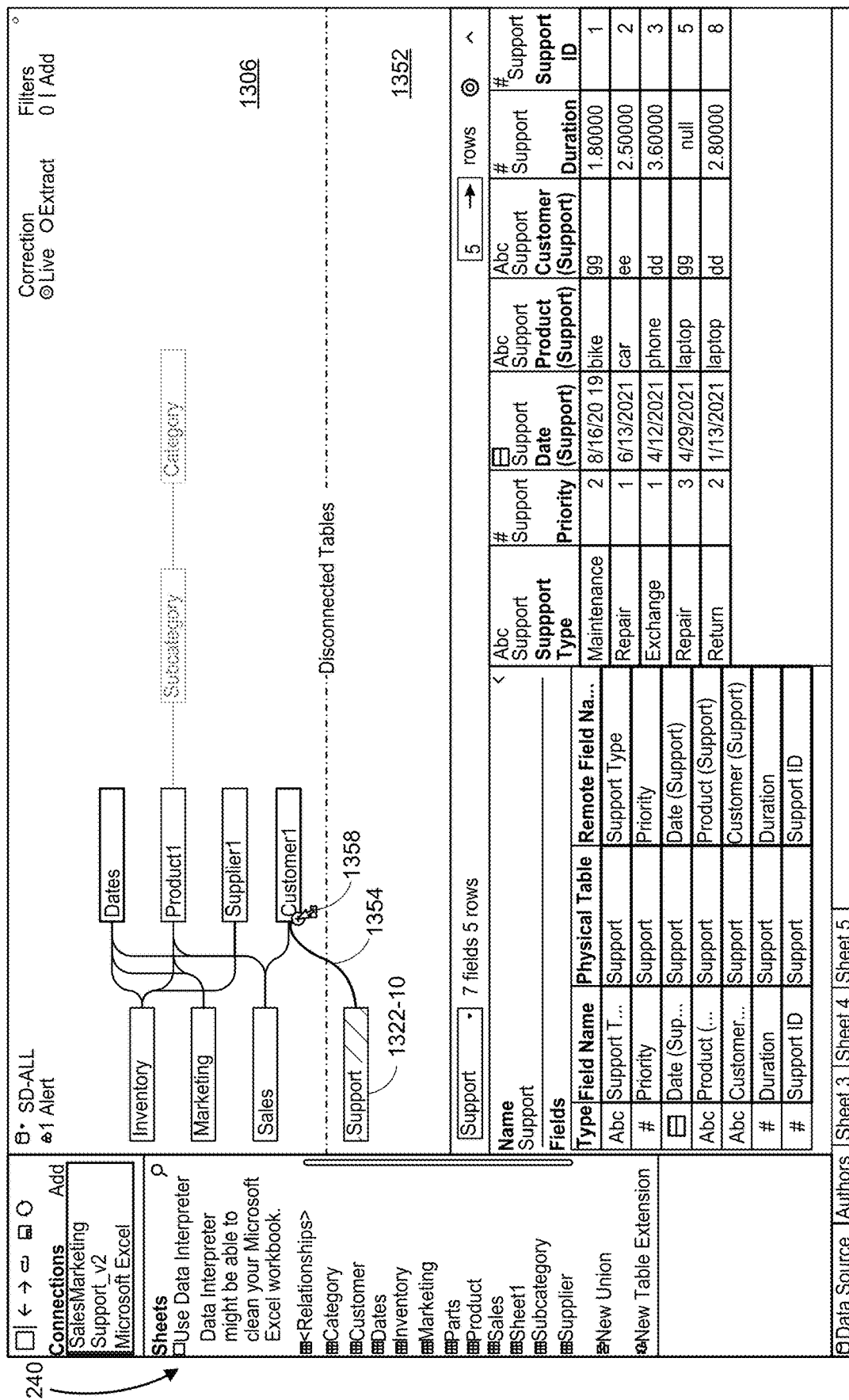
Figure 13P:
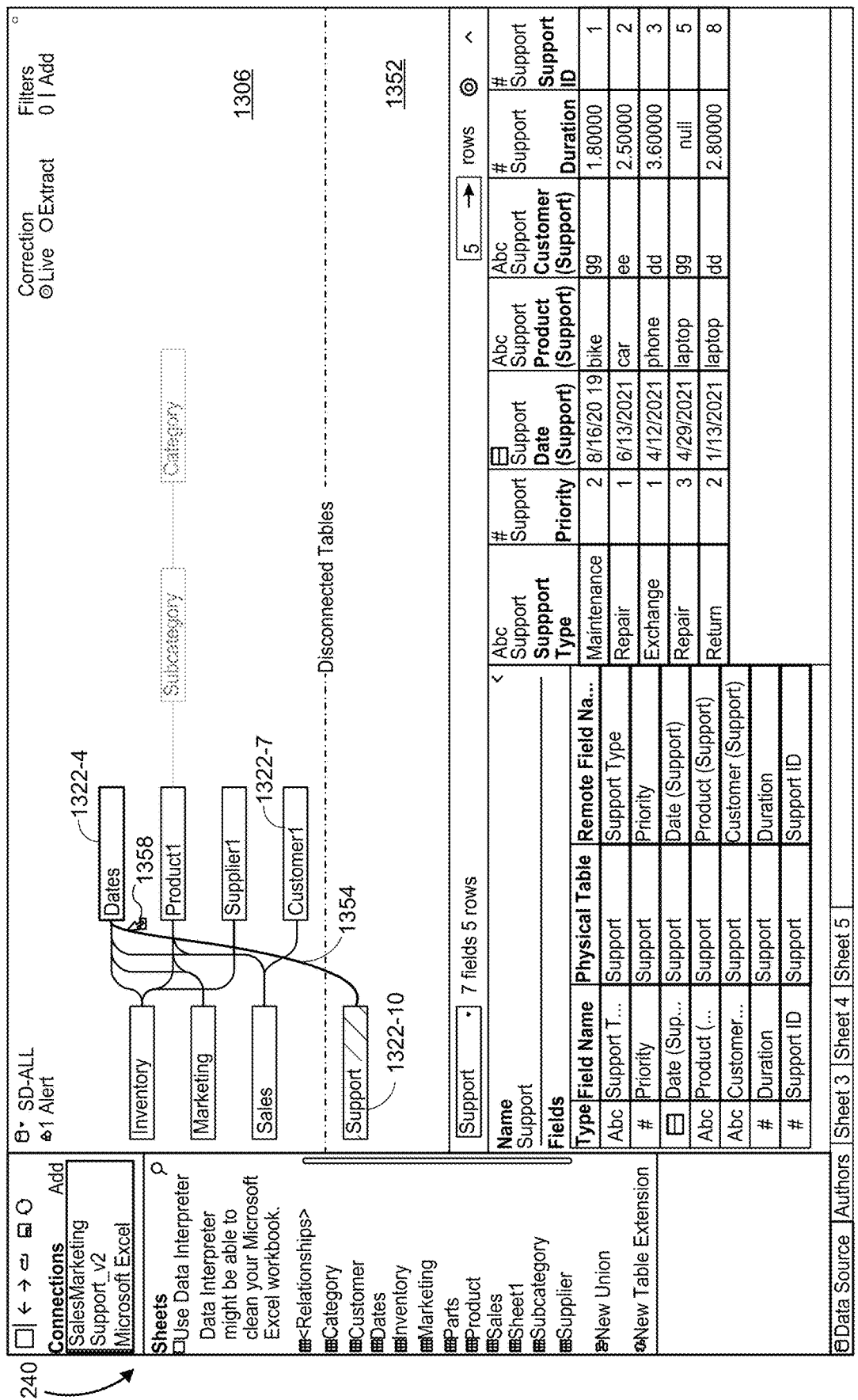
Figure 13Q:
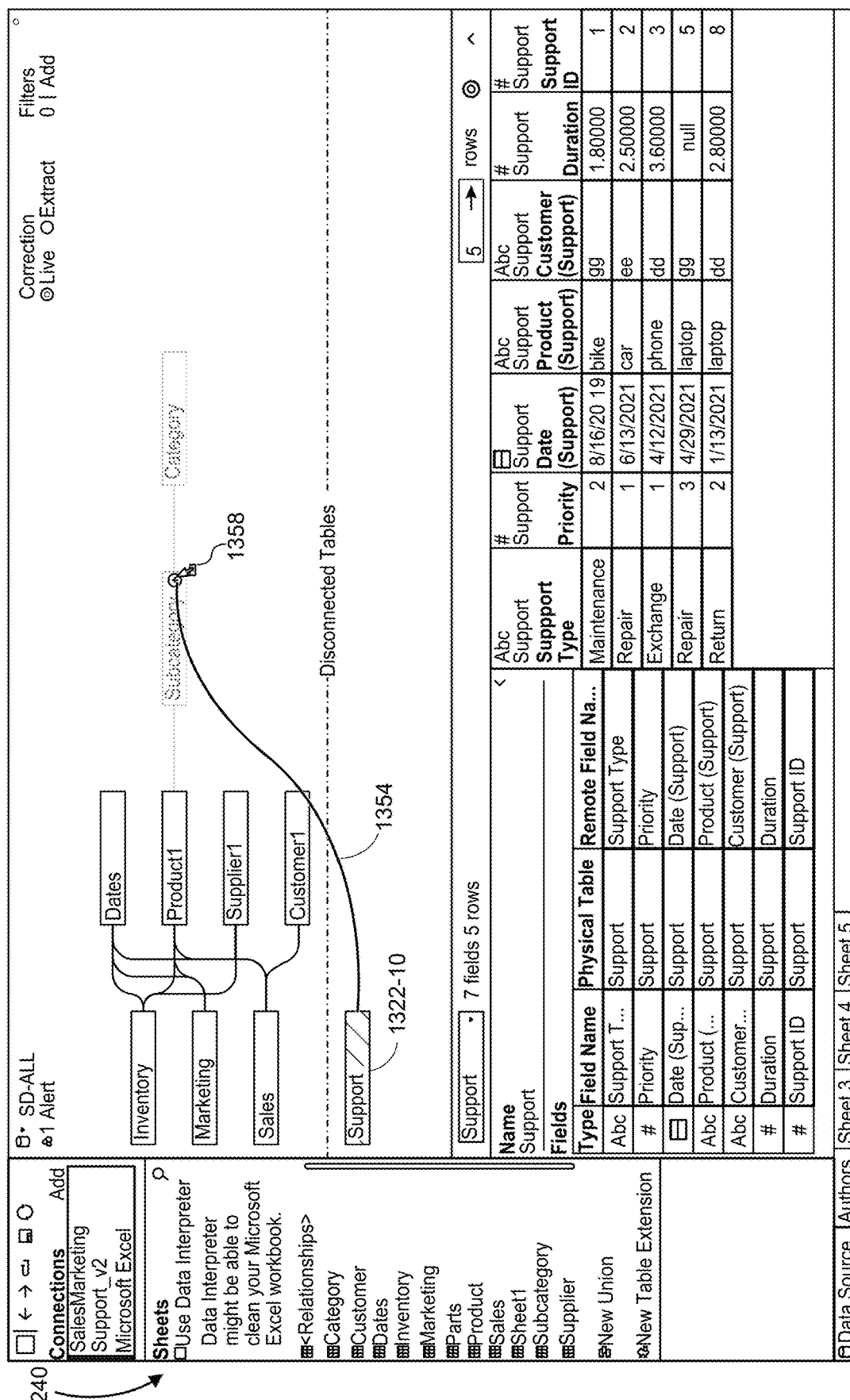
Figure 13R:
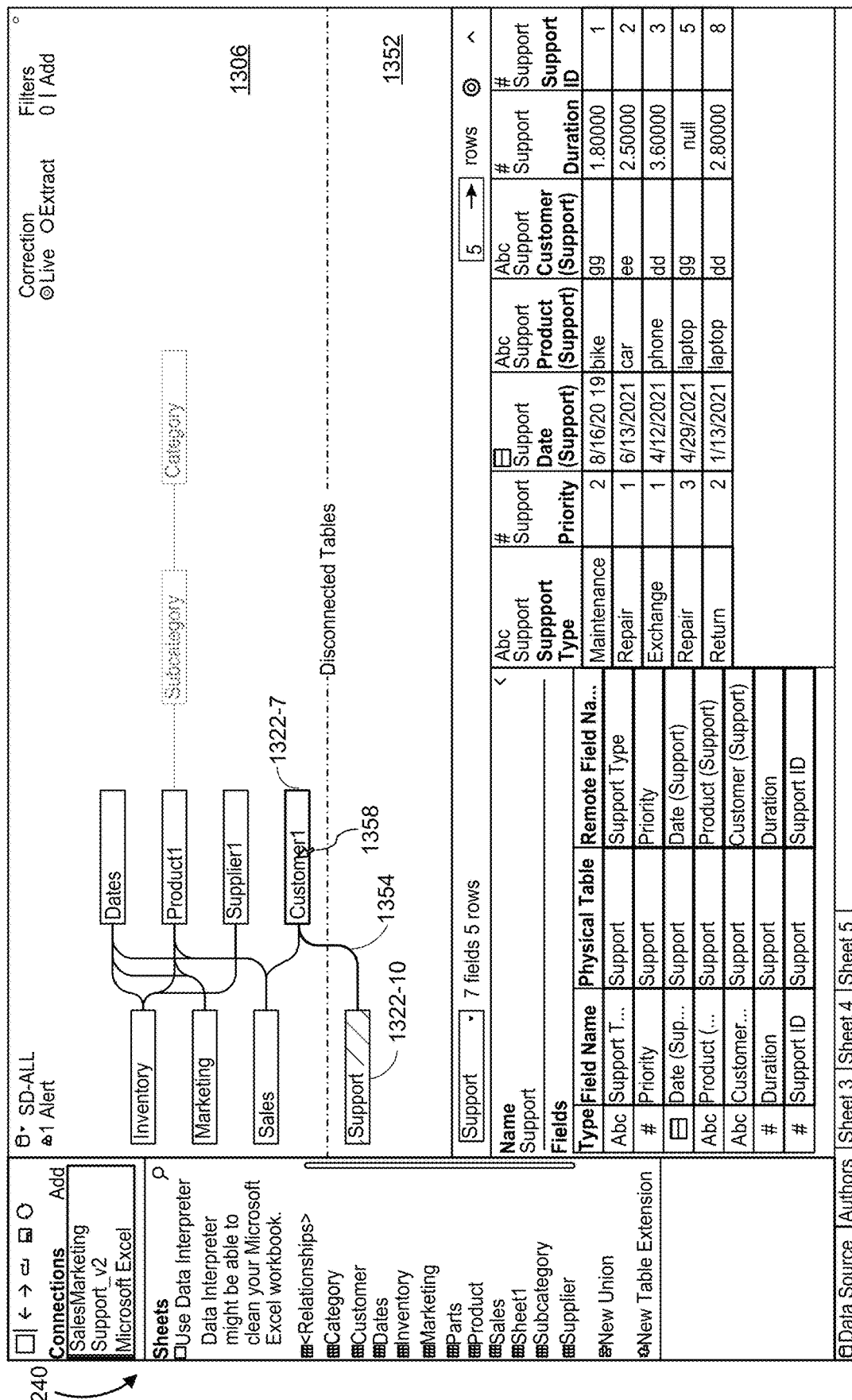
Figure 13S:
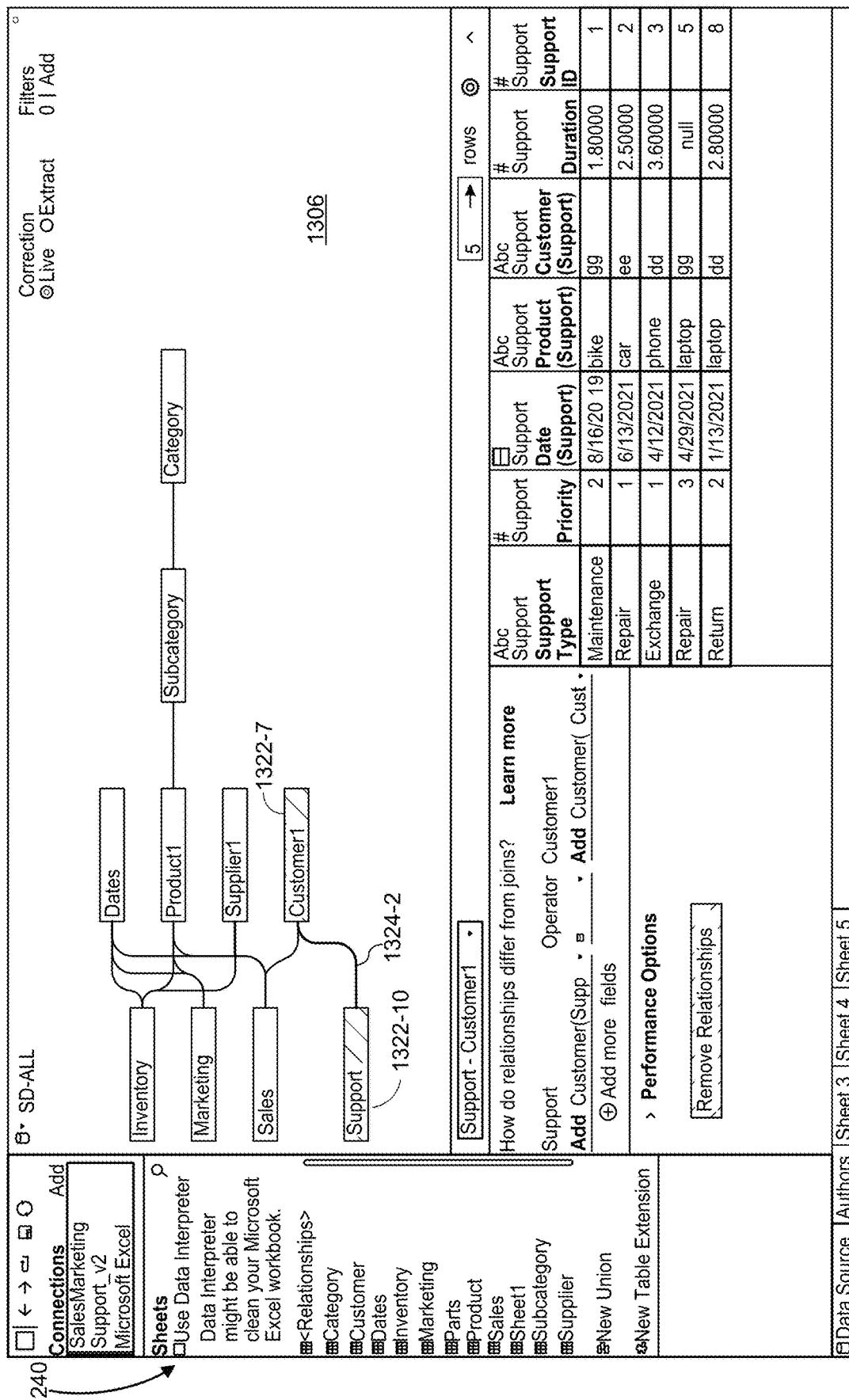
Figure 13T:
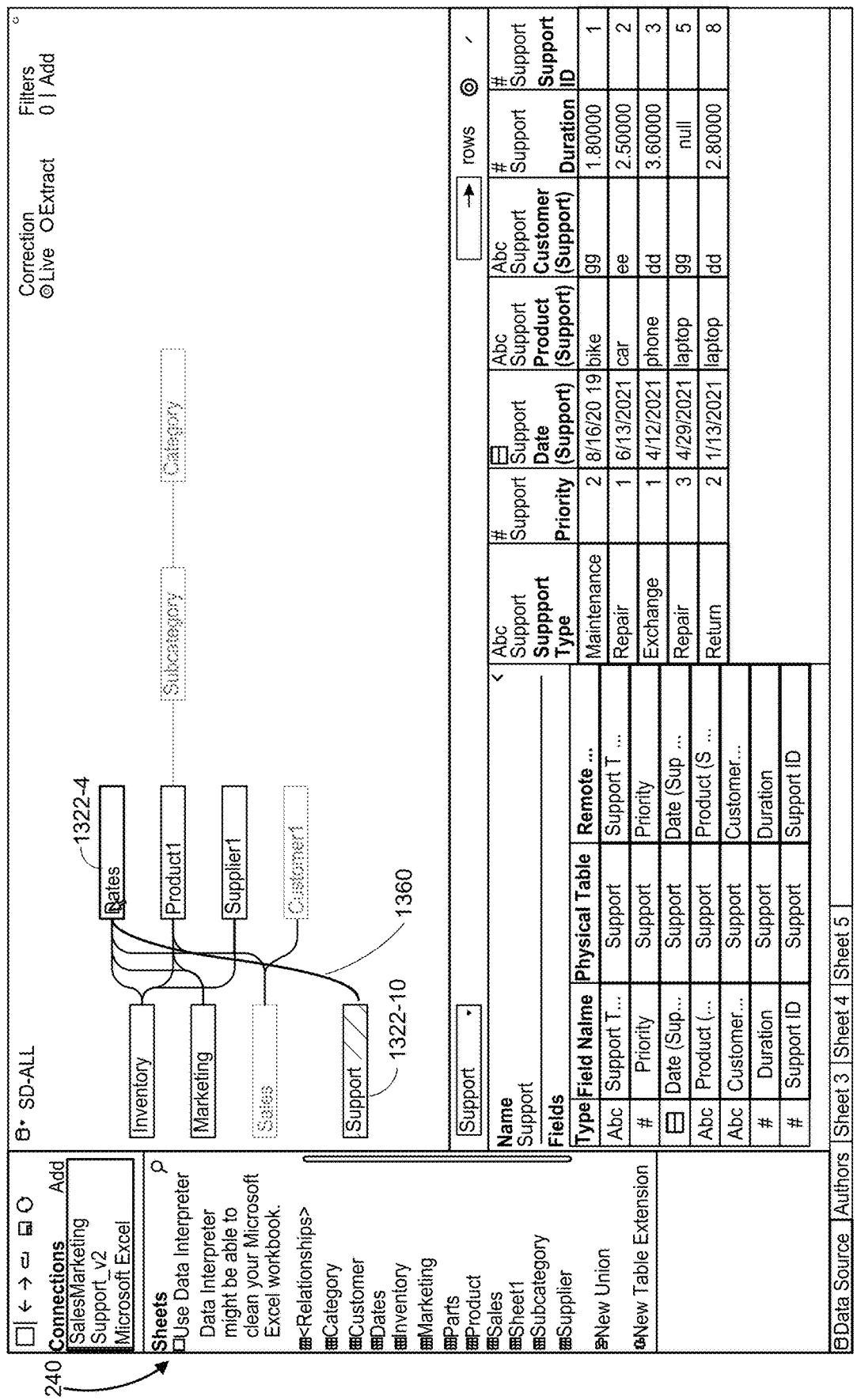
Figure 13U:
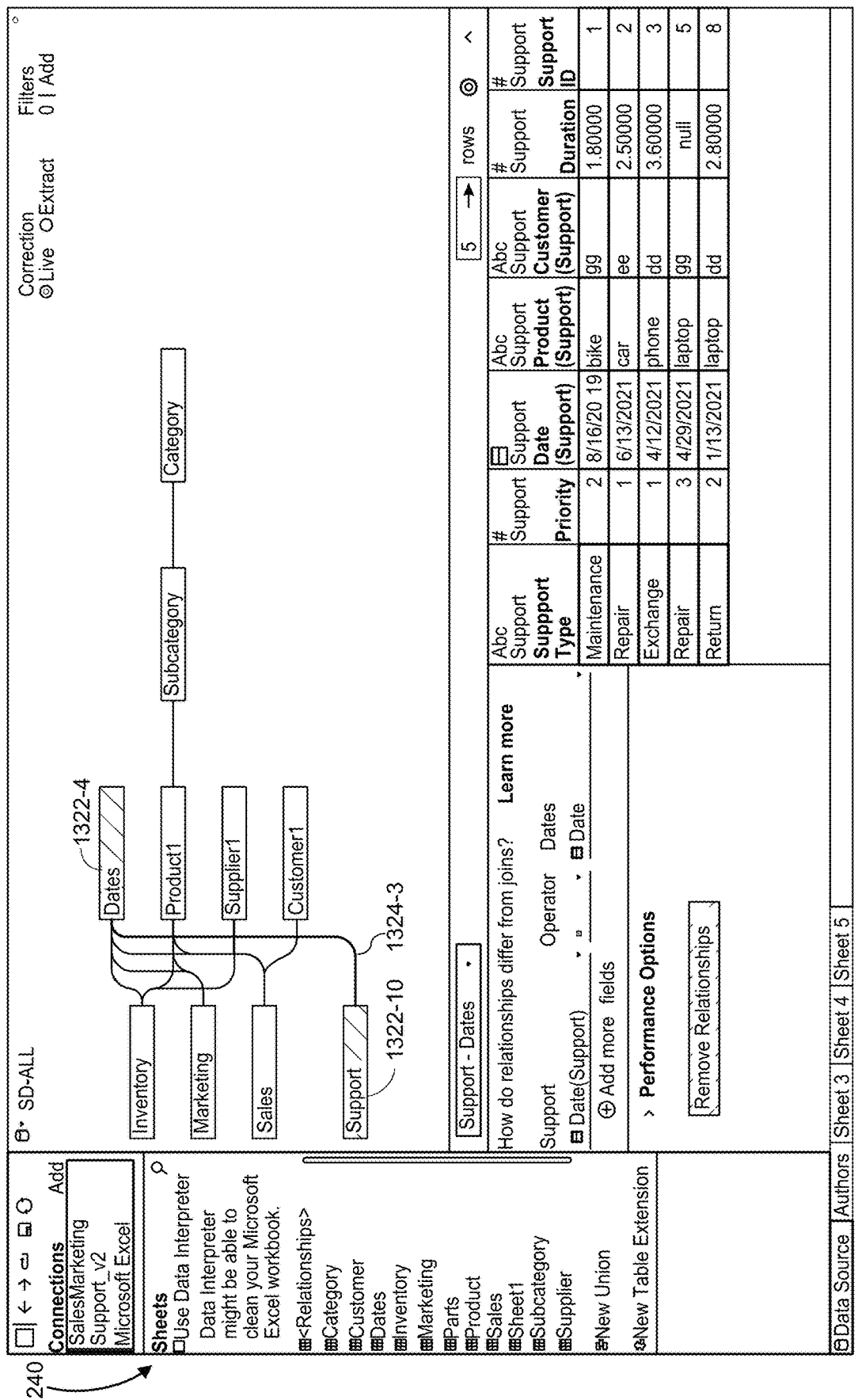

FIGS. 13A-13U provide a series of screenshots that illustrate user interactions with a data modeling graphical user interface 240 for building (e.g., constructing) multi-fact data models, in accordance with some implementations. In some implementations, the graphical user interface 240 is used for validating relationships between objects (also referred to as object classes or logical tables) in an object model.

In FIG. 13A, the user interface 240 includes a connections region 1302, a tables region 1304, an object model visualization region 1306, a data field/metadata region 1308, and a data region 1310, in accordance with some example implementations. The connections region 1302 includes one or more user-selectable data sources 1312. The tables region 1304 includes one or more icons 1314. Each of the icons 1314 represents a respective data table from one or more data sources 1312 that are selected in the connections region 1302. The object model visualization region 1306 shows an object model 1320 that includes a plurality of object icons 1322 (e.g., 1322-1 to 1322-9 in FIG. 13A). Each object icon 1322 represents a respective object (e.g., logical table or object class) in the object model 1320, and each object includes respective one or more data fields. The object model visualization region 1306 also displays visual connections 1324 (e.g., connected links or connectors) between connected object icons 1322. Each of the visual connections 1324 represents a respective relationship between the connected objects corresponding to the object icons 1322.

In the example of FIG. 13A, the object model 1320 is a multi-fact model that includes multiple fact tables "Inventory," "Marketing," and "Sales," corresponding to object icons 1332-1 to 1332-3. In some implementations, the fact tables are also referred to as root tables (or root objects). In some implementations, object icons corresponding to fact tables are located in the left-most portion of the object model visualization region 1306. In some implementations, the object icons corresponding to the fact tables are arranged in an alphabetical order in the user interface 240.

In some implementations, the data field/metadata region 1308 displays information regarding the data fields and/or metadata of a selected object that is represented in the object model visualization region 130 as an object icon 1306. For example, FIG. 13A shows that in response to user selection of object icon 1322-1, corresponding to "Inventory" object, the data field/metadata region 1308 displays a table 1326 that provides information about the fields in the Inventory logical table, such as their field names, field type, the physical table in which a respective field is located, and metadata information such as the remote field name.

In some implementations, the data region 1310 displays information regarding data fields and data values of a selected object that is represented in the object model visualization region 130 as an object icon 1306. For example, FIG. 13A also shows that in response to user selection of object icon 1322-1, the data region 1310 displays a table 1328 that includes information regarding data fields corresponding to the Inventory logical table and their respective data values.

FIG. 13B shows that, in response to a user interaction (e.g., user selection or mouse hover) with a visual connection 1324-1, the user interface 240 displays a tooltip 1330 that provides information about the logical table(s) that are connected by the visual connection 1324-1, the cardinality (e.g., many-to-many, many-to-one, one-to-many), and the related fields.

FIG. 13C illustrates a user hovering over (1332) (e.g., via a mouse) an object icon 1322-2 corresponding to the "Marketing" object. FIG. 13C shows that, in response to the user interaction, the user interface 240 displays a subset of object icons 1322-4, 1322-5, 1322-8, and 1322-9 of the object model, corresponding to objects Dates, Products, Subcategory, and Category, that are connected to the "Marketing" object. The user interface 240 also displays the visual connections 1324 of the subset of object icons. At the same time, the other object icons and connectors that are not connected to the "Marketing" object are visually de-emphasized in the user interface 240. In some implementations, in response to the user hovering over the object icon 1322-2, the user interface 240 displays a tooltip 1332 that invites the user to double click on the object icon 1322-2 to view the physical table.

FIGS. 13D to 13S illustrate the process of adding a "Support' fact table to the data model 1320, in accordance with some implementations. FIG. 13D shows that before adding the "Support" fact table to the object model, the "Customer" object (represented by object icon 1322-7) is not shared because it only connects to one root table Sales (represented by object icon 1322-3).

FIG. 13E illustrates user selection (1334) of an icon 1314-1 corresponding to the Support data table (e.g., fact table). FIG. 13F illustrates a user drag-and-drop action that drags the icon 1314-1 from the tables region 1304 to the object model visualization region 1306. FIG. 13F also illustrates that as the icon 1314-1 crosses the tables region 1304 into the object model visualization region 1306, the user interface 240 displays an affordance 1336 (e.g., an icon or a drop zone) (e.g., "+New Base Table") for adding a new table (or creating a new tree, as described in with reference to FIG. 5A, element 518).

According to some implementations of the present disclosure, when a user brings introduces a table (e.g., a logical table or an object) into the object model visualization region 1306, there are two ways of adding the table to the object model. The first way of adding the table to the object model is by relationships (e.g., "noodles"). For example, FIGS. 13G and 13H show that as the user moves the icon 1314-1 toward any of the existing object icons 1322 in the data model 1320, a freeform line 1338 with one end connected to the icon 1314-1 is automatically generated. A user can connect the other end of the freeform line 1338 to an object icon of an object to form a relationship between the "Support" logical table and that object. FIG. 13G shows that it is possible to form a relationship between the Support table (object) and the Sales object. FIG. 13H shows that it is possible to form a relationship between the Support table (object) and the Customer logical table. FIG. 13I illustrates that if the icon 1314-1 is placed underneath an existing object (e.g., "Customer"), the data visualization application provides a union option (1340) to combine the two objects (e.g., "Customer" and "Support").

The second way of adding the table to the object model is via the affordance 1336 for adding a new table. FIGS. 13J and 13K illustrate that placement of the icon 1314-1 on the affordance 1336 (FIG. 13K) adds a new object icon 1322-10, corresponding to the "Support" logical table, to the data model 1320. In FIG. 13K, the "Support" logical table exists as a standalone table in the object model because the object icon 1322-10 is not connected to other object icons in the object model 1320.

FIG. 13K shows that, in some implementations, when the data visualization application 230 detects the presence of standalone objects (that are not connected to any other objects) in an object model, the data visualization application 230 causes an alert icon 1342 to be displayed on the user interface. FIG. 13L illustrates that, in response to user selection (1344) of the alert icon 1342, the user interface 240 displays a tooltip that informs the user of presence of disconnected table in the graph (object model). The tooltip includes an alert feature 1348 that can be activated by a user.

FIG. 13M shows that in response to user activation (1350) of the alert feature 1348, the user interface 240 displays the object icon(s) 1322 corresponding to standalone objects (e.g., disconnected objects) in a disconnected tables region 1352 that is separate from the object model visualization region 1306. The disconnected tables region 1352 assists the user in the process of identifying disconnected objects and makes the data modeling process more efficient.

FIGS. 13N to 13Q illustrate the process of adding a relationship to an object in accordance with some implementations. FIG. 13N shows that when a user selects a portion (e.g., an edge, a side, or an icon) of the object icon 1322-10, a freeform line 1354 (e.g., a "noodle") is generated and displayed. One end 1356 of the line 1354 is connected to the object icon 1322-10 and the other end 1358 of the line 1354 corresponds to a position of a mouse cursor (e.g., within a predefined margin) in the user interface 240. Notice that as the user moves the other end 1358 of the line 1354 (e.g., by moving the mouse) to interact with other object icons in the object model, object(s) that can form relationships with the "Support" object (e.g., "Customer" in FIG. 13O and "Dates" in FIG. 13P) are visually emphasized whereas object(s) that cannot form relationships with the "Support" object (e.g., "Subcategory" and "Category" in FIG. 13Q) are visually de-emphasized. In some cases, the user interface 240 precents a user from forming a relationship between a root table and one or more shared objects because of limitations in tree traversal strategy, and/or if the relationship would create a nested shared tree.

FIG. 13R illustrates a user interaction to connect the other end 1358 of the freeform line 1354 to the object icon 1322-7 corresponding to the object "Customer." FIG. 13S illustrates that, in response to the user interaction, the data visualization application 230 displays a visual connection 1324-2 between the object icon 1322-7 and the object icon 1324-10. The visual connection 1324-2 represents a relationship between these two connected objects. Because the object icon 1324-10 is now connected, there are no longer any standalone objects in the object model. Accordingly, the disconnected tables region 1352 is no longer displayed in the user interface. In some instances, a user can go on to create other relationships. For example, the "Support" table may have dates and the user can drag another freeform line 1360 (e.g., by interacting with a portion of the object icon 1324-10) and link it to the "Dates" logical table (FIG. 13T) to form a connection between the "Support" object and the "Dates" object. This is illustrated by the visual connector 1324-3 between the object icon 1322-10 and the object icon 1322-7 in FIG. 13U. In some implementations, a user can remove a relationship between two objects by clicking on the visual connector corresponding to the relationship and by clicking the "Remove Relationship" icon 1362 in FIG. 13U. FIG. 13U shows an updated object model that includes the Support fact table.

III. Multi-Fact Data Model Analysis

There are several analytic challenges associated with analyzing a multi-fact data source using a complex data model that includes shared dimensions:

Relatability: cross-fact analysis may present data fields that are related, unrelated, and/or ambiguously related Unaggregated vs. aggregated calculations: calculations within a single set of fact are performed at the unaggregated level while cross-fact analyses must occur at the aggregated level.

Multi-fact dimensional cardinality warning: unrelated dimensions in different facts are crossed/cartesian joined thus introducing potential high cardinality product which requires user intervention Filter on shared logical tables is applied for all the trees involved Pill relatability icon are preserved on shelves.

Whether fields are within the same or different fact trees. If the fields in the analysis are across different facts (e.g., fact tables, fact trees), are there unambiguously relatable paths between them? How will analysts know which fields to use together?

Referring again to the example of FIG. 4A, Inventory 402 (e.g., the inventory object) and Sales 404 (e.g., the sales object) are separate fact tables that do not have row-level correspondence (Primary keys-foreign keys) with each other. However, they both share the DimDate 406 and DimSites 408 objects (e.g., logical tables). There is a need to update current semantics in object modeling so that Inventory 402 and Sales 404 can be separately aggregated to DimDate & DimSites.

To address the above challenges, the present disclosure introduces new semantics for unrelated fields. Some implementations of the present disclosure also provide an improved user interface that provides more direct feedback to help analysts understand the underlying semantics, take appropriate action to keep their analysis along shared dimensions, or resolve ambiguities. The improved user interface abstracts away from the complex data model and presents a simple yet clear analytic experience for data analysts. Should the analysts "wander off track" during the analysis, they are notified of the off-track analysis and can take action to get back on-track.

III.A. Feature Goals

One aspect of the present disclosure improves existing analytic experience by presenting to a user reachable data fields. For example, the disclosed user interface shows fields when using single tree versus multi-tree semantic.

Another aspect of the present disclosure introduces additional user interface features to resolve ambiguities. For example, multiple unrelated dimensions are cross-joined, leading to high cardinality. Ambiguously relatable paths are resolved.

Another aspect of the present disclosure enhances existing pill UX (e.g., in a shelf region of the user interface) to help users understand the underlying semantics when fields are unrelated or ambiguously related, and/or actions a user can take to be on track.

III.B. Relatability Metadata for Multi-fact Data Model

III.B.1. Problem Statement

The current Tableau data model contains a single tree graph of logical tables. Columns within logical tables appear as dimension and measure fields parented to their logical table in the schema viewer. Calculated and aggregate fields that span multiple tables appear outside of the table hierarchy. This logical grouping provides the necessary context for analysts to decide what to use in their analysis. Between any dimension and measure field, there is always an aggregation path.

However, in a multi-fact data model, the aggregation path between dimensions and measures can be none (unrelated), one (related), or many (ambiguously related). In addition, analysts do not have the additional context of what fields belong to what trees and which fields should be used together. Teams that rely on the Tableau multi-fact data model also may not have this additional context for their features to function correctly.

III.B.2. Proposed Solution

There are two sets of contextual information that aren't available in the schema viewer today: (1) what is the static metadata of what fields belong to which trees, and (2) given a set of fields that are used in the flow of analysis, what is the dynamic metadata of what other fields could be used together.

Figure 14A:
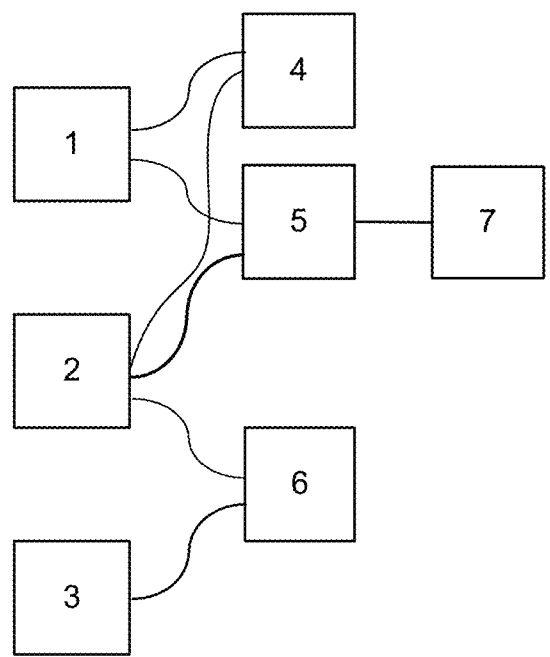
FIGS. 14A and 14B illustrate a data model with seven logical tables, in accordance with some implementations.

These two sets of metadata are important in the following ways:
1. Schema viewer to gray out fields that are unrelated or ambiguously related to what trees are in use (e.g., on shelves) and to provide explanatory information why they can/cannot be used together
2. Explain Data to determine what dimensions to evaluate measures against, don't explain data that do not have underlying data relationship, for unrelated and ambiguously related fields
3. Ask Data to bootstrap the creation of Lenses for single fact and multiple facts
4. Data Catalog to identify lineage relationships of logical tables
5. Narrative Science can leverage relatability to generate stories III.B.3. Model Example FIG. 14A illustrates a multi-fact data model with 7 logical tables (Tables 1, 2, 3, 4, 5, 6, and 7). In this data model, there are three fact trees that share logical tables (4, 5, 7, 6) and three shared trees of logical tables (4), (5, 7), and (6).

Figure 14B:
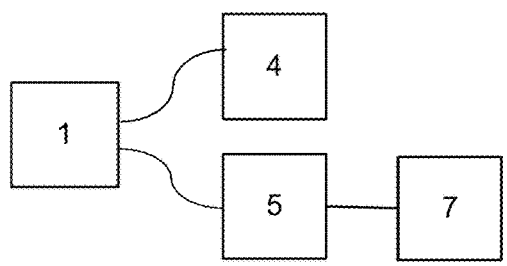
Figure 14B:
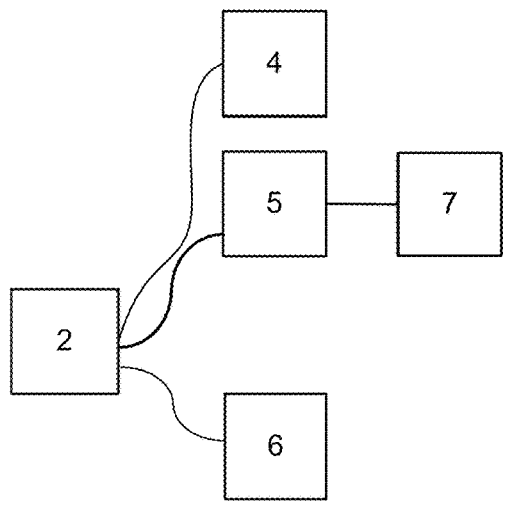
Figure 14B:
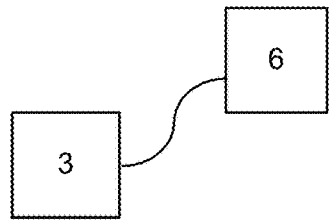

FIG. 14B shows that the multi-fact data model is make up of separate trees, Tree 1, Tree 2, and Tree 3.

There are three shared trees of logical tables:
Shared tree A that belongs to fact trees 1 and 2: Table 4.
Shared tree B that also belongs to fact trees 1 and 2: Tables 5 and 7.
Shared tree C that belongs to fact trees 2 and 3: Table 6

III.B.4. Ideal Use Cases

Single tree: although the data model contains multiple facts (1 to 3), analysts may focus their analysis on one fact at a time. If analysts are using fields that have only one fact in common, the underlying query semantics will use only this fact and this would maintain backward compatibility with the current version of the object modeling tool. Examples:
a. Simple tree 1 using the base table: dimensions from table 1, measures from tables 4, 5, and/or 7.
b. Simple tree 2 not using the base table: dimensions from table 6, measures from tables 4, 5, and/or 7

Multiple trees: In the model example of FIG. 14A, using dimensions from tables 4, 5, and/or 7 would make measures from tables 1 and 2 relatable, but not table 3 measures. Alternatively, dimensions from table 6 would make measures from tables 2 and 3 relatable but not table 1 measures. If analysts are using dimensions from tables 4 and 6, they should use measures in table 2.

As illustrated in two use cases above, there are two aspects to tree membership: static and dynamic aspects. The static aspect is the tree membership of fields (as they appear on the schema viewer) using the underlying data model, and the dynamic aspect is what trees are being used (i.e., what fields are being used on shelves and the current marks card). Using the model example above, below are additional examples:

Single tree using shared tree B: dimensions from logical table 5 and measures from logical table 7. Although fields in logical tables 5 and 7 belong to trees 1 and 2, they also belong to the same shared tree B, then this becomes a single tree evaluation. The dynamic or tree-in-use aspect for determining relatable measures: relatable measures in tables 1 and 2 because shared dim in table 5, but measures in table 3 would be unrelatable.

Single tree or multi-tree using two shared trees A & B: dimensions from logical table 4 (of shared tree A) and measures from logical tables 5 and 7 (of shared tree B). There are two possible paths between shared trees A & B, through either fact tree 1 or 2. Analysts can choose to have some measures in shared tree B to table 4 dimensions through fact tree 1, and some through fact tree 2. The dynamic aspect of what trees are in use depends on the decision of analysts.

III.B.5. Schema Viewer Gray Out Field

Data stewards and analysts need sufficient information to help decide what fields to use together but they also do not want to traverse the hierarchy from tree to table to field, especially when many logical tables can belong to two or more trees. The present disclosure addresses this need by implementing an improved user interface with a field list for the schema viewer that changes field appearance depending on its static tree membership and the dynamic aspect of what trees are in use on shelves and the marks card.

For analysts to determine what fields to bring out next for their analysis, the disclosed schema viewer user interface (illustrated in the examples of FIGS. 16, 17, and 18) provides info-scenting of fields that are relatable based on the underlying data model and what fields are already in use. The first of these user interface hints is to gray out (e.g., visually de-emphasize) fields that are unrelated and/or ambiguously related to fields on shelves.

III.B.6. Related and Relatable Fields

Related fields are fields that belong to logical tables within the same tree. If all fields being used on shelves and marks card belong to only one tree (see, e.g., illustrations for Tree 1, 2, or 3 in FIG. 14B), then all fields that belong to this tree in-use are relatable.

Fields that belong to two separate trees (e.g., measures in Tables 1 and 2 in FIG. 14A) can become relatable when a shared dimension from Tables 4, 5 or 7 in FIG. 14A are used.

III.B.7. Unrelated and Unrelatable Fields

Unrelated fields are fields that belong to logical tables that are in separate trees. The simplest case is when fields belong to separate base tables (e.g., root tables), i.e., fields in different base tables of trees are always unrelated to each other.

However, in a measures-only visualization, unrelated fields are relatable if there is no dimension in use, because measure values are aggregated to within their respective tables and Tableau allows measure marks to be juxtaposed next to each other.

Referring to FIGS. 14A and 14B, unrelated measures from tables 1 and 2 can become relatable when a shared dimension is used (from Tables 4, 5, or 7). Unrelated measures from tables 1 and 3 can become relatable when dimensions from these separate trees are used. But the measures are only aggregated to their dimensions in their respective tree.

Unrelated measures would remain unrelatable when there is a dimension in-use but it doesn't share any tree with measures. In FIGS. 14A and 14B, if a table 3 dimension is in use with table 1 and table 2 measures, then these measures are not relatable because there isn't a dimension that is shared between these two trees.

III.B.8. Ambiguously Related Fields

Fields are ambiguously related when they belong to the same two or more shared trees because there can be multiple paths connecting them. With reference to the example of FIGS. 14A and 14B, shared trees A and B belong to both trees 1 and 2. If a dimension field from Table 4 is used, a measure field from Table 5 or 7 can aggregate to the dimension field via Table 1 (tree 1), Table 2 (tree 2), or by default, aggregate locally within its table (no tree).

Analysts can disambiguate by creating a level of detail (LOD) calculation that includes a field in either Table 1 or 2. In some implementations, the data analytics user interface 250 includes a UI component to generate these LOD to simplify the disambiguation of the aggregation path.

III.B.9. Algorithm for Field Relatability

In accordance with some implementations of the present disclosure, the computing device 200 or the server 300 is configured to execute an algorithm for field relatability. The algorithm includes:

Step 1: Are there dimensions on shelves? If no, then no need to gray out field; measures are aggregated within their respective table Step 2: Do dimensions have in common one tree? If yes, then use single tree evaluation (from object model v1): show inner join dimensions, and identify all trees that these dimensions belong to.
  a. Related: dimensions of the one tree, measures (can belong to multiple trees, but they have one tree is actively in use), and aggregate calcs that belongs to this tree in use
  b. Unrelated: Gray out dimensions and measures of trees not in use
  c. Ambiguously related: Gray out measures (and row-level calcs) that belong to related trees but not the single tree being evaluated
  d. Partially related:

Step 3: Group dimensions with one or more trees in common, then use single tree evaluation described in step 2 for each tree in use. In addition to relatability logic in step 2:
  a. Related: same as step 2
  b. Unrelated: same as step 2
  c. Ambiguously related: Gray out measures (and row-level calcs) that belong to related trees that overlap with trees of dimensions in use Step 4: For groups of dimensions that have one or more trees in common, outer join their tree-based tuples together. Use the same relatability logic described in step 3 above.

Step 5: For groups of dimensions that have no tree in common, cross their dimension tuples. Use the same relatability logic described in step 3 above.

III.B.10. Examples for Each Test Above

Figure 15A:
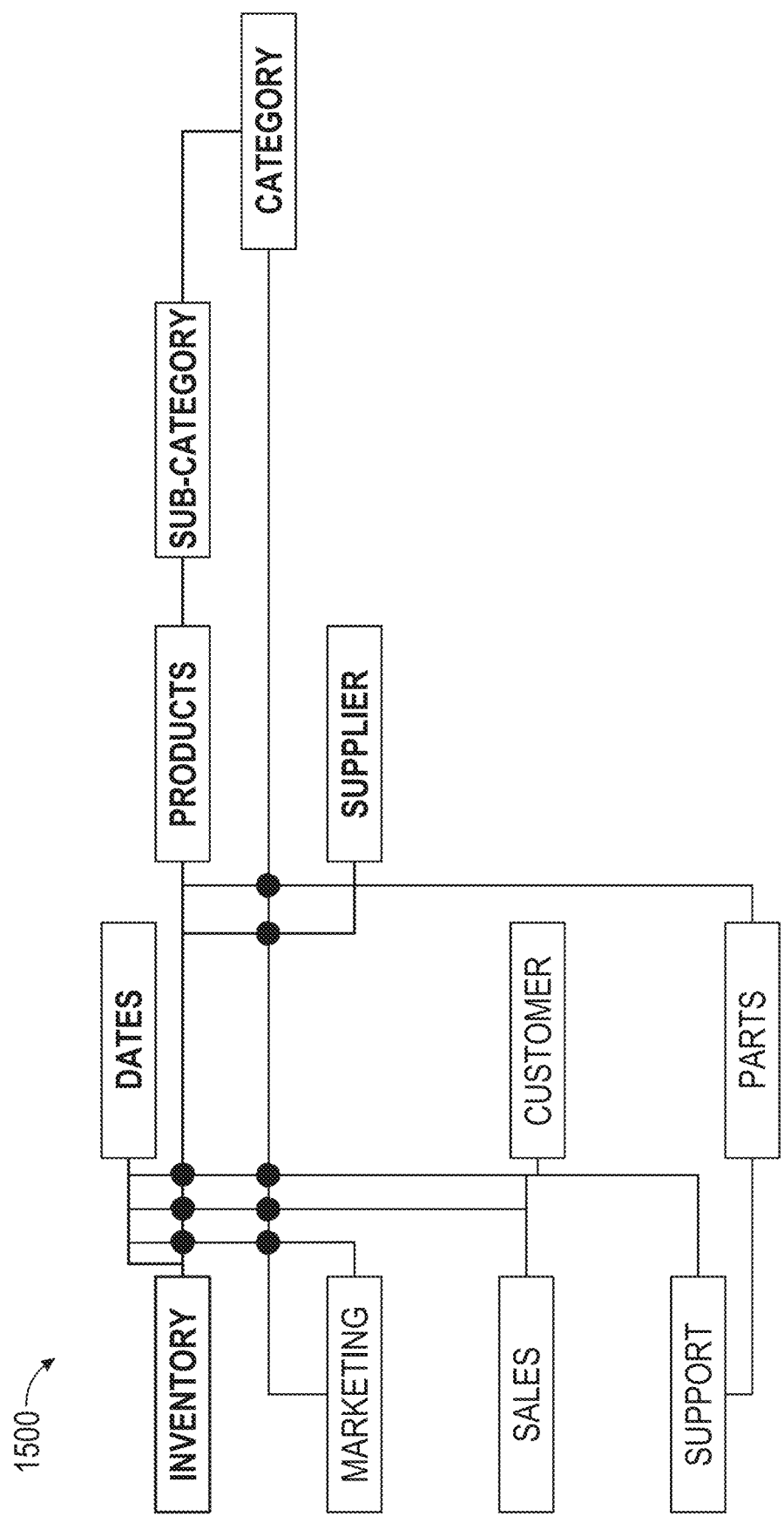
FIGS. 15A-15C illustrate a data model, in accordance with some implementations.
Figure 15B:
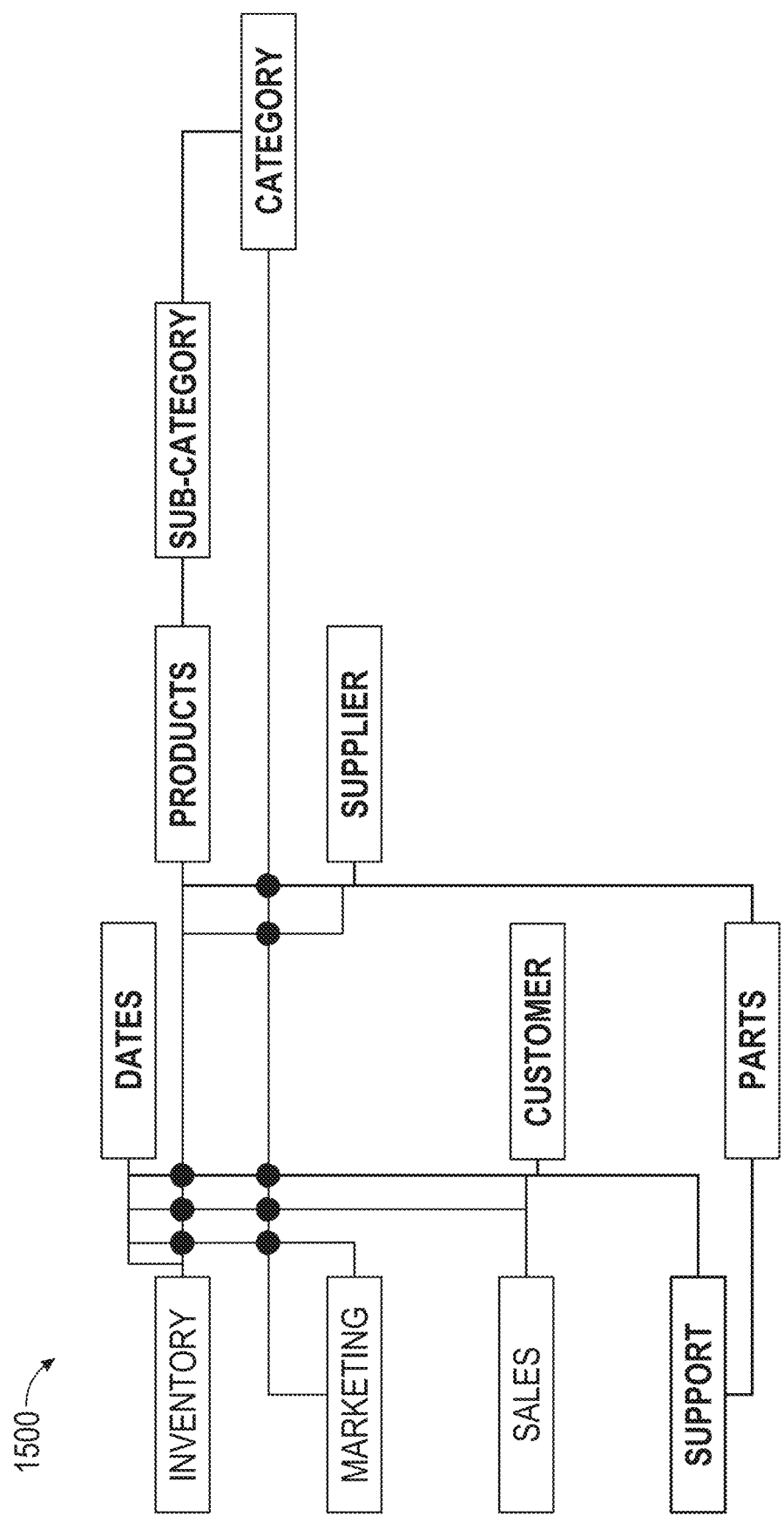
Figure 15C:
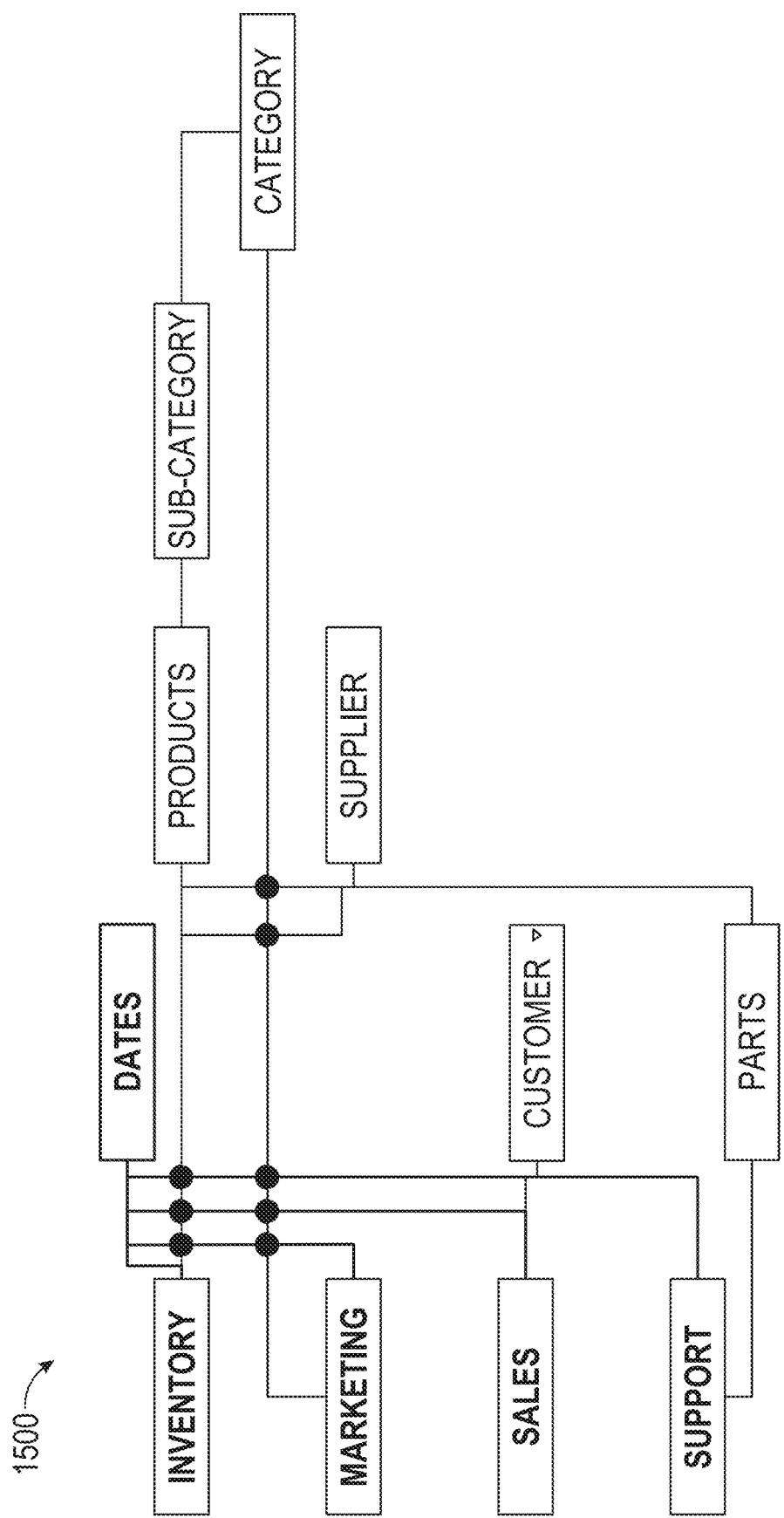

FIGS. 15A, 15B, and 15C illustrate an object model 1500 in accordance with some implementations. FIG. 15A shows the inventory tree of the object model 1000. FIG. 15B shows the support tree of the object model 1500. FIG. 15C shows the dates object.

Below are examples of what fields are used and what should be grayed in the object model 1500:

1. Measures only: COUNT (Inventory), SUM (Sales), COUNT (Supplier)
2. Single tree evaluation (Inventory) with one related tree (Support): Product Name (Products table), Supplier Name (Supplier table), Inventory Type (Inventory table)
   a. Related trees in use: Inventory tree, Support tree (measures from objects shared with Inventory only)
   b. Unrelated trees not in use: Marketing, Sales, Customer
   c. Ambiguously related fields: (none)
3. Single tree evaluation (Inventory) but with all related trees: Inventory Type (Inventory table), Week (Dates table)
   a. Related trees in use: Inventory
   b. Unrelated trees not in use: Marketing, Sales, Support
   c. Ambiguously related fields: measures in Customer table
4. Multiple trees evaluation (Inventory, Support) using shared dims: COUNT (Inventory), SUM (Support Hours), Supplier Name (Supplier), Product Name (Products)
   a. Related trees in use: Inventory, Support
   b. Unrelated trees not in use: Marketing, Sales
   c. Ambiguously related fields: measures in Dates, Products, Sub-category, Category, Supplier
5. Multiple trees evaluation (Inventory, Support) using unshared dims: COUNT (Inventory), SUM (Support Hours), Inventory Type (Inventory), Support Type (Support)
   a. Related trees in use: Inventory, Support; cross join Inventory Type & Support Type
   b. Unrelated trees not in use: Marketing, Sales
   c. Ambiguously related fields: measures in Dates, Customer, Supplier, Products/Subcat/Category
6. Multiple trees evaluation (Inventory, Support) using shared and unshared dims: COUNT (Inventory), SUM (Support Hours), Supplier Name (Supplier), Product Name (Products), Inventory Type (Inventory), Support Type (Support)
   a. Related trees in use: Inventory, Support; inner join Inventory Type+Supplier+Product Name, inner join Support Type+Supplier Name+Product Name, then outer join these two tree-based result
   b. Unrelated trees not in use: Marketing, Sales
   c. Ambiguously related fields: measures in Dates, Products, Sub-category, Category, Supplier, Customer 7. Multiple trees evaluation (Inventory, Marketing, Support) using shared and unshared dims: COUNT (Inventory), SUM (Support Hours), Supplier Name (Supplier), Product Name (Products), Inventory Type (Inventory), Support Type (Support), Marketing Type (Marketing)
   a. Related trees in use: Inventory, Marketing, Support; same inner joins, same outer join, then cross join with Marketing Type
   b. Unrelated trees not in use: Sales
   c. Ambiguously related fields: measures in Dates, Products, Sub-category, Category, Supplier, Customer
8. Multiple tree evaluation (Inventory, Marketing, Support) using unshared III.C. Exemplary User Interface for Analytics based on Multi-Fact Data Model FIGS. 16A-16H provide a series of screenshots that illustrate user interactions with a data analytics user interface 250, in accordance with some implementations.

Figure 16A:
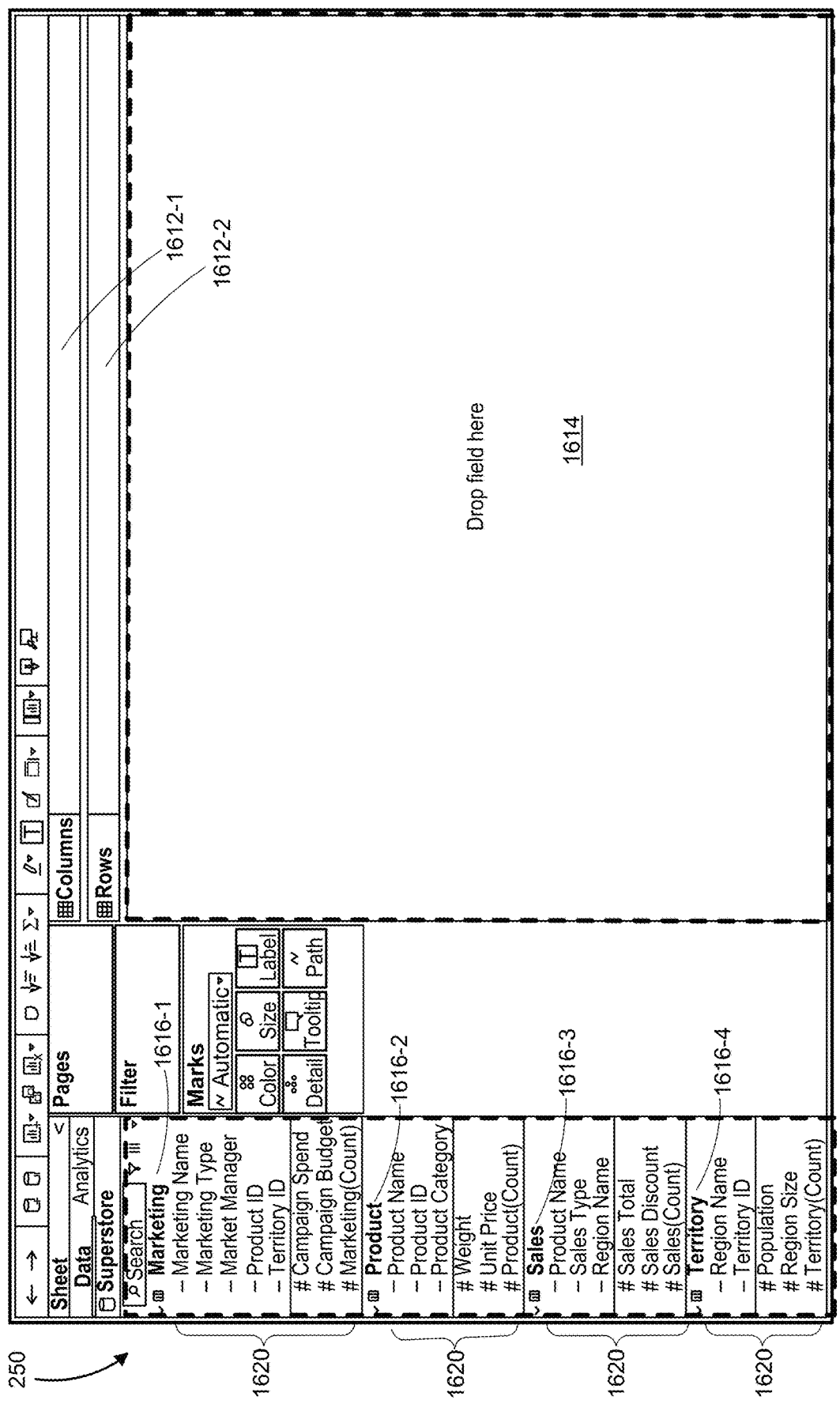
FIGS. 16A-16H provide a series of screenshots that illustrate user interactions with a data analytics user interface, in accordance with some implementations.

FIG. 16A shows a data analytics graphical user interface 250 (e.g., data visualization user interface) in accordance with some implementations. The user interface 250 includes a schema region 1610 (also sometimes referred to as a "schema viewer"), a plurality of shelf regions 1612 (in this example, two shelf regions 1612-1 and 1612-2 are shown), and a data visualization region 1614. In some implementations, the schema region 1610 shows data field icons 1620 (or object field icon) corresponding to data fields (or object fields) of an object model. Each shelf region 1612 is configured to define a respective characteristic of a displayed data visualization according to placement of data fields icons from the schema region 1610 into the respective shelf region 1612. The data visualization region 1614 is configured to display data visualizations. In the example of FIG. 16, the object model is a multi-fact object model that includes fact tables "Marketing," "Product," "Sales," and "Territory."

As shown in FIG. 16A, each data field icon 1620 in the schema region 1610 is associated with a respective object 1616 (e.g., objects 1616-1 to 1616-4) of the object model. For example, the data field icons "Marketing name," "Marketing type," "Marketing manager," "Product ID," "Territory ID," "Campaign Spend," "Campaign Budget," and "Marketing (Count)" are all included in the Marketing object 1616-1.

Figure 16B:
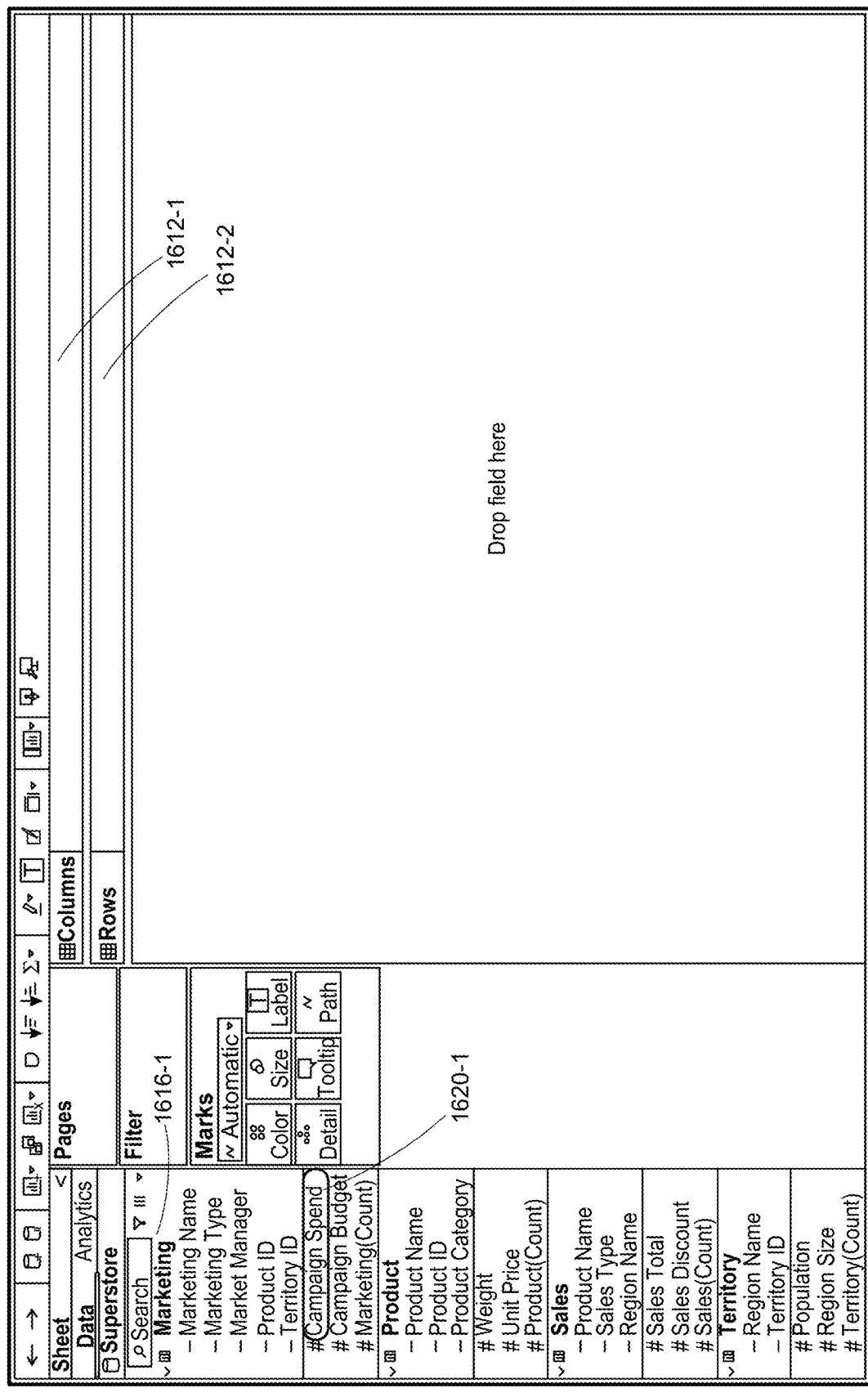

FIG. 16B illustrates user selection of a data field icon 1620-1, corresponding to the data field "Campaign Spend," from the schema region 1610, and placement of the data field icon 1620-1 into the column shelf 1612-1. In some implementations, the user selection and placement comprise a drag-and-drop action.

Figure 16C:
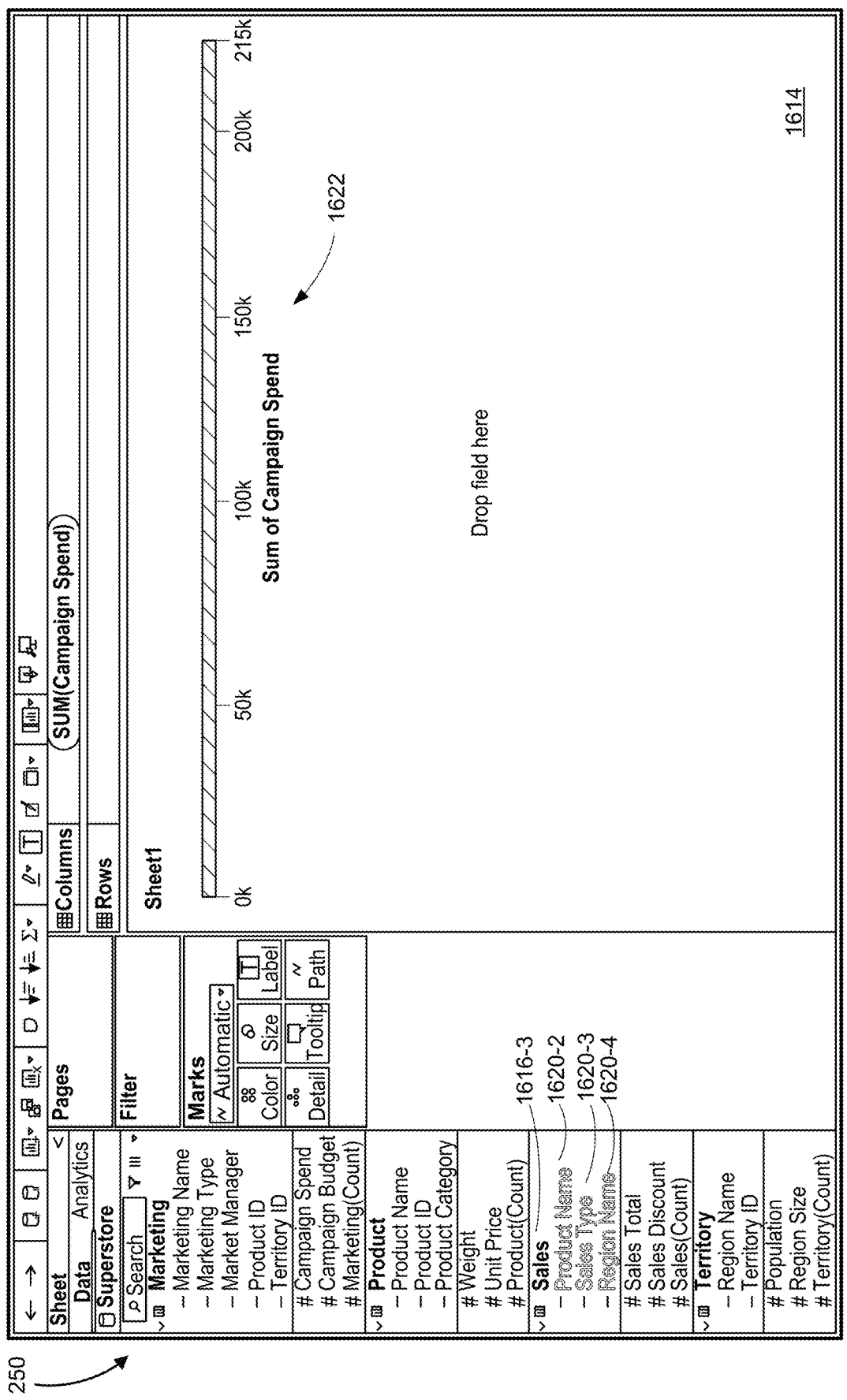

FIG. 16C shows that in response to user placement of the data field icon 1620-1 into the column shelf 1612-1, the user interface 250 displays a data visualization 1622 (e.g., a bar chart) in the data visualization region 1614. In this example, the data visualization 1622 is generated (e.g., automatically and without user intervention) by aggregating (e.g., summing) all data values (e.g., campaign expenditures) of the data field "Campaign Spend."

FIG. 16C shows that in some implementations, concurrently with displaying the data visualization 1622, the computing device updates a visual characteristic (e.g., visual appearance) of one or more data field icons in the schema region 1610. In the example of FIG. 16C, the data field icons 1620-2, 1620-3, and 1620-4 are visually de-emphasized (e.g., grayed out) relative to other data field icons 1620 in the schema region 1610. The data field icon 1620-2 corresponds to the data field "Product name" (e.g., a dimension field) in the Sales object 1616-3. The data field icon 1620-3 corresponds to the data field "Sales Type" (e.g., a dimension field) in the Sales object 1616-3. The data field icon 1620-4 corresponds to the data field "Region name" (e.g., a dimension field) in the Sales object 1616-3.

In this example, the data field icons 1620-2, 1620-3, and 1620-4, corresponding to the "Product Name," "Sales type," and "Region name" dimension fields in the Sales object are grayed out when the user places the data field icon 1620-1 "Campaign Spend" on the shelf regions 1612. This is because the dimension field "Sales Type" is a separate fact from "Campaign Spend," meaning that it is not possible to break down campaign spend (i.e., the amount of money spent in a marketing campaign) by sales type (e.g., because no sale is made during a marketing campaign). The grayed out fields—or info-scenting fields—are hints that the data visualization application leaves for the user to try to steer the user toward a certain direction for their analysis.

In some cases, when analyzing a complex multi-fact data model, analysts cannot easily identify the relevant fields to be used. Once they start their analysis, they can lose sight of what is relevant and what is not. FIG. 16C presents a simple yet informative way of guiding an analyst in fully utilizing the multi-fact data model, by visually de-emphasizing fields that are not relevant to the current analysis. Here, because the shelf region 1612 contains only measure fields (e.g., Campaign Spend), dimension fields in unrelated facts are grayed out.

Figure 16D:
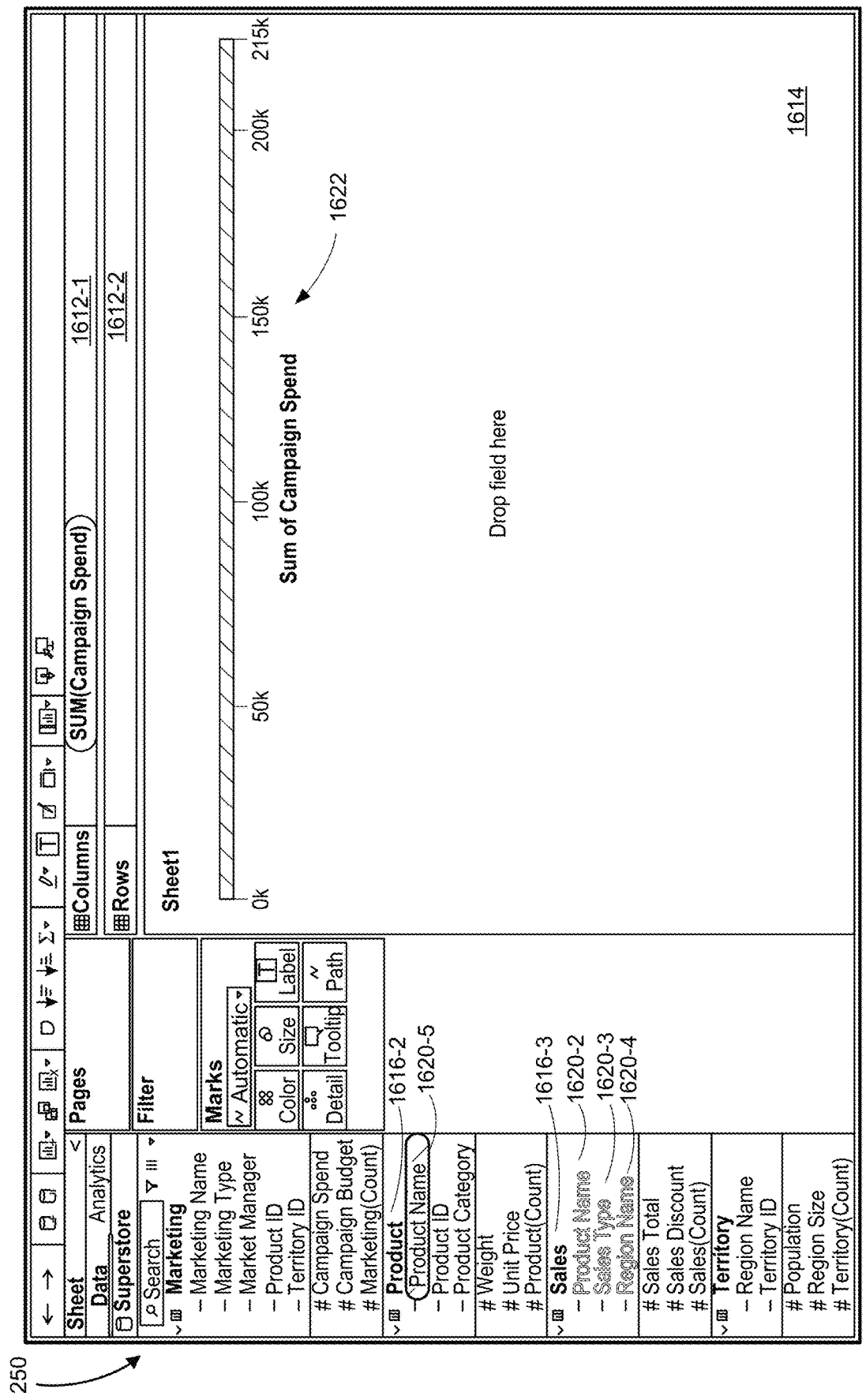
Figure 16E:
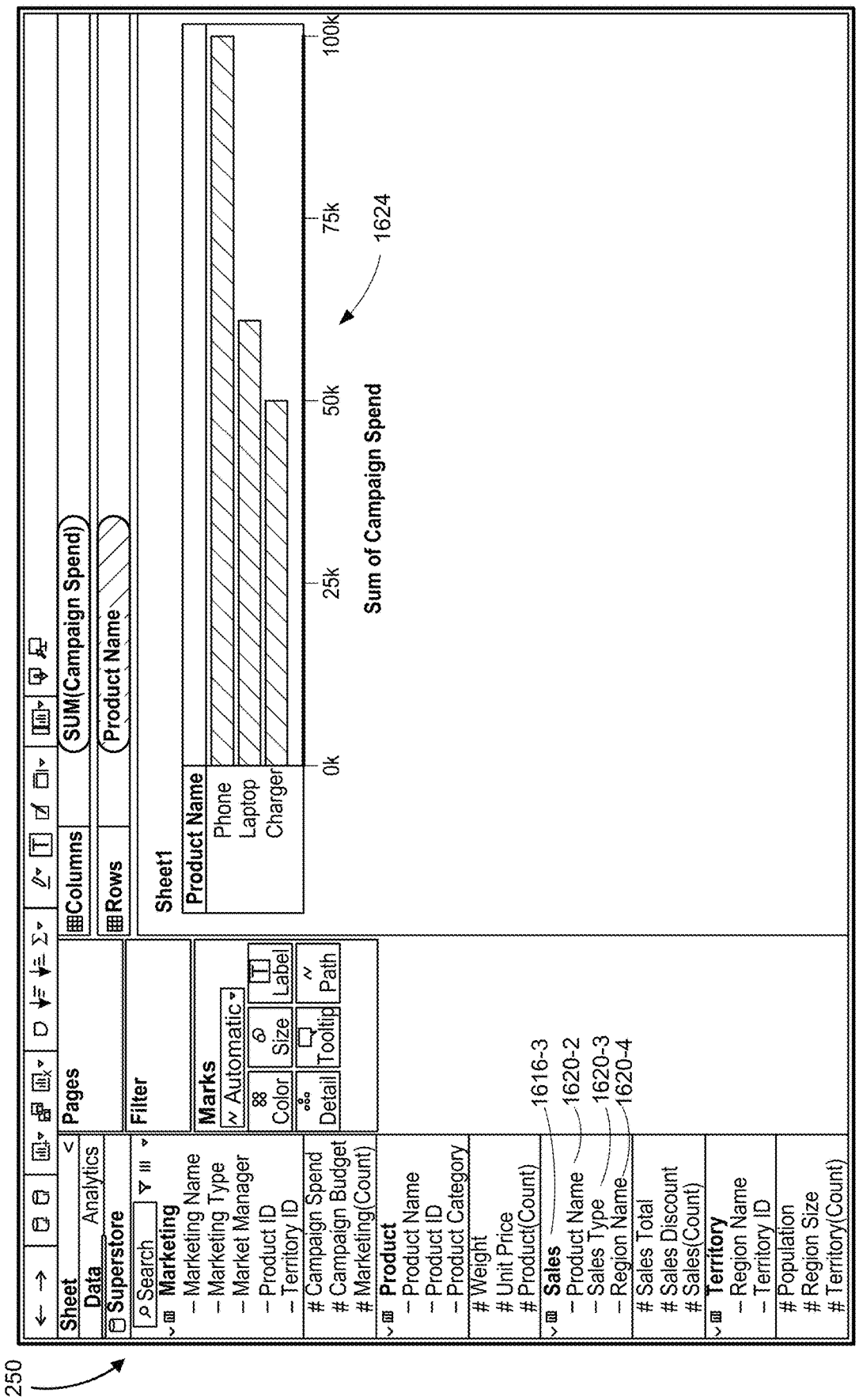

FIG. 16D illustrates user selection of the data field icon 1620-5, corresponding to the object field "Product name" in the Product object 1616-2, and placement of the object field icon 1620-5 into the shelf region 1612. FIG. 16E shows that in response to user placement of the object field icon 1620-5 into the shelf region 1612, the user interface 250 displays an updated data visualization 1624 that comprises a bar chart where the sum of marketing spend is broken down by the products "phone," "laptop," and "charger." FIG. 16E also shows that concurrently with displaying the data visualization 1624, the visual characteristic of the data field icons 1620-2, 1620-3, and 1620-4 are updated from the grayed-out appearance in FIG. 16C to having a regular typeface like the rest of the data field icons in the schema region 1610. The Sales dimensions are no longer grayed out because one can break down sales by product type.

Figure 16F:
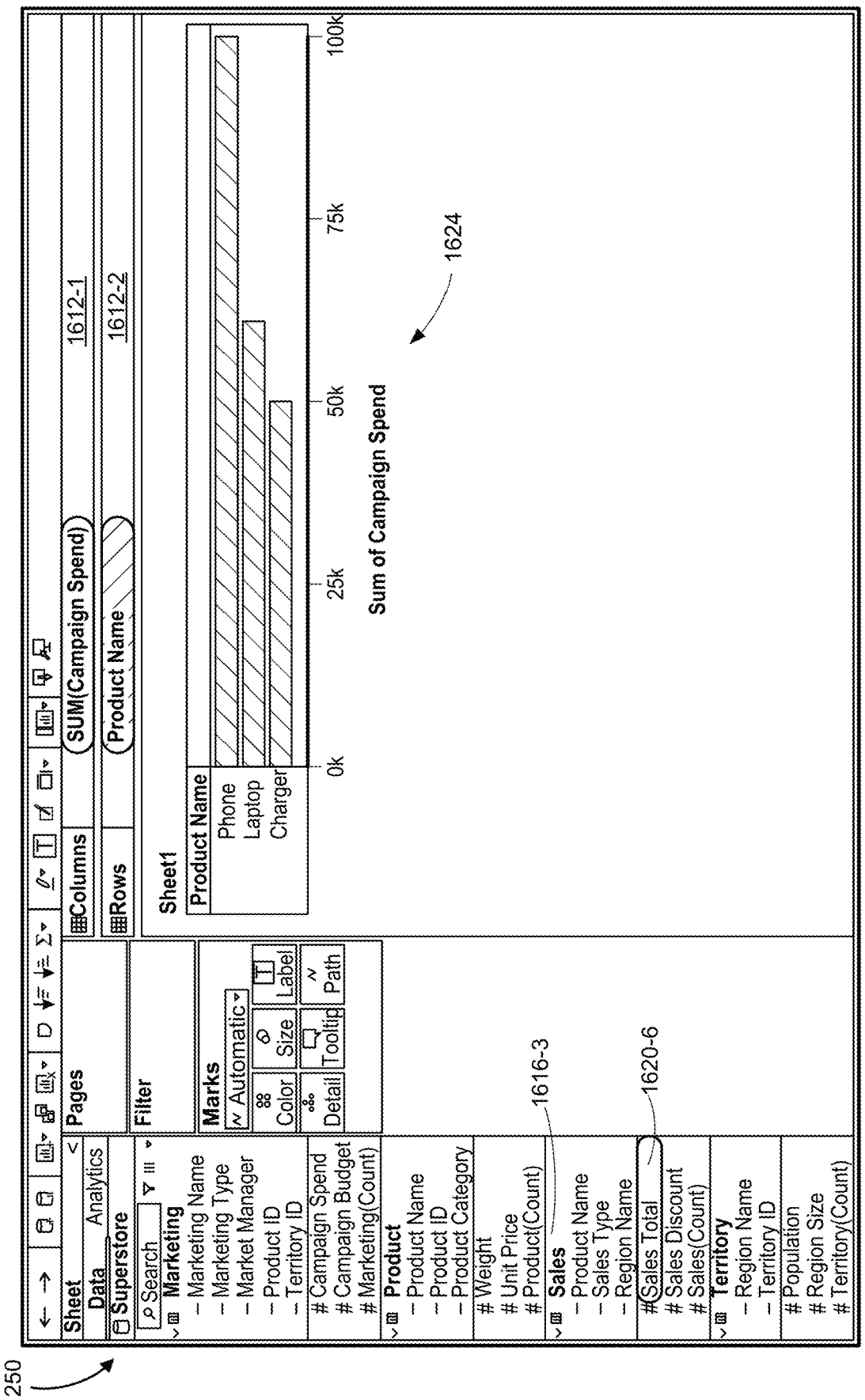

FIG. 16F illustrates user selection of a data field icon 1620-6, corresponding to the measure field "Sales Total" from the Sales object 1616-3, and placement of the data field icon 1620-5 into the shelf region 1612.

Figure 16G:
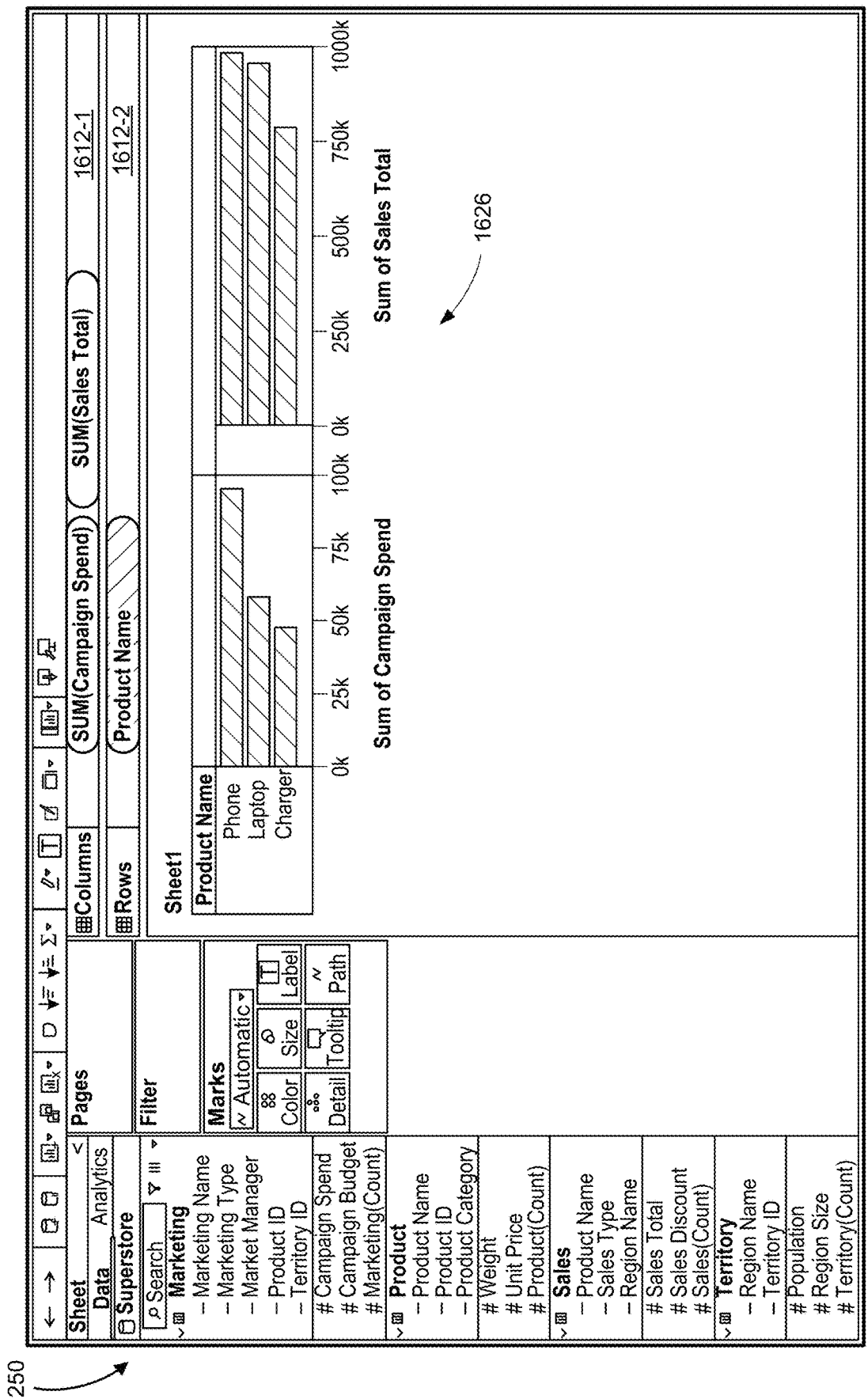

FIG. 16G shows that in response to user placement of the object field icon 1620-6 into the shelf region 1612, the user interface 250 displays an updated data visualization 1626. In this example, the data visualization comprises two bar graphs showing sum of campaign spend by product name and sum of sales total by product name. These two bar graphs share a common vertical axis Product name.

Figure 16H:
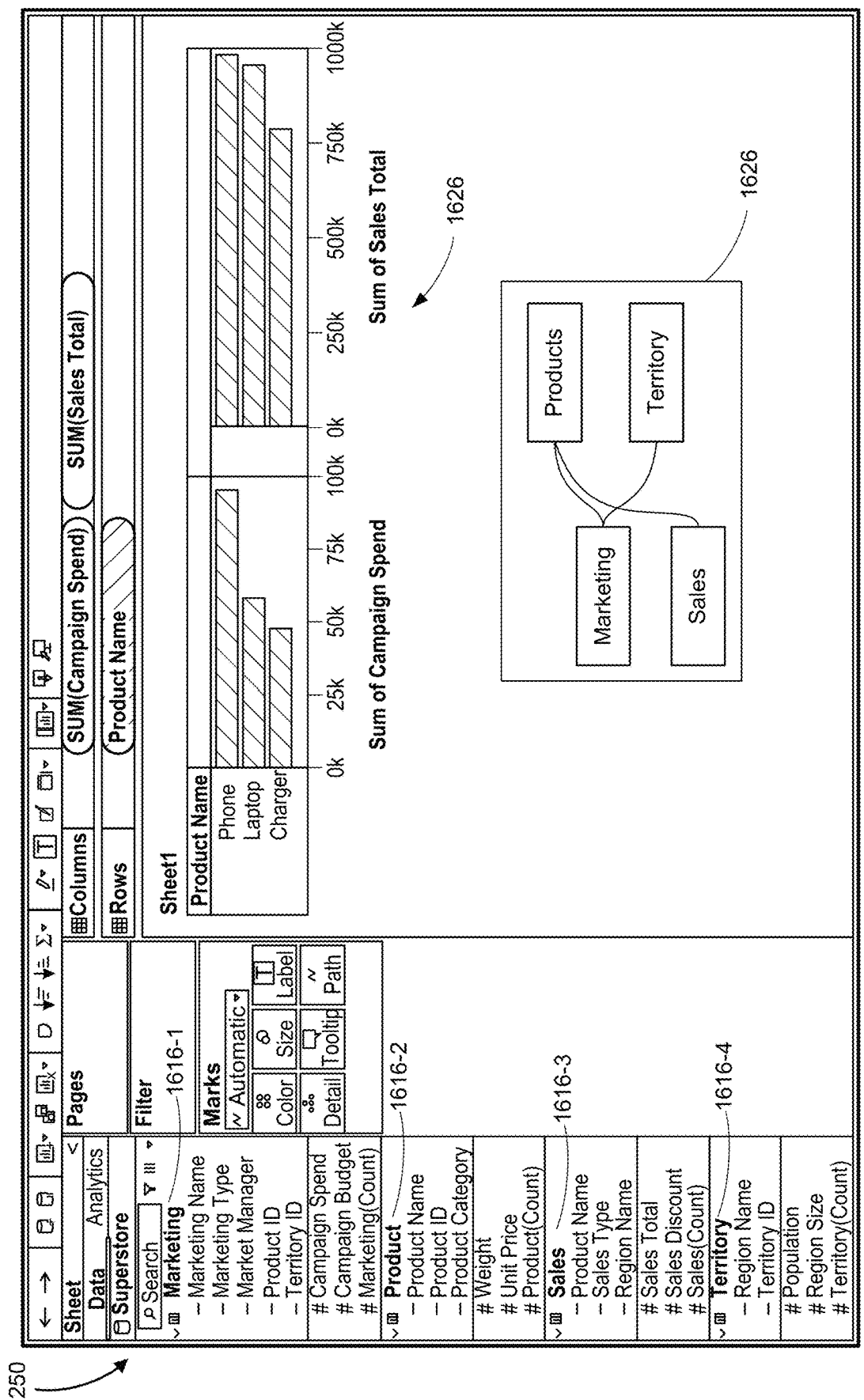

FIG. 16H illustrates a data model 1626 corresponding to the examples of FIGS. 16A to 16G. The data model 1626 includes a Marketing root table (e.g., fact table) (i.e., Marketing object 1616-1) and a Sales root table (e.g., fact table) (i.e., Sales object 1616-3). which are related by the Products logical table (i.e., Product object 1616-2) and the Territories logical table (i.e., Territory object 1616-4).

In the example of FIG. 16, Marketing can be broken down by products (i.e., Product object 1616-2) and territory (i.e., Territory object 1616-4). Sales can also be broken down by products and territories, but marketing and sales are not related to each other. Therefore, when an analyst specifies fields from Marketing, the data visualization displays fields from sales in a grayed-out manner because Marketing and Sales are separate fact tables. However, as soon as an analyst specifies fields that are common between marketing and sales, then it becomes possible to connect these two root tables by the common fields.

FIGS. 17A-17E provide a series of screenshots that illustrate user interactions with a data analytics user interface, in accordance with some implementations.

Figure 17A:
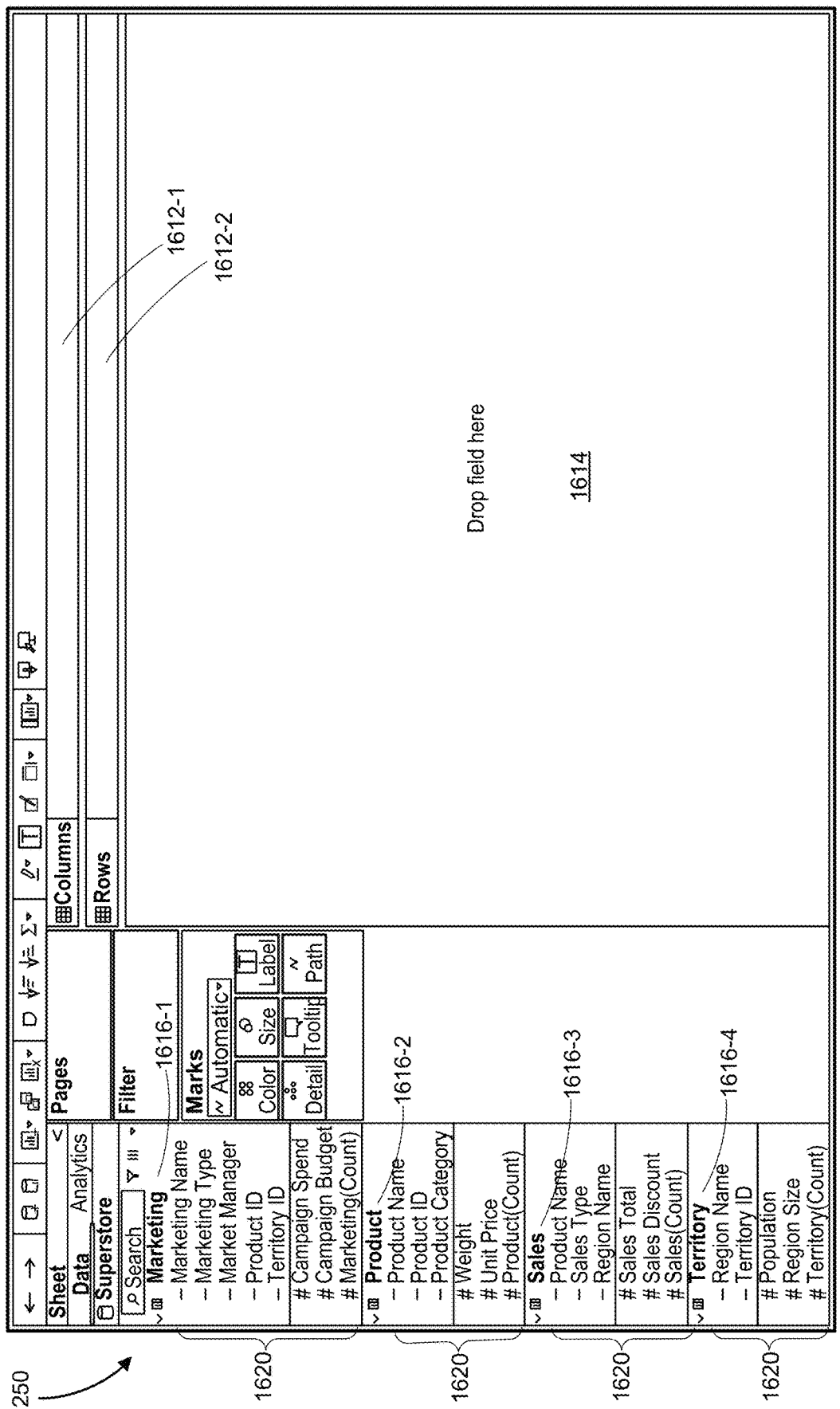
FIGS. 17A-17E provide a series of screenshots that illustrate user interactions with a data analytics user interface, in accordance with some implementations.

FIG. 17A shows a view of the user interface 250. Details of the user interface 250, including the schema region 1610, the shelf region 1612, the data visualization region 1614, the objects 1616 and the data field icons 1620 are described in FIG. 16A and are not repeated for the sake of brevity.

Figure 17B:
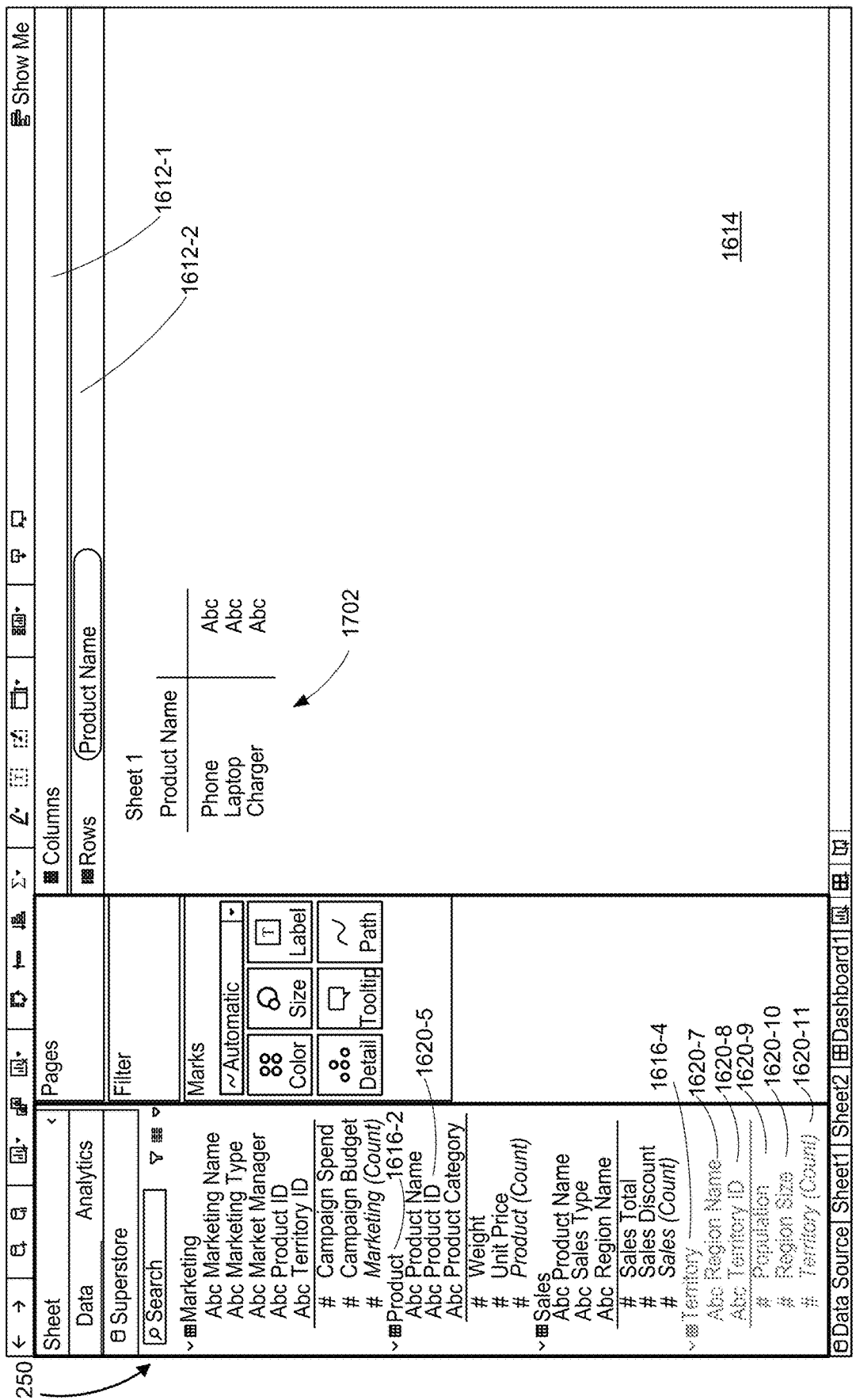

FIG. 17B illustrates user selection of the data field icon 1620-5, corresponding to the field "Product name" (e.g., a dimension field) from the Product object 1612-5, and placement of the data field icon 1620-5 into the shelf region 1612. In response to user placement of the data field icon 1620-5 into the shelf region, the data visualization displays a data visualization 1702 in the data visualization region 1614. In this example, the data visualization is a text table with rows corresponding to data values (e.g., names of products, such as "Phone," "Laptop," and "Charger") of the object field "Product name."

Figure 17C:
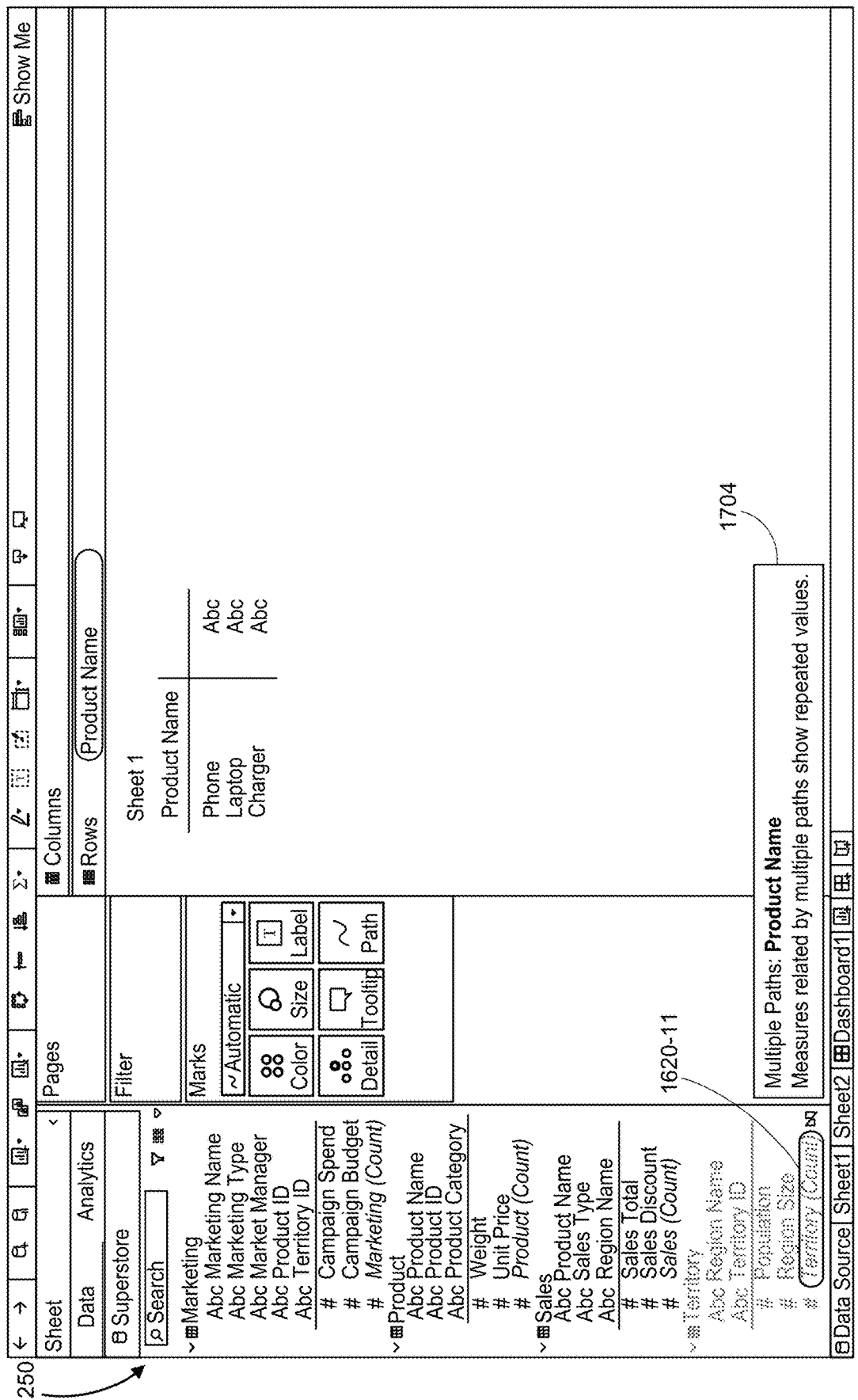

FIG. 17B also shows that concurrently with displaying the data visualization 1702, the computing device updates a visual characteristic (e.g., visual appearance) of data field icons 1620-7 to 1620-11, corresponding to the Territory object 1616-4, in the schema region 1610. In the example of FIG. 17C, the data field icons 1620-7 to 1620-11 are visually de-emphasized (e.g., grayed out) relative to other data field icons 1620 in the schema region 1610. In this example, because the only field in the shelf region 1612 is "Product name," which is a dimension field, dimensions and measures in unrelated facts are grayed out. In FIG. 17B, the grayed out dimension fields are "Region name" and "Territory ID." The grayed out measure fields are "Population," "Region size," and "Territory (Count)."

FIG. 17C illustrates that, in response to a user interaction (e.g., user selection or mouse hover) with the data field icon 1620-11 (e.g., "Territory (Count)"), the user interface 250 displays a tooltip 1704 that includes information (e.g., guidance) indicating that the field "Product name" is not related to the field "Territory (Count)." The tooltip 1704 also includes a comment that "Measures related by multiple paths show repeated value," meaning that if a user places the field "Territory (Count)" in the shelf region 1612, all possible combinations between data values of the field "Product name" and data values of the field "Territory (Count)" will be shown.

It is intended that the analyst gets sufficient information from the tooltip to decide whether to proceed. As the analyst continues to explore the data model, the relatability of fields changes with the user input.

Unlike other business intelligence (BI) tools, which do not provide visibility about the underlying mechanism, the disclosed data visualization application explains to the analyst the reason why certain fields are grayed out. Thus, some implementations of the present disclosure provide an improved user interface that manages user expectation, thereby ensuring that a user does not get confused or frustrated by the result after selecting certain data fields.

Figure 17D:
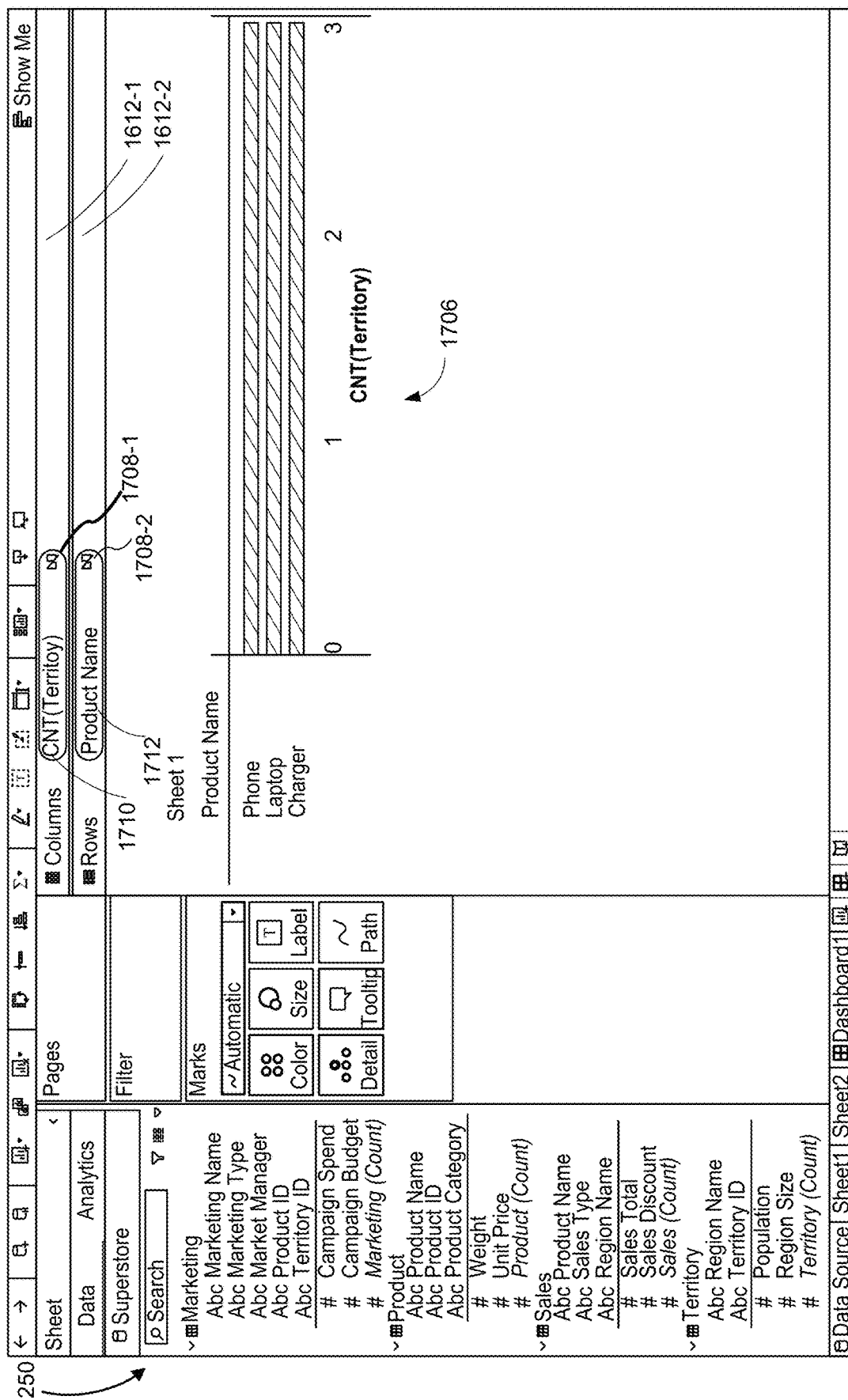

According to some implementations of the present disclosure, data field icons of fields that have been grayed out continue to be user-selectable. This is illustrated in FIG. 17D, which shows that in response to user selection of the data field icon 1620-11 and placement of the icon 1620-11 onto the shelf region, the data visualization displays an updated visualization 1706. The visualization 1706 is a bar graph of count of territory by product name, where each of the product names "Phone," "Laptop," and "Charger" shows the same territory count. The value for territory count is replicated (e.g., duplicated) for each of the product names because count of territory cannot be broken down by product name.

Figure 17E:
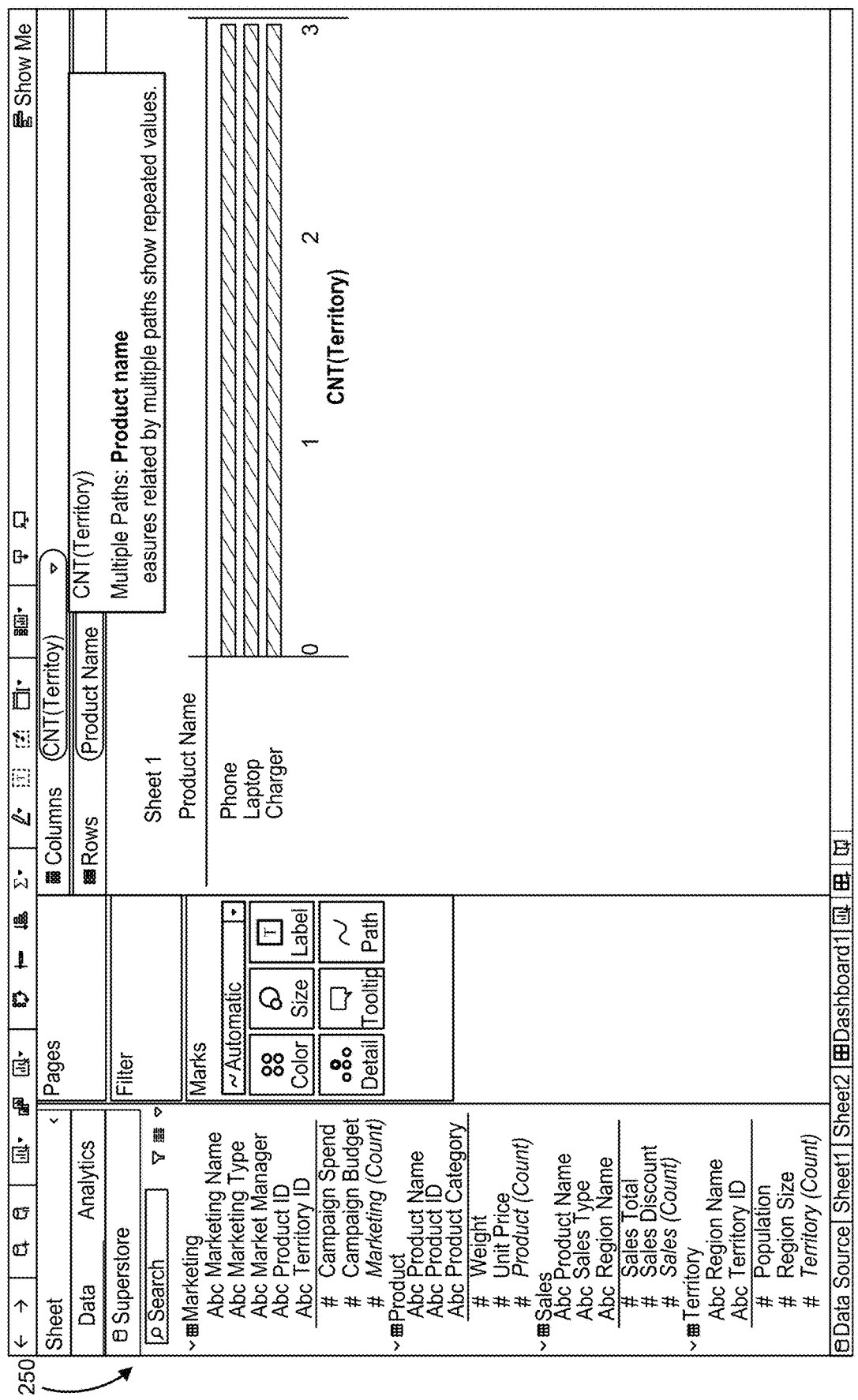

FIGS. 17D and 17E also shows that in some implementations, pill(s) in the shelf region 1612, such as pill 1710 and pill 1712, include respective indicators 1708 that, when interacted with by the analyst, displays information of which fields used in the analysis are related fields and which fields are unrelated fields, so that the analyst can go back and refine their analysis. For example, FIG. 17E shows that when an analyst interacts with (e.g., hovers over) the indicator 1708-1, corresponding to the unrelated field "Territory (Count)," the user interface 250 displays a tooltip 1714 that preserves a relevant reminder (e.g., similar to the information provided by the tooltip 1704) to the analyst that the field "Territory (Count)" is not related to the field "Product name."

In summary, an analyst has access to all the field information in the tooltips to inform them about a particular field and its relevance to their analysis.

In some implementations, the analyst is also informed of cardinality issues if the domain is beyond the limit that can result from the domain size and/or its usage with unrelated fields.

FIGS. 18A-18I provide a series of screenshots that illustrate user interactions with a data analytics user interface, in accordance with some implementations.

Figure 18A:
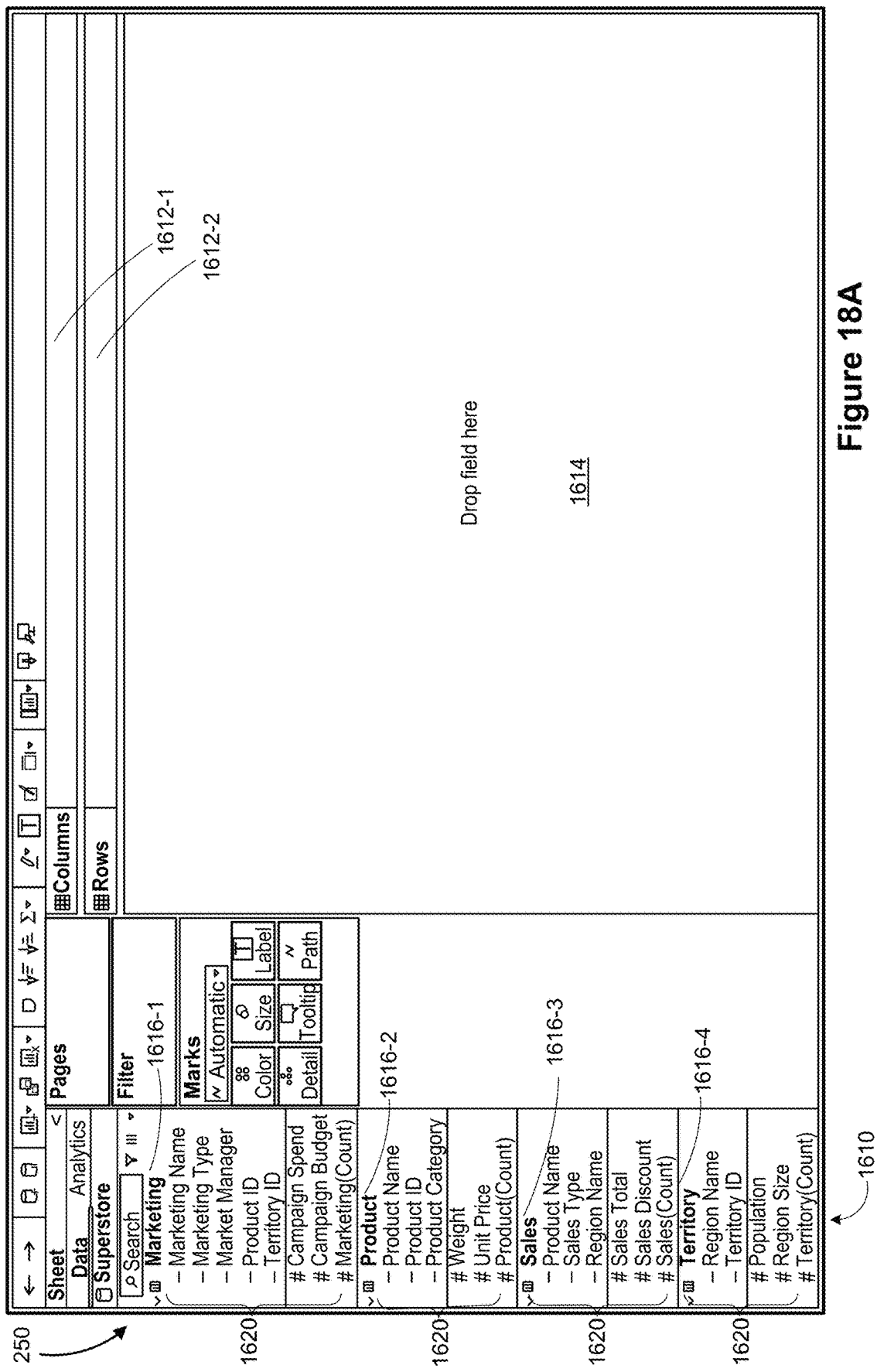
FIGS. 18A-18I provide a series of screenshots that illustrate user interactions with a data analytics user interface, in accordance with some implementations.

FIG. 18A shows a view of the user interface 250. Details of the user interface 250, including the schema region 1610, the shelf region 1612, the data visualization region 1614, the objects 1616 and the data field icons 1620 are described in FIG. 16A and are not repeated for the sake of brevity.

Figure 18B:
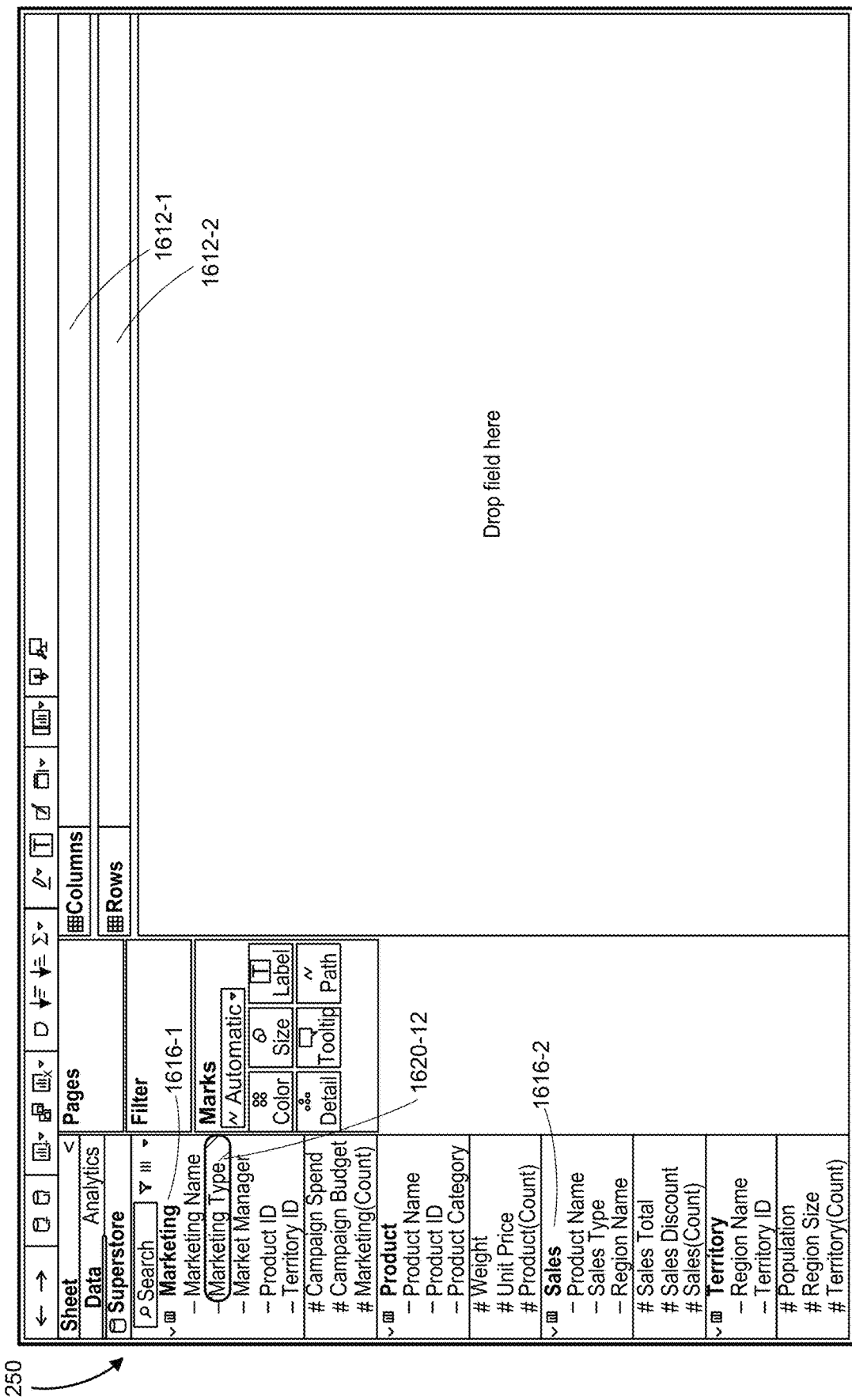

FIG. 18B illustrates user selection of a data field icon 1620-12, corresponding to the data field (e.g., object field) "Marketing type" in the Marketing object 1616-1, and placement of the data field icon 1620-12 into the shelf region 1612.

Figure 18C:
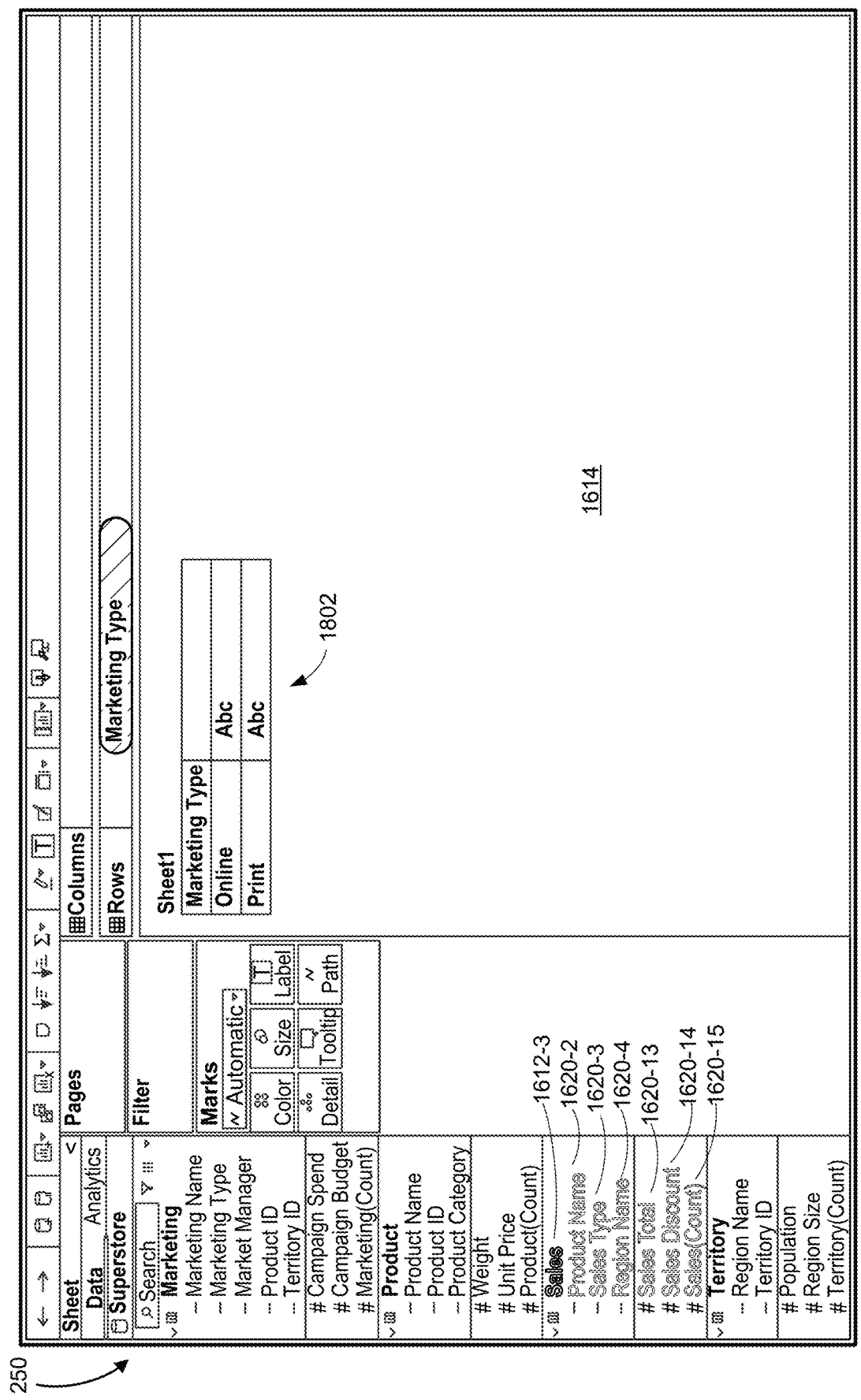

FIG. 18C shows that in response to placement of the data field icon 1620-12 into the shelf region 1612, the user interface 250 displays a data visualization 1802 (e.g., a text table). The rows of the text table are data values (e.g., "Online" and "Print") of the data field marketing type. Concurrently, the computing device visually de-emphasizes all the data field icons (i.e., data field icons 1620-2, 1620-3, 1620-4, 1620-13, 1620-14, and 1620-15) corresponding to the Sales object 1612-3.

Figure 18D:
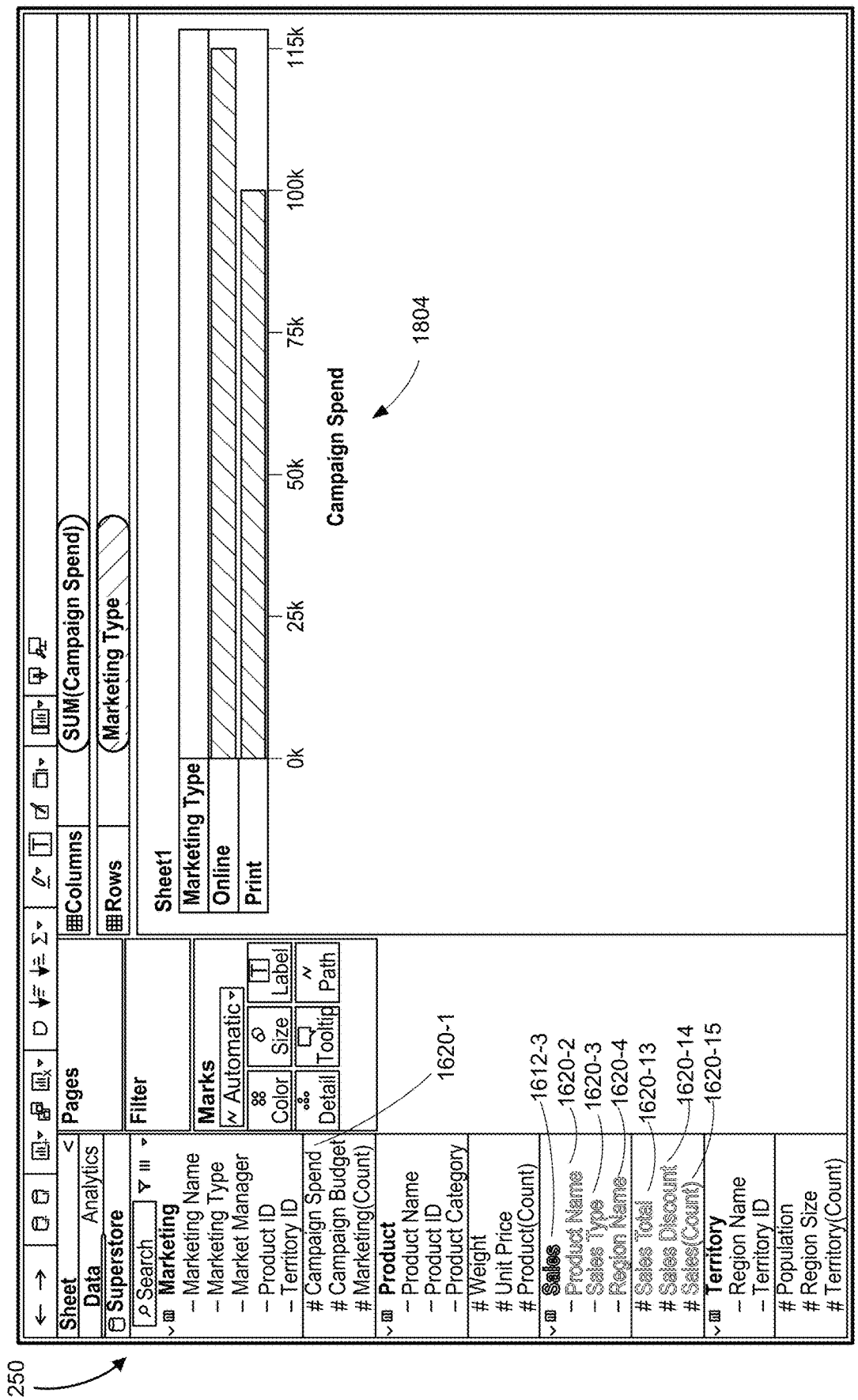

FIG. 18D illustrates that, in response to user selection of the data field icon 1620-1, corresponding to the data field "Campaign Spend," from the schema region 1610, and placement of the data field icon 1620-1 into the shelf region 1612, the user interface 250 displays an updated data visualization 1804 (e.g., a bar chart). In this example, the data visualization 1804 shows a breakdown of campaign spend amount by marketing type (e.g., online and print). FIG. 18D shows that all the data field icons for the Sales object 1612-3 continue to be grayed out.

Figure 18E:
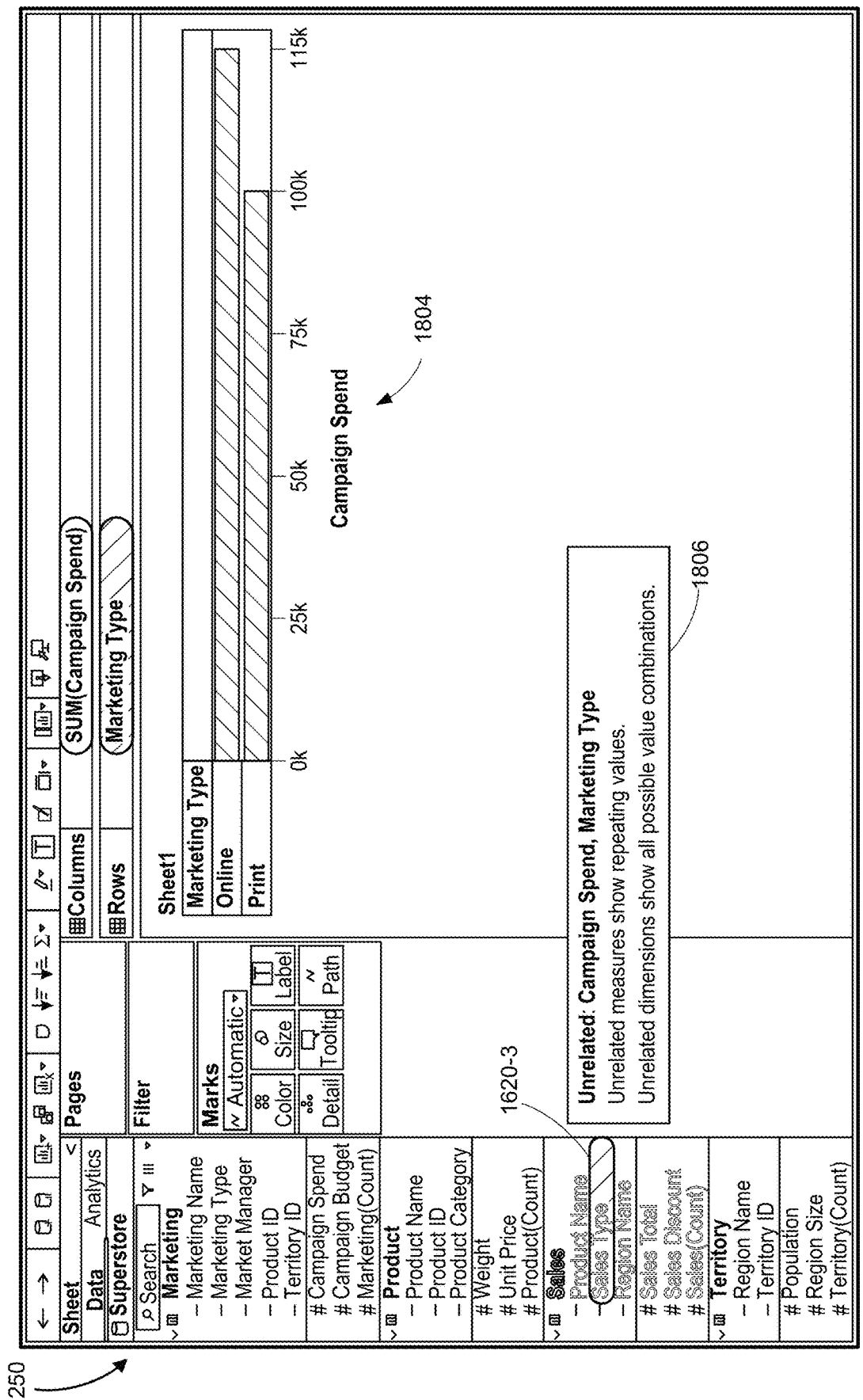

FIG. 18E illustrates that, in response to a user interaction (e.g., user selection or mouse hover) with the data field icon 1620-3 corresponding to the data field "Sales Type," the user interface 250 displays a tooltip 1806 that includes information (e.g., guidance) indicating that the field "Sales Type" is not related to the fields "Campaign Spend" and "Marketing type," and information that all possible combinations will be displayed should the field "Sales Type" be used.

Figure 18F:
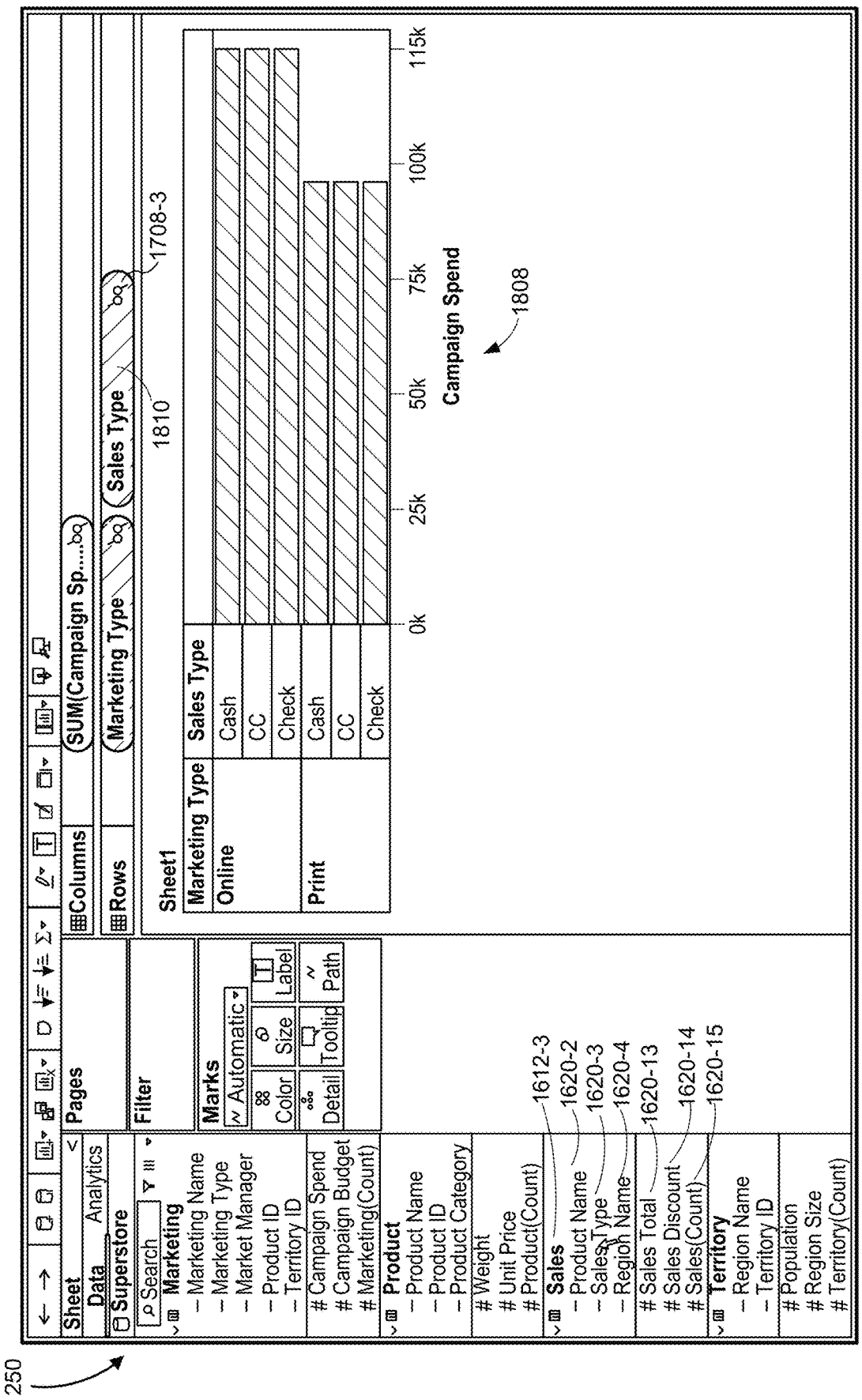

FIG. 18F shows that when the user selects the data field icon 1620-3 in the schema region 1610 places it in the shelf region, the user interface 250 displays an updated data visualization 1808. The data visualization 1808 is a bar graph of campaign spend by marketing type and sales type. Because campaign spend cannot be broken down by sales type, the computing device generates the data visualization 1808 by (i) duplicating (e.g., replicating) the campaign spend for online marketing for each of the sales type "cash," "credit card (CC)," and "check" and (ii) duplicating (e.g., replicating) the campaign spend for print marketing for each of the sales type "cash," "credit card (CC)," and "check."

FIG. 18F also shows that after the data field icon 1620-3 is placed into the shelf region, the data field icons for the Sales object 1612-3 are no longer grayed out.

Figure 18G:
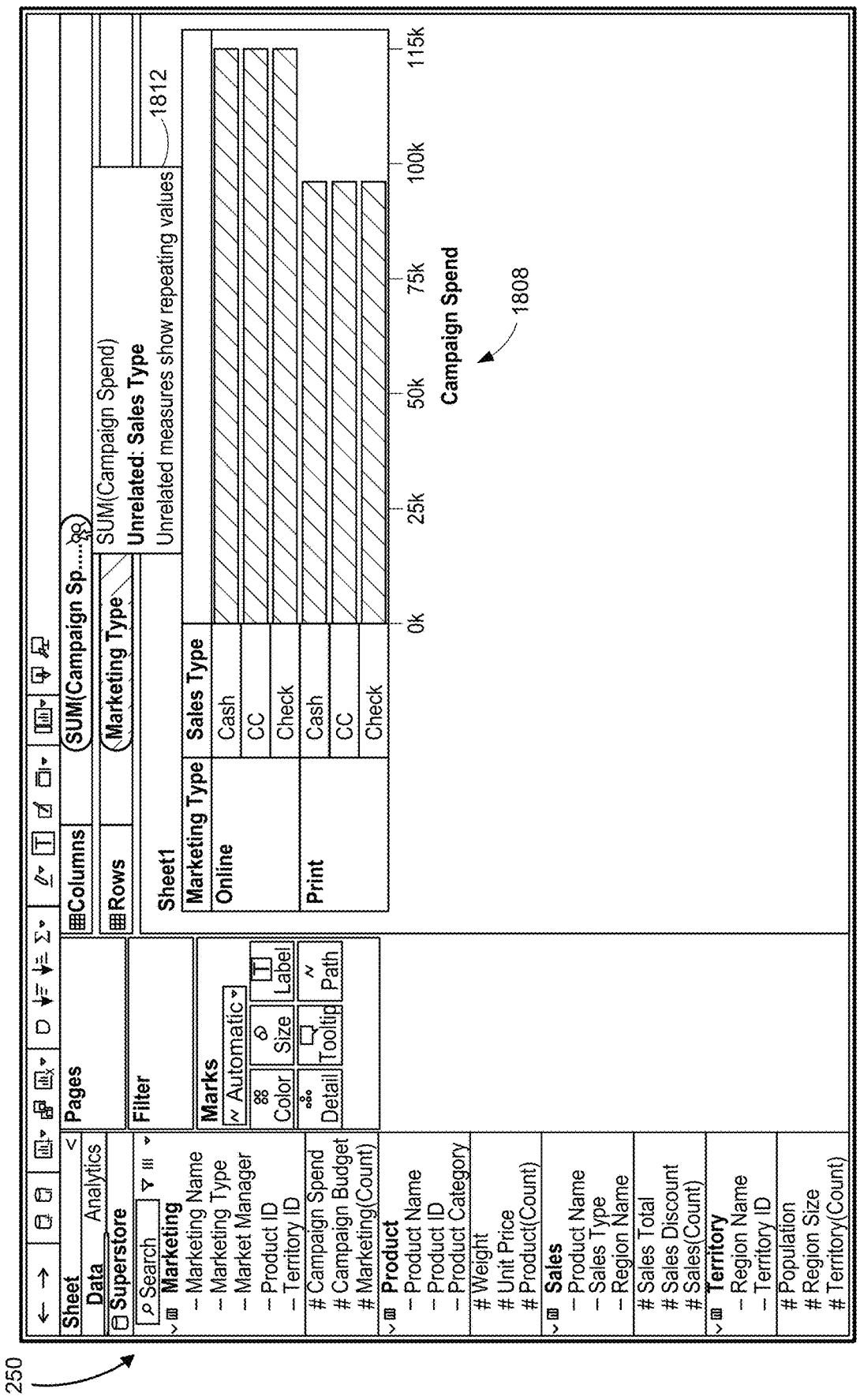

FIGS. 18F and 18G show that when a user hovers over an indicator 1708-3 that is displayed next to the pill 1810 for sales type, the user interface 250 displays a tooltip 1812 reminding the user that the fields "Sales Type" and "Campaign Spend" are unrelated, and repeating values are shown.

Figure 18H:
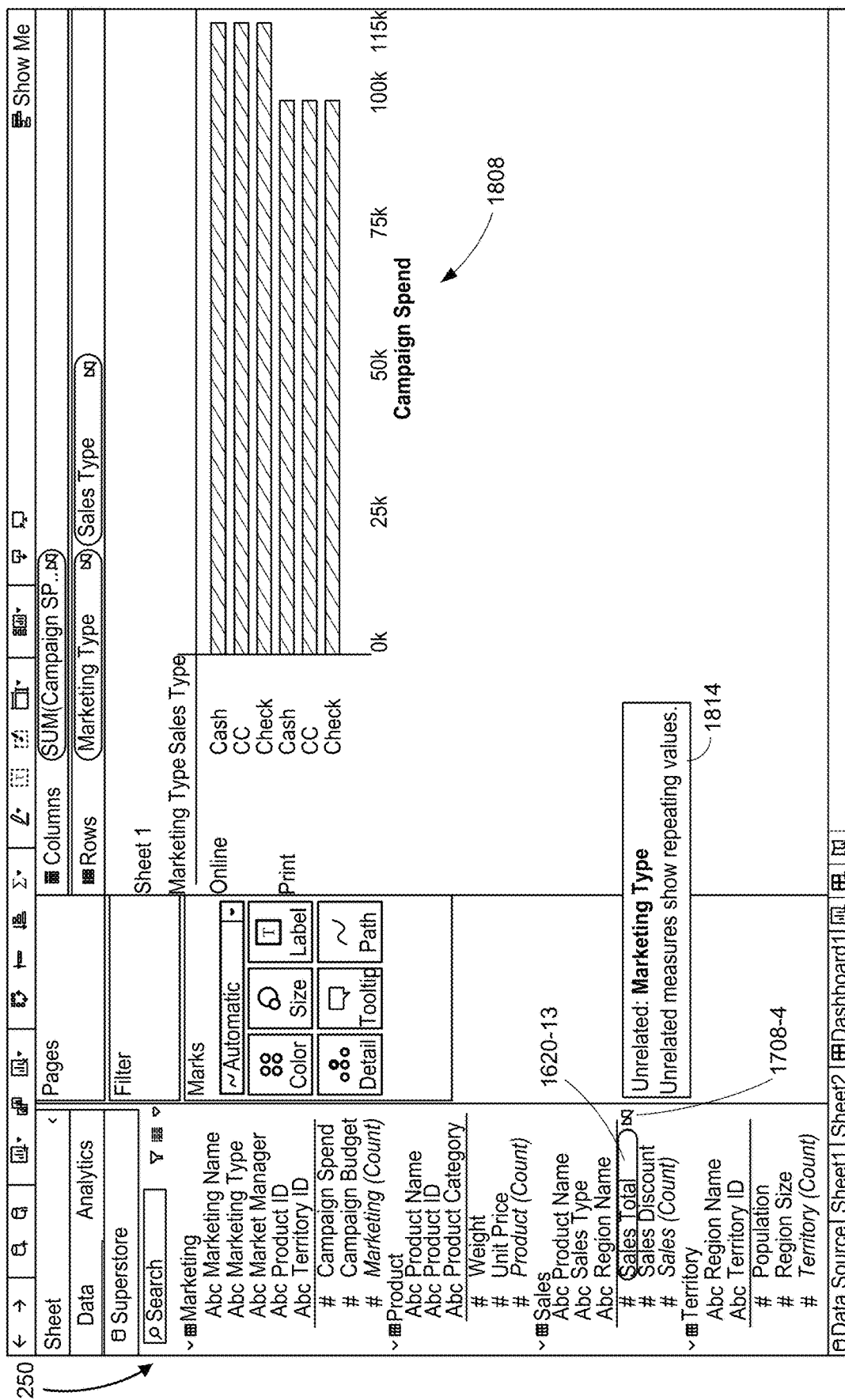

FIG. 18H shows a user interacting with (e.g., selecting or hovering over) the data field icon 1610-13, corresponding to the field "Sales total." In response to the user interaction, the user interface displays a tooltip 1814 with guidance/warning information.

Figure 18I:
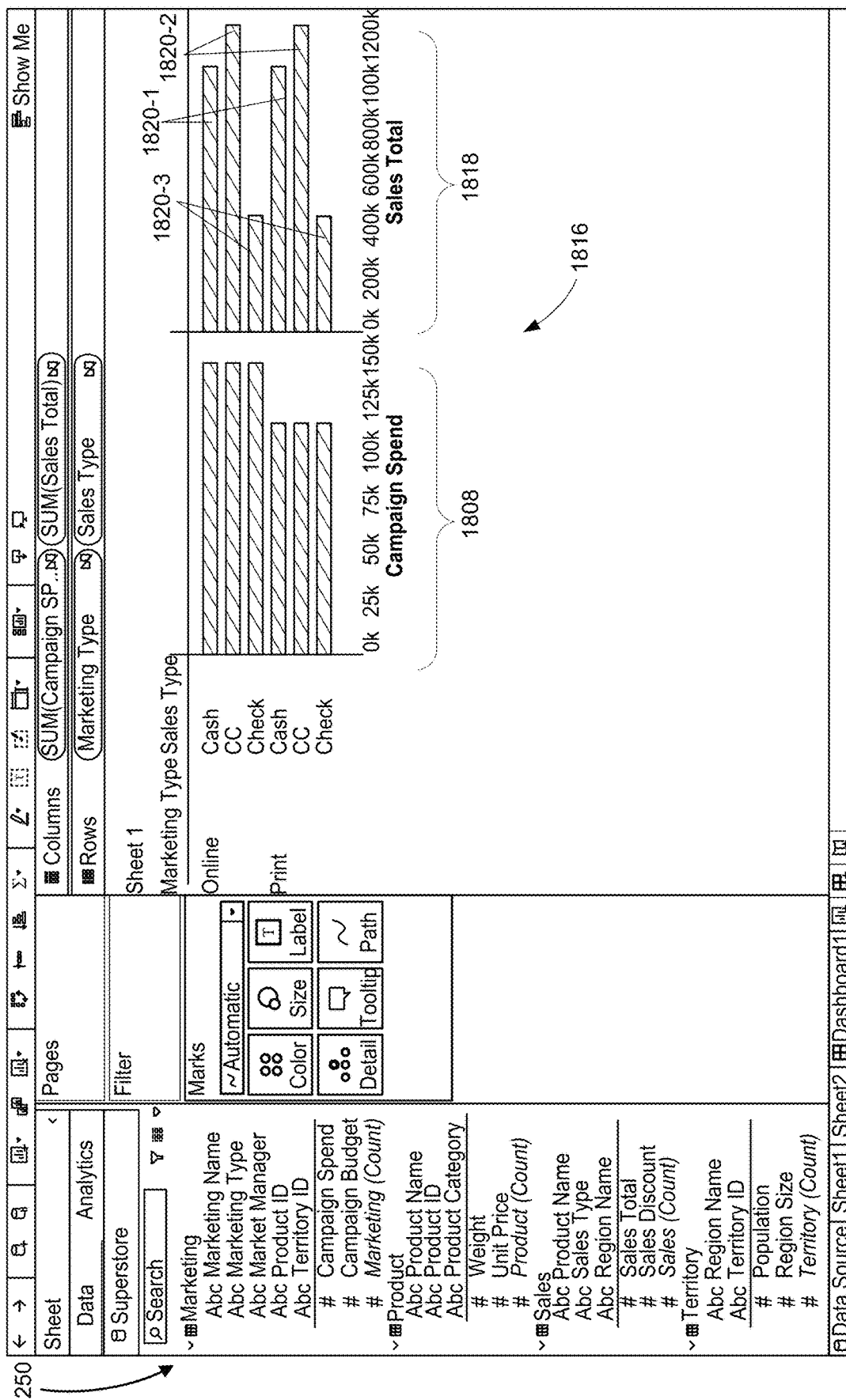

FIG. 18I shows that, in response to user selection of the data field icon 1610-13 from the schema region 1610 and placement of the icon into the shelf region, the computing device generates a data visualization 1816. The data bars on the left portion of the visualization 1816 are the same as the data bars of the data visualization 1808. The right portion 1818 of the data visualization 1816 shows sales total broken down by marketing type and by sales type. Because sales type and sales total are related (i.e., they are both data fields of the Marketing logical table), the computing device is able to determine a respective sales total for each of the sales type (cash, credit card, and check). Because sales total is unrelated to marketing type, the computing device duplicates the respective sales total that it obtained a respective sales type for each data value of the field "marketing types."

IV. Query Semantics for Multi-Fact Data Models

Some aspects of the disclosed implementations extend the current Tableau data model semantics to support multi-fact analysis, by enabling aggregation of measures from multiple fact tables to shared dimensions in different tables in the same visualization (see FIG. 4A). This feature enables analysis of data models with multiple snowflake schemas where they share common objects.

Referring again to FIG. 4A as an example, one of the drawbacks of existing data models is that analysts cannot aggregate measures from different, separate fact tables (e.g., Inventory 402 and Sales 404) to common dimensions (e.g., DimDate 406 and DimSites 408). To compare data from separate fact tables using existing data models, analysts have to generate visualizations corresponding to each fact table and juxtapose them onto a data dashboard.

The proposed technical solution to this problem preserves the current flexibility of the existing data model while extending its capabilities. The proposed solution balances the amount of work that the data modeler needs to do, limiting the amount of additional properties assigned to the new multi-fact data model, thus adding more analytic capabilities without much more user input.

IV.A. Feature Goals

Some implementations of the present disclosure extend current object model semantics to support multiple snowflake schemas where they share common objects that can be created with data models.

Some implementations of the present disclosure update query generation to enable separate tree-based queries. In some implementations, row-level measures are evaluated by tree. Some implementations support all existing row-based calculations, such as level of detail (LOD) calculations and calculations using combined fields and/or multi-dimensional sets.

Some implementations of the present disclosure add query generation to allow for consolidating separate tree-based queries together. In some implementations, the disclosed devices, methods, and/or user interfaces enable (i) aggregating measures that span multiple trees, (ii) outer joining shared dimensions between trees, and/or (iii) cross joining unshared dimensions between trees.

Some implementations of the present disclosure impose/present limits on query generation for cross-join of unrelated fields. In some implementations, the disclosed devices, methods, and/or user interfaces caution a user against using unrelated dimensions from different sets of facts. In some implementations, the disclosed devices, methods, and/or user interfaces caution a user against using unreachable dimensions from measures.

IV.B. Query Semantics for Single Fact Tables (Object Model v1)

This section discusses query semantics in the case of a single fact table.

The goals of query semantics include:
Proper Measure Aggregation: We want all measures to be aggregated at their native granularity to avoid duplication.
All Measures Kept: Adding in dimensions should not cause us to lose measure values even if the measure values do not have corresponding dimension values.
All Dimensions Kept: Adding in measures should not cause us to lose dimension values even if some part of the domain do not have corresponding measure values One of the goals of the data visualization application is to generate a query that comprises dimensions, aggregated measures and/or filters. Some of these fields and filter inputs may be calculations, for which the data visualization application has the formulae.

IV.B.1. Query Generation Algorithm

Figure 19A:
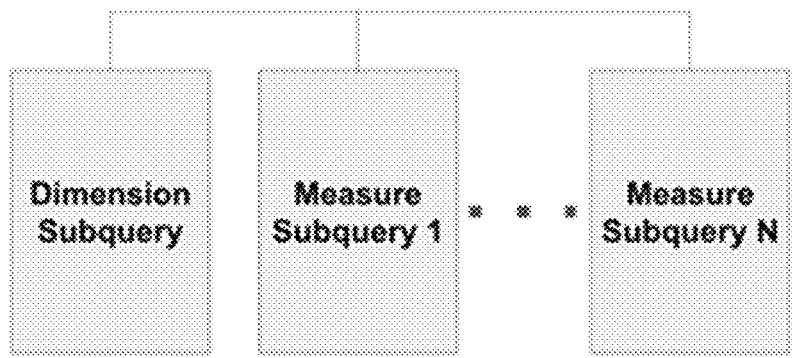
FIGS. 19A-19G illustrate steps of a query generation algorithm, in accordance with some implementations.
Figure 19B:
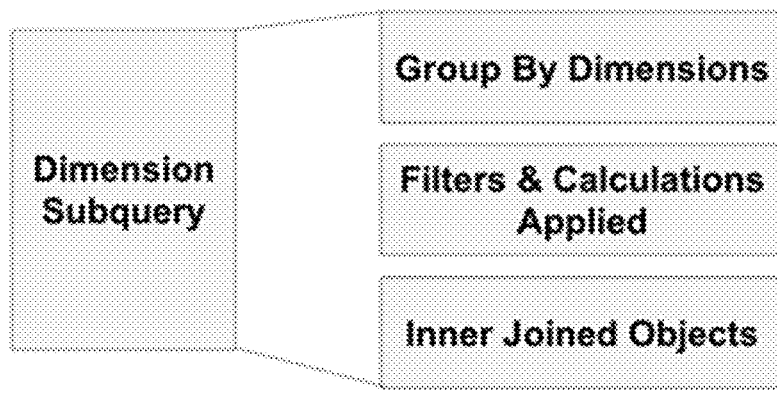

FIG. 19A illustrates the query generation algorithm. At a high level, the query generation algorithm includes:
Step 1—Constructing the Dimension Subquery: Create a table consisting of the dimensions. We call this query the dimension subquery.
Step 2—Constructing Measure Subqueries: For each aggregated measure, create a subquery consisting of the dimensions and the single aggregated measure with the filters applied. We call these queries the measure subqueries.
Step 3—Combining the Subqueries: Combine the dimension and measure subqueries IV.B.1.a. Constructing the Dimension Subquery FIG. 19B illustrates the dimension subquery construction process (step 1 of the query generation algorithm).

For this part of the algorithm, we first inner join all the objects needed to compute the dimensions and filters. In general, the objects needed for a set of dimensions, filters and/or measure is the minimum subgraph containing all the objects which contain at least one object field needed to compute a dimension, measure or filter. We then layer on calculations, then filters. We only layer on the calculations needed to compute the dimensions and filters. Finally, we group by the dimensions. If the query has no measures, we are done.

The purpose of the dimension subquery is to ensure we preserve all the dimension values that would appear in a dimension-only query.

A special case worth noting is a query with no dimensions. In this case, the query we generate is Table Dee—the table with one row and an empty schema.

Roughly speaking, joining a table to Table Dee yields the original table.

IV.B.1.b. Constructing the Measures Subqueries

A measure query consists of the set of the dimensions and a single aggregated measure.

The crux of the object model algorithm is to create a table (referred to as a "pre-aggregation table") containing the measure and dimensions—with the filters applied—for which it is safe to apply the aggregation.

The process to construct the pre-aggregation table is the trickiest part of the object model algorithm as it also strives to keep all measure values and recover unmatched dimension values when possible.

Suppose we know the primary key for each object. Then, we can construct the pre-aggregation table by:
  Creating the Object Join Tree: Join the objects together to create an object join tree.
  Adding Calculations+Filters to Object Join Tree: Add the calculations and filters on top of the object join tree.
  De-duplicating the Results: De-duplicate the object join tree by the primary keys of the measure objects and the dimensions. The goal of this step is to ensure the measures are at their native level of granularity.

When we de-duplicate a query by a set of de-duplication fields, we are asserting that for every combination of de-duplication fields, there is only one combination of the rest of the fields. In other words, the de-duplication fields uniquely determine the remainder of the fields.

The query we compute is to GROUP BY the de-duplication fields and perform an ANY aggregation on the rest of the fields.

Figure 19C:
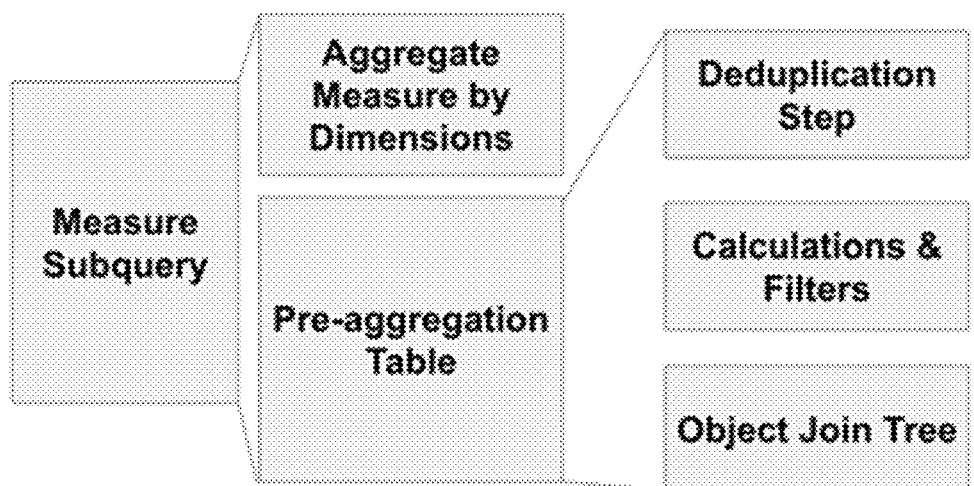

While the actual pre-aggregation query won't always be so simple, its objective is to simulate the semantics of this query structure given incomplete information. The measure subquery construction process is illustrated in FIG. 19C.

i. Creating the Object Join Tree

We define the measure core to be the set of objects needed to get all the object fields for the subquery's measure. Currently, we inner join the objects in the measure core.

The measure core defines both the granularity of the pre-aggregation table as well as the set of measure rows that we want to keep.

We want to preserve the rows in the measure core by left joining in the rest of the objects. This may lead to unmatched dimension values-which appear as nulls.

For instance, we might be aggregating sales by state with certain sales having a missing/unknown state. The left joins will ensure we keep all the sales, but the state will appear as null.

ii. Query Optimization—Referential Integrity

Recall that we perform left joins with respect to the measure core in order to avoid losing rows from the measure core. With referential integrity settings on the relationship, we can eliminate some of these left joins.

Namely, we can expand the core of objects that we inner join along relationships for which the referential integrity information indicates that we always have a match with respect to the measure core.

Figure 19D:
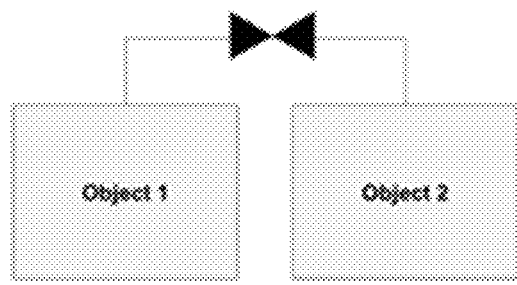

In the example above, if the relationship indicated that every row in Object 1 had a match in Object 2, we can reduce the subquery all the way down to that shown in FIG. 19D.

iii. Applying Calculations and Filters

We apply calculations and filters on top of the object join tree.

The key semantics in this area are:
  Calculations on top of joins: Calculations (and filters) are applied on top of the object join tree. This means that they operate on top of the null values introduced by left joins from the measure core. For instance, a calculation defined as IFNULL([Field], "Foo") will return "Foo" if the underlying field returns an unmatched null.
  Mandatory filters: We always apply all filters. This means that adding a filter may require joining in additional objects. Note: we would have made the determination that we need the filter's input objects when computing the object join tree. See the next section for more details. For instance, if we have a query that only uses fields from Orders but have a filter on States, we'll join in States (and intermediate objects in the join path).

iv. Deduplication Step

In practice, we don't always have primary keys (PK) or cardinality information. The general algorithm to create the pre-aggregation table roughly creates a pseudo-PK that can be used to join the dimension objects to the measure core without undue duplication.

IV.B.1.c. Combining the Dimension and Measures Subqueries

Figure 19E:
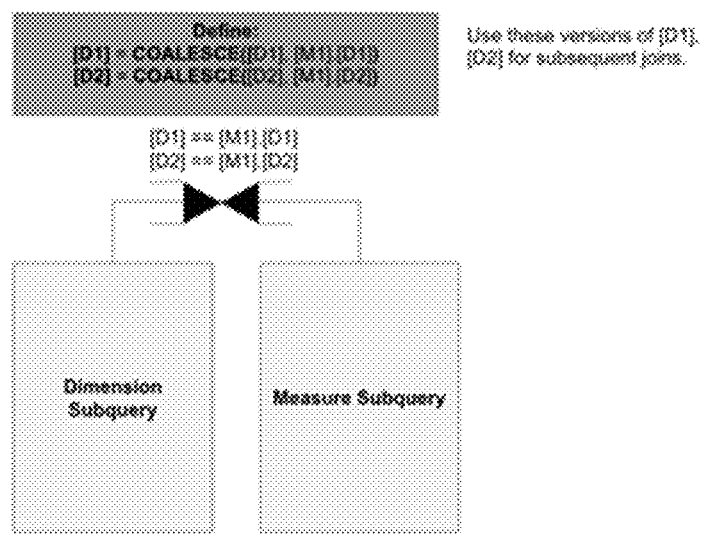

FIG. 19E illustrates the subqueries combination step.

We full outer join each subquery one at a time using the dimensions as the join keys.

After each join, we replace each dimension value with the coalesce of the value of the dimension across the two sides of the join. We use these coalesced dimensions for subsequent joins and in the result set.

Semantically, the outer joins and the coalesces union the dimensions across the subqueries. For this special case of joins and coalesces, the order in which we join the subqueries does not matter.

Figure 19F:
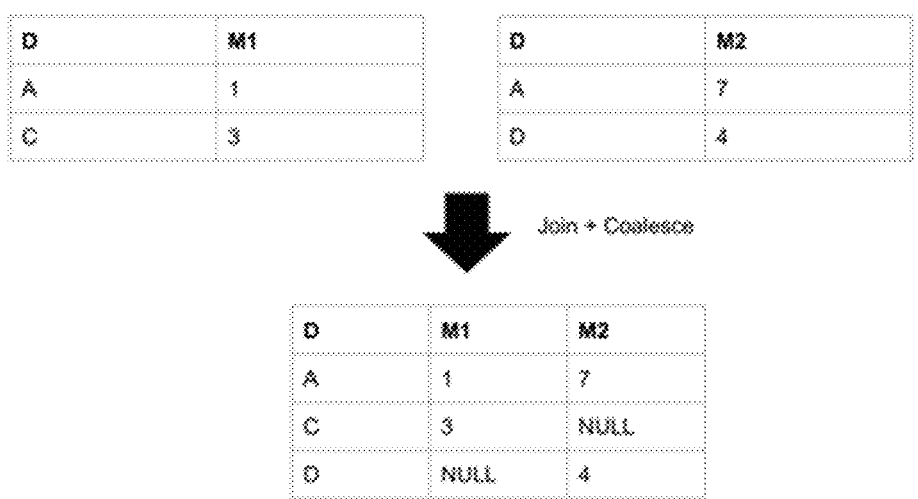

FIG. 19F illustrates performing an outer join on two tables. Unmatched measure values default to nulls (except for COUNT/COUNTD, which evaluate to 0), IV.B.1.d. Query Fusion Optimization In some instances, we can avoid outer joining subqueries by fusing them together into combined subqueries.

In some instances, we can avoid outer joining subqueries by fusing them together into combined subqueries.

For example, if we detect that two measure subqueries with the same set of dimensions operate over join trees with certain properties, we replace these subqueries with a new subquery that exposes the combined set of measures.

Figure 19G:
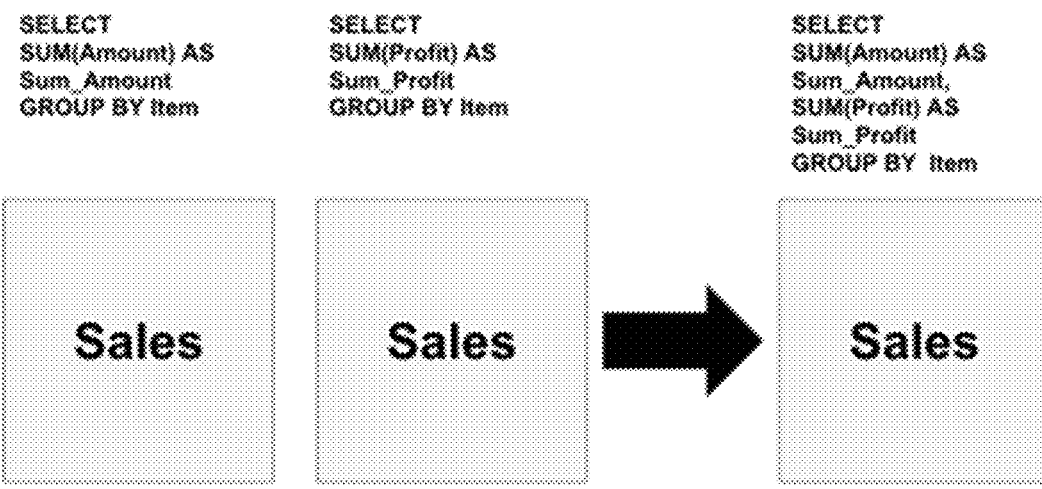

The query fusion optimization process is illustrated in FIG. 19G.

IV.B.1.e. Query Generation Example

Figure 20A:
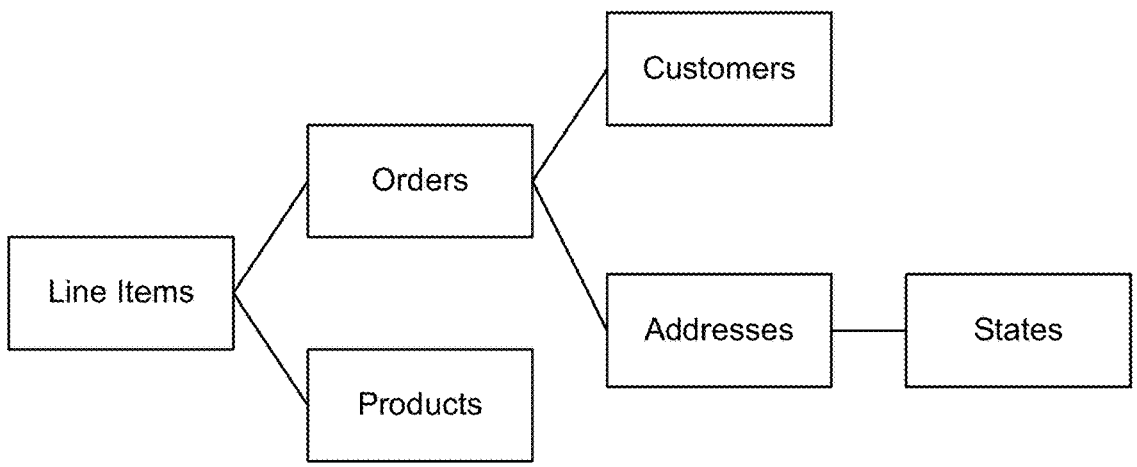
FIGS. 20A-20I illustrate an example of generating a query, in accordance with some implementations.

This section will work through an example using a Superstore model, as illustrated in FIG. 20A.

The measure subquery for which we want to compute the pre-aggregation table is:

Measure = {COUNT([Order ID])}

Dimension = {[Customer Age Bracket]}

Filter = {[Tax Adjusted Order Amount] >= 50} where

[Tax Adjusted Order Amount] is a calculation with formula

[Order Amount] * (1 + [State Tax Rate]).

The full algorithm for creating the pre-aggregation table via de-duplication is as follows:

Step 1: Get all the object fields needed for the dimensions, measure and filters. Define the object field subgraph to be the minimum subgraph that contains all these fields.

For the purpose of the rest of the algorithm, we can ignore all objects not in the object field subgraph, For the measure, the object field in play is [Order ID] from Orders.

For the dimension, the object field in play is [Customer Age Bracket] from Customers.

For the filter, the object fields that are needed to compute the calculation inside are [Order Amount] and [State Tax Rate] from Orders and States, respectively.

Figure 20B:
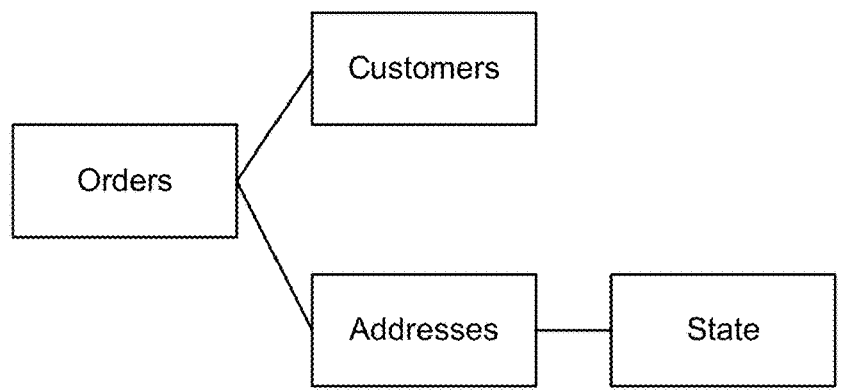

The object field subgraph is therefore {Orders, Customers, Addresses, States}, illustrated in FIG. 20B. For the rest of this example case, we can ignore the existence of {Line Items, Products}.

Step 2: Define the measure core to be the minimum subgraph that contains all the object fields needed to compute the measure.

The measure core is important because it both encodes the measure's granularity as well the set of measure rows that we need to keep.

By our analysis in Step 1, the measure only requires the Orders object-which is the measure core.

Step 3: For all the dimensions and filters not entirely contained in the measure core, compute the minimum subgraph that:

A. Contains their object fields

B. Contains at least one object from the measure core.

We call this subgraph the dimension-measure subgraph.

Note: if all dimensions and filters are fully contained within the measure core, then there will not be a dimension-measure subgraph.

The goal of the dimension-measure subgraph will be to add all the dimensions and filters not in the measure core to the measure core in a controlled manner.

As we will later see in Steps 5 and 8, the objects from the measure core are important for preserving our desired calculation semantics and for joining the two subgraphs back together.

Neither the dimension nor the filter is entirely contained with the measure core. The dimension requires Customers and the filter requires Orders & States. The dimension-measure subgraph is {Orders, Customers, Addresses, States}. Since this graph shares an object with the measure core (Orders), this graph is enough.

Step 4: Create the compiled measure subgraph by inner joining all the objects in the measure core. Then, add on the calculations and filters that depend only on objects in the measure core.

The compiled measure subgraph is just the query representation for Orders.

If there is no dimension-measure subgraph, we are done.

Step 5: Create the compiled dimension-measure subgraph by inner joining all the objects that come from the measure core. Then, left join in the rest of the objects.

Next, add on the calculations and filters that are entirely contained within objects in the dimension-measure subgraph.

The presence of measure core objects in the dimension-measure subgraph preserves the semantics of calculations operating on top of nulls introduced from left joining with respect to the measure core.

Orders is the only object from the measure core. We left join the rest of the objects against Orders. We then layer on the calculated field by creating a new field with its formula. Finally, we add on the filter.

Figure 20C:
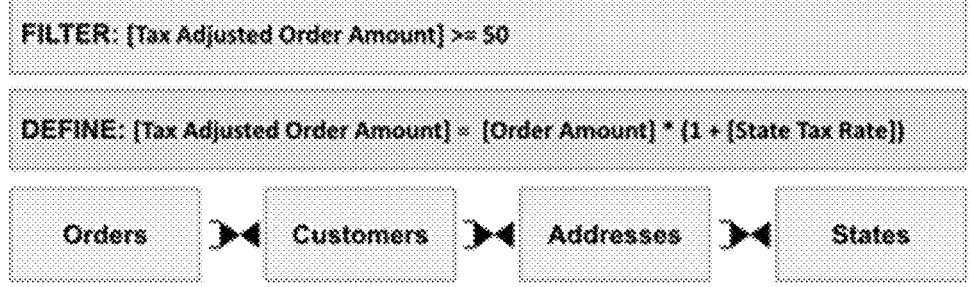

The compiled dimension-measure subgraph is illustrated in FIG. 20C.

Step 6: Define the linking fields as the union of:

The relationship keys that join the measure objects in the dimension-measure subgraph with the rest of this subgraph. We pick the key from the measure-object side.

For the filters and dimensions which span the measure core and rest of the object field subgraph, the object fields that fall within the measure core.

The relationships that join the measure objects with the rest of the dimension-measure subgraph are (Orders, Customers) & (Orders, Addresses). The keys from these relationships on the Orders side are {[Customer FK], [Address FK]}.

While the dimension does not span into the measure core, the filter's input calculation has an input field that falls in Orders. This field is {[Order Amount]}.

Therefore, the linking keys are {[Customer FK], [Address FK], [Order Amount]}.

Step 7: De-duplicate the compiled dimension-measure subgraph by the dimensions and the linking fields.

Figure 20D:
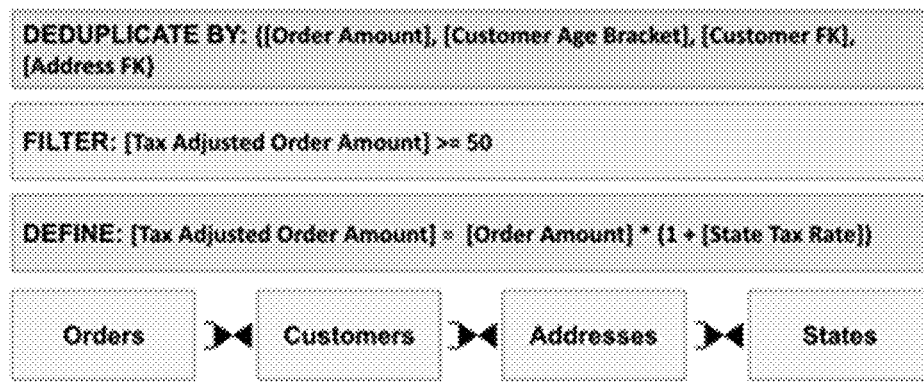

We add the dimension [Customer Age Bracket] to the linking fields for the purposes of de-duplication. FIG. 20D shows the de-duplicated compiled dimension-measure subgraph.

Step 8: In the simplified algorithm, Step 7 is analogous to the de-duplication step. Unlike with the simplified algorithm, we could not put all the measure core objects underneath this de-duplication step. Without primary keys, we might not be able to craft a group by that also preserves the granularity of the measure core.

Instead, we kept the measure core separate in the previous steps. We now combine the two compiled subgraphs in a way that prevents duplication without losing the granularity of the measure core due to an overly coarse group by.

In particular, inner join the compiled measure subgraph and the de-duplicated compiled dimension-measure subgraph on the linking fields.

Essentially, this step acts like a self-join between measure objects that appear in the measure core and those that appear in the dimension-measure subgraph.

Since the non-measure core objects are left joined in against the measure core objects, this inner join won't cause any rows to be dropped, unless a filter was applied (in which case, these dropped rows are by design).

The linking fields act like a quasi-PK to ensure that the dimension-measure subquery doesn't introduce duplication. The intuition here is that had the dimension-measure subquery been grouped by only the linking fields, this table would have a many-to-one relationship with respect to the measure core.

Figure 20E:
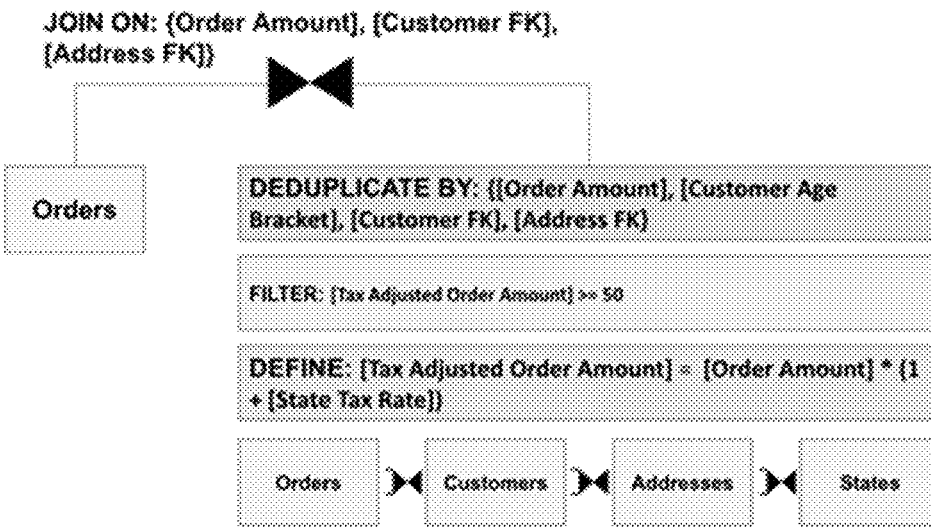

We effectively perform a self-join on the Orders in the measure core and dimension-measure subgraph. This yields the final query that is illustrated in FIG. 20E.

Query Optimizations—Cardinality

The deduplication step above is correct given a general model with all many-to-many relationships.

Figure 20F:
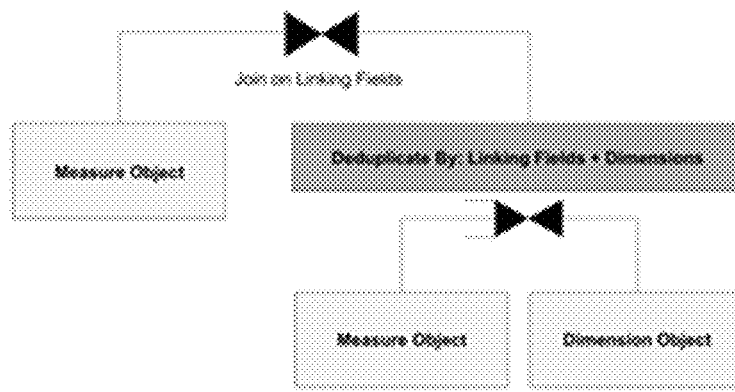

The correctness comes at a cost of joining in at least one measure object twice as well as a deduplication group by. For a simple model with the measures from one object and the dimensions from the other object, we get a query that is shown in FIG. 20F. In certain cases, we can leverage cardinality information to reduce these costs.

Figure 20G:
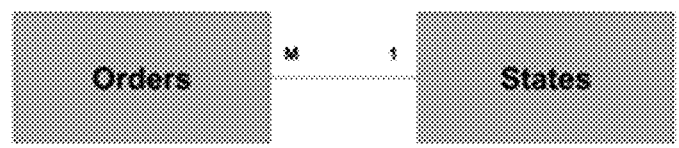

For the discussion of the two optimizations, we'll use a pared-down Superstore model that is shown in FIG. 20G.

Here, we use cardinality information to reason about how joining an object to another impacts the first object's granularity.

Optimization 1:

We can expand the measure core along many-to-one and one-to-one edges. This is because the additional objects do not change the relative cardinality of the measure core.

This optimization is powerful because, in the snowflake case with the measure at the root, it can eliminate the group by entirely.

Figure 20H:
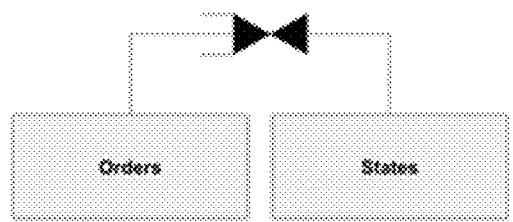

Suppose we use a measure from Orders and a dimension from States. Joining States to Orders doesn't increase the cardinality of Orders, so we can simplify the query to that shown in FIG. 20H.

Optimization 2:

Here, we use cardinality information to try to extract primary keys. We can deduce a relationship clause is a primary key if it is on the one side of a relationship.

When de-duplicating the dimension-measure subgraph, we can de-duplicate by the primary keys of the measure objects within this subgraph and the dimensions. This is different from the base algorithm, where we de-duplicate by the linking fields and the dimensions.

At this point, the dimension-measure subquery is at the granularity of the measure objects that it contains.

This means that we only need to join the measure objects from the measure core that aren't already contained within the dimension-measure subgraph. In the best case, this can mean that the de-duplicated dimension-measure subgraph is the entire query.

Figure 20I:
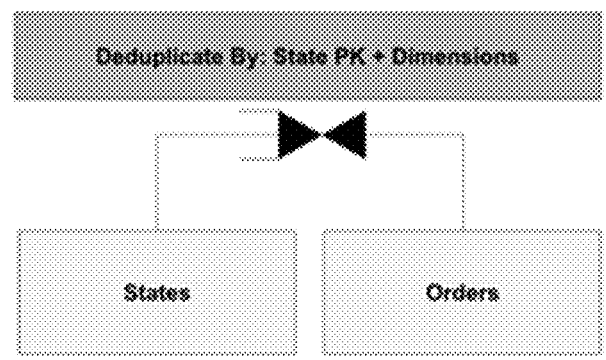

Suppose we use a measure from States and a dimension from Orders. By the one side of the relationship going into States, we can extract the primary key for States. De-duplicating by this primary key (and the dimensions) ensures that we won't have undue duplication. Therefore, we don't need to join against States again, so we can simplify our subquery to that shown in FIG. 20I.

IV.B.1.f. Measure—Dimension Subgraph Examples

Figure 21A:
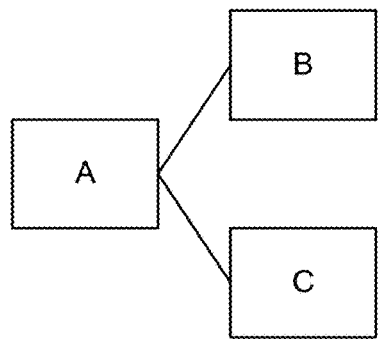
FIGS. 21A-21C illustrate dimension-measure subgraphs, in accordance with some implementations.
Figure 21A:
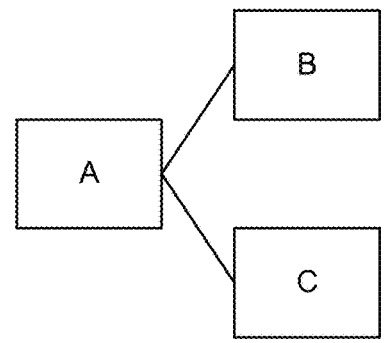
Figure 21B:
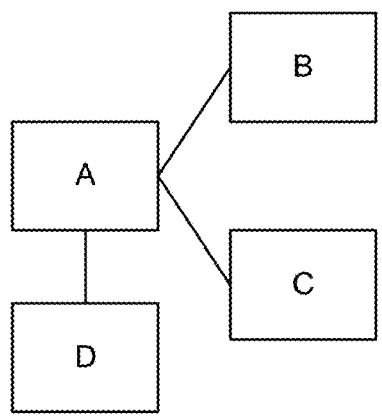
Figure 21B:
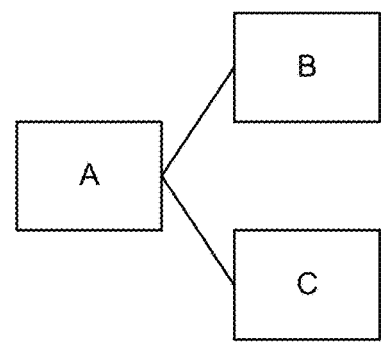
Figure 21C:
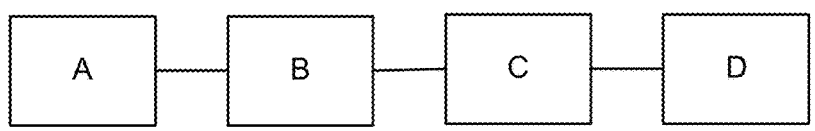
Figure 21C:
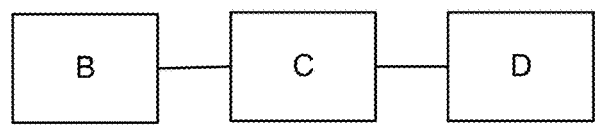

FIGS. 21A, 21B, and 21C illustrate dimension-measure subgraphs in accordance with some implementations.

FIG. 21A starts with an object field subgraph of {A,B,C} and a measure core {A}. The dimensions depend on {B} and {C}, which aren't in the measure core. The minimum subgraph that contains these dimensions is {A,B,C}. Since this subgraph contains an object from the measure core, we are done.

FIG. 21B starts start with an object field subgraph of {A,B,C,D} and a measure core {A,D}. The dimensions depend on {B} and {C}, which aren't in the measure core. The minimum subgraph that contains these dimensions is {A,B,C}. Since this subgraph contains an object from the measure core, we are done. In this case, we didn't need to bring in the entire measure core; we need only bring in A.

FIG. 21C starts with an object field subgraph of {A,B,C,D} and a measure core {A,B}. The dimensions depend on {D}, which isn't in the measure core. The minimum subgraph that contains these dimensions is {D}. This subgraph doesn't include an object from the measure core. The minimum subgraph that contains the dimension and the measure core is {B,C,D}.

IV.C. Query Semantics for Multi-Fact Object Models

This section describes how the query semantics for single fact tables, which is described in the previous session, can be expanded to include analysis of multi-fact tables.

IV.C.1. Scenario 1: Single Tree Object Model Query Semantics (Single Fact Table) (Object Model Version 1)

When all fields in the visual specification have one tree in common, and all fields from unshared objects are from the same tree, existing object model semantics are used. See Section IV.B.

IV.C.1.b. Scenario 2: Query Semantics for Multi-Fact Object Models

Figure 22:
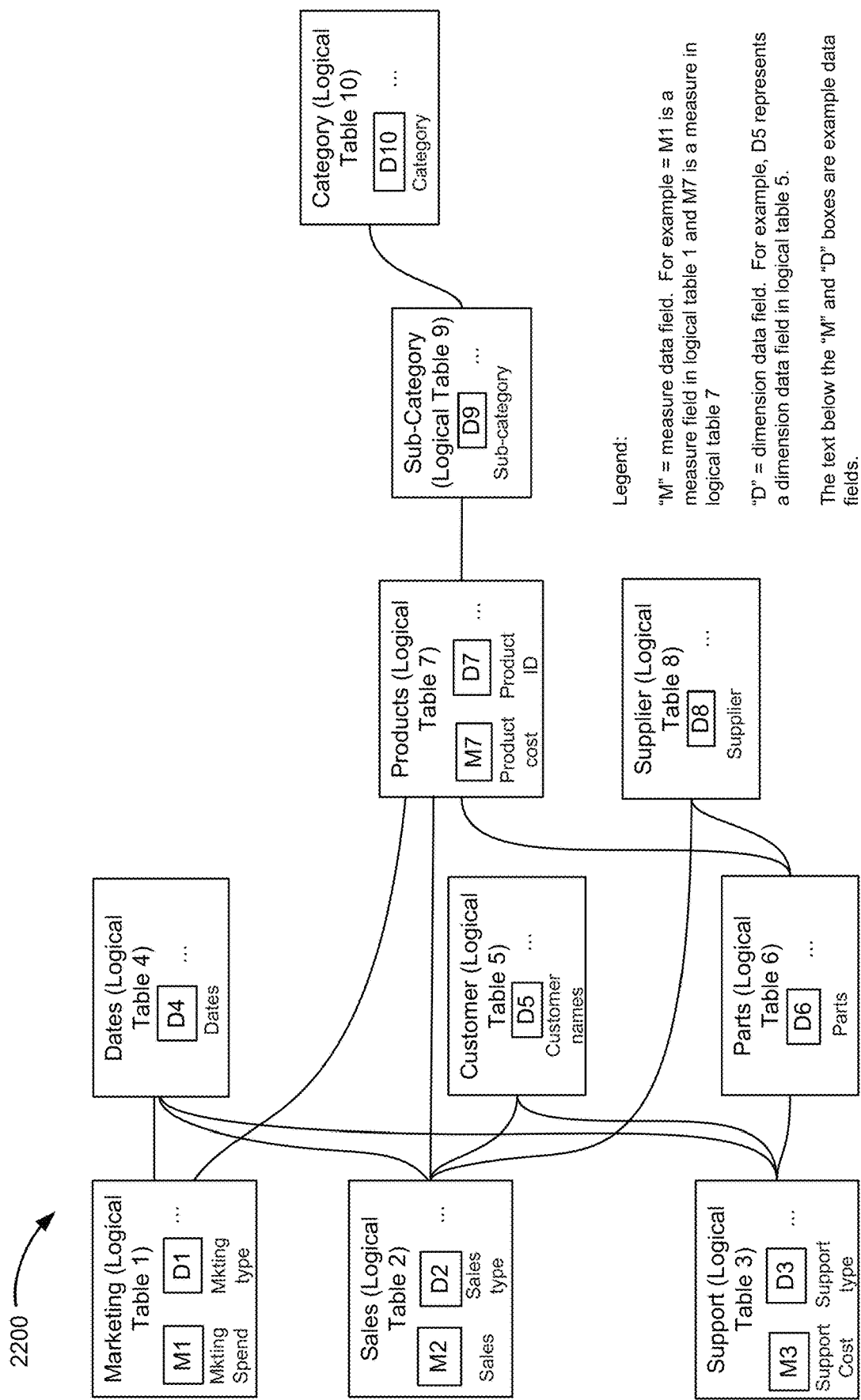
FIG. 22 illustrates a multi-fact object model, in accordance with some implementations.

This section is discussed with reference to a multi-fact object model 2200, as illustrated in FIG. 22.

To reiterate some of the nomenclature used in the present disclosure, every tree has a root table. The root table always starts from the left-most side of an object model. A shared tree is a tree that can be traced back to two or more roots. A shared tree does not contain any root table.

In FIG. 22, Products (logical table 7) is a shared tree because Products can be traced back to the Marketing root table (logical table 1), the Sales root table (logical table 2), and the Support root table (logical table 3).

When an object is determined to be a shared object, any object that is to the right of that shared object is part of a shared tree with that object. Referring back to FIG. 22, because Products (logical table 7) is a shared object, and Sub-Category (logical table 9) and Category (logical table 10) are to its right, Products (logical table 7), Sub-Category (logical table 9), and Category (logical table 10) belong to their own tree (e.g., a shared) tree. Recall in FIG. 14A that a shared tree refers to a tree that does not include a root object.

In FIG. 22, Dates (logical table 4) is also a shared tree. In this example, Dates is also its own tree.

"Shared" or "unshared" is an intrinsic property of the object model. Every object in the object model is either shared or unshared. One exception to this is when the dimensions can be collapsed to one tree (see example in Scenario 1 in Table 1 below), so as to maintain backward compatibility. Dimensions that collapse to one tree are considered to be unshared.

Tree traversal is directional. When we trace back to the root, we can only traverse in the left direction. In FIG. 22, Parts (logical table 6) is not a shared tree because it can only be traced back to one root when traversed in the leftward direction.

Below are a few canonical scenarios where measures come from different fact tables and measure results can be compared against each other using shared dimensions. These scenarios are discussed with reference to FIG. 22.

Scenario 2.1. Unshared dimensions from one tree: collapse to same semantics as Object Model v1.

Examples of unshared dimensions in FIG. 22 are: D1, D2, D3, and D6. They belong to different trees.

Although D4 is a shared dimension, if D1 and D4 are used together, they would collapse into a single tree.

Similarly, if a query uses D1, D4, and D7, these dimension fields would also collapse to a single tree, and are treated as though they are part of one tree. Even though D4 can be traced back to Table 2 and Table 3, if the query does not call out fields from these root tables, D4 is anchored back to a single tree with D1.

Join type: Inner join
e.g., inner join D1 and D4; or inner join D1, D4, and D7.

As another example, imagine that an analyst starts with D1, D4, and D7. Later, they decide to add D2 and/or D3. The queries/analysis that were generated before D2 and/or D3 were introduced would be as though D1, D4, and D7 were part of a single tree.

Scenario 2.2. Unshared dimensions from multiple trees: inner join dimensions from the same tree first, then cross-join from different trees.
From FIG. 22, example unshared dimensions from multiple trees are: D1, D2, D3, and D6
Taking D2 (e.g., Sales type) and D3 (e.g., support type) as an example, we:
Inner join all dims in Sales tree using sales type (Result 1)
Inner join all dims in Support tree using support type (Result 2)
Cross join result 1 and result 2

Scenario 2.3. Shared dimensions from a single shared tree: inner join within the shared dimensions.
From FIG. 22, example shared dimensions from a single shared tree are: D7, D9, and D10
Join type: inner join these dimensions Scenario 2.4. Shared dimensions from multiple shared trees: cross-join across trees if they are evaluated to be sharing among different trees.
From FIG. 22, shared dimensions from multiple shared trees are D4, D5, and/or D7
Multiple shared trees have multiple shared roots, so they are still ambiguous. Therefore, we use cross-join.
If D9 or D10 are also specified, then these will be inner joined with D7 first to obtain an inner join result (Result A). Result A will be cross-joined with D4 and/or D5.

Scenario 2.5. Shared dimensions and unshared dimensions in one tree: inner join within trees (same as Object model semantics v1)
Example: D1 and D4.
Join type: Inner join D1 and D4. This collapses to a single tree.

Scenario 2.6. Shared dimensions and unshared dimensions in multiple trees: inner join with unshared dimensions in each tree, then outer join shared dimensions between trees.
Example: D1 and D5. Because D1 is not shared with D5, these two dimensions will be cross-joined.

Scenario 2.7. Unshared measures. Recall that the query generation algorithm in Section IV.B.1. includes the three steps of:
Step 1—Constructing the Dimension Subquery (to obtain a dimension core).
Step 2—Constructing Measure Subqueries
Step 3—Combining the Subqueries Scenarios 2.1 to 2.6 described above are directed to the dimension subquery construction (Step 1 of the query generation algorithm). If a measure is specified (e.g., in the visual specification), a measure sub-query is generated for the measures. That sub-query depends on whether the measure is shared or unshared.

Scenario 2.7a. Unshared dimensions from one tree+unshared measure: Use the same query semantics as Object Model v1

Scenario 2.7b. Unshared dimensions from multiple trees+unshared measure: Aggregate measure to unshared dimensions from the tree, then replicate entire measure (without dimensions) to unshared dimensions in other trees.

Scenario 2.7c. Shared dimensions from a single shared tree+unshared measure: Apply Scenario 2.7b to shared dimensions Scenario 2.7d. Shared dimensions from multiple shared trees+unshared measure: Aggregate measure to shared dimensions within tree, then replicate entire measure (without dimensions) to other trees Scenario 2.7e. Shared dimensions and unshared dimensions in one tree+unshared measure: Same as Scenarios 2.7b and 2.7d Scenario 2.7f. Shared dimensions and unshared dimensions in multiple trees+unshared measure: Same as Scenarios 2.7b and 2.7d Scenario 2.8. Shared measure. A shared measure is a measure that belongs to different trees.

Scenario 2.8a. Unshared dimensions from one tree+shared measure: Aggregate measure to unshared dimensions using OM v1

Scenario 2.8b. Unshared dimensions from multiple trees+shared measure: Aggregate measure to unshared dimensions within tree (using OM v1), then replicate measure (without dimensions) to other trees Scenario 2.8c. Shared dimensions from a single shared tree+shared measure: replicate measure (without dimensions) to shared dimensions Scenario 2.8d. Shared dimensions from multiple shared trees+shared measure: Same as Scenario 2.8c.

Scenario 2.8e. Shared dimensions and unshared dimensions in one tree+shared measure: Same as Scenarios 2.8b and 2.8c Scenario 2.8f. Shared dimensions and unshared dimensions in multiple trees+shared measure: Same as Scenarios 2.8b and 2.8c Scenario 2.9. Filters.
When a filter is applied to a shared dimension, the filter gets applied every time a fact that is shared the shared dimension is brought into the query.
As one example, a filter is applied to "customer names" (e.g., D5 in FIG. 22). Because "customer names" is a dimension field that is shared with both Sales (logical table 2) and Support (logical table 3), that filter is applied every time a measure is brought in from Sales or Support.
As another example, if a filter is applied to "sales type" (e.g., D2 in FIG. 22). Because "sales type" is an unshared dimension, this filter is only limited to facts in the Sales table.

Scenario 2.10. Ambiguous cases. Suppose the query is for "count of product for different months." In FIG. 22, because Products is shared with marketing, sales, and support, the count of product for different months can be for marketing, or sales, or support. For this example, because there are multiple paths to get to the dimension core, the computing device (e.g., data visualization application 230) resolves this query by aggregate locally within the Products table to obtain a total count of products, and then replicating the total count of products for each of the dimensions associated with marketing, sales, and support.

Figure 23:
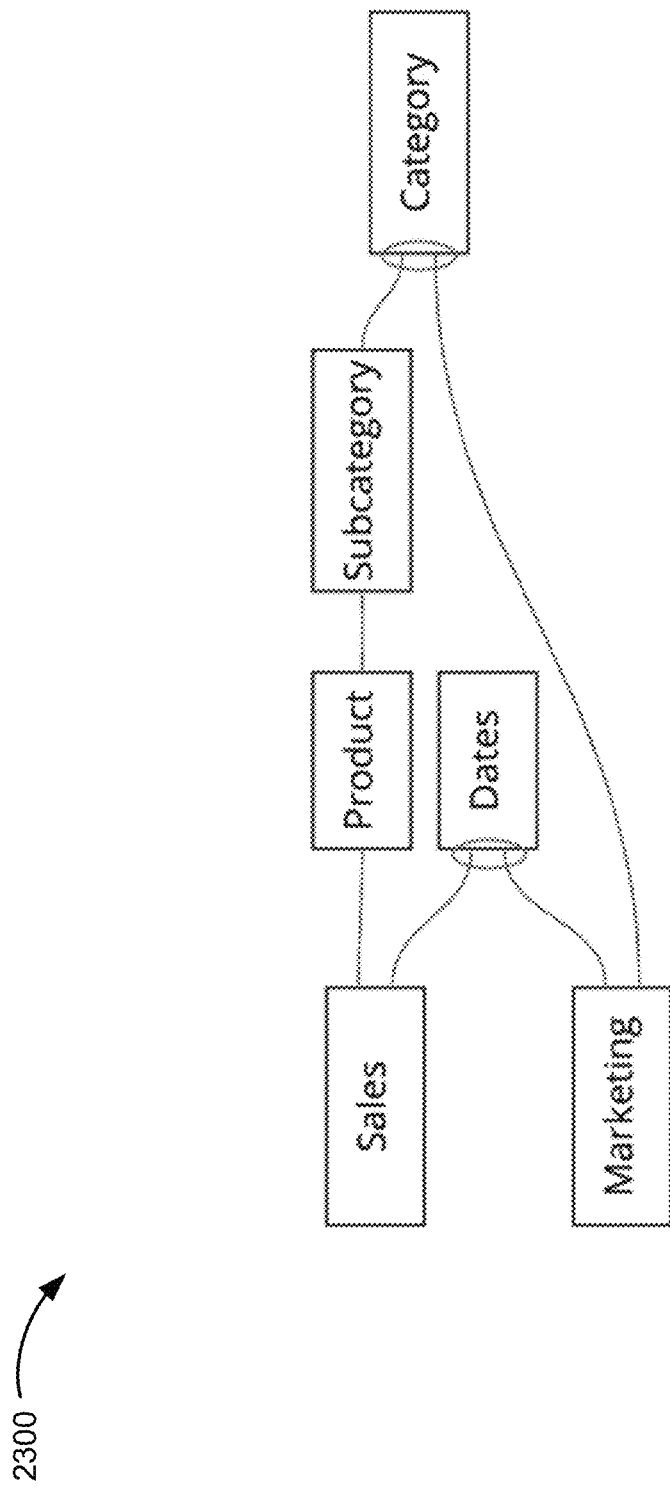
FIG. 23 illustrates a multi-fact object model, in accordance with some implementations.

IV.C.1.b.i. Multi-Fact Model Query Semantics Example
This section will work through an example using an object model 2300 as illustrated in FIG. 23. Sales and Marketing are two different trees in the object model 2200.

What they have in common are Dates and Category. The data values for Category are "Transportation and "Device." Marketing includes a dimension field "Marketing Type."

FIG. 24A illustrates a table corresponding to the object model 2200 based on the shared dimension Date. First table; Shared dimension is date. Sales by Category occur in the months of January, March, and April. Marketing spend is incurred in the months of January, February, March, and May. Outer join semantics is used in this example.

FIG. 24B illustrates a data visualization (e.g., a text table) that is generated when the query consists only of measure fields (i.e., no dimension fields). Notice that there is no further breakdown of the measure values.

FIG. 24C illustrates a data visualization (e.g., a text table) that is generated when the query consists only of dimension fields (i.e., no measure fields). In this example, the query specifies "month" and "category." Notice that data values for Category (i.e., "Device" and "Transportation") are replicated for each of the months. each other. This is an example Scenario 2.4 described above.

FIG. 24D illustrates a data visualization (e.g., a text table) from the single fact table Sales. This is essentially a re-capitulation of Object Model V1. Notice that the data visualization shows r sum of sales for month(s) and category where sales is a not a null value. In this example, because there is no sale in the month of February, the data visualization in FIG. 24 does not have a data row for the month of February.

FIG. 24E illustrates a data visualization (e.g., a text table) when a dimension is added to measures from many trees.

FIG. 24F illustrates a data visualization (e.g., a text table) when a filter is applied to filter data values of the dimension field Category to "Device." Because "Category" is a shared object, applying a filter on this shared object cause it to be applied to all connected trees that are being uses in the visualization.

FIG. 24G illustrates a data visualization (e.g., a text table) when a filter is applied to filter data values of the dimension field Marketing Type to "Online Marketing." In this example, because Marketing Type is an unshared dimension, this filter is only limited to facts in the Marketing table.

FIG. 24H illustrates a scenario where analysts can evaluate aggregate measures across multiple fact trees at the shared dimension level of details. In this example, analysts can normalize SUM (Sales) by SUM (Spend). FIG. 24H shows that there can be missing values in either the SUM (Sales) column or the SUM (Spend) column, and the aggregated calculation has to verified and adjusted accordingly.

IV.C.2. Object Tree Properties

Each tree starts with a root object. There can be multiple roots in a data model, and root objects cannot relate to each other. In some implementations, all roots must be connected (via shared objects).

Figure 25:
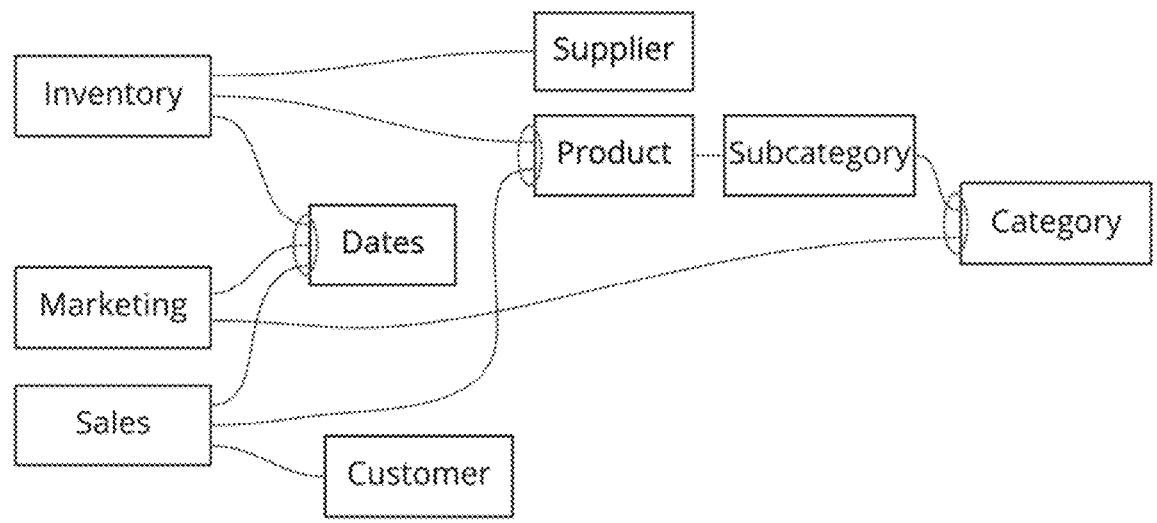
FIG. 25 illustrates a multi-fact object model, in accordance with some implementations.

All objects have only one path back to any related tree root. Objects with more than one tree roots are "shared" where its dimensions are shared dimensions. In some implementations, a shared object must belong to at least two trees of the object model (i.e., a shared object does not have to belong to all trees). In some implementations, a shared object must belong to all trees of the object model In some implementations, shared objects can relate to each other, and the order of relationship matters. FIG. 25 illustrates an object model according to some implementations. In FIG. 25, although Product-Subcategory-Category are related, Marketing is related to the Category object but it cannot resolve to other shared objects: Product—Subcategory.

Shared objects are context dependent. In the example of FIG. 25, Product-Subcategory are considered shared if their dimensions are used to evaluate measures in Inventory and Sales, but between Inventory and Marketing, Product-Subcategory, dimensions are in the Inventory tree.

IV.C.3. Evaluation Logic

Single tree results remain the same as Object Model v1. See Section IV.B. (Query Semantics (Object Model v1)).

Measure results are evaluated by their single tree membership. For example, measures in shared object(s) (i.e., can belong to multiple trees) need to be identified by tree (e.g., via level of detail calculations). Measures spanning multiple trees are aggregated and their components come from individual trees. Filters are also applied by tree.

Tree-based measure results are consolidated together using shared dims

Unshared dims are crossed using current vizQL layout algebra.

An object that tracks back (to the left) to one and only one root would belong to the subtree of the root object.

An object that tracks back to two or more root objects are defined as a shared object within the data model.

A shared object is not a special object, but rather it is defined by the context of analysis, i.e., what else is in the visualization specification or the query.

Any unshared object can become the root object of its subtree; the layout is determined by the data modeler. Any unshared object within a subtree can be the root.

Dimensions in shared objects are shared even when they are not used in any relationship if there are fields from multiple subtrees that are used in the query.

Measures in shared objects may need additional information to identify which tree they would aggregate through.

Filter scope on shared objects is propagated to all affected subtrees.

Filter scope on unshared objects is limited to their respective subtrees. However, if shared dimension (i.e., from shared objects) are used, and their domain is affected by filter within subtrees in play, then shared dimensions domain is removed from the final overlay results.

Calculations spanning multiple subtrees would require their shared objects.

IV.C.4. Object Model Shared Dimension Semantics

IV.C.4.a. Background

During development of Object Model v1, there was a need to keep track of the subqueries so as to execute the subqueries independently in parallel, perform subquery fusion, and perform the final outer joins locally if necessary. To this end, Object Model Query was created as an intermediate query representation (between Abstract Query and Logical Query). Some implementations of Object Model v1 first create an Object Model Query Builder that collects the information required to compute the subqueries. Then the Builder is asked (e.g., by a computer device) for an Object Model Query.

IV.C.4.b. Problem

According to some implementations of the present disclosure, the desired semantics for data models with shared dimensions require that the computer device takes a full Abstract Query that may possibly span multiple trees and compute and combines the Object Model v1 subqueries for each tree ("tree subqueries") and then combines tree subqueries to get the final result.

IV.C.4.c. Solution.

Prerequisites. Some implementations create a Shared Dimension Tree View structure at the point where we have the SQLQuery.

Split up the SQL Query. In some implementations, the computing device works with a SQLQuery object instead of an Abstract Query object. For the purposes of this disclosure, there are no meaningful differences between them. In order to achieve Object Model v1 semantics within any particular tree, some implementations split up the full SQLQuery into separate SQLQuery objects for each tree. This is accomplished by first computing the Shared Dimension Tree View structure, determining which trees are active, and then for each active tree, the computing device creates a SQLQuery containing all of the objects that reference fields in that tree. In some implementations, the computing device may end up duplicating some objects (e.g. if a select column is shared between two trees, that select column should appear in the SQLQuery object for both trees it belongs to. Any tree-agnostic settings should be copied from the full SQLQuery object.

Compute Tree Subqueries

Some implementations resolve each tree-scoped SQLQuery into the Object Model v1 subqueries by looping over the set of tree-scoped SQLQuery objects. Where we use the full ObjectGraph today, we use the appropriate tree subgraph instead.

In order to ensure that the Object Model v1 subqueries are kept together, we need to associate each tree subquery and query component (e.g. Order Bys, Top N) with the appropriate tree. Some implementations hold the tree ID for the tree that the computing device is currently working with.

Today, we create an IObjectModelQueryBuilder when we create and add measure subqueries to the base table subquery. In order to support multiple sets of subqueries, some implementations construct a IObjectModelQueryBuilder in ConstructQueryWithObjectModelSemanticsImpl and pass it down to where we create the subqueries, adding subqueries and other query components. Some implementations modify the API for IObjectModelQueryBuilder to facilitate adding subqueries for a particular tree, as well as other query components. Some implementations modify the reconstruction actions so that they can be associated with a specific tree.

Combine Tree Subqueries. For Object Model Query to construct the final Logical Query, it first runs through the reconstruction pipeline. When there are multiple sets of subqueries, the reconstruction pipeline is run on each tree to form the tree subquery. The reconstruction state is how we retrieve the final query, so we need to combine tree subqueries when we run the reconstruction pipeline. We can do this by adding an additional set of loops over the active trees. After the reconstruction pipeline has been run for a particular tree, we combine that with the previous tree subquery.

Order of Operations. Some implementations perform different joins between trees depending on whether or not they have dimensions in any common active nodes. All tree subqueries that share dimensions in their common active nodes are joined first, followed by joining in the trees that do not have any dimension nodes in common.

Determining Shared Active Nodes. The requirements to join on one or more shared dimension columns are:
The columns must be present in the visualization;
The columns must be in the set of "group bys" in the SQLQuery;
Two or more root nodes must be related to the nodes that contain the columns;
The nodes must be shared nodes (i.e., adjacent to all active root nodes they are related to).

Figure 26:
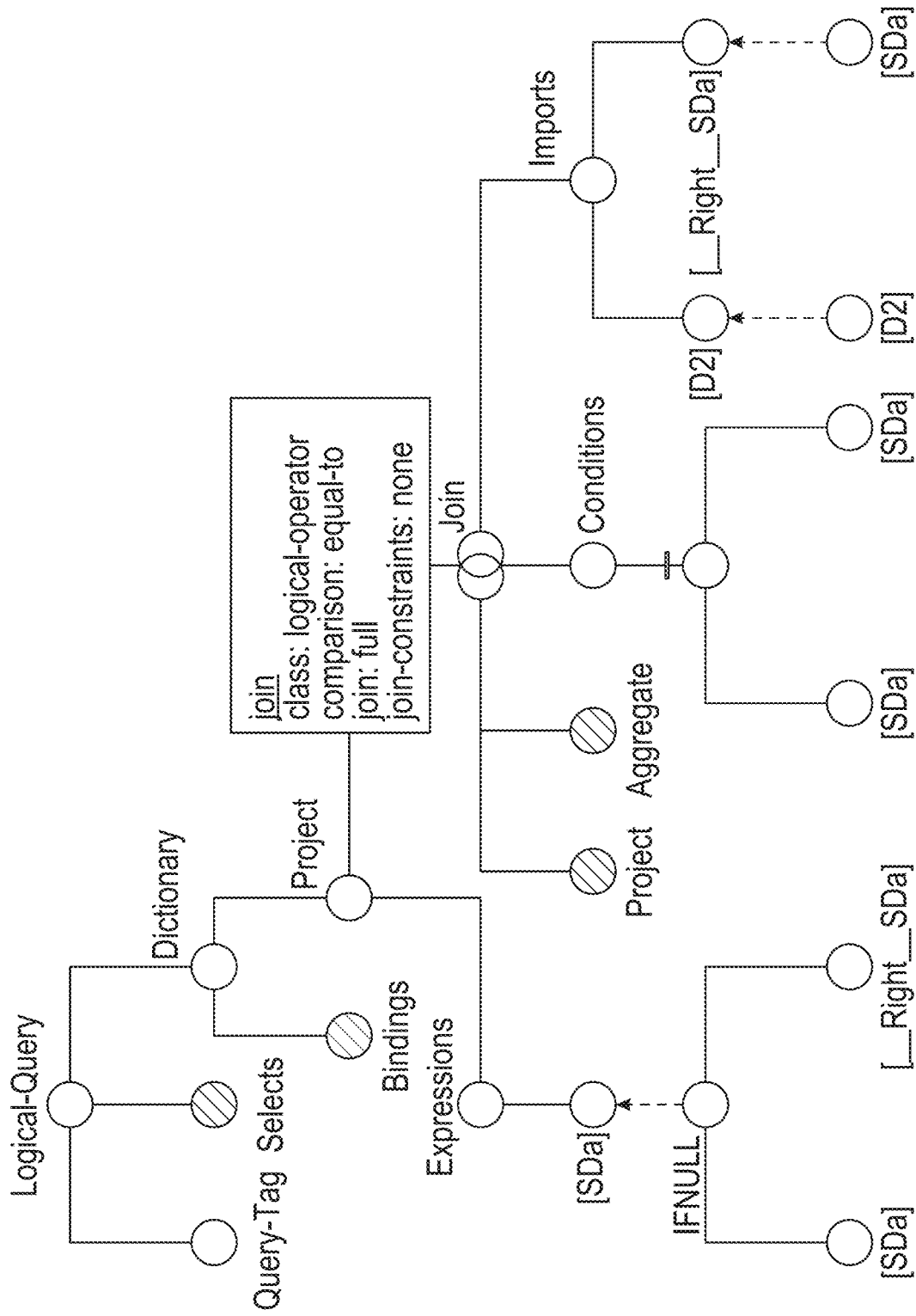
FIG. 26 illustrates creating a join logical operation for tree subqueries with shared nodes, in accordance with some implementations.

In some implementations, to determine the set of shared active nodes, the following algorithm is used:

1. Find the set of shared nodes that are active
2. Filter the nodes found in step 1 to just nodes from which we have dimension columns Creating JoinLogicalOps for Tree Subqueries with Shared Nodes. For two trees with one dimension column shared between them, we create a JoinLogicalOp with JoinType:: FullJoin, with the condition that the dimension column shared between the two trees is equal. Then, we coalesce the two dimension columns with a ProjectOp. This is illustrated in FIG. 26.

Note that we must rename the dimension column on one side, import it, and then project the IFNULL calculation between the dimension coming from the left and the renamed dimension onto the shared column name. In the case where we have multiple dimension columns shared, or multiple nodes shared, we combine each of the equality join conditions with an OR. We also layer on additional ProjectOp for each shared dimension column (and import each renamed column). When there are three or more trees, we add on additional outer joins as above.

Figure 27:
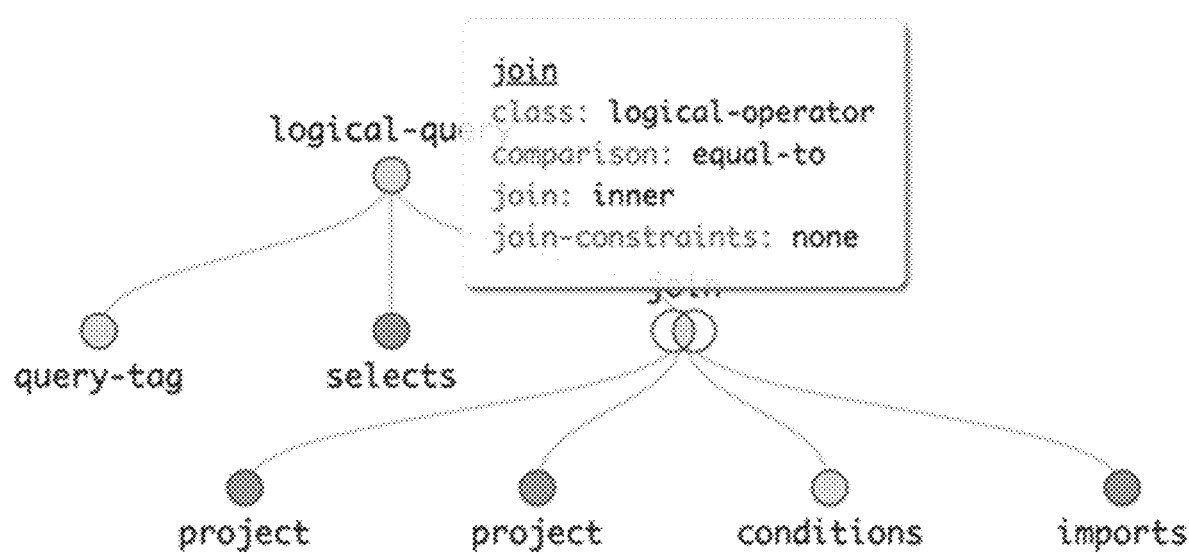
FIG. 27 illustrates creating a join logical operation for tree subqueries with no shared nodes, in accordance with some implementations.

Creating JoinLogicalOps for Tree Subqueries with no Shared Nodes. In this scenario, we combine tree subqueries with no active nodes in common with a cross join, which is implemented as a JoinLogicalOp with JoinType::Inner, but with no conditions. This is illustrated in FIG. 27.

V. Flowcharts

FIGS. 28A-28E provide a flowchart of a method 2600 for generating object models (e.g., data models) that span multiple fact tables according to some implementations. The method 2600 is also called a process.

The method 2600 is performed (2602) at a computing device 200 having a display 208, one or more processors 202, and memory 214. The memory 214 stores (2604) one or more programs configured for execution by the one or more processors 202. In some implementations, the operations shown in FIGS. 1A to 1C, 4A, 4B, 5A to 5D, 6A, 6B, 7, 8A to 8C, 9A to 9C, 10, 11, 12, 13A to 13U, 14A, 14B, 15A to 15C, 16A to 16H, 17A to 17E, 18A to 18I, 19A to 19G, 20A to 20I, 21A to 21C, 22, 23, 24A to 24H, 25, 26, and 27 correspond to instructions stored in the memory 212 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 2600 may be combined and/or the order of some operations may be changed. In some implementations, some of the operations in the method 2600 can be combined with other operations in the method 2700 and/or the method 2800.

The computing device displays (2606), in a user interface (e.g., the UI displays the logical layer of data source(s)), a first object icon and a second object icon positioned to the right of the first object icon. The first object icon represents a first object (e.g., first logical table) of a first data source. The second object icon represents a second object (e.g., second logical table) of the first data source. The first object icon is connected to the second object icon via a first connector (e.g., link) representing a relationship between the first object and the second object. The relationship between the first object and the second object has a first cardinality.

In some implementations, the first cardinality is (2608) one of: a many-to-many relationship, a many-to-one relationship, and a one-to-many relationship. In some implementations, if the relationship cardinality is unknown, the computing device assumes all relationships are many-to-many.

In some implementations, the computing device, in response to receiving user selection of the first object icon: displays (2610), in the user interface, a plurality of data rows and data columns representing information corresponding to one or more data fields in the third object.

In some implementations, the first object comprises (2612) a first fact table (e.g., a logical table or a fact subtree).

The computing device, in response to receiving (2614) a first user input to add a third object (e.g., third logical table), displays, in the user interface, a third object icon representing the third object.

In some implementations, the third object comprises (2616) a second fact table that is unrelated to the first fact table (e.g., there is no aggregation path for dimensions and measures between the first fact table and the second for table, or the first fact table and the second fact table are different base tables).

In some implementations, the third object is (2618) an object of the first data source.

In some implementations, the third object is (2620) an object of a second data source, distinct from the first data source.

Figure 28B:
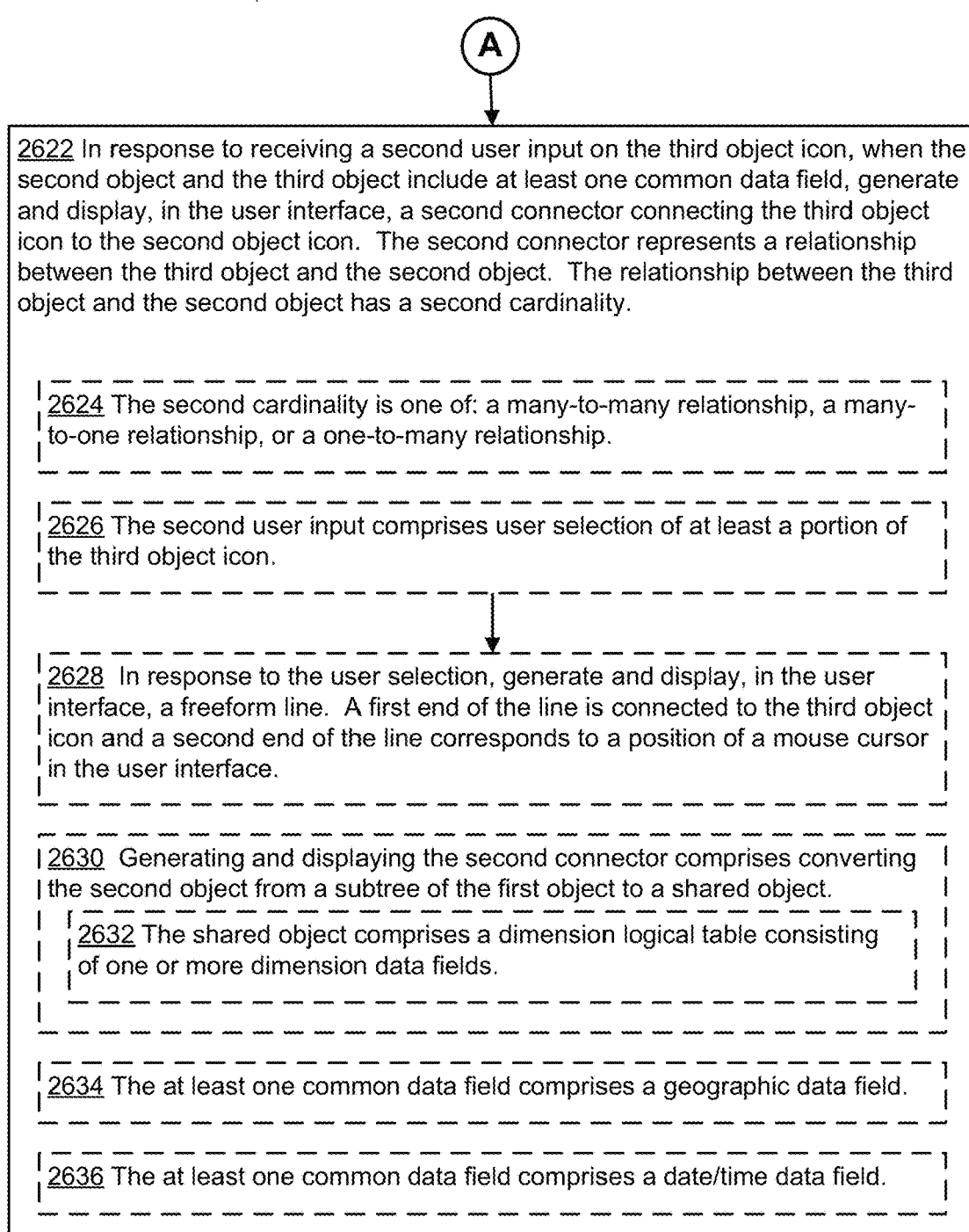

Referring to FIG. 28B, the computing device, in response to receiving (2622) a second user input on the third object icon: in accordance with a determination that the second object and the third object include at least one common data field, generates and displays, in the user interface, a second connector connecting the third object icon to the second object icon. The second connector represents a relationship between the third object and the second object. The relationship between the third object and the second object has a second cardinality.

In some implementations, the second cardinality is (2624) one of: a many-to-many relationship, a many-to-one relationship, and a one-to-many relationship. In some implementations, if the relationship cardinality is unknown, the computing device assumes all relationships are many-to-many.

In some implementations, the second user input comprises (2626) user selection of at least a portion (e.g., an edge or a side) (e.g., a circular icon that user can "drag" a line out of) of the third object icon.

In some implementations, the computing device, in response to (2628) the user selection, generates and displays, in the user interface, a freeform line. A first end of the line is connected to the third object icon and a second end of the line corresponds to a position of a mouse cursor in the user interface. For example, in some implementations, by positioning a mouse or a stylus over other object icons in the user, the user can "search" the existing object model that is displayed in the user interface, to determine if there are relevant/related objects that the second object can relate to. In some implementations, the freeform line becomes a connector line (e.g., the second connector) connecting two object icons when the computing device determines that the two object models corresponding to the two object icons include at least one related (e.g., common) data field.

In some implementations, generating and displaying the second connector further comprises converting (2630) the second object from a subtree of the first object to a shared object. (e.g., that is shared between a first tree to which the first object belongs and a second tree to which the second object belongs)

In some implementations, the shared object comprises a logical table consisting (2632) of one or more dimension data fields. A dimension table is a logical table that consists of just dimension data fields (i.e., there are no measure data fields in a dimension table).)

In some implementations, the shared object comprises a logical table consisting of dimension fields and measure fields.

In some implementations, the at least one common data field comprises (2634) a geographic data field. Examples of geographic data field include country, region, state, province, city, postal code, longitude, or latitude.

In some implementations, the at least one common (e.g., related) data field comprises (2636) a date/time data field (e.g., month, date, year, or day).

Referring now to FIG. 28C, in some implementations, the computing device, after connecting the third object icon to the second object icon via the second connector, and in response to receiving a user interaction (e.g., a hover action) with the second connector, displays (2638) an identification of the at least one common data field.

In some implementations, the computing device, after connecting the third object icon to the second object icon via the second connector, vertically aligns (2640) (e.g., arranges the icons in a column) the first object icon and the third object icon for display in the user interface.

In some implementations, the computing device, after connecting the third object icon to the second object icon via the second connector, arranges (2642) the first object icon and the third object icon in an alphabetical order for display in the user interface.

Referring to FIG. 28D, in some implementations, the computing device displays (2644), in the user interface, a fourth object icon representing a fourth object. The fourth object icon is connected to the second object icon via a third connector representing a relationship between the fourth object and the second object. The relationship between the fourth object and the second object has a third cardinality. The fourth object icon is connected to a fifth object icon, representing a fifth object, via a fourth connector representing a relationship between the fourth object and the fifth object. The relationship between the fourth object and the fifth object has a fourth cardinality. The third connector and the fourth connector include an overlapping portion.

In some implementations, the third cardinality is (2646) one of: a many-to-many relationship, a many-to-one relationship, and a one-to-many relationship. In some implementations, if the relationship cardinality is unknown, the computing device assumes all relationships are many-to-many.

In some implementations, the fourth cardinality is (2648) one of: a many-to-many relationship, a many-to-one relationship, and a one-to-many relationship. In some implementations, if the relationship cardinality is unknown, the computing device assumes all relationships are many-to-many.

In some implementations, in response to receiving (2650) a user interaction (e.g., a hover action) with the overlapping portion of the third connector and the fourth connector, the computing device concurrently displays (i) an identification of a first related data field relating the fourth object and the second object and (ii) an identification of a second related data field relating the fourth object and the fifth object. The first object icon, the second object icon, the third object icon, the fourth object icon, and the fifth object icon are (2652) distinct icons. The first related data field and the second related data field are (2654) distinct data fields.

In some implementations, in response to user selection (2656) of the identification of the first related data field relating the fourth object and the second object, the computing device simultaneously visually emphasizes the fourth object, the second object, and the third connector.

Referring now to FIG. 28E, in some implementations, the computing device displays (2658), in the user interface: a fourth object icon representing a fourth object, a fifth object icon representing a fifth object, and a third connector connecting the fourth object icon and the fifth object icon. The third connector represents a many-to-many relationship between the fourth object and the fifth object. The fourth object icon, the fifth object icon, and the third connector are (2660) not connected to any of the first object icon, the second object icon, and the third object icon.

In some implementations, the computing device, in response to receiving (2662) a third user input on the fifth object icon, generates and displays, in the user interface, a freeform line. A first end of the line is connected to the fifth object icon and a second end of the line corresponds to the position of a mouse cursor in the user interface.

In some implementations, the computing device, in response to receiving (2664) an interaction between the second end of the line and the second object icon: converts the freeform line into a third connector connecting the fifth object icon and the second object icon. The third connector representing a many-to-many relationship between the fifth object and the second object.

In some implementations, the first object icon, the second object icon, and the third object icon are (2666) displayed in a first portion of the user interface. The fourth object icon and the fifth object icon are displayed in a second portion of the user interface. Converting the freeform line into a third connector connecting the fifth object icon and the second object icon includes: redisplaying the fourth object icon and the fifth object icon in the first portion of the user interface.

FIGS. 29A-29D provide a flowchart of a method 2700 for performing guided analysis using multi-fact object models (e.g., data models), in accordance with some implementations. The 2700 is also called a process.

The method 2700 is performed (2702) at a computing device 200 having a display 208, one or more processors 202, and memory 214. The memory 214 stores (2704) one or more programs configured for execution by the one or more processors 202. In some implementations, the operations shown in FIGS. 1A to 1C, 4A, 4B, 5A to 5D, 6A, 6B, 7, 8A to 8C, 9A to 9C, 10, 11, 12, 13A to 13U, 14A, 14B, 15A to 15C, 16A to 16H, 17A to 17E, 18A to 18I, 19A to 19G, 20A to 20I, 21A to 21C, 22, 23, 24A to 24H, 25, 26, and 27 correspond to instructions stored in the memory 212 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 2700 may be combined and/or the order of some operations may be changed. In some implementations, some of the operations in the method 2700 can be combined with other operations in the method 2600 and/or the method 2800.

The computing device displays (2706), in a user interface (e.g., in a schema region of the user interface), a plurality of data field icons corresponding to a plurality of data fields. Each of the data fields is associated with a respective object (e.g., a logical table) of a plurality of objects (logical tables) in an object model.

The computing device, in response (2708) to receiving (i) user selection of a first data field icon, from the plurality of data field icons, corresponding to a first data field, and (ii) placement of the first data field icon in a shelf region of the user interface, generates and displays a first data visualization in the user interface. The first data field is associated with a first object of the plurality of objects.

In some implementations, generating the first data visualization includes executing (2710) a first query that specifies an aggregation of data values of the first data field (or aggregation of data values of the first data field according to a first dimension data field) (e.g., aggregate campaign spend, or aggregate campaign spend by marketing type).

The computing device updates (2712) a visual characteristic (e.g., a visual appearance) of a subset of (one or more) the plurality of data field icons (e.g., the subset of data fields are associated with a third object of the plurality of objects) that are displayed in the user interface from a first visual characteristic to a second visual characteristic. Each data field icon in the subset of data field icons is (2714) associated with a second object of the plurality of objects, distinct from the first object. The subset of data field icons are (2716) user-selectable independent of the first or second visual characteristic. (selectable when their appearance corresponds to the first or second visual characteristic) (e.g., user-selectable when the subset of data field icons have the first visual characteristic or the second visual characteristic.)

In some implementations, updating the visual characteristic of the subset of data field icons from the first visual characteristic to the second visual characteristic includes (2718) visually de-emphasizing (e.g., graying out) the subset of data field icons relative to other data field icons in the plurality of data field icons while maintaining user-selectability (e.g., clickable) of the subset of data field icons.

Figure 29A:
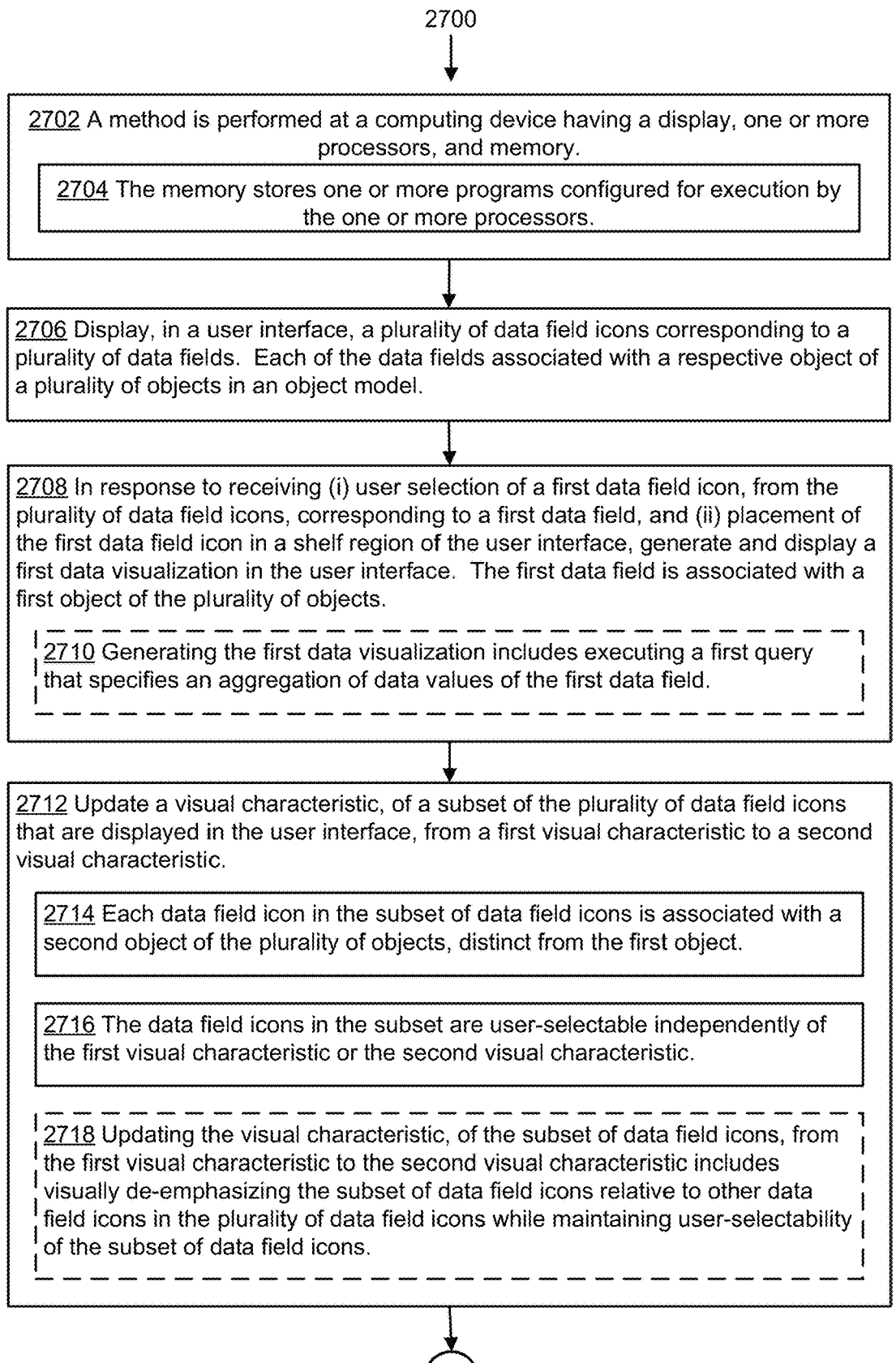
Figure 29B:
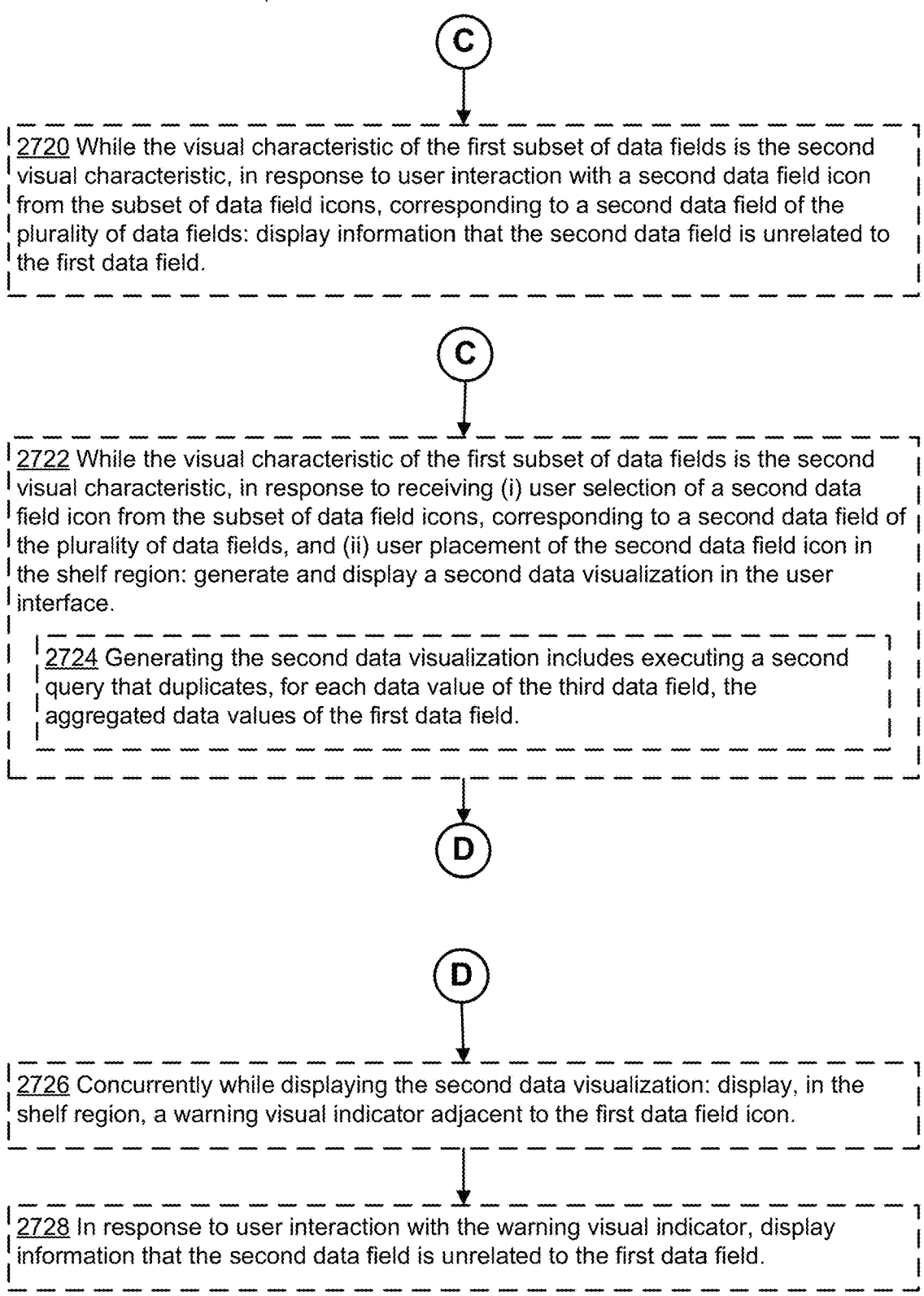

Referring now to FIG. 29B, in some implementations, while the visual characteristic of the first subset of data fields is the second visual characteristic, the computing device, in response to a user interaction (e.g., hover over) with a second data field icon from the subset of data field icons, corresponding to a second data field [e.g., "Sales type"] of the plurality of data fields (the second data field is associated with a second object), displays (2720) information that the second data field is unrelated to the first data field.

In some implementations, while the visual characteristic of the first subset of data fields is the second visual characteristic, the computing device, in response to receiving (i) user selection of a second data field icon (e.g., "Sales type") from the subset of data field icons, corresponding to a second data field of the plurality of data fields, and (ii) user placement of the second data field icon in the shelf region, generates (2722) and displays a second data visualization in the user interface.

In some implementations, generating the second data visualization includes executing (2724) a first query that duplicates (e.g., replicates or reproduces), for each data value of the third data field, the aggregated data values of the first data field.

In some implementations, concurrently while displaying the second data visualization, the computing device displays (2726), in the shelf region, a warning visual indicator adjacent to the first data field icon (and/or the second date field icon). In response to a user interaction (e.g., hover over) with the warning visual indicator, the computing device displays (2728) information that the second data field is unrelated to the first data field.

Figure 29C:
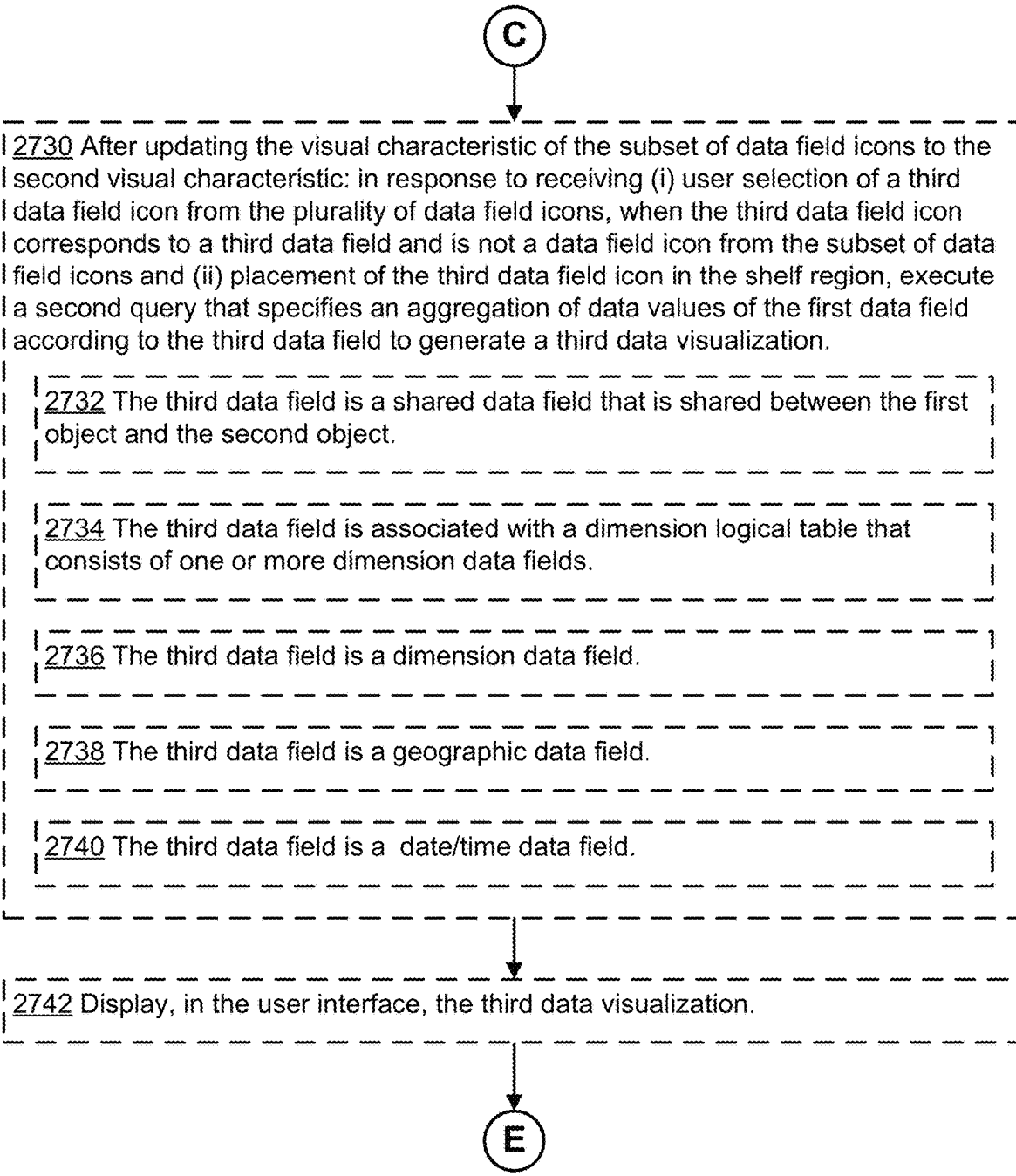

With continued reference to FIG. 29C, in some implementations, the method 2700 further includes, after updating (2730) the visual characteristic of the subset of data field icons to the second visual characteristic: in response to receiving (i) user selection of a third data field icon from the plurality of data field icons, wherein the third data field icon corresponds to a third data field and is not a data field icon from the subset of data field icons and (ii) placement of the third data field icon in the shelf region: executing a second query that specifies an aggregation of data values of the first data field according to the third data field to generate a third data visualization.

In some implementations, the third data field is (2732) a shared data field between the first object and the second object.

In some implementations, the third data field is (2734) associated with a dimension logical table that consists of one or more dimension data fields. A dimension logical table is a logical table that contains only dimension data fields (i.e., it does not contain any measure data field.)

In some implementations, the third data field is (2734) associated with a logical table that includes one or more dimension fields and one or more measure fields.

In some implementations, the third data field is (2736) a dimension data field.

In some implementations, the third data field is (2738) a geographic data field.

In some implementations, the third data field is (2740) a date/time data field.

In some implementations, the method 2700 includes displaying (2742), in the user interface, the third data visualization.

Referring to FIG. 29D, in some implementations, concurrently while displaying the third data visualization, the computing device updates (2744) (e.g., restores) a visual characteristic of the subset of data fields from the second visual characteristic to the first visual characteristic.

In some implementations, updating the visual characteristic of the subset of data fields from the first characteristic to the second characteristic comprises visually de-emphasizing (e.g., graying out) the subset of data field icons relative to other data field icons of the plurality of data field icons. In some implementations, updating (restoring) a visual characteristic of the subset of data fields from the second characteristic to the first characteristic includes restoring a view of the user interface to a state prior to the visual de-emphasis.

In some implementations, the method 2700 further includes after displaying the third data visualization: in response to receiving (i) user selection of a fourth data field icon from the subset of data field icons, corresponding to a fourth data field, and (ii) placement of the fourth data field icon in the shelf region: executing (2746) a third query that specifies an aggregation of data values of the fourth data field ["Sales total"] according to the third data field ["Product name"] to generate a fourth data visualization. The method includes displaying (2748), in the user interface, the fourth data visualization.

In some implementations, the fourth data visualization is (2750) concurrently displayed with the third data visualization in the user interface.

In some instances, the third data visualization and the fourth data visualization share (2752) a common data axis.

FIGS. 30A-30D provide a flowchart of a method for generating data visualizations using multi-fact object models (e.g., data models), in accordance with some implementations. The 2800 is also called a process.

The method 2800 is performed (2802) at a computing device 200 having a display 208, one or more processors 202, and memory 214. The memory 214 stores (22804) one or more programs configured for execution by the one or more processors 202. In some implementations, the operations shown in FIGS. 1A to 1C, 4A, 4B, 5A to 5D, 6A, 6B, 7, 8A to 8C, 9A to 9C, 10, 11, 12, 13A to 13U, 14A, 14B, 15A to 15C, 16A to 16H, 17A to 17E, 18A to 18I, 19A to 19G, 20A to 20I, 21A to 21C, 22, 23, 24A to 24H, 25, 26, and 27 correspond to instructions stored in the memory 212 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 2800 may be combined and/or the order of some operations may be changed. In some implementations, some of the operations in the method 2800 may be combined with other operations in the method 2600 and/or the method 2700.

The computing device receives (2806) (e.g., via a user interface, such as user interface 2332) a first user input specifying a first dimension data field and a second dimension data field for generating a first data visualization.

In some implementations, at least one of the first dimension data field or the second dimension data field is (2808) a geographic data field.

In some implementations, at least one of the first dimension data field or the second dimension data field is (2810) a date/time data field.

The computing device determines (2812) that the first dimension data field belongs to a first object (e.g., a first logical table) of an object model and the second dimension data field belongs to a second object (e.g., a second logical table) of the object model, distinct from the first object.

Referring to FIG. 30B, in some implementations, the computing device constructs (2814) a dimension subquery according to characteristics of the first dimension data field, the second dimension data field, the first object, and/or the second object. In some implementations, the characteristics include whether the first dimension data field is a shared dimension or an unshared dimension, and/or whether the second dimension data field is a shared dimension or an unshared dimension, whether the first object can be traced back to a single root table or to multiple root tables, and/or whether the second object can be traced back to a single root table or to multiple root tables.

The computing device determines (2816) a join type (e.g., inner join, cross join, outer join left join, right join) for combining (i) first data rows that includes data values of the first dimension data field and (ii) second data rows that includes data values of the second dimension data field.

The computing device constructs (2824) the dimension subquery according to the determined join type. The dimension subquery references the first object and the second object;

The computing device executes (2820) the dimension subquery against one or more data sources corresponding to the first dimension data field and the second dimension data field to retrieve first tuples that comprise unique ordered combinations of data values for the first dimension data field and the second dimension data field.

In some implementations, the one or more data sources comprise (2822) a plurality of data sources.

The computing device constructs (2824) one or more measure subqueries. Each of the measure subqueries references one or more measure data fields in the object model;

The computing device executes (2826) the one or more measure subqueries to retrieve second tuples;

The computing device forms (2828) extended tuples by combining the retrieved first tuples and the retrieved second tuples.

The computing device generates (2830) and displays the first data visualization according to the extended tuples.

Figure 30A:
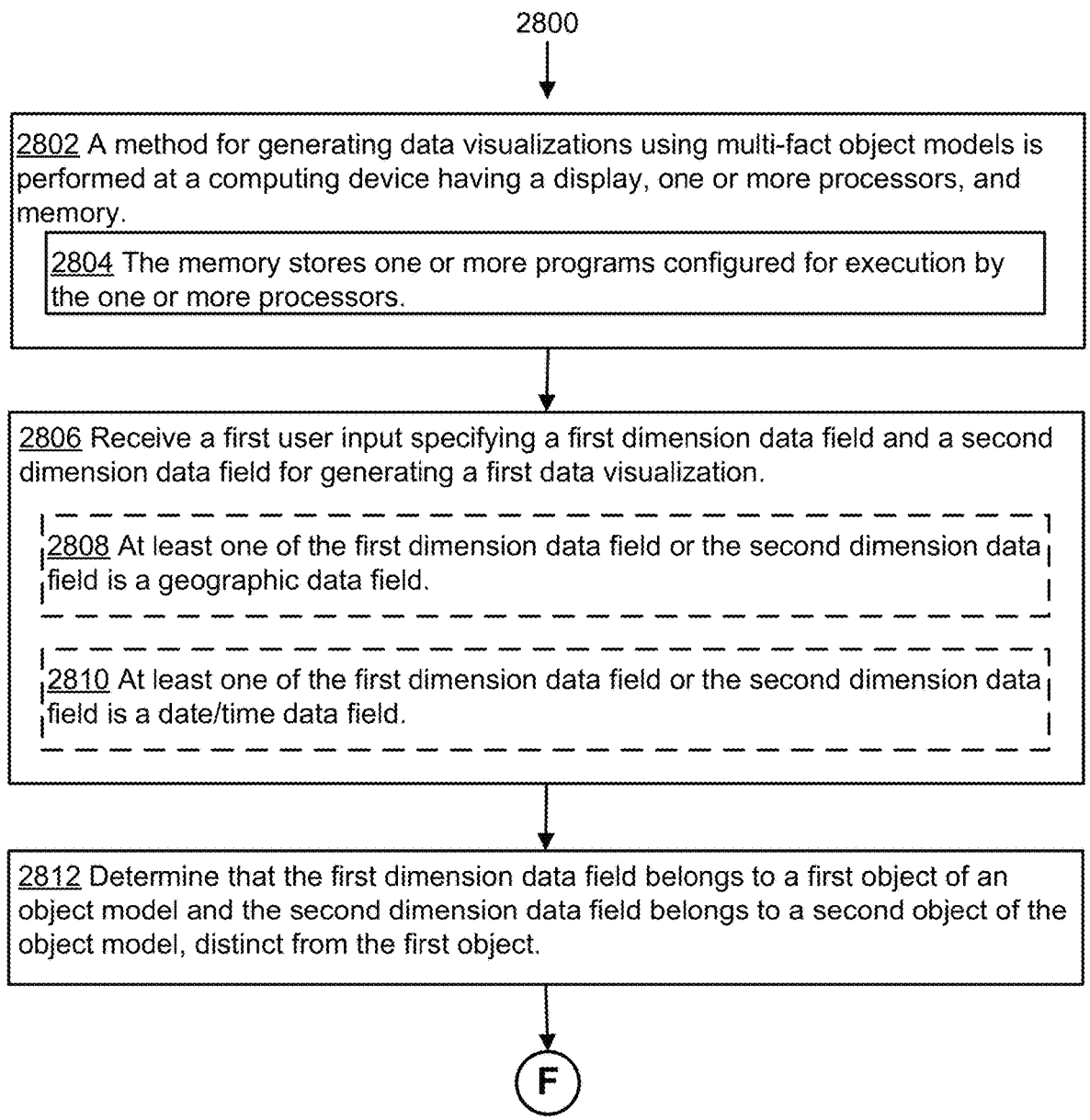
Figure 30C:
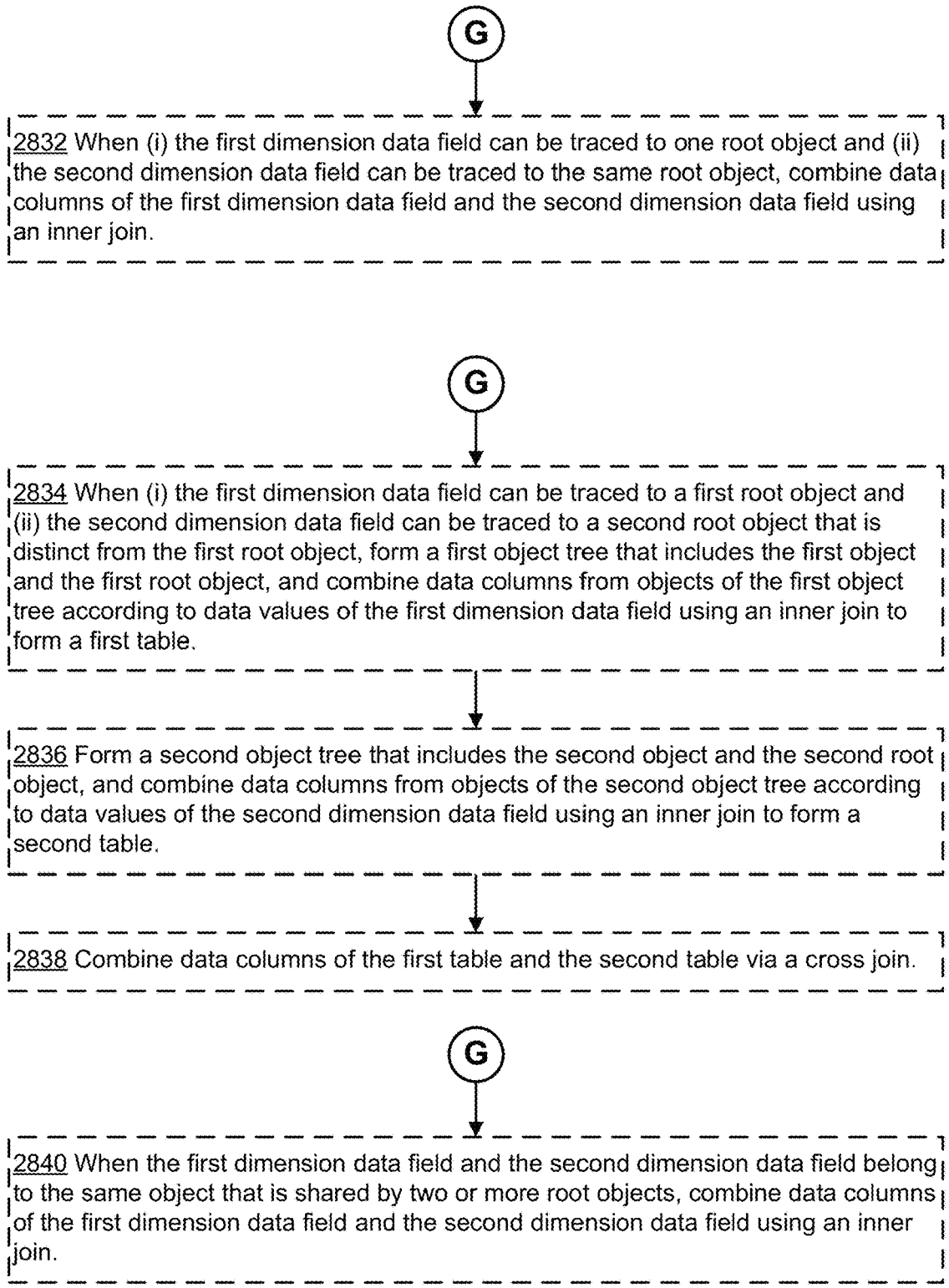

Referring to FIG. 30C, in some implementations, the first dimension data field and the second dimension data field are unshared dimensions from one tree (e.g., Scenario 2.1 in Section IV.C.1.b). In some implementations, constructing the dimension subquery according to the characteristics of the first dimension data field, the second dimension data field, the first object, and/or the object includes: in accordance with a determination (2832) by the computing device that (i) the first dimension data field can be traced to one (e.g., one and only one) (i.e., a single) root object (e.g., a fact table) (e.g., by traversing in the leftward direction in the object model) and (ii) the second dimension data field can be traced to the same root object (i.e., the first and objects belong to the same root object), the computing device combines data columns of the first dimension data field and the second dimension data field using an inner join.

As discussed above, a dimension data field that can be traced to only one root object is an unshared dimension data field (i.e., it is not shared by other fact tables). Using the object model 2200 in FIG. 22 as an example, the first dimension data field can be D1 (e.g., Marketing Type) the second dimension data field can be D4 (e.g., dates). Because D1 and D4 are unshared dimensions from one tree, the query semantics for constructing the dimension query are same semantics as Object Model v1 (see, e.g., Section IV.B).

In some implementations, the first dimension data field and the second dimension data field are unshared dimensions from multiple trees, as described in Scenario 2.2 in Section IV.C.1.b. In some implementations, constructing the dimension subquery according to the characteristics of the first dimension data field, the second dimension data field, the first object, and/or the second object includes: in accordance with a determination by the computing device that (i) the first dimension data field can be traced to a first root object and (ii) the second dimension data field can be traced to a second root object that is distinct from the first root object (e.g., and the second object is not a shared object of the first root object, the computing device forms (2834) a first object tree that includes the first object and the first root object, and combines data columns from objects of the first object tree according to data values of the first dimension data field using an inner join to form a first table. The computing device forms (2836) a second object tree that includes the second object and the second root object, and combines data columns from objects of the second object tree according to data values of the second dimension data field using an inner join to form a second table. The computing device combines (2838) data columns of the first table and the second table via a cross join. Using the object model 2200 in FIG. 22 to illustrate, in one example the first dimension data field is DI (e.g., Marketing type) and the second dimension data field is D6 (e.g., Parts). In this example, the computing device (i) forms a marketing object tree (in this case, the marketing tree consists of just the marketing object) (result 1), (ii) forms a support tree that includes the parts object (logical table 6) and the Support object (i.e., the root object) and inner joins all the dimensions using Parts (result 2), and cross joins result 1 and result 2. In some instances, the first object is a first root object. In some implementations, the second object is a second root object that is distinct from the first root object.

In some implementations, the first dimension data field and the second data dimension data field are shared dimensions from a single shared tree, as described in Scenario 2.3 in Section IV.C.1.b. In some implementations, constructing the dimension subquery according to the characteristics of the first dimension data field, the second dimension data field, the first object, and/or the second object includes: in accordance with a determination by the computing device that the first dimension data field and the second dimension data field belong to the same object (e.g., a shared tree) that is shared by two or more root objects (e.g., and the first object is not a root object, and the second object is not a root object): the computing device combines data columns of the first dimension data field and the second dimension data field using an inner join. Using the example object model 2200 in FIG. 22 as an example, the first dimension data field can be D7 and the second dimension data field can be D9.

With continued reference to FIG. 30D, in some implementations, the first dimension data field and the second dimension data field are shared dimensions from multiple shared trees, as discussed with respect to Scenario 2.4 in Section IV.C.1.b. In some implementations, constructing the dimension subquery according to the characteristics of the first dimension data field, the second dimension data field, the first object, and/or the second object includes: in accordance with a determination by the computing device that (i) the first object (of which the first dimension data field belongs) is shared by a first set of root objects (e.g., two or more root objects) and (ii) the second object (of which the second dimension data field belongs) is shared by a second set of root objects (e.g., two or more root objects), the computing device combines data columns of the first dimension data field and the second dimension data field using a cross join. In some implementations, the first set of root objects is the same as the second set of root objects. In some implementations, the first set of root objects and the second set of root objects has at least one distinct root object. Using the object model 2200 as an example, the first dimension data field can be D4 and the second dimension data field can be D5.

In some implementations, the first dimension data field is an unshared dimension data field, the second dimension data field is a shared dimension data field, and the first and second dimension data fields belong to the same tree, as discussed with respect to Scenario 2.5 in Section IV.C.1.b. In some implementations, constructing the dimension subquery according to the characteristics of the first dimension data field, the second dimension data field, the first object, and/or the second object includes, in accordance with a determination by the computing device that (i) the first object (of which the first dimension data field belongs) is a first root object (meaning that the first object (e.g., first root object), and therefore the first dimension data field, is not shared), (ii) the second object can be traced to the first root object, and the (iii) the second dimension data field is not shared by another root object, the computing device combines (2844) data columns of the first dimension data field and the second dimension data field using an inner join. Using the object model 2200 as an example, the first dimension data field can be D1 and the second dimension data field can be D4.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory stores a subset of the modules and data structures identified above. Furthermore, the memory may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating object models that span multiple fact tables, comprising:
   at a computing device having a display, one or more processors and memory storing one or more programs configured for execution by the one or more processors:
   concurrently displaying, in a user interface:
   a tables region that includes a plurality of icons, each of the icons representing a respective logical table of one or more data sources; and
   a visualization region adjacent to the tables region, including displaying in the visualization region a data model that includes a plurality of data object icons, wherein:
   each data object icon represents a logical table of the one or more data sources;
   each data object icon is connected to at least one other data object icon via a respective connector; and
   the plurality of data object icons includes a first data object icon and a second data object icon positioned to the right of the first data object icon, wherein: (a) the first data object icon represents a first logical table of a first data source; (b) the second data object icon represents a second logical table of the first data source; and (c) the first data object icon is connected to the second data object icon via a first connector representing a relationship between the first logical table and the second logical table;
   detecting a user interaction that includes (i) selection of a first icon from the tables region and (ii) movement of the first icon from the tables region to the visualization region, wherein the first icon represents a third logical table of the one or more data sources; in accordance with a determination, based on the movement of the first icon, that a position of the first icon is in the visualization region, displaying in the visualization region an affordance for adding a new table; detecting that the first icon is placed on the affordance; and in response to detecting that the first icon is placed on the affordance:
   concurrently displaying a new data object icon and the data model in the visualization region, the new data object icon corresponding to the third logical table, wherein the new data object icon (i) is displayed adjacent to the data model and (ii) is not connected to any of the plurality of data object icons of the data model.

2. The method of claim 1, wherein: the first logical table and the second logical table has a first cardinality that is one of: a many-to-many relationship, a many-to-one relationship, and a one-to-many relationship.

3. The method of claim 1, further comprising: after displaying the new data object icon in the visualization region, receiving a user selection of at least a portion of the new data icon; and
   in response to receiving the user selection, generating and displaying a freeform line in the user interface, wherein a first end of the freeform line is connected to the new data object icon and a second end of the freeform line corresponds to a position of a cursor in the user interface.

4. The method of claim 3, further comprising:
   after generating and displaying the freeform line, detecting movement of the cursor to respective positions of the plurality of data object icons;
   in accordance with a determination that the position of the cursor is at a third data object icon of the plurality of data object icons, wherein (a) the third data object icon represents a third logical table and (b) the third logical table and the respective logical table have a common data field, visually emphasizing the third data object icon; and
   in accordance with a determination that the position of the cursor is at a fourth data object icon of the plurality of data object icons, wherein (c) the fourth data object icon represents a fourth logical table and (d) the fourth logical table and the respective logical table do not have a common data field, visually deemphasizing the fourth data object icon.

5. The method of claim 3, further comprising:
after generating and displaying the freeform line, detecting a user interaction to connect the second end of the freeform line to the second data object icon; and
in response to detecting the user interaction:
in accordance with a determination that the second logical table and the respective logical table include at least one common data field:
converting the freeform line into a second connector;
connecting the new data object icon and the second data object icon via the second connector, the second connector representing a relationship between the new data object icon and the second data object icon; and
generating an updated object model that includes the plurality of data object icons and the new data object icon.

6. The method of claim 5, further comprising: after connecting the new data object icon to the second data object icon via the second connector:
in response to receiving a user interaction with the second connector, displaying an identification of the at least one common data field.

7. The method of claim 5, further comprising:
after connecting the new data object icon to the second data object icon via the second connector, displaying the new data object icon such that the new data object icon is vertically aligned with the first data object icon.

8. The method of claim 5, further comprising: after connecting the new data object icon to the second data object icon via the second connector, arranging the first data object icon and the new data object icon in an alphabetical order for display in the user interface.

9. The method of claim 5, wherein the connecting the new data object icon and the second data object icon via the second connector converts the second logical table into a shared object that is shared by both the first logical table and the respective logical table.

10. The method of claim 5, wherein the at least one common data field comprises a geographic data field or a date/time data field.

11. The method of claim 5, wherein:
displaying the new data object icon in the visualization region includes displaying a partition line separating the new data object icon and the data model; and
the method includes ceasing to display the partition line when the new data object icon and the second data object icon are connected via the second connector.

12. The method of claim 9, wherein the shared object comprises a logical table consisting only of one or more dimension data fields and no measure data field.

13. The method of claim 1, further comprising: in response to receiving a user selection of the first data object icon:
displaying, in the user interface, a plurality of data rows and data columns representing information corresponding to one or more data fields in the first logical table.

14. The method of claim 1, wherein: the first logical table comprises a first fact table; and
the third logical table comprises a second fact table that is unrelated to the first fact table.

15. The method of claim 1, wherein the third logical table is a logical table of the first data source.

16. The method of claim 1, wherein the third logical table is a logical table of a second data source, distinct from the first data source.

17. The method of claim 1, further comprising: displaying, in the user interface, a fourth data object icon representing a fourth logical table, wherein:
the fourth data object icon is connected to the second data object icon via a third connector representing a relationship between the fourth logical table and the second logical table, the relationship between the fourth logical table and the second logical table having a third cardinality;
the fourth data object icon is connected to a fifth data object icon, representing a fifth logical table via a fourth connector representing a relationship between the fourth logical table and the fifth logical table, the relationship between the fourth logical table and the fifth logical table having a fourth cardinality; and
the third connector and the fourth connector include an overlapping portion; and
in response to receiving a user interaction with the overlapping portion of the third connector and the fourth connector:
concurrently displaying (i) an identification of a first related data field relating the fourth logical table and the second logical table and (ii) an identification of a second related data field relating the fourth logical table and the fifth logical table wherein:
the first data object icon, the second data object icon, the new data object icon, the fourth data object icon, and the fifth data object icon are distinct icons; and
the first related data field and the second related data field are distinct data fields.

18. A computing device, comprising: one or more processors;
memory;
a display; and
one or more programs stored in the memory and configured for execution by the one or more processors, the one or more programs comprising instructions for:
concurrently displaying, in a user interface;
a tables region that includes a plurality of icons, each of the icons representing a respective logical table of one or more data sources; and
a visualization region adjacent to the tables region, including displaying in the visualization region a data model that includes a plurality of data object icons, wherein:
each data object icon represents a logical table of the one or more data sources;
each data object icon is connected to at least one other data object icon via a respective connector; and
the plurality of data object icons includes a first data object icon and a second data object icon positioned to the right of the first data object icon, wherein: (a) the first data object icon represents a first logical table of a first data source; (b) the second data object icon represents a second logical table of the first data source; and (c) the first data object icon is connected to the second data object icon via a first connector representing a relationship between the first logical table and the second logical table;
detecting a user interaction that includes (i) selection of a first icon from the tables region and (ii) movement of the first icon from the tables region to the visualization region, wherein the first icon represents a third logical table of the one or more data sources;

in accordance with a determination, based on the movement of the first icon, that a position of the first icon is in the visualization region, displaying in the visualization region an affordance for adding a new table;

detecting that the first icon is placed on the affordance; and in response to detecting that the first icon is placed on the affordance:

concurrently displaying a new data object icon and the data model in the visualization region, the new data object icon corresponding to the third logical table, wherein the new data object icon (i) is displayed adjacent to the data model and (ii) is not connected to any of the plurality of data object icons of the data model.

19. A non-transitory computer readable storage medium storing one or more programs configured for execution by a computing device having one or more processors, memory, and a display, the one or more programs comprising instructions for:

concurrently displaying, in a user interface;

a tables region that includes a plurality of icons, each of the icons representing a respective logical table of one or more data sources; and a visualization region adjacent to the tables region, including displaying in the visualization region a data model that includes a plurality of data object icons, wherein:

each data object icon represents a logical table of the one or more data sources;

each data object icon is connected to at least one other data object icon via a respective connector; and the plurality of data object icons includes a first data object icon and a second data object icon positioned to the right of the first data object icon, wherein: (a) the first data object icon represents a first logical table of a first data source; (b) the second data object icon represents a second logical table of the first data source; and (c) the first data object icon is connected to the second data object icon via a first connector representing a relationship between the first logical table and the second logical table;

detecting a user interaction that includes (i) selection of a first icon from the tables region and (ii) movement of the first icon from the tables region to the visualization region, wherein the first icon represents a third logical table of the one or more data sources;

in accordance with a determination, based on the movement of the first icon, that a position of the first icon is in the visualization region, displaying in the visualization region an affordance for adding a new table;

detecting that the first icon is placed on the affordance; and in response to detecting that the first icon is placed on the affordance:

concurrently displaying a new data object icon and the data model in the visualization region, the new data object icon corresponding to the third logical table, wherein the new data object icon (i) is displayed adjacent to the data model and (ii) is not connected to any of the plurality of data object icons of the data model.

20. The method of claim 1, further comprising, concurrently with displaying the new data object icon in the visualization region:

displaying, via the user interface, a tooltip that includes information indicating presence of one or more logical tables that are disconnected from the data model.

* * * * *